US012072669B2

(12) United States Patent
Nishida et al.

(10) Patent No.: US 12,072,669 B2
(45) Date of Patent: Aug. 27, 2024

(54) CARTRIDGE HAVING A MEMBER FOR TRANSMITTING A DRIVING FORCE FOR ROTATING A DEVELOPING ROLLER

(71) Applicant: CANON KABUSHIKI KAISHA, Tokyo (JP)

(72) Inventors: Shinichi Nishida, Kawasaki (JP); Yuichi Fukui, Yokosuka (JP); Tetsushi Uneme, Kawasaki (JP); Yasuyuki Egami, Tokyo (JP); Yohei Anzai, Kawasaki (JP); Takeo Kawanami, Kamakura (JP); Toshiki Fujino, Kawasaki (JP); Sohta Sugimoto, Yokohama (JP); Fumiya Sawashima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/509,184

(22) Filed: Oct. 25, 2021

(65) Prior Publication Data

US 2022/0050417 A1 Feb. 17, 2022

Related U.S. Application Data

(60) Division of application No. 16/713,561, filed on Dec. 13, 2019, now Pat. No. 11,392,082, which is a (Continued)

(30) Foreign Application Priority Data

Jun. 15, 2017 (JP) ................................ 2017-117890

(51) Int. Cl.
*G03G 21/18* (2006.01)
*G03G 21/16* (2006.01)

(52) U.S. Cl.
CPC ..... *G03G 21/1864* (2013.01); *G03G 21/1647* (2013.01); *G03G 21/1825* (2013.01); (Continued)

(58) Field of Classification Search
USPC .......................................................... 399/113
See application file for complete search history.

(56) References Cited

U.S. PATENT DOCUMENTS 4,875,063 A 10/1989 Idenawa et al.
5,262,824 A 11/1993 Morita et al.
(Continued)

FOREIGN PATENT DOCUMENTS

CN 200965623 Y 10/2007
CN 102109017 A 6/2011
(Continued)

OTHER PUBLICATIONS

Hattori, JP2001-337511A, computer translation (Year: 2001).*
(Continued)

*Primary Examiner* — Quana Grainger
(74) *Attorney, Agent, or Firm* — Venable LLP

(57) ABSTRACT

A control member 76 for controlling transmission and blocking of a rotational force by a clutch is rotatably supported by a supporting member which supports a developing frame. a locking portion provided on the control member 76 rotates between a position retracted from a locked portion of the clutch and a position for engaging with the locked portion.

35 Claims, 45 Drawing Sheets

Related U.S. Application Data continuation of application No. PCT/JP2018/023714, filed on Jun. 15, 2018.

(52) U.S. Cl.
CPC ... *G03G 21/186* (2013.01); *G03G 2221/1654* (2013.01); *G03G 2221/1657* (2013.01)

(56) References Cited

U.S. PATENT DOCUMENTS

| | | | |
|---|---|---|---|
| 5,485,244 | A | 1/1996 | Gotoda et al. |
| 5,548,379 | A | 8/1996 | Fukuchi et al. |
| 5,559,581 | A | 9/1996 | Sugiura et al. |
| 5,946,531 | A | 8/1999 | Miura et al. |
| 6,681,088 | B2 | 1/2004 | Kanno et al. |
| 7,567,769 | B2 | 7/2009 | Noguchi et al. |
| 7,761,024 | B2 | 7/2010 | Imaizumi et al. |
| 7,865,115 | B2 | 1/2011 | Oguma et al. |
| 7,907,866 | B2 | 3/2011 | Imaizumi et al. |
| 8,145,095 | B2 | 3/2012 | Sakurai et al. |
| 8,175,487 | B2 | 5/2012 | Imaizumi et al. |
| 8,275,283 | B2 | 9/2012 | Uneme et al. |
| 8,401,441 | B2 | 3/2013 | Uneme et al. |
| 8,442,412 | B2 | 5/2013 | Imaizumi et al. |
| 8,463,157 | B2 | 6/2013 | Sakurai et al. |
| 8,483,589 | B2 | 7/2013 | Uneme et al. |
| 8,843,023 | B2 | 9/2014 | Fujinaka et al. |
| 8,862,014 | B2 | 10/2014 | Imaizumi et al. |
| 8,879,944 | B2 | 11/2014 | Takarada et al. |
| 8,879,954 | B2 | 11/2014 | Nonaka et al. |
| 8,909,096 | B2 | 12/2014 | Fukui et al. |
| 8,983,335 | B2 | 3/2015 | Yamashita et al. |
| 9,002,230 | B2 | 4/2015 | Imaizumi et al. |
| 9,052,640 | B2 | 6/2015 | Kashiide et al. |
| 9,128,417 | B2 | 9/2015 | Yamasaki et al. |
| 9,164,419 | B2 | 10/2015 | Uneme |
| 9,188,940 | B2 | 11/2015 | Fukui et al. |
| 9,274,489 | B2 | 3/2016 | Takarada et al. |
| 9,291,994 | B2 | 3/2016 | Kanno et al. |
| 9,304,488 | B2 | 4/2016 | Toba et al. |
| 9,367,025 | B2 | 6/2016 | Takarada et al. |
| 9,377,716 | B2 | 6/2016 | Yamasaki et al. |
| 9,423,767 | B2 | 8/2016 | Fujino et al. |
| 9,501,031 | B2 | 11/2016 | Hayashi et al. |
| 9,541,863 | B2 | 1/2017 | Kashiide et al. |
| 9,688,008 | B2 | 6/2017 | Takarada et al. |
| 9,708,116 | B2 | 7/2017 | Koishi et al. |
| 9,720,374 | B2 | 8/2017 | Kanno et al. |
| 9,727,021 | B2 | 8/2017 | Fukui et al. |
| 9,733,612 | B2 | 8/2017 | Toba et al. |
| 10,254,712 | B2 | 4/2019 | Toba et al. |
| 10,444,702 | B2 | 4/2019 | Sato et al. |
| 10,427,867 | B2 | 10/2019 | Koishi et al. |
| 10,534,313 | B2 | 1/2020 | Sugimoto et al. |
| 2003/0138270 | A1 | 7/2003 | Matsuoka |
| 2007/0081831 | A1 | 4/2007 | Yoon |
| 2009/0169253 | A1 | 7/2009 | Kamimura et al. |
| 2009/0175652 | A1 | 7/2009 | Kamimura |
| 2009/0257779 | A1 | 10/2009 | Shimura et al. |
| 2009/0317132 | A1 | 12/2009 | Asanuma et al. |
| 2011/0038649 | A1 | 2/2011 | Miyabe et al. |
| 2011/0158695 | A1 | 6/2011 | Tamura |
| 2012/0177400 | A1 | 7/2012 | Jang et al. |
| 2013/0243481 | A1 | 9/2013 | Toba et al. |
| 2014/0356016 | A1 | 12/2014 | Buchanan et al. |
| 2015/0093146 | A1 | 4/2015 | Sato et al. |
| 2015/0227110 | A1 | 8/2015 | Yoshimura et al. |
| 2015/0352863 | A1 | 12/2015 | Poma et al. |
| 2016/0091822 | A1 | 3/2016 | Koishi et al. |
| 2016/0221747 | A1 | 8/2016 | Koishi et al. |
| 2016/0274526 | A1 | 9/2016 | Ochi |
| 2016/0291540 | A1 | 10/2016 | Sato et al. |
| 2018/0074454 | A1 | 3/2018 | Uneme et al. |
| 2019/0219966 | A1 | 7/2019 | Uneme et al. |
| 2019/0286051 | A1 | 9/2019 | Sugimoto et al. |
| 2020/0004199 | A1 | 1/2020 | Sato et al. |

FOREIGN PATENT DOCUMENTS

| | | | |
|---|---|---|---|
| CN | 104541212 | A | 4/2015 |
| CO | 15172796 | A | 7/2014 |
| EP | 1 705 532 | A | 9/2006 |
| ES | 250188 | U | 7/1980 |
| GB | 1158021 | A | 7/1969 |
| JP | H08-183237 | A | 7/1996 |
| JP | H10-281188 | A | 10/1998 |
| JP | H10-318292 | A | 12/1998 |
| JP | 2001-337511 | A | 12/2001 |
| JP | 2003-167499 | A | 6/2003 |
| JP | 2004-294631 | A | 10/2004 |
| JP | 2009-092812 | A | 4/2009 |
| JP | 2009-265628 | A | 11/2009 |
| JP | 2014-016610 | A | 1/2014 |
| JP | 2014-032247 | A | 2/2014 |
| JP | 2015-114416 | A | 6/2015 |
| JP | 2017-003974 | A | 1/2017 |
| KR | 10-2012-0132584 | A | 12/2012 |
| KR | 10-2014-0108334 | A | 9/2014 |
| KR | 10-2016-0013952 | A | 2/2016 |
| TW | 201635058 | A | 10/2016 |
| TW | 201643568 | A | 12/2016 |
| WO | 2016/195118 | A2 | 12/2016 |

OTHER PUBLICATIONS

Nov. 2, 2021 Office Action in Chinese Patent Application No. 201880048831.2 (with English translation).
International Search Report and Written Opinion for International Patent Application No. PCT/JP2018/023714, mailed Aug. 21, 2018.
Nov. 20, 2019 Office Action in Taiwanese Patent Application No. 107120681.
Mar. 22, 2019 Office Action in Taiwanese Patent Application No. 107120681.
English translation of Japanese Patent Application Pub. No. H10-281188.
English translation of Japanese Patent Application Pub. No. H10-318292.
English translation of Japanese Patent Application Pub. No. 2014-032247 A.
English translation of Japanese Patent Application Pub. No. 2001-337511.
Jun. 13, 2020 Notice of Acceptance in Australian Patent Application No. 2018283274.
Jul. 31, 2020 Office Action in Russian Patent Application No. 2020100863 (with English translation).
Dec. 1, 2020 Notice of Allowance in Korean Patent Application No. 10-2020-7001377.
Nov. 16, 2020 Office Action in Chilean Patent Application No. 201903580.
Jan. 29, 2021 Extended Search Report in European Patent Application No. 18 817 519.4.
Computer translation of JP 2001-337511 (Tanizaki).
Nov. 29, 2021 Office Action in Canadian Patent Application No. 3,067,526.
Apr. 2, 2022 Australian Office Action in Australian Patent Application No. 2021201973.
Mar. 11, 2022 Office Action in Chilean Patent Application No. 2019-003580.
Feb. 28, 2022 Office Action in Colombian Patent Application No. NC 2020/0000113.
Feb. 10, 2021 Office Action in Canadian Patent Application No. 3,067,526.
Feb. 23, 2021 Office Action in Indian Patent Application No. 201947054383.
Mar. 4, 2021 Notice of Allowance in Korean Patent Application No. 10-2021-7005813.
May 14, 2021 Office Action in Chilean Patent Application No. 201903580.
Apr. 29, 2021 Notice of Acceptance in Australian Patent Application No. 2018283274.

(56) References Cited

OTHER PUBLICATIONS

Jul. 16, 2021 Office Action in Colombian Patent Application No. NC2020/0000113 (with English translation).
Apr. 8, 2021 Decision to Grant in Russian Patent Application No. 2020100863 (with English translation).
Mar. 29, 2022 Office Action in Japanese Patent Application No. 2018-114707 (with English translation).
Oct. 31, 2022 Office Action in Malaysia Patent Application No. PI2019007476.
Sep. 5, 2023 Office Action in Japanese Patent Application No. 2022-134561 (with English translation).
Feb. 13, 2024 Examination Report in Australian Patent Application No. 2023201865.
Apr. 11, 2024 Office Action in Singapore Patent Application No. 10202111783U.

* cited by examiner (a)

(b)

(a)

(b)

(a)

(b)

(c)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

CARTRIDGE HAVING A MEMBER FOR TRANSMITTING A DRIVING FORCE FOR ROTATING A DEVELOPING ROLLER

TECHNICAL FIELD

The present invention relates to an electrophotographic image forming apparatus (hereinafter referred to as an image forming apparatus) and a cartridge which can be mounted to and dismounted from an apparatus main assembly (electrophotographic image forming apparatus main assembly) of the image forming apparatus.

Here, the image forming apparatus forms an image on a recording material using an electrophotographic image forming process. Examples of the image forming apparatus include an electrophotographic copying machine, an electrophotographic printer (for example, a laser beam printer, a LED printer, and so on), a facsimile apparatus, a word processor, and the like.

The cartridge is a unit in which a portion of the image forming apparatus can be mounted to and dismounted from the image forming apparatus main assembly (apparatus main assembly). Examples of members which can be mounted and dismounted as a portion of the cartridge include electrophotographic photosensitive drums (hereinafter referred to as drum) and process means (for example, developing roller) which acts on the drums.

The cartridge which integrally includes the drum and the process means acting on the drum is called a process cartridge. In an example of the process cartridge, the drum and the developing roller are integrated into a cartridge.

In addition, the other examples of the cartridge, there are a cartridge including the drum and a cartridge including the developing roller. In such cases, a cartridge including the drum may be referred to as a drum cartridge (photosensitive member cartridge), and a cartridge including the developing roller may be referred to as a developing cartridge.

BACKGROUND ART

Conventionally, in an image forming apparatus, a cartridge type which allows a cartridge to be mounted to and dismounted from the main assembly of the image forming apparatus has been employed.

According to this cartridge type, maintenance of the image forming apparatus can be performed by the user himself or herself without depending on the service person, and therefore, the operability is greatly improved.

Therefore, this cartridge type is widely used with image forming apparatuses.

Here, a cartridge (Japanese Laid-open Patent Application No. 2001-337511) has been proposed in which a developing roller is driven when an image is formed, and a drive switching is performed to keep the developing roller not driven when the image formation is not carried out.

SUMMARY OF INVENTION

Problems to be Solved by the Invention

In JP2001-337511, a clutch for switching the drive is provided at the end of the developing roller. In addition, a mechanism is disclosed which switches drive transmission by the clutch in interrelation with the operation of contact separation between the photosensitive drum and the developing roller.

An object of the present invention is to improve the above-mentioned conventional technology.

Means for Solving Problem

The exemplary structure disclosed in this application is A cartridge detachably mountable to a main assembly of an electrophotographic image forming apparatus, said cartridge comprising:

- a developing roller configured to develop a latent image;
- a developing frame rotatably supporting said developing roller;
- a supporting member movably supporting said developing frame;
- a clutch configured to be switchable between a state in which a driving force for rotating said developing roller is transmitted and a state in which the transmission of the driving force is blocked, said clutch being rotatable by the driving force and including a locked portion;
- a control member, rotatably supported by a supporting portion fixed on said supporting member, for controlling the transmission and the blocking of the driving force by said clutch, said control member including a locking portion engageable with said locked portion, said control member being configured such that said locking portion is rotatable about said supporting portion between (a) a non-locking position in which said locking portion is retracted from a rotation locus of said locked portion to permit said clutch to transmit the driving force to said clutch, and (b) a locking position in which said locking portion engages with said locked portion to stop rotation of said locked portion, thus blocking the transmission of the driving force by said clutch; and
- an acting portion provided on said developing frame, for acting on said control member, said acting portion capable of rotating said locking portion between the non-locking position and the locking position.

The Effect of the Invention

The above conventional technology can be improved.

DESCRIPTION OF THE EMBODIMENTS

In the following, the embodiments for carrying out the present invention will be described in detail with reference to the drawings and embodiments. However, the functions, materials, shapes, relative arrangements, and the like of the components described in the embodiments are not intended to limit the scope of the present invention only to those unless otherwise specified. In addition, the functions, materials, shapes, and so on of the members once described in the following description are the same as in the first description unless otherwise specified.

Embodiment 1

[General Description of Electrophotographic Image Forming Apparatus]

In the following, about Embodiment 1 will be explained, referring to the Figures.

Here, in the following embodiments, a full-color image forming apparatus relative to which four process cartridges can be mounted and dismounted is illustrated as an image forming apparatus.

Here, the number of process cartridges mounted to the image forming apparatus is not limited to this example. The number may be properly selected, as needed.

For example, in the case of an image forming apparatus which forms a monochrome image, the number of process cartridges mounted to the image forming apparatus is one. In addition, in the embodiments described below, a printer is taken as an example of the image forming apparatus.

[General Arrangement of Image Forming Apparatus]

Figure 2:
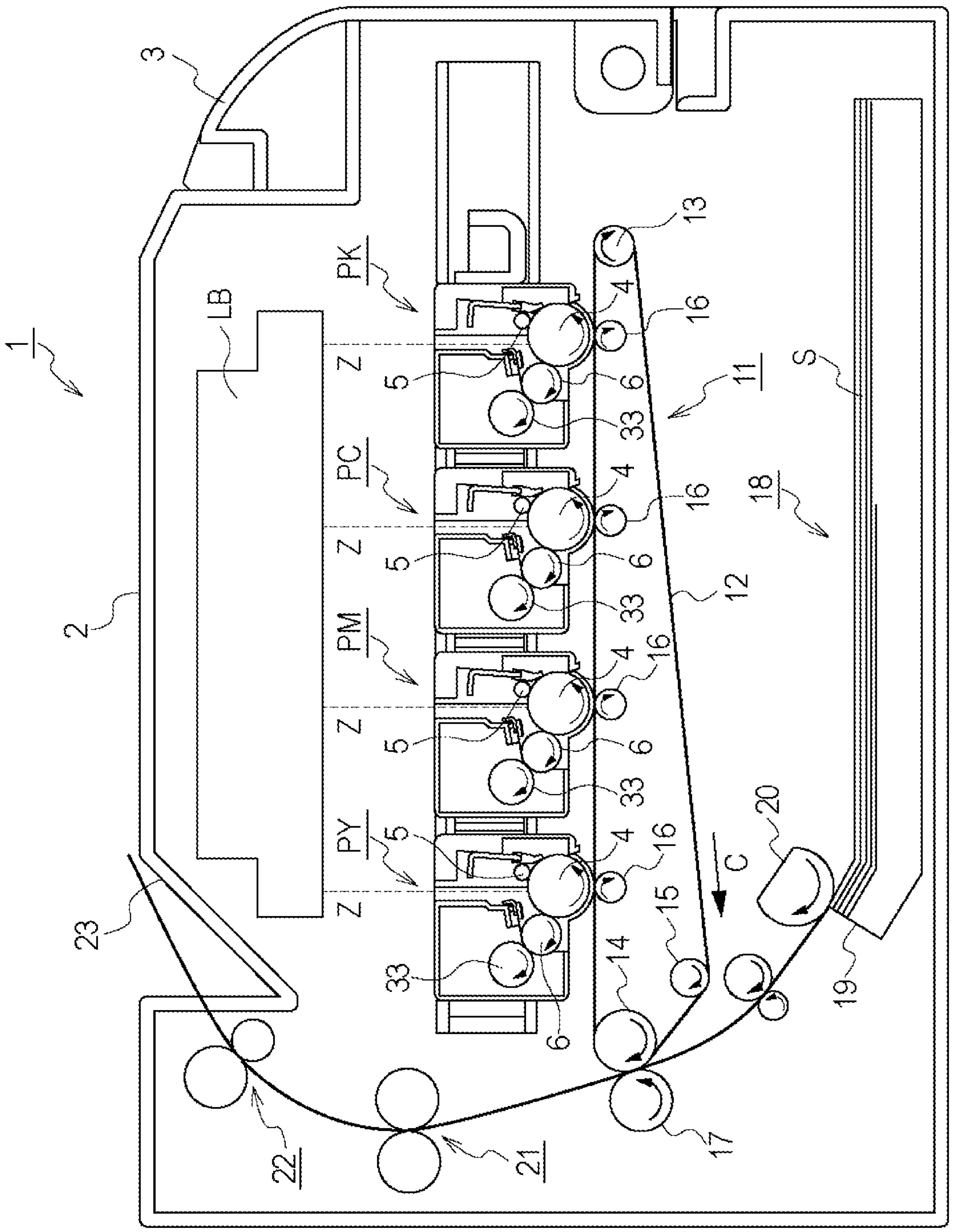
FIG. 2 is a cross-sectional view of the image forming apparatus according to Embodiment 1.
Figure 3:
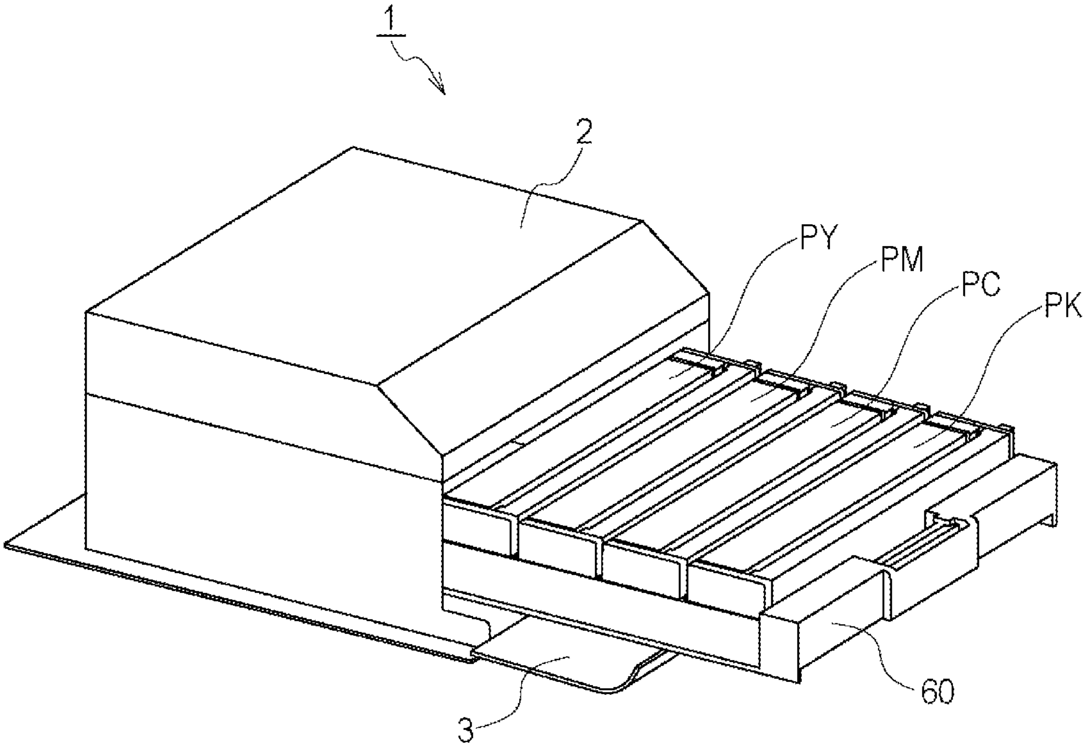
FIG. 3 is a perspective view of the image forming apparatus according to Embodiment 1.
Figure 3:
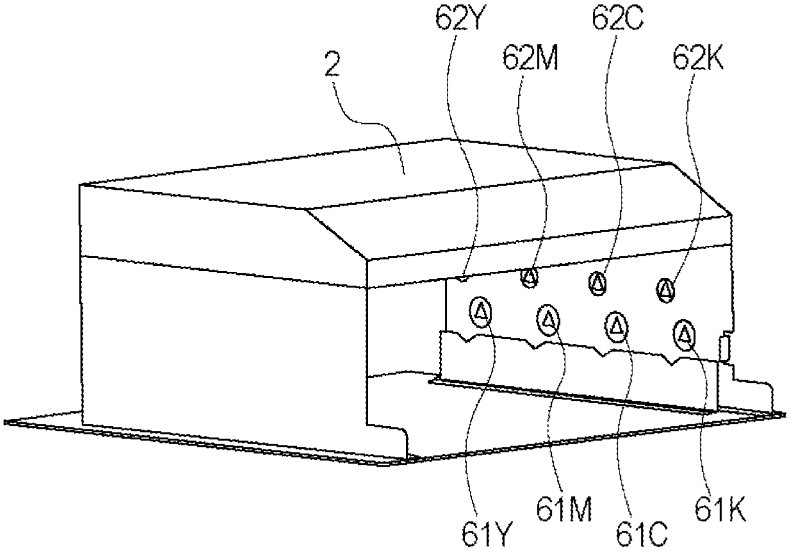
Figure 4:
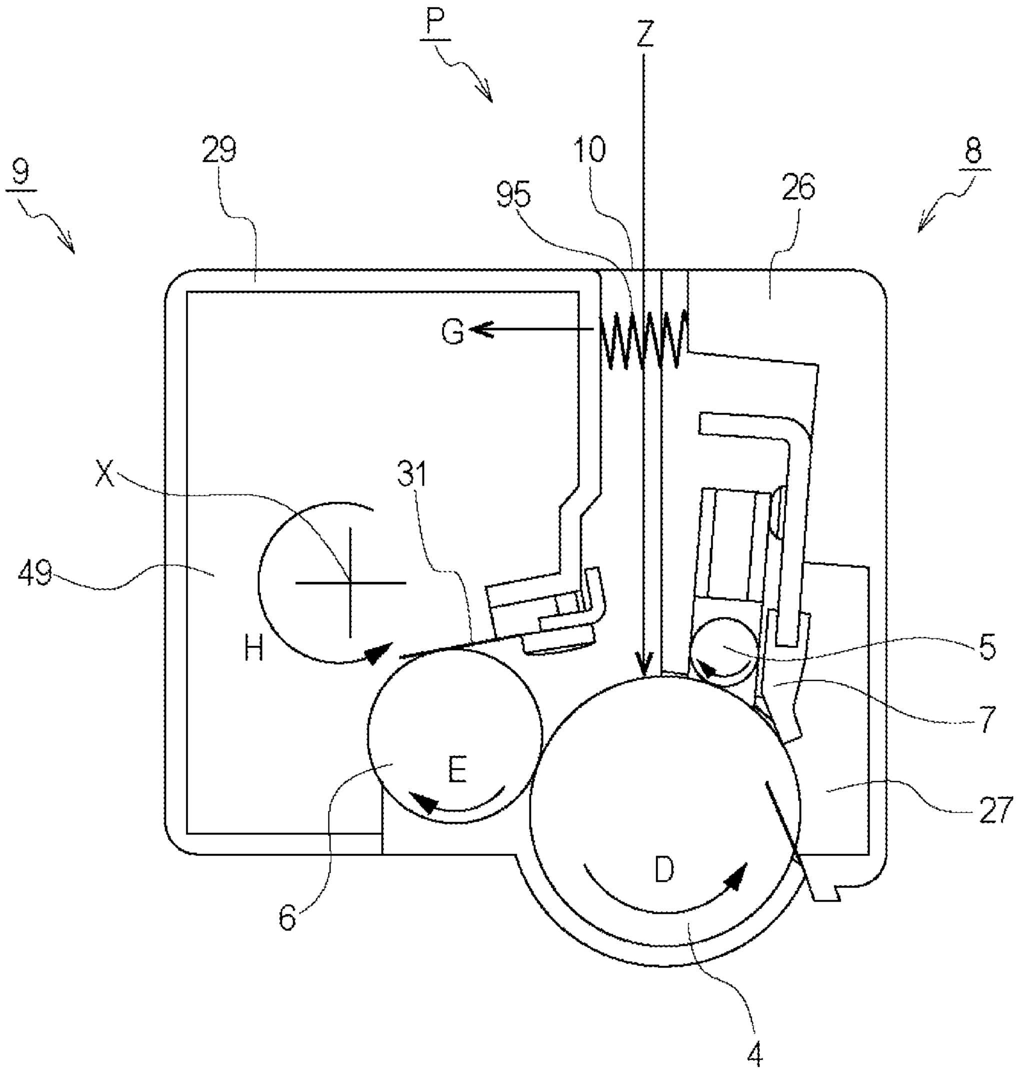
FIG. 4 is a cross-sectional view of a process cartridge according to Embodiment 1.
Figure 5:
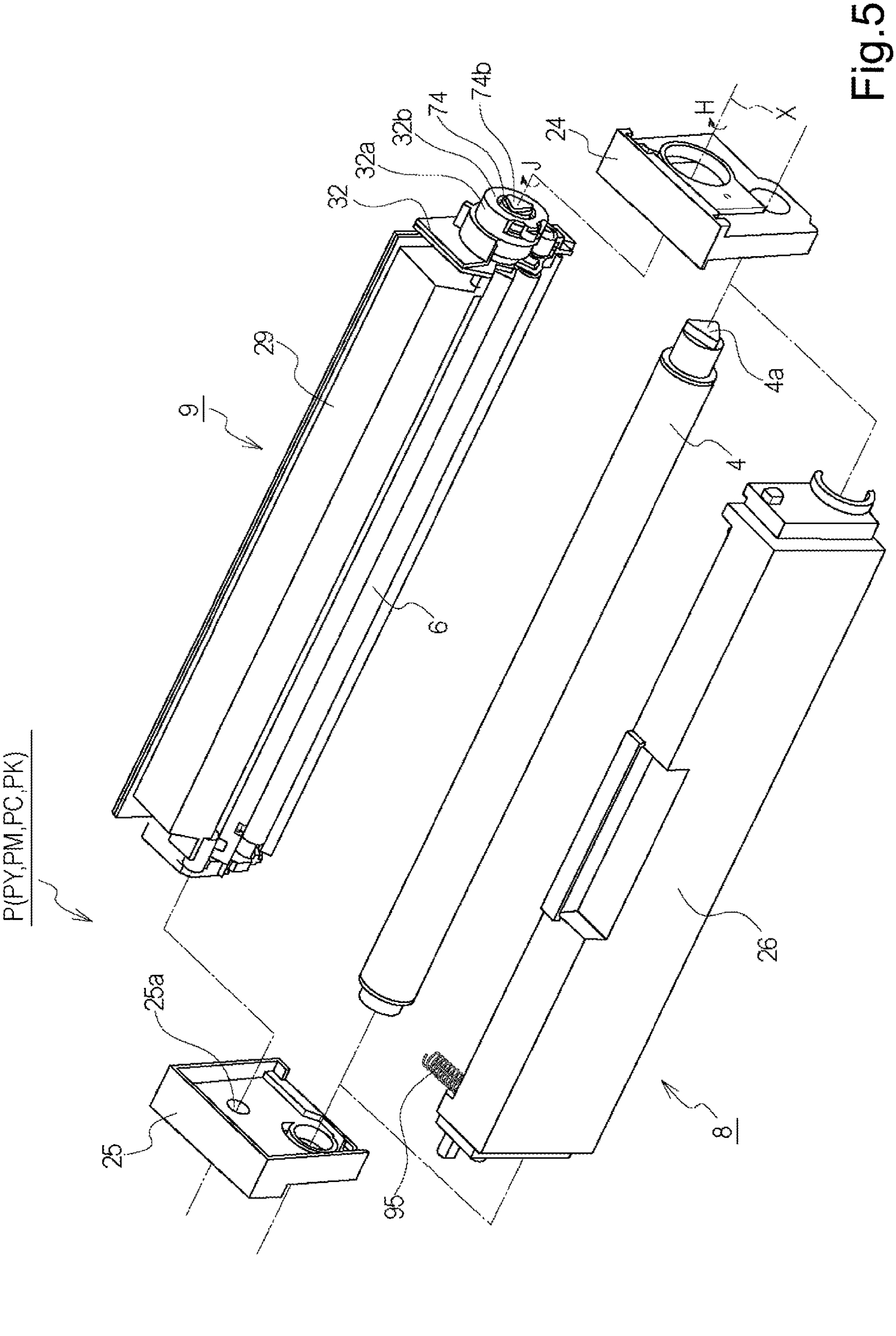
FIG. 5 is a perspective view of the process cartridge according to Embodiment 1.
Figure 6:
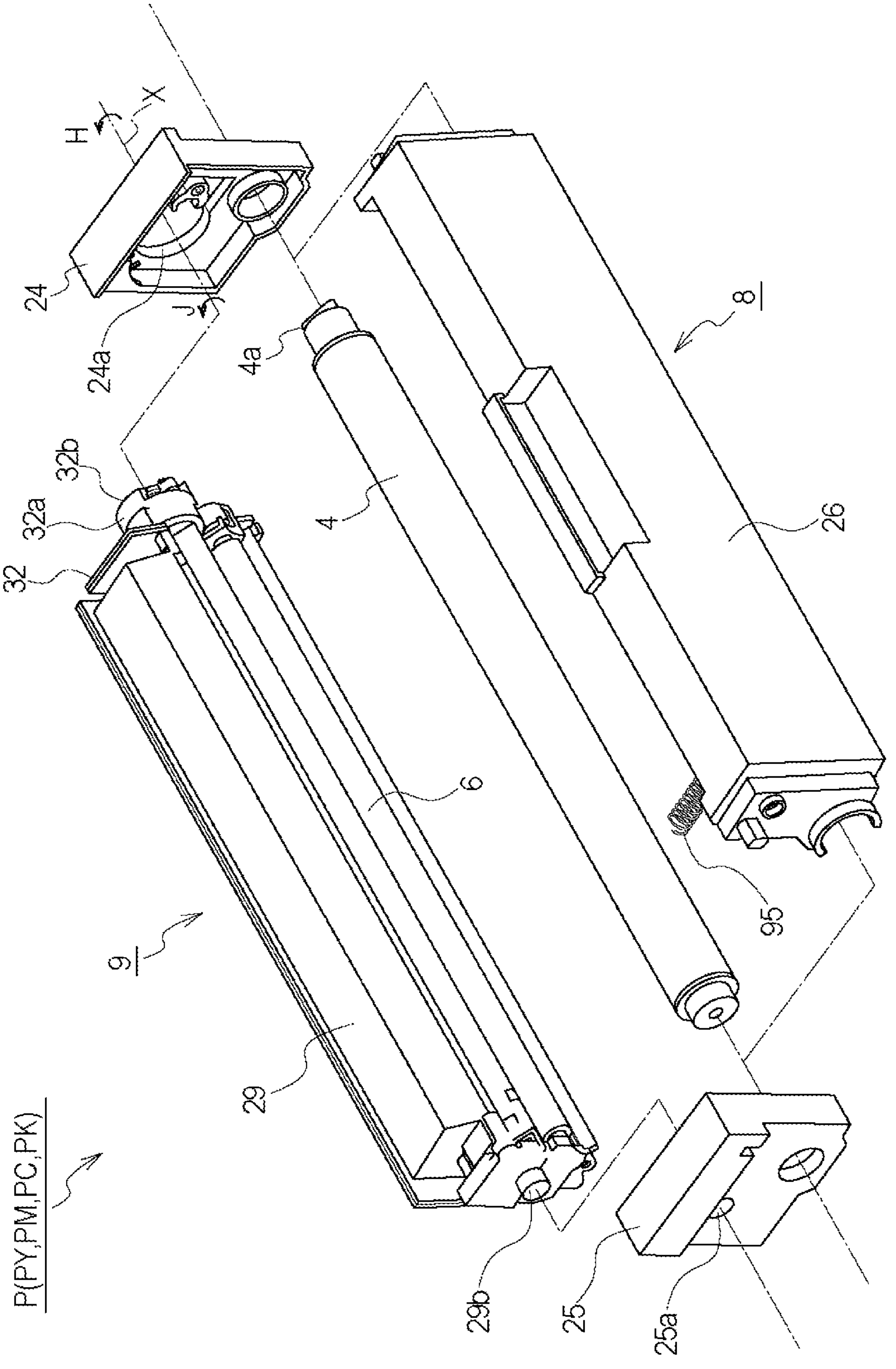
FIG. 6 is a perspective view of the process cartridge according to Embodiment 1.

FIG. 2 is a schematic sectional view of the image forming apparatus of this embodiment. In addition, part (a) of FIG. 3 is a perspective view of the image forming apparatus of this embodiment. In addition, FIG. 4 is a cross-sectional view of the process cartridge P of this embodiment. In addition, FIG. 5 is a perspective view of the process cartridge P of this embodiment as viewed from the driving side, and FIG. 6 is a perspective view of the process cartridge P of this embodiment as viewed from the non-driving side.

As shown in FIG. 2, this image forming apparatus 1 is a four-color full-color laser printer using an electrophotographic image forming process, and forms a color image on a recording material S. The image forming apparatus 1 is a process cartridge type, and the process cartridge is dismountably mounted on the apparatus main assembly (electrophotographic image forming apparatus main assembly) 2 to form the color image on the recording material S.

Here, regarding the image forming apparatus 1, the side on which a front door 3 is provided is the front (front) side, and a side opposite to the front is the back (rear) side. In addition, when the image forming apparatus 1 is viewed from the front, the right side is referred to as a driving side, and the left side is referred to as a non-driving side. FIG. 2 is a cross-sectional view of the image forming apparatus 1 as viewed from the non-driving side. The front side of the sheet of the drawing is the non-driving side of the image forming apparatus 1, the right side of the sheet of the drawing is the front side of the image forming apparatus 1, and the back side of the sheet of the drawing is the driving side of the image forming apparatus 1.

To the apparatus main assembly 2, four process cartridges P are mountable, that is, a first process cartridge PY (yellow), a second process cartridge PM (magenta), a third process cartridge PC (cyan), and a fourth process cartridge PK (black). (PY, PM, PC, PK), arranged horizontally.

Rotational driving forces are transmitted to the first to fourth process cartridges P (PY, PM, PC, PK) from the drive output portion of the apparatus main assembly 2. Details will be described hereinafter.

In addition, a bias voltage (charging bias, developing bias, and so on) is supplied from the apparatus main assembly 2 to each of the first to fourth process cartridges P (PY, PM, PC, PK) (not shown).

As shown in FIG. 4, each of the first to fourth process cartridges P (PY, PM, PC, PK) of this embodiment includes a photosensitive drum unit which includes an electrophotographic photosensitive drum 4, a charging means and a cleaning means as process means acting on the drum 4. An electrophotographic photosensitive drum is a drum including a photosensitive layer provided on the surface thereof, and is used for an electrophotographic image forming process. In the following, the electrophotographic photosensitive drum 4 will be simply referred to as a drum 4 hereinafter.

In addition, each of the first to fourth process cartridges P (PY, PM, PC, PK) includes a developing unit 9 provided with developing means for developing the electrostatic latent image on the drum 4.

The first process cartridge PY contains a yellow (Y) developer in the developing frame 29 and forms a yellow developer image on the surface of the drum 4.

The second process cartridge PM contains a magenta (M) developer in the developing frame 29 and forms a magenta developer image on the surface of the drum 4.

The third process cartridge PC accommodates a cyan (C) developer in the developing frame 29 and forms a cyan developer image on the surface of the drum 4.

The fourth process cartridge PK contains a black (K) developer in the developing frame 29 and forms a black developer image on the surface of the drum 4.

A laser scanner unit LB as an exposure portion is provided above the first to fourth process cartridges P (PY, PM, PC, PK). This laser scanner unit LB outputs a laser beam Z corresponding to image information. And, the laser beam Z passes through the exposure window 10 of the cartridge P and scans and exposes the surface of the drum 4.

An intermediary transfer belt unit 11 as a transfer member is provided below the first to fourth cartridges P (PY, PM, PC, PK). This intermediary transfer belt unit 11 includes a drive roller 13 and tension rollers 14 and 15, and a transfer belt 12 having flexibility is stretched around them.

The lower surface of the drum 4 of each of the first to fourth cartridges P (PY, PM, PC, PK) is in contact with the upper surface of the transfer belt 12. The contact portions are the primary transfer portions. The primary transfer roller 16 is provided inside the transfer belt 12 so as to face the drum 4.

In addition, the secondary transfer roller 17 is disposed at a position across from the transfer belt 12 at a position facing the tension roller 14. The contact portion between the transfer belt 12 and the secondary transfer roller 17 is the secondary transfer portion.

A feeding unit 18 is provided below the intermediary transfer belt unit 11. The feeding unit 18 includes a sheet feed roller 20 and a sheet feed tray 19 on which the recording materials S are stacked and stored.

The fixing unit 21 and the discharge unit 22 are provided at the upper left position in the apparatus main assembly 2 in Figure. The upper surface of the apparatus main assembly 2 functions as a discharge tray 23.

The recording material S onto which the developer image has been transferred is fixed by fixing means provided in the fixing unit 21 and then discharged to the discharge tray 23.

The cartridge P is constituted to be dismountable from the apparatus main assembly 2 using a cartridge tray 60 that can be pulled out. Part (a) of FIG. 3 shows a state in which the cartridge tray 60 and the cartridge P are pulled out from the apparatus main assembly 2.

[Image Forming Operation]

The operation for forming a full color image is as follows.

The drum 4 of each of the first to fourth cartridges P (PY, PM, PC, PK) is rotationally driven at a predetermined speed (in the direction of arrow D in FIG. 4, counterclockwise in FIG. 2).

The transfer belt 12 is also driven to rotate at a speed corresponding to the speed of the drum 4 in the forward direction (in the direction of arrow C in FIG. 2).

The laser scanner unit LB is also driven. In synchronization with the drive of the scanner unit LB, the surface of the drum 4 is uniformly charged to a predetermined polarity and potential by the charging roller 5. The Laser scanner unit LB scans and exposes the surface of each drum 4 with laser beam Z in accordance with the image signal of each color.

By this, an electrostatic latent image corresponding to the image signal of the corresponding color is formed on the surface of each drum 4. This electrostatic latent image is developed by the developing roller 6 which is driven to rotate at a predetermined speed (in the direction of arrow E in FIG. 4, clockwise in FIG. 2).

By such an electrophotographic image forming process, a yellow developer image corresponding to the yellow component of the full-color image is formed on the drum 4 of the first cartridge PY. And, the developer image is primarily transferred onto the transfer belt 12.

Similarly, a magenta developer image corresponding to the magenta component of the full-color image is formed on the drum 4 of the second cartridge PM. And, the developer image is primary-transferred and superimposed on the yellow developer image already transferred onto the transfer belt 12.

Similarly, on the drum 4 of the third cartridge PC, a cyan developer image corresponding to the cyan component of the full-color image is formed. And, the developer image is primary-transferred superimposed on the yellow and magenta developer images already transferred onto the transfer belt 12.

Similarly, a black developer image corresponding to the black component of the full color image is formed on the drum 4 of the fourth cartridge PK. And, the developer image is primary-transferred and superimposed on the yellow, magenta, and cyan developer images already transferred onto the transfer belt 12.

As described above, as a result, a full-color unfixed developer image of four colors of yellow, magenta, cyan, and black is formed on the transfer belt 12.

On the other hand, the recording material S is separated and fed one by one at a predetermined control timing. The recording material S is introduced into a secondary transfer portion which is a contact portion between the secondary transfer roller 17 and the transfer belt 12 at a predetermined control timing.

By this, in the process in which the recording material S is fed in the secondary transfer portion, the four color superimposed developer images on the transfer belt 12 are sequentially transferred onto the surface of the recording material S all together.

In summary, as shown in FIG. 4, as the drum 4 rotates in the direction of arrow D, charging, exposure, development, transfer, and cleaning processes are performed on the surface of the drum 4. First, the surface of the drum 4 is charged by the charging roller (charging member) 5. Thereafter, when the drum 4 rotates, the latent image is formed on the surface thereof by the laser beam Z, and the developing roller 6 develops the latent image. By this, a toner image (developer image) is formed on the surface of the drum 4. Furthermore, when the drum 4 rotates, the toner image is exposed to the outside of the cartridge and transferred onto the transfer belt 12. Thereafter, the surface of the drum 4 enters the waste developer storing portion 27. The developer remaining on the surface of the drum 4 after the image transfer of the developer image is scraped off (removed) from the surface of the drum 4 by the cleaning blade (cleaning member) 7 and is stored in the waste developer storing portion. Thereafter, the surface of the drum 4 moves out of the waste developer storing portion 27 and again faces the charging roller 5. By this, the above-described process is repeated.

As described above, the drum 4 is a rotatable member (rotating member) which rotates, carrying an image formed of toner on the surface thereof. The drum 4 is sometimes called an image bearing member.

The structure is such that cleaning blade 7 is in contact with drum 4 in the counter direction. That is, the free end of the cleaning blade 7 is in contact with the surface of the drum 4 so as to face the upstream side in the rotational direction of the drum 4.

On the other hand, the developing roller (developing member) 6 rotates in the direction of an arrow E during image formation (development) to develop the latent image through the following steps. The toner is supplied to the surface of the developing roller 6 inside the developing frame 29 (that is, inside the developer container 49), and the surface of the developing roller 6 carries the developer.

When the developing roller 6 rotates in the E direction, the developing blade (developer regulating member, toner regulating member) 31 contacts the surface of the developing roller 6, by which the amount of developer carried on the surface of the developing roller 6 (toner layer thickness) is restricted to a predetermined level. Thereafter, the surface of the developing roller 6 is exposed to the outside of the developing frame 29 and then faces the drum 4. By this, the developing roller 6 develops the latent image on the surface of the drum 4 with the toner. Furthermore, as the developing roller 6 rotates, the surface of the developing roller 6 again enters the developer container 49, and the above-described process is repeated. Here, the developing blade 31 is provided such that the free end thereof faces the upstream side in the rotational direction E of the developing roller 6.

The developing roller 6 is a rotatable member (rotating member) which rotates carrying, on the surface thereof, the developer to be supplied to the drum 4.

[Overall Structure of Process Cartridge]

In this embodiment, the first to fourth cartridges P (PY, PM, PC, PK) have the same electrophotographic image forming process mechanism, and the developer color and developer filling amount stored therein can be properly selected.

The cartridge P is includes the drum 4 as the photosensitive member and includes process means acting on the drum 4. Here, the process means include the charging roller 5 as the charging means for charging the drum 4, the developing roller 6 as the developing means for developing the latent image formed on the drum 4, and the cleaning blade 7 as the cleaning blade for removing residual developer remaining on the surface of the drum 4. And, the cartridge P is divided into a drum unit 8 and a developing unit 9. One of the drum unit 8 and the developing unit 9 may be called a first unit, and the other may be called a second unit. In addition, one of the frame (photosensitive member supporting frame) constituting the drum unit 8 and the frame (development frame) constituting the developing unit 9 may be referred to as a first frame and the other as a second frame.

[Drum Unit Structure]

As shown in FIG. 4, FIG. 5 and FIG. 6 the drum unit 8 comprises the drum 4, as the photosensitive member the charging roller 5, the cleaning blade 7, the cleaning container 26 as the photosensitive member supporting frame, the waste developer container 27, the cartridge cover member (driving side cartridge cover member 24 and non-driving side cartridge cover member 25 in FIGS. 5 and 6). Here, the photosensitive member supporting frame in a broad sense includes a cleaning container 26 which is a photosensitive member supporting frame in a narrow sense, and in addition the waste developer storing portion 27, the driving side cartridge cover member 24, the non-driving side cartridge cover member 25 (the same applies to the following embodiments). Here, when the cartridge P is mounted in the apparatus main assembly 2, the photosensitive member frame is fixed to the apparatus main assembly 2.

The drum 4 is rotatably supported by the cartridge cover members 24 and 25 provided at the opposite longitudinal ends of the cartridge P. Here, an axial direction of the drum 4 is defined as a longitudinal direction. The axial direction (longitudinal direction) is a direction parallel to the direction in which the axis (rotational axis, axis) of the drum 4 extends.

The cartridge cover members 24 and 25 are fixed to the cleaning container 26 at both ends in the longitudinal direction of the cleaning container 26.

In addition, as shown in FIG. 5, a drum side coupling member 4*a* for transmitting a driving force to the drum 4 is provided on one end side in the longitudinal direction of the drum 4. Part (b) of FIG. 3 is a perspective view of the apparatus main assembly 2, in which the cartridge tray 60 and the cartridge P are not shown. Each coupling member 4*a* of cartridge P (PY, PM, PC, PK) is coupled (coupled) with [a drum drive output member 61 (61Y, 61M, 61C, 61K) as a drive transmission member on the main assembly side of the apparatus main assembly 2 shown in part (b) of FIG. 3 so that the driving force of a driving motor (not shown) of the apparatus main assembly is transmitted to the drum 4.

The charging roller 5 is supported by the cleaning container 26 so that the charging roller 5 can rotate in contact with the drum 4.

In addition, the cleaning blade 7 is supported by the cleaning container 26 so as to contact the peripheral surface of the drum 4 with a predetermined pressure.

The transfer residual developer removed from the peripheral surface of the drum 4 by the cleaning means 7 is stored in the waste developer storing portion 27 in the cleaning container 26.

In addition, the driving side cartridge cover member 24 and the non-driving side cartridge cover member 25 are provided with the supporting portions 24*a* and 25*a* for rotatably supporting the developing unit 9 (FIG. 6).

[Developing Unit Structure]

Figure 1:
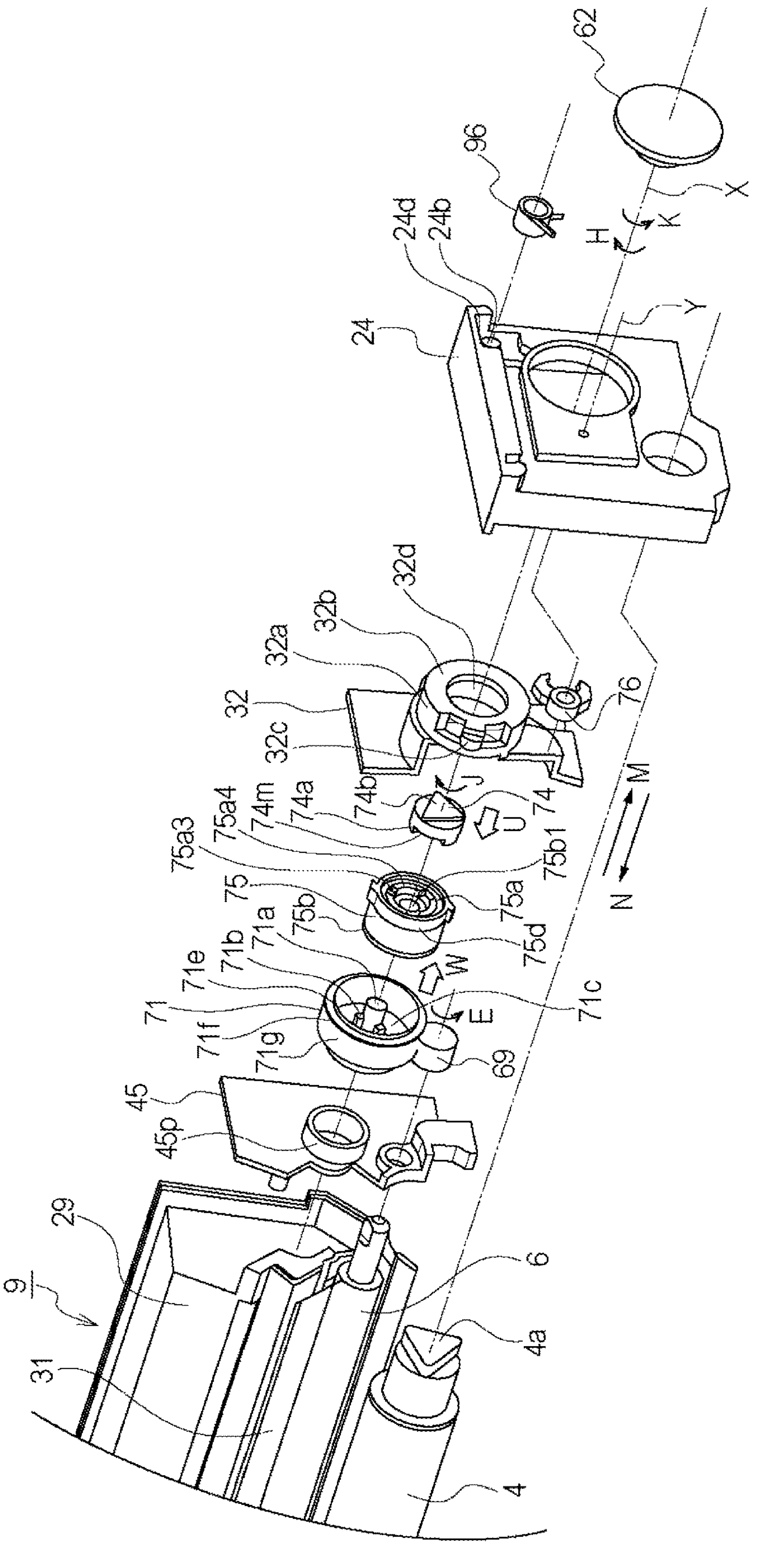
FIG. 1 is a perspective view of a process cartridge according to Embodiment 1.

As shown in FIG. 1 and FIG. 4, the developing unit 9 includes the developing roller 6, the developing blade 31, the developing frame 29, the bearing member 45, the development cover member 32, and the like.

The developing frame 29 includes the developer accommodating portion 49 which accommodates the developer to be supplied to the developing roller 6, and the developing blade 31 which restricts the developer layer thickness on the peripheral surface of the developing roller 6.

In addition, as shown in FIG. 1, the bearing member 45 is fixed to one end side in the longitudinal direction of the developing frame 29. This bearing member 45 rotatably supports the developing roller 6. The developing roller 6 is provided with a developing roller gear 69 at its longitudinal end. The bearing member 45 also rotatably supports a downstream drive transmission member (downstream transmission member) 71 for transmitting a driving force to the developing roller gear 69. Details will be described hereinafter.

And, the development cover member 32 is fixed to the outside of the bearing member 45 in the longitudinal direction of the cartridge P. The structure is such that the development cover member 32 covers the developing roller gear 69, a downstream transmission member 71, an upstream drive transmission member (upstream transmission member) 74, and a transmission release mechanism (clutch) 75. Details of the transmission release mechanism 75 will be described hereinafter, but the transmission release mechanism 75 can switch between the state in which the rotation of the upstream transmission member 74 is transmitted to the downstream transmission member 71 and the state in which the rotation is blocked. That is, the transmission release mechanism 75 is a clutch.

In addition, the upstream transmission member 74 is a development input coupling (coupling member) to which the driving force is inputted from the image forming apparatus main assembly.

As shown in FIG. 1, the development cover member 32 is provided with a cylindrical portion 32*b*. And, a drive input portion (coupling portion) 74*b* as a rotational force receiving portion (driving force receiving portion) of the upstream transmission member 74 is exposed through an opening 32*d* inside the cylindrical portion 32*b*. When the cartridge P (PY, PM, PC, PK) is mounted in the main assembly 2, the drive input portion 74*b* is engaged with the development drive output member 62 (62Y, 62M, 62C, 62K) shown in part (b) of FIG. 3, and receives the driving force from the drive motor (not shown) provided in the apparatus main assembly 2. The driving force input from the apparatus main assembly 2 to the upstream transmission member 74 is further transmitted to the developing roller gear 69, which is a drive transmission member provided on the downstream side, by way of the transmission release mechanism 75 and the downstream transmission member 71. And, the driving force is further transmitted from the developing roller gear 69 to the developing roller 6.

Of the two sides of the cartridge, the side on which the coupling portion 74*b* is provided is called the cartridge drive side. The drive side of the cartridge is the side to which drive force is input from the output members 61, 62, and so on of the apparatus main assembly 2. On the other hand, the side opposite to the drive side in the axial direction is called the non-drive side of the cartridge.

The upstream transmission member 74, the transmission release mechanism 75, the downstream transmission member 71, the coupling member 4*a* (FIG. 5) and the like are arranged on the drive side of the cartridge.

[Assembly of Drum Unit and Developing Unit]

FIGS. 5 and 6 show the state where the developing unit 9 and the drum unit 8 are disassembled. Here, at one longitudinal end of the cartridge P, the outer diameter portion 32*a* of the cylindrical portion 32*b* of the development cover member 32 is rotatably fitted to the supporting portion 24*a* of the driving side cartridge cover member 24. In addition, at the other longitudinal end side of the cartridge P, a projecting portion 29*b* which projects from the developing frame 29 is rotatably fitted in the support hole portion 25*a* of the non-driving side cartridge cover member 25. By this, the developing unit 9 is supported so as to be rotatable relative to the drum unit 8. Here, a rotational center (rotational axis) of the developing unit 9 relative to the drum unit 8 is referred to as a rotational center (rotational axis) X. This rotational center X is an axis connecting the center of the support hole 24*a* and the center of the support hole 25*a*.

[Contact Between Developing Roller and Drum]

As shown in FIG. 4, FIG. 5 and FIG. 6, the structure is such that the developing unit 9 is urged by a pressing spring 95 which is an urging member and an elastic member, and the developing roller 6 contacts the drum 4 by movement around the rotational center X. That is, by the urging force of the pressing spring 95, the developing unit 9 is urged in the direction of arrow G in FIG. 4, and a moment in the direction of arrow H acts about will the rotational center X.

In addition, as shown in FIG. 5, the upstream transmission member 74 receives rotational drive in the direction of arrow J from the development drive output member 62 which is a main assembly coupling provided in the apparatus main assembly 2 shown in part (b) of FIG. 5. Next, in response to the driving force inputted to the upstream transmission member 74, the downstream transmission member 71 rotates in the arrow J direction. By this, the developing roller gear 69 engaged with the downstream transmission member (transmission gear) 71 rotates in the direction of arrow E. By this, the developing roller 6 rotates in the direction of arrow E. As the driving force required to rotate the developing roller 6 is inputted to the upstream transmission member 74, a rotation moment in the direction of arrow H is generated in the developing unit 9.

The developing unit 9 receives a moment in the direction of arrow H about the rotational center X by the pressing force of the pressing spring 95 and the rotational driving force from the apparatus main assembly 2 described above. By this, the developing roller 6 can contact the drum 4 with a predetermined pressure. In addition, the position of the developing unit 9 with respect to the drum unit 8 at this time is called a contact position. Here, in this embodiment, in order to press the developing roller 6 against the drum 4, two forces, that is, a pressing force by the pressing spring 95 and a rotational driving force from the apparatus main assembly 2 are used. However, this is not necessarily required, but a structure in which the developing roller 6 is pressed against the drum 4 with only one of the above-described forces may be employed.

[Spacing Between Developing Roller and Drum]

Figure 7:
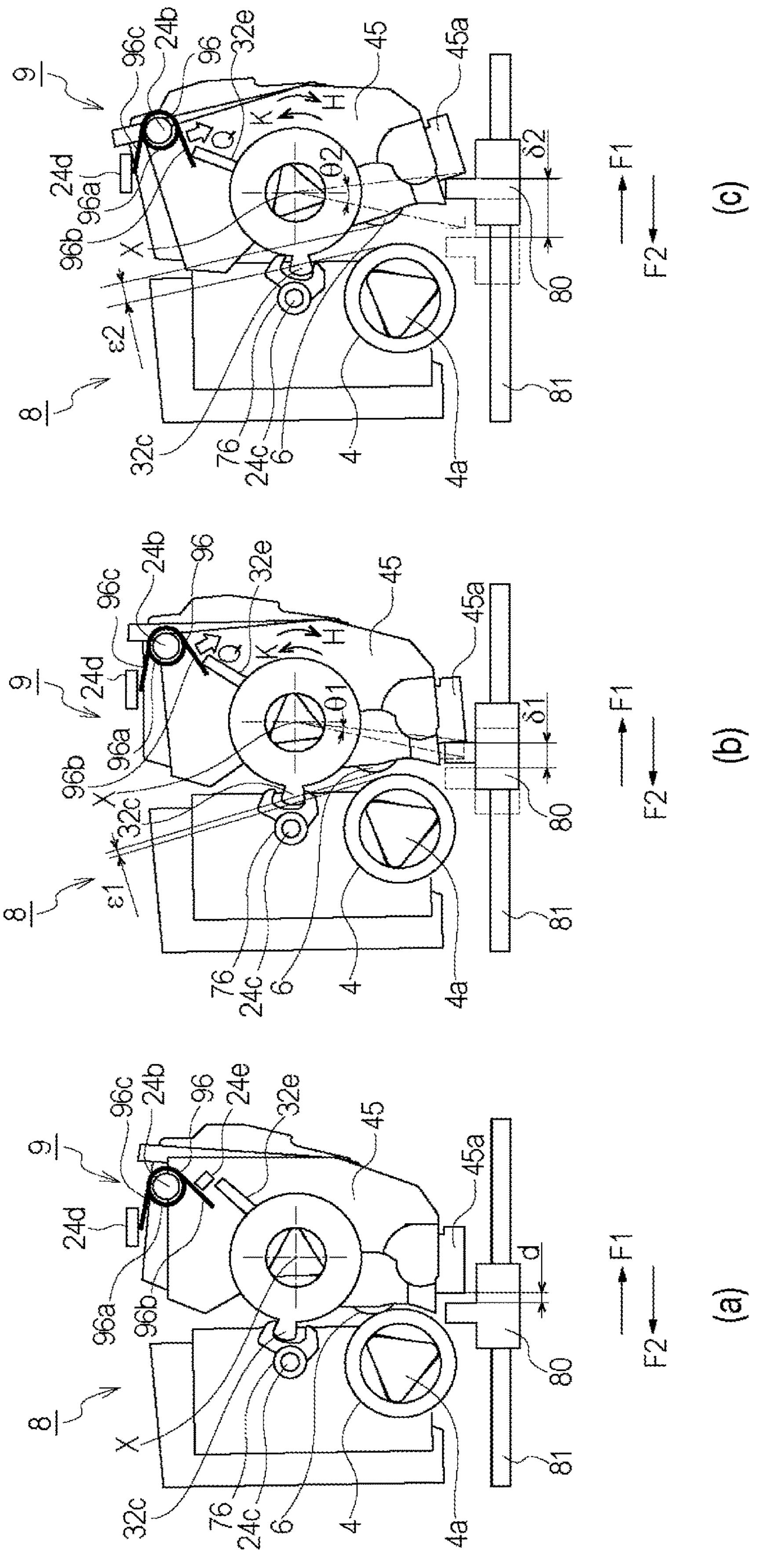
FIG. 7 is a side view of the process cartridge according to Embodiment 1.

FIG. 7 is a side view of the cartridge P as viewed from the drive side. In this Figure, some portions are not shown for better illustration. When the cartridge P is mounted in the apparatus main assembly 2, the drum unit 8 is positioned and fixed to the apparatus main assembly 2.

A force receiving portion 45*a* is provided in the bearing member 45. The force receiving portion 45*a* is constituted to be engageable by a main assembly separating member 80 provided in the apparatus main assembly 2.

The main assembly separation member 80 is constituted to receive a driving force from a motor (not shown) and to move along a rail 81 in a directions of arrows F1 and F2.

Part (a) of FIG. 7 shows a state where the drum 4 and the developing roller 6 are in contact with each other. At this time, the force receiving portion 45*a* and the main assembly separation member 80 are spaced with a gap d.

Part (b) of FIG. 7 shows a state in which the main assembly separation member 80 has moved by a distance M in the direction of the arrow F1, as compared with the state of part (a) of FIG. 7. At this time, the force receiving portion 45*a* is engaged with the main assembly separating member 80 and receives the force. As described in the foregoing, the developing unit 9 is rotatable with respect to the drum unit 8, and in part (b) of FIG. 7, the developing unit 9 has rotated about the rotational center X by an angle θ1 in the arrow K direction. At this time, the drum 4 and the developing roller 6 are separated from each other by a distance ε1.

Part (c) of FIG. 7 shows a state in which the main assembly separation member 80 has moved by δ2 (>δ1) in the direction of the arrow F1 as compared with the state of part (a) of FIG. 7. The developing unit 9 is rotated about the rotational center (rotational axis X) by an angle θ2 in the direction of the arrow K. At this time, the drum 4 and the developing roller 6 are separated from each other by a distance ε2. In addition, the auxiliary pressing spring 96 will be described in detail hereinafter, but like the state of part (b) in FIG. 7, a moment is applied to the developing unit 9 in the direction of arrow H about the rotational center X.

Here, in this embodiment (the same applies to the following embodiments), the distance between the force receiving portion 45*a* and the rotational center of the drum 4 is in the range of 13 mm to 33 mm.

In addition, in this embodiment (the same applies to the following embodiments), the distance between the force receiving portion 45*a* and the rotational center X is in the range of 27 mm to 32 mm.

[Structure of Drive Connecting Portion]

Referring to FIG. 1 the structure of the drive connecting portion will be described. First, an outline will be described.

Between the bearing member 45 and the driving side cartridge cover member 24, the downstream transmission member 71, the transmission release mechanism 75, the upstream transmission member 74, and the development cover member 32 are provided in the order named from the bearing member 45 toward the driving side cartridge cover member 24. These members are provided on the rotational axis of the developing unit 9 described above. That is, the axes of the upstream transmission member 74, the downstream transmission member 71, and the transmission release mechanism 75 substantially the same as the axis X of the developing unit 9. Here, the rotational axis X is substantially parallel to the axis of the photosensitive drum 4. Therefore, the axial direction of the transmission release mechanism 75 and the like may be considered as being in the same as the axial direction of the drum 4.

Figure 9:
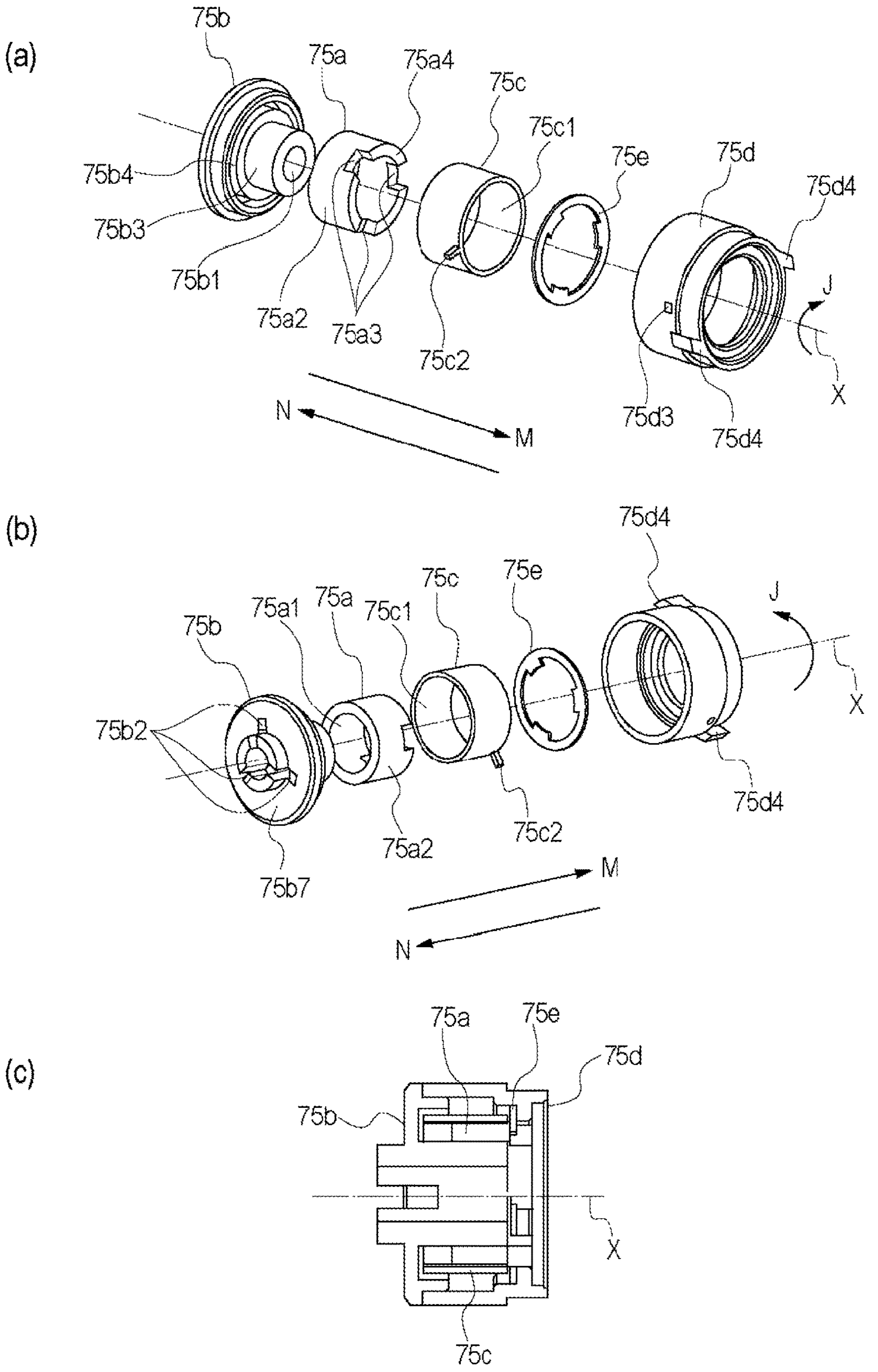
In FIG. 9, part (a) and part (b) are exploded perspective views of a transmission release mechanism according to Embodiment 1, and part (c) is a cross-sectional view of the transmission release mechanism according to Embodiment 1.

Here, referring to parts (a) to (c) of FIG. 9, an example of the transmission release mechanism 75 which switches between the case where the rotation of the upstream transmission member 74 is transmitted to the downstream transmission member 71 and the case where the rotation is blocked will be described in detail. Parts (a) and (b) of FIG. 9 show a state in which the transmission release mechanism 75 is disassembled, and part (a) of FIG. 9 is a perspective view as seen from the driving side, and part (b) of FIG. 9 is a view as seen from the non-driving side. In addition, part (c) of FIG. 9 is a cross-sectional view of the transmission release mechanism 75.

The transmission release mechanism 75 in this embodiment is a mechanism generally called a spring clutch. The transmission release mechanism 75 comprises members such as an input inner ring (input member, clutch side input member) 75*a*, an output member (clutch side output member) 75*b*, a transmission spring (coil spring, elastic member, intermediate transmission member) 75*c*, a control ring 75*d*, and a retaining member 75*e*, for example.

The input inner ring 75*a* has an inner diameter portion 75*a*1, an input side outer diameter portion 75*a*2, a rotation engaged portion 75*a*3, and an input side end surface 75*a*4. The input inner ring 75*a* is an input portion of the transmission release mechanism 75 to which driving force (rotational force) is inputted. The input inner ring 75*a* is connected to the upstream transmission member 74, and rotates together with the upstream transmission member 74 by receiving a driving force from the upstream transmission member 74.

The output member 75*b* has an engaged hole portion 75*b*1, an engagement groove 75*b*2, an inner ring engagement shaft 75*b*3, and an output member outer diameter portion 75*b*4. The output member 75*b* is an output portion of the transmission release mechanism 75 which outputs a driving force. The output member 75*b* is connected to the downstream transmission member 71, and rotates together with the downstream transmission member 71 by transmitting a driving force to the downstream transmission member 71.

The inner ring engaging shaft **75*b*3 rotatably supports the inner ring inner diameter portion 75*a*1, and the input inner ring 75*a* and the output member 75*b*** are arranged coaxially on the rotational axis X.

The transmission spring **75*c* is spirally wound extending in the direction of arrow J, and in M orientation in the axial direction, as viewed from the upstream transmission member 74 side, to provide an inner peripheral portion 75*c*1. In addition, the inner peripheral portion 75*c*1 is coaxially disposed in contact with the input side outer diameter portion 75*a*2 of the input inner ring 75*a* and the output member outer diameter portion 75*b*4 of the output member 75*b*. Here, in the spring clutch, the transmission spring 75*c* is a transmission member (transmission medium member, transmission medium portion, intermediate transmission member) for transmitting the rotation of the upstream transmission member 74 to the downstream transmission member 71. More specifically, the transmission spring 75*c* transmits driving force from the input inner ring 75*a* to the output member 75*b*, by which the rotational force (driving force) of the upstream transmission member 74 is transmitted to the downstream transmission member 71**.

The control ring **75*d* is arranged on the outer periphery of the transmission spring 75*c*, coaxially with the transmission spring 75*c*, and it includes a transmission spring end locking portion 75*d*3 which engages with one end side 75*c*2 of a wire rod of the transmission spring 75*c*, and a locked portion 75*d*4** projecting radially on the outer diameter portion.

The retaining member **75*e* is disposed between the input inner ring 75*a* and the control ring 75*d* and suppresses the movement of the input inner ring 75*a*** in the axial direction.

In the following, referring to FIG. 1 and FIG. 8, the relationship between the transmission release mechanism 75, the upstream transmission member 74, and the downstream transmission member 71 will be described.

The upstream transmission member 74 is provided with a drive input portion (coupling portion) **74*b* at one end in the axial direction, and is a coupling member constituted to receive drive force from the outside of the cartridge (that is, the image forming apparatus main assembly) at the drive input portion 74*b*. A contact end surface 74*m* is provided on the other end side, in the axial direction, of the upstream transmission member 74, and the contact end surface 74*m* contacts the input side end surface 75*a*4 of the transmission release mechanism 75. The upstream transmission member 74 is transmitted with a driving force in a state that said it receives an urging force (load U) in the direction of arrow N from the development driving output member 62 of the apparatus main assembly 2. Therefore, the contact end surface 74*m* of the upstream transmission member 74 is in contact with the input side end surface 75*a*4 of the transmission release mechanism 75** in a state of being pressed by the urging force U.

In addition, a rotation engagement portion **74*a* is provided in the rotational axis X direction of the upstream transmission member 74. The rotation engagement portion 74*a* engages with the rotation engaged portion 75*a*3 provided on the input inner ring 75*a* of the transmission release mechanism 75, so that the rotation of the upstream transmission member 74 is transmitted to the transmission release mechanism 75. The upstream transmission member 74 and the input inner ring 75*a* rotate integrally, and therefore, the input inner ring 75*a* and the upstream transmission member 74 may be regarded as one body, and the upstream transmission member 74 may be considered as a portion of the transmission release mechanism 75 (clutch). In this case, the upstream transmission member 74 can be regarded as an input member (clutch side input member) of the transmission release mechanism 75**.

Next, after describing the detailed structure of the downstream transmission member 71, the relationship with the transmission release mechanism 75 will be described. The downstream transmission member 71 has a substantially cylindrical shape, and includes an engagement shaft (shaft portion) **71*a* on the rotational axis X inside the cylinder on one end side, and includes an engagement rib 71*b* extending radially from the engagement shaft 71*a* in the radial direction, and a longitudinal contact end surface 71*c* in contact with the transmission release mechanism 75. In addition, it includes a bearing portion 71*d* as a cylindrical outer peripheral portion on the other end side. Furthermore, a cylindrical portion 71*e*, an end surface flange 71*f*, and a gear portion 71*g*** are provided on the outer peripheral portion of the cylinder.

In the downstream transmission member 71, the cylindrical portion **71*e* and the inner diameter portion 32*q* of the development cover member 32 are engaged with each other on one end side. In addition, on the other end side, the bearing portion 71*d* and the first bearing portion 45*p* (cylindrical outer peripheral surface) of the bearing member 45 are engaged with each other. That is, the downstream transmission member 71 is rotatably supported by the bearing member 45 and the development cover member 32** at both ends thereof.

Next, the gear portion **71*g* of the downstream transmission member 71 is engaged with the developing roller gear 69 to rotate the developing roller 6. That is, the downstream transmission member 71 is a gear member (transmission gear) for meshing engagement with the developing roller gear 69. Here, the gear portion 71*g* is a helical gear, the gear has a torsion angle so as to receive a thrust load W in the direction of arrow M by meshing engagement with the developing roller gear 69. Due to this thrust load W, the end surface flange 71*f* abuts against the abutting surface 32*f* of the development cover member 32, and the downstream transmission member 71** is positioned in the axial direction.

In the transmission release mechanism 75, the engaged hole **75*b*1 provided in the output member 75*b* is engaged with the engagement shaft 71*a*, and is supported coaxially with the downstream transmission member by the downstream transmission member 71. That is, the drive release mechanism 75 is directly engaged with the downstream transmission member 71 because the engagement shaft 71*a* penetrates the hole 75*b*1. In addition, the engagement rib 71*b* of the downstream transmission member 71 is inserted into the engagement groove 75*b*2 provided in the output member 75*b* of the transmission release mechanism 75. By this, when the transmission release mechanism 75 rotates, the driving force can be transmitted to the downstream transmission member 71. The engagement rib 71*b* is the driving force receiving portion for receiving the driving force. Here, with such a structure, the downstream transmission member 71 rotates integrally with the output member 75*b*. Therefore, the downstream transmission member 71 and the output member 75*b* may be regarded as one body, and the downstream transmission member 71 may be considered as a portion of the drive release mechanism 75. In this case, the downstream transmission member 71 can be regarded as a portion of the output member (clutch side output portion, output side transmission member) of the transmission release mechanism 75**.

Here, an engagement shaft **71*a* that ensures the coaxiality of the downstream transmission member 71 and the transmission release mechanism 75 is formed integrally with the engagement rib 71***b*, and therefore, the strength of the engaging shaft 71*a* can be assured even after downsizing. As a result, the positional accuracy of the transmission release mechanism 75 relative to the downstream transmission member 71 can be improved.

The transmission release mechanism 75 is by the input side end surface 75*a*4 receiving the urging force U in the direction of arrow N from the upstream transmission member 74, the downstream contact end surface 75*b*7 provided on the other end side in the axial direction is brought into contact to the longitudinal contact end surface 71*c* of the downstream transmission member 71. On the other hand, as described above, the gear portion 71*g* of the downstream transmission member 71 is engaged with the developing roller gear 69 to receive the thrust load W in the arrow M direction. Additionally, the thrust load W in the arrow M direction is set larger than the urging force U in the arrow N direction from the upstream transmission member 74. Therefore, at the position where the end surface flange 71*f* contacts the abutting surface 32*f* of the development cover member 32, the position of the downstream transmission member 71 in the axial direction is determined. As described above, the transmission release mechanism 75 is disposed in a state of being pressed in the axial direction by the downstream transmission member 71 and the upstream transmission member 74. By this, the axial position of the transmission release mechanism 75 is stabilized, and the engagement between a control member 76 and a control ring 75*d* of the transmission release mechanism 75, which will be described hereinafter, is stabilized.

Figure 10:
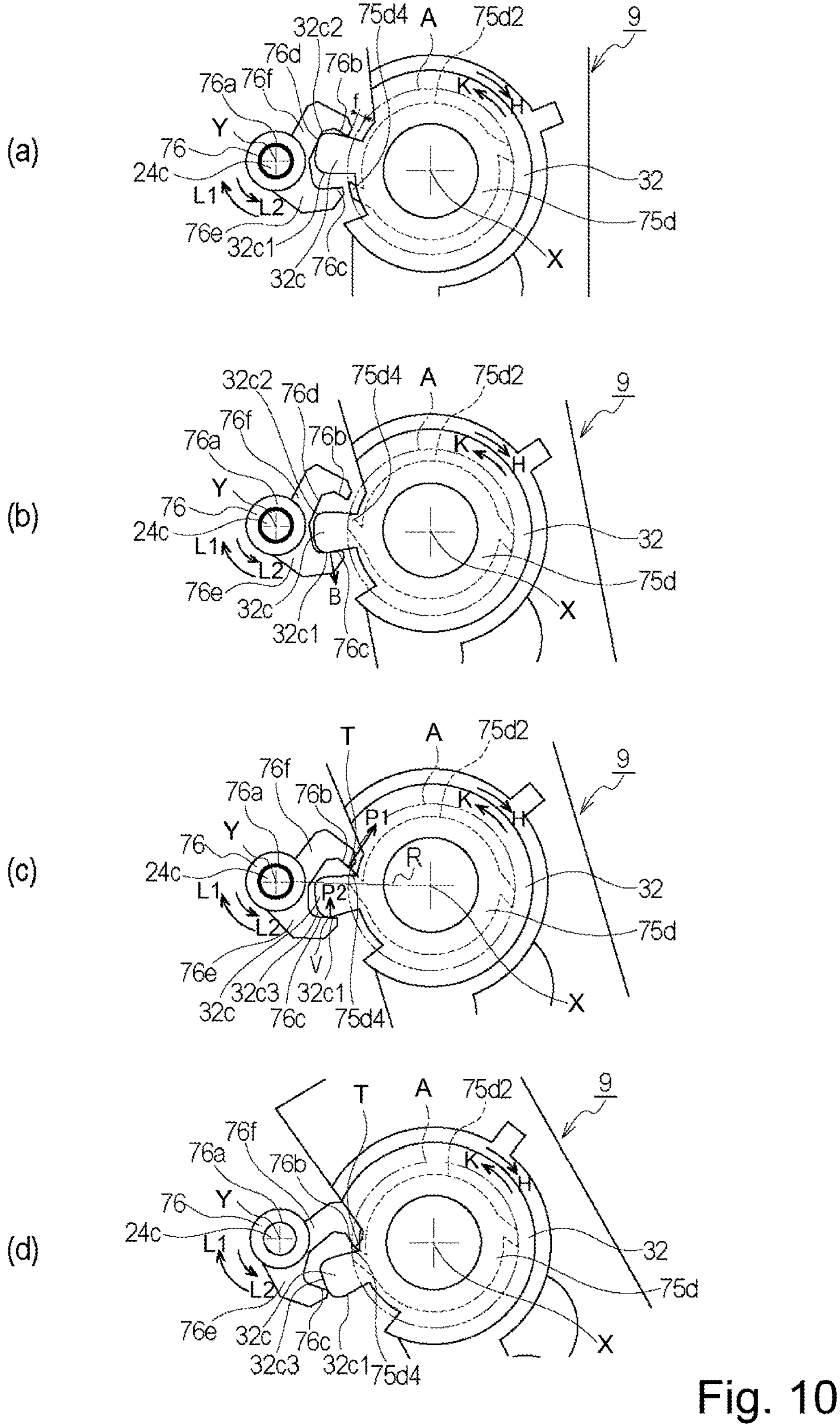
FIG. 10 is a schematic illustration showing a positional relationship between a control member and a developing unit according to Embodiment 1.

In the following, then, about transmission and blocking of the driving force in the transmission release mechanism 75 will be described referring to FIG. 10. FIG. 10 is a side view seen from the driving side, and shows the positional relationship among the transmission release mechanism 75, the control member 76, and the development cover member 32. Some portions are omitted for better illustration. First, the positional relationship between the transmission release mechanism 75 and the control member 76 will be briefly described, and the operation of the control member 76 will be described in detail later.

The control member 76 has a first position and a second position with respect to the transmission release mechanism 75. When the control member 76 is in the first position, the transmission release mechanism 75 transmits the rotation of the upstream transmission member 74 to the downstream transmission member 71. When the control member 76 is in the second position, the transmission release mechanism 75 blocks the rotation of the upstream transmission member 74 and does not transmit the rotation to the downstream transmission member 71. In the following, this will be described in detail.

First, the operation of the transmission release mechanism 75 when the control member 76 is in the first position will be described. The outermost rotation trace of the locked portion 75*d*4 is the rotation trace A (two-dot chain line in part (a) of FIG. 10), and the first position is a position where the control member 76 is outside the rotation locus A and away from the transmission release mechanism 75 (position shown in part (a) of FIG. 10). When the upstream transmission member 74 rotates, the input inner ring 75*a* engaged with the upstream transmission member 74 rotates in the direction of arrow J. The transmission spring 75*c* which engages with the input inner ring 75*a* is twisted in a direction in which the inner diameter is reduced by the frictional force produced by the rotation of the input inner ring 75*a*. As a result, the inner peripheral portion 75*c*1 of the transmission spring 75*c* tightens the input-side outer diameter portion 75*a*2, whereby the rotation of the input inner ring 75*a* is transmitted to the transmission spring 75*c*. The transmission spring 75*c* is engaged with the output member outer diameter portion 75*b*4 at the inner peripheral portion 75*c*1 similarly to the input side outer diameter portion 75*a*2. Therefore, the rotation of the input inner ring 75*a* is transmitted to the output member 75*b* by way of the transmission spring 75*c*. Here, the control ring 75*d* is engaged with the transmission spring 75*c* at the transmission spring end locking portion 75*d*3, and therefore, the rotation is the same as the components of the transmission release mechanism 75.

When the control member 76 is in the first position, the control member 76 is not in contact with the control ring 75*d*, as described above, the transmission release mechanism 75 transmits the rotation of the upstream transmission member 74. By this, the rotation of the upstream transmission member 74 is transmitted to the downstream transmission member 71 via the transmission release mechanism 75.

Next, the operation of the transmission release mechanism 75 when the control member 76 is in the second position will be described. The second position is a position where the control member 76 is inside the rotation locus A of the transmission release mechanism 75 and the control member 76 can contact the locked portion 75*d*4. (position shown in part (c) of FIG. 10).

When the upstream transmission member 74 rotates, the input inner ring 75*a* engaged with the upstream transmission member 74 rotates in the arrow J direction. In the second position, the control member 76 can contact the locked portion 75*d*4, and therefore, the control ring 75*d* is locked by the control member 76 and stops rotating. Additionally, the transmission spring 75 is engaged with the locked portion 75*d*4 of the control ring 75*d* whose one end side 75*c*2 of the wire rod stops rotating, and therefore, when the input inner ring 75*a* rotates, the inner diameter of the transmission spring 75*c* cannot be twisted in the direction of reducing the inner diameter. Therefore, slip occurs between the input side outer diameter portion 75*a*2 of the input inner ring 75*a* and the inner peripheral portion 75*c*1 of the transmission spring 75*c* even when the input inner ring 75*a* is rotating, the drive is not transmitted to the output member 75*b*. By this, the rotation of the upstream transmission member 74 is blocked by the transmission release mechanism 75 and is not transmitted to the downstream transmission member 71.

As described above, the transmission release mechanism 75 can switch between the position where the rotation of the upstream transmission member 74 is transmitted to the downstream transmission member 71 and the position where the rotation is blocked. Additionally, the transmission release mechanism 75 described in this embodiment transmits, to the downstream side transmission member 71, the rotational force received by the upstream transmission member 74 on the downstream side by the frictional force between the transmission spring 75*c* and the input-side outer diameter portion 75*a*2 and the output member outer-diameter portion 75*b*4. If the load for rotating the developing roller 6 is abnormally high and a rotational load exceeding the set friction force is produced, a slip can result between the input inner ring 75*a* and the inner peripheral portion 75*c*1 of the transmission spring 75*c*. By this, it is possible to prevent the apparatus main assembly 2 from being damaged.

Here, in this embodiment described above, as an example of the transmission release mechanism 75, an ordinary spring clutch has been used, but the form of the transmission release mechanism 75 is not limited to this example. For example, the transmission medium portion for transmitting the rotation of the upstream transmission member 74 to the downstream transmission member 71 may be advanced and retracted in the radial direction of the control portion. Such a structure is employed in Example 2 which will be described hereinafter.

[Drive Release Operation by Control Member 76]

The operation of the control member 76 will be described. As stated earlier, the control member 76 has a first position and a second position with respect to the control ring 75*d* of the transmission release mechanism 75. In addition, the control member 76 is switched between the first position and the second position in interrelation with the moving operation between the contact position and the separation position of the developing unit 9 with respect to the drum 4 having been described in conjunction with FIG. 7. That is, when developing unit 9 and drum 4 are in contact with each other, the control member is in the first position, and is in the second position when they are in the spaced position. In the following, this will be described in detail.

First, the state where the control member 76 is in the first position will be described. As shown in part (a) of FIG. 7, when there is a gap d between the force receiving portion 45*a* of the main assembly separation member 80 and the bearing member 45, the drum 4 and the developing roller 6 are in contact with each other. This state is the contact position of the developing unit 9. Part (a) of FIG. 10 shows a state in which the control member 76 is in the first position and the developing unit 9 is in contact with the drum 4.

The control member 76 has a supported portion 76*a* which is a circular hole. The supported member 76*a* is engaged with the control member support 24*c* (FIG. 8) of the driving side cartridge cover 24, so that the control member 76 is rotatably supported by the driving side cartridge cover 24. Here, the control member support 24*c* is a shaft provided on the driving side cartridge cover 24, and may be simply referred to as a support 24*c* in the following. Here, a rotational center of the control member 76 is depicted by reference character Y. Furthermore, the control member 76 is provided with two projecting portions projecting radially outward away from the rotational center Y, wherein a first acted portion 76*c* is provided at the free end of the first projecting portion 76*e*, and a contact surface 76*b* and a second controlled portion 76*d* are provided on the second projecting portion 76*f*. The contact surface 76*b*, the first acted portion 76*c*, and the second controlled portion 76*d* can rotate about the rotational center Y with the rotation of the control member 76.

In addition, between the contact surface 76*b* and the first actuated portion 76*c* facing each other, an acting portion 32*c* of the development cover member 32 is placed, and the acting portion 32*c* has a first acting portion 32*c*1 and a second acting portion 32*c*2. The first acting portion 32*c*1 is a surface facing the first acted portion 76*c*, and the second acting portion 32*c*2 is a surface facing the second acted portion 76*d*.

As described in the foregoing, the development cover member 32 of the developing unit 9 is rotatably supported by the driving side cartridge cover 24. That is, the first action portion 32*c*1 and the second action portion 32*c*2 can rotate about the rotational center X as the developing unit 9 rotates.

In addition, on the inside of the development cover member 32 in the X axis direction, the transmission release mechanism 75 is provided coaxially with the rotational center X, and the control ring 75*d* of the transmission release mechanism 75 which receives the driving force rotates in the arrow H direction about the rotational center X inside the development cover member 32.

In the contact position of developing unit 9, the contact surface 76*b* is located outside the rotation locus A of the control ring 75*d*, and there is a gap f between the contact surface 76*b* and the rotation locus A. At this time, the second actuated portion 76*d* of the control member 76 contacts the second actuating portion 32*c*2, and therefore, the rotational movement of the control member 76 in the direction of the arrow L1 is restricted. Therefore, the contact surface 76*b* can stably maintain the gap f with respect to the rotation locus A. In addition, the control member 76 can rotate in the L2 direction, but the control member 76 is arranged so that the control member 76 does not enter the inside of the rotation locus A, even if the control member 76 rotates in the L2 direction.

If the control member 76 is in the first position away from the control ring 75*d*, the control ring 75*d* can rotate (without being stopped By the control member 76), and the transmission release mechanism 75 transmits the rotation of the upstream transmission member 74 to the downstream transmission member 71.

Subsequently, referring to part (b) in FIG. 10 and part (c) in FIG. 10, the description will be made as to operation of the control member 76 when the developing unit 9 moves from the contact position to the separation position to move the control member 76 from the first position to the second position.

Part (b) of FIG. 10 shows the state of the control member 76 while the developing unit 9 is moving from the contact position to the separation position. In part (c) of FIG. 10, the control member 76 is in the second position, and the developing unit 9 is in a separated position with respect to the drum 4.

As shown in part (c) of FIG. 7, the developing unit 9 moves from the contact position, and when the main assembly separating member 80 moves by δ2 in the direction of arrow F1 and stops, a state is established in which the center of rotation X is rotated by an angle θ2 in the direction of arrow K. At this time, the drum 4 and the developing roller 6 are separated from each other by a distance ε2, and the state of the developing unit 9 at this time is the separated position.

In the process of the movement of the developing unit 9 from the contact position to the separation position relative to the drum 4, the first action portion 32*c*1 and the second action portion 32*c*2 of the development cover member 32 move in the arrow K direction about the rotational center X as shown in part (b) of FIG. 10. The second acting portion 32*c*2 starts to move away from the second actuated portion 76*d* by the movement. Furthermore, when the development cover member 32 moves in the direction of arrow K, the first acting portion 32*c*1 contacts the first acted portion 76*c* of the control member 76. A force is applied to the first actuated portion 76*c* in contact with the first acting portion 32*c*1 in the direction of arrow B in part (b) of FIG. 10, and by this force, the control member 76 rotates in the direction of the arrow L1. As described above, as the developing unit 9 moves, the control member 76 rotates in the direction of the arrow L1, and as the control member 76 rotates, the contact surface 76*b* moves in the direction of the arrow L1 to approach to the rotation locus A of the control ring 75*d*.

Furthermore, when the developing unit 9 rotates and reaches the separated position, the control member 76 also rotates, and the contact surface 76*b* enters inside the rotation locus A of the control ring 75*d*, as shown in part (c) of FIG. 10. The contact surface 76*b* which has entered the inside of the rotation locus A of the control ring 75*d* contacts the rotating locked portion 75*d*4 to stop the rotation of the control ring 75*d*. By this, transmission of rotational force by the transmission release mechanism 75 is blocked. By this, as described above, even when the upstream transmission member 74 is rotating, the rotation is blocked by the transmission release mechanism 75 and is not transmitted to the downstream transmission member 71. The contact surface 76*b* is a locking portion which engages with the locked portion 75*d*4 (locks the locked portion 75*d*4) and stops the rotation of the locked portion 75*d*4.

Here, in the state where the upstream transmission member 74 is rotating, when the rotation is kept blocked by the transmission release mechanism 75, slip occurs between the input inner ring 75*a* and the inner peripheral portion 75*c*1 of the transmission spring 75*c*. Therefore, a rotational load remains on the upstream transmission member 74 due to friction between the inner periphery of the transmission spring 75*c* and the input-side engagement outer diameter portion 75*a*2. In the following, the rotational load remaining on the upstream transmission member 74 when the rotation is blocked by the transmission release mechanism 75 is referred to as slip torque.

The contact surface 76*b* and the locked portion 75*d*4 are in contact at the contact portion T, and in a state where slip torque is produced, the contact surface 76*b* receives a force in the direction of the arrow P1 from the control ring 75*d* at the contact portion T. The force in the direction of arrow P1 attempts to rotate the control member 76 in the direction of arrow L2, but the first actuated portion 76*c* of the control member 76 abuts on the first actuating portion 32*c*1, so that the rotation of the control member 76 is limited. By this, the control member 76 can also maintain a contact state with the control ring 75*d* in a state of receiving a force in the direction of arrow P1 from the control ring 75*d*.

As described above, the position of the control member 76 with respect to the control ring 75*d* is determined by bring the first acting portion 76*c* into contact with the first acting portion 32*c*1, and therefore, the second position of the control member 76 can be changed by changing the shape of the first acting portion 32*c*1. That is, by selecting the shape of the first action portion 32*c*1, it is possible to freely control the speed at which the contact surface 76*b* approaches the rotation locus A of the control ring 75*d* and the timing of entry thereinto, and therefore, the blocking of the drive of the transmission release mechanism 75 can be controlled.

When the developing unit 9 rotates in the direction of arrow K from the state shown in part (c) of FIG. 10, the contact surface 76*b* enters the rotation locus A (the position shown in part (d) of FIG. 10). The action portion 32*c* is provided with an at-over-separation acting portion 32*c*3 on the downstream side of the first action portion 32*c*1 in the direction of the arrow H in part (d) of FIG. 10. The at-over-separation action portion 32*c*3 has an arc shape centered on the rotational center X of the developing unit 9. If the developing unit 9 is further rotated in the direction of arrow K than the state shown in part (d) of FIG. 10, the first acted portion 76*c* abuts to the arc-shaped at-over-separation acting portion 32*c*3. By this, the structure is such that the control member 76 maintains the second position, and the amount of intrusion into the inside of the rotation locus A of the contact surface 76*b* does not increase. That is, even if the developing unit 9 rotates more than the separation position due to the transportation, and so on, of the developing unit 9 it is possible to prevent the control member 76 from colliding against the outer portion 75*d*2 of the control ring 75*d*, thereby preventing damage and the like. The at-over-separation action portion 32*c*3 is a movement restricting portion which restricts the excessive movement beyond the second position when the control member 76 (contact surface 76*b*) moves from the first position to the second position. That is, the at-over-separation operating portion 32*c*3 suppresses the movement of the control member 76 (abutment surface 76*b*) from moving further in the second position when the control member 76 (contact surface 76*b*) moves from the first position to the second position.

[Drive Connecting Operation by Control Member 76]

In the following, the operation of the control member 76 when the control member 76 is switched from the second position to the first position will be described. The control member 76 shown in part (c) of FIG. 10 is in the second position, in the state that the slip torque is generated as described above, at the contact portion T between the contact surface 76*b* and the locked portion 75*d*4, the contact surface 76*b* receives the force indicated by the arrow P1 in part (c) of FIG. 10 as a normal force from the locked portion 75*d*4. In this example, contact surface 76*b* faces such that the control member 76 is rotated in the direction of the arrow L2 by a normal reaction force (arrow P1) received from the locked portion 75*d*4. That is, the control member 76 receives a force in a direction in which the control member 76 moves from the second position to the first position due to contact with the control ring 75*d* of the transmission release mechanism 75. On the contrary, the first acted portion 76*c* of the control member 76 abuts to the first acting portion 32*c*1, by which the rotation of the control member 76 is suppressed. In this state, at the contact portion V between the first acting portion 32*c*1 and the first acted portion 76*c*, the first acting portion 32*c*1 receives a force indicated by arrow P2 in part (c) of FIG. 10, as a perpendicular reaction force from the first acted portion 76*c*. In this embodiment, the first acting portion 32*c*1 and the first acted portion 76*c* are faced each other such that the developing unit 9 including the development cover member 32 is rotated in the direction of arrow H by the perpendicular reaction force (arrow P2) received by the first acting portion 32*c*1 from the first acted portion 76*c*. Furthermore, the contact portion T and the contact portion V are placed in substantially the same cross-section with respect to a plane perpendicular to the axial direction of the rotational center Y of the control member 76. Therefore, the inclination in the axial direction of the rotational center Y of the control member 76 when the control member 76 receives the reaction force of the vertical force (arrow P2) and the vertical force (arrow P1) at the same time is suppressed, and as a result, the contact state between the control member 76 and the transmission release mechanism 75 can be stably maintained.

The developing unit 9 has a structure in which a moment in the direction of arrow H acts by the urging force of the pressing spring 95, and furthermore, the developing unit 9 including the development cover member 32 receives a moment in the direction of the arrow H (FIG. 4) due to the force in the direction of the arrow P2. However, as shown in part (c) of FIG. 7, the main assembly separation member 80 and the force receiving portion 45*a* of the bearing member 45 are in contact with each other, by which the rotation of the developing unit 9 in the arrow H direction is limited. That is, the force receiving portion 45*a* of the bearing member 45 receives an external force (force from the outside of the cartridge) due to contact with the main assembly separation member 80. By this force, the rotation of the developing unit 9 in the direction of arrow H is restricted, and the rotation of the control member 76 in the direction of the arrow L2 can also be kept restricted.

That is, even when the control member 76 receives a force in the direction of the arrow P1 due to contact with the control ring 75*d* of the transmission release mechanism 75, it is possible to stably maintain the second position of the control member 76.

From this state, when the main assembly separation member 80 moves in the direction of arrow F2 in part (c) of Figure the rotation restriction to the developing unit 9 by the main assembly separation member 80 and the rotation restriction of the control member 76 are removed.

That is, the developing unit 9 the rotation of which is restricted by the main assembly separating member 80 starts to rotate in the direction of the arrow H by the force in the direction of arrow P2. Furthermore, when the first action portion 32*c*1 of the development cover member 32 of the developing unit 9 rotates in the direction of the arrow H, the control member 76 the rotation of which is restricted by the first action portion 32*c*1 is rotated in the direction of the arrow L2 by the force in the direction of the arrow P1.

When the control member 76 rotates in the direction of arrow L2, the contact surface 76*b* moves similarly in the direction of the arrow L2. The movement of the contact surface 76*b* proceeds to such an extent that the contact surface 76*b* reaches the first position of the control member 76 which has moved to the outside of the rotation locus A of the control ring 75*d*, as shown in part (a) of Figure. By this, the control ring 75*d* becomes rotatable, and therefore the transmission release mechanism 75 can transmit the rotation of the upstream transmission member 74 to the downstream transmission member 71.

With this structure, the rotation of the control member 76 in the direction of the arrow L2 is restricted by the first action portion 32*c*1, and therefore, depending on the shape design of the first action portion 32*c*1, it is possible to arbitrarily set the timing at which the contact surface 76*b* comes out of the rotation locus A and the rotation amount thereof. Therefore, the timing to start transmitting the driving force can be arbitrarily set when the developing unit 9 moves from the separated position to the contact position.

In order to stabilize the toner coating state on the developing roller 6, it is desirable to rotate the developing roller 6*a* a certain number of times (time) before the developing roller 6 and the drum 4 contact to each other. This rotation is called pre-rotation. By employing the structure of this embodiment, the amount of pre-rotation (number of times, time) of the developing roller 6 can be arbitrarily set.

As has been described in the foregoing, the control member 76 and the control ring 75*d* cooperate with each other to control the switching between on and off of the transmission of driving force, and therefore, the control member 76 and the control ring 75*d* can also be regarded as a portion of a control mechanism for controlling drive transmission and blocking of the force. Therefore, not only the control member 76 but also the control ring 75*d* may be called a control member. At this time, one of the control member 76 and the control ring 75*d* may be referred to as a first control member and the other as a second control member. In addition, the control member 76 may be called a control lever to distinguish it from the control ring 75*d* having a ring shape (circular shape, disk shape). The control member 76 is a lever member having a bent lever shape. In other words, the control member 76 has a U shape (C shape, V shape). The control member 76 has two end portions and a bent portion between the opposite end portions, and the rotational center (axis) of the control member 76 is located in the neighborhood of the bent portion.

In addition, both the control ring 75*d* and the control member 76 are rotatable members, and therefore, each can also be referred to as a rotating member. At this time, in order to distinguish them from each other, one of these may be referred to as a first rotating member, and the other as a second rotating member.

Figure 11:
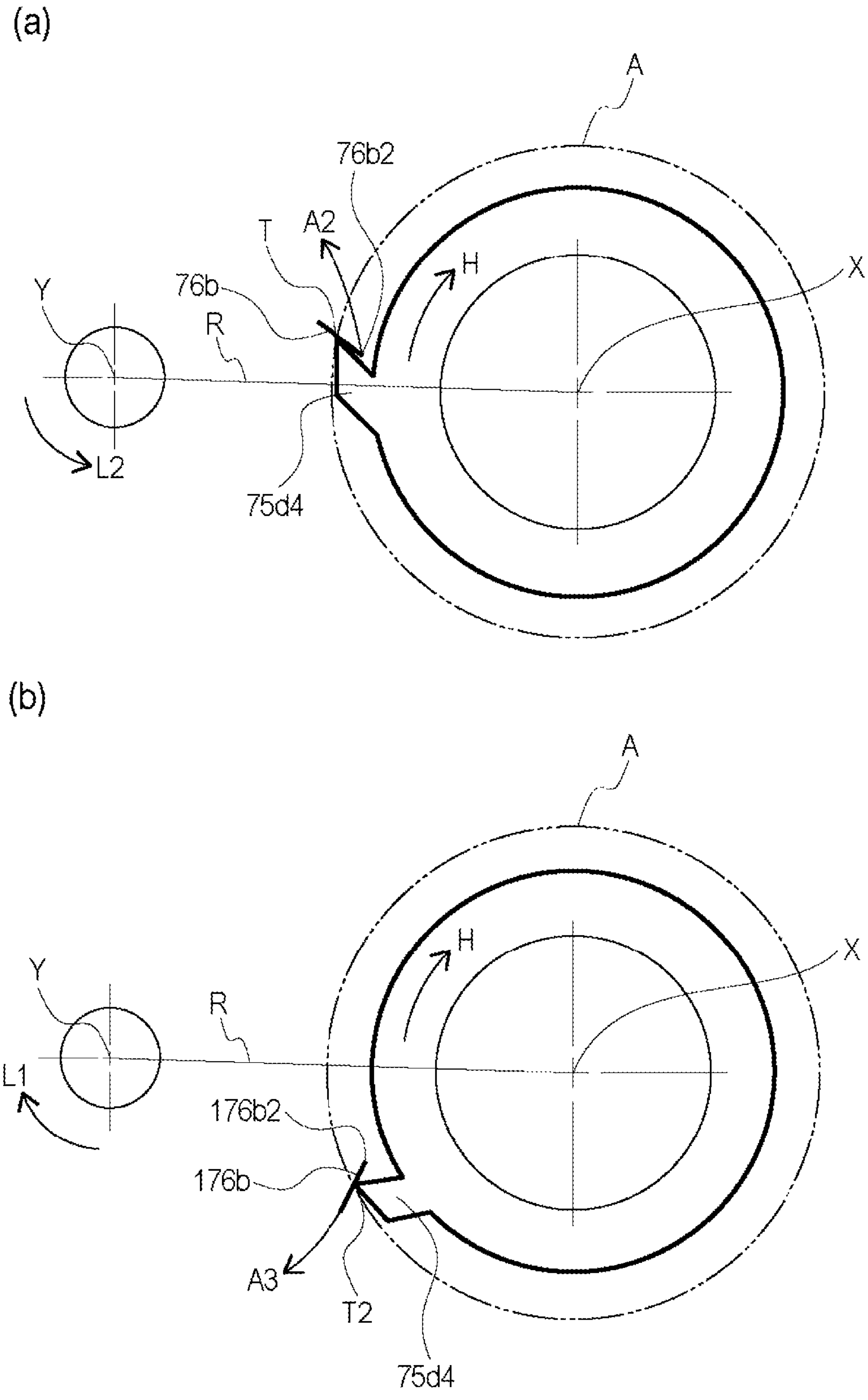
FIG. 11 is a schematic illustration showing a positional relationship between the control member and the transmission release mechanism according to Embodiment 1.

In addition, in this embodiment, as shown in part (c) of FIG. 10, the structure is such that the contact portion T between the contact surface 76*b* and the locked portion 75*d*4 is more downstream with respect to the rotational direction of the control ring 75*d* (arrow H direction) than the line R connecting the rotational center X and the rotational center Y. By this, the operation of rotating the control member 76 and moving the contact surface 76*b* to the outside of the rotation locus A can be stabilized. referring to FIG. 11, this operation will be explained in more detail. Part (a) of FIG. 11 is a simplified illustration showing the contact surface 76*b* and the locked portion 75*d*4 in the state shown in part (c) of FIG. 11. as shown in part (a) of FIG. 11, the contact portion T is located downstream of the line R connecting the rotational center X and the rotational center Y in the rotational direction (arrow H direction) of the control ring 75*d*. The contact portion T (contact surface 76*b*) is located downstream, in the arrow H direction, of the supporting portion 24*c* (FIG. 8) functioning as the rotational center Y with respect to the rotational center X. That is, the contact portion T is in the range of an angle greater than 0 degrees and smaller than 180 degrees with respect to the supporting portion 24*c* in the direction of arrow H with the rotational center X as the center.

As mentioned above, from this state, the contact surface 76*b* rotates in a direction (arrow L2 direction) different from the rotational direction (arrow H direction) of the control ring 75*d* the contact surface 76*b* moves to the outside of the rotation locus A. In the case of such an arrangement of the contact portion T and the rotational direction of the contact surface 76*b*, the end portion 76*b*2 of the contact surface 76*b* moves in the direction of the arrow A2 away from the contact portion T and away from the rotational center X, with the rotational center Y being the center. That is, the contact surface 76*b* can be moved to the outside of the rotation locus A with the rotational center X as the center, while being separated from the locked portion 75*d*4, and therefore, the friction can be suppressed at the contact portion T.

Here, referring to part (b) of FIG. 11, for comparison with this structure, the description will be made as to the case that the contact portion T is disposed upstream of the line R connecting the rotational center X and the rotational center Y in the rotational direction of the control ring 75*d*, and the control surface 76 is rotated in the same direction as the rotational direction of the control ring 75*d*. As shown in part (b) of FIG. 11, the contact portion T2 of the contact surface 176*b* and the locked portion 75*d*4 is placed upstream of the line R connecting the rotational center X and the rotational center Y in the rotational direction (arrow H direction) of the control ring 75*d*. From this state, the contact surface 176*b* is rotated in the same direction (arrow L1 direction) as the rotational direction of the control ring 75*d* (arrow H direction) to move the contact surface 176*b* to the outside of the rotation locus A. In the case of such an arrangement of the contact portion T2 and the rotational direction of the contact surface 176*b*, the end portion 176*b*2 of the contact surface 176*b* moves in the direction of the arrow A3 toward the contact portion T and away from the rotational center X, about the rotational center Y. That is, the contact surface 176*b* moves to the outside of the rotation locus A about the rotational center X, while rubbing against the locked portion 75*d*4, and therefore, the friction occurs at the contact portion T2.

However, the arrangement as in part (a) of FIG. 11 is preferable because it can suppress the production of frictional force at the contact portion T, and can stably move the contact surface 76*b* to the outside of the rotation locus A, but the arrangement is not limited to that shown in part (a) of FIG. 11. Even with the arrangement shown in part (b) of FIG. 11, the drive transmission of the transmission release mechanism 75 can be controlled by the control member 76.

When the transmission release mechanism 75 transmits the rotation of the upstream transmission member 74 to the downstream transmission member 71 at the first position of the control member 76, a torque larger than the slip torque is produced in the upstream transmission member 74, and a larger rotational moment in the direction of arrow H is produced in the developing unit 9. By the rotational moment in the direction of arrow H, the developing unit 9 moves more securely to the contact position.

In the case that the transmission release mechanism 75 is a spring clutch, when the rotation is blocked by the transmission release mechanism 75, a slip torque is produced in the upstream transmission member 74, as described above. In this embodiment, the force in the direction of arrow P1 at the contact portion T produced by the sliding torque is switched so that the developing unit 9 rotates in the direction of arrow H.

In contrast, when the torque remaining on the upstream transmission member 74 at the time of the rotation being blocked by the transmission release mechanism 75 is small, an auxiliary pressing spring 96 as an auxiliary urging member may be provided in order to reliably change between the contact and separation states of the developing unit.

As shown in FIG. 1 the auxiliary pressing spring 96 is a torsion coil spring, and the coil portion 96*c* is supported by the control member supporting portion 24*c* of the driving side cartridge cover member 24. In addition, one end side arm portion 96*c* of the auxiliary pressing spring 96 is engaged with a locking portion 24*d* of the driving side cartridge cover member 24. On the other hand, the arm portion 96*b* on the other end side switches the associated counterportion, depending on the attitude of the developing unit 9 (separated position or contact position). This will be described. In the state in which the developing unit 9 is in contact with the drum 4 as shown in part (a) of FIG. 7, the arm portion 96*b* on the other end side of the auxiliary pressing spring 96 is in a non-contact state with respect to the developing unit 9, and it is engaged with a portion 24*e* of the driving side cartridge cover member 24. That is, it is set so that the urging force Q by the auxiliary pressing spring 96 is not applied to the developing unit 9. As shown in part (b) of FIG. 7 to part (c) of FIG. 7, in a state in which the developing unit 9 is separated from the drum 4, the arm 96*b* on the other end side of the auxiliary pressing spring 96 is in contact with the urged portion 32*e* of the developing unit 9. By this, the auxiliary pressing spring 96 imparts a moment, in the direction of arrow H about the rotational center X, to the developing unit 9. As described above, even when the torque (sliding torque) remaining in the upstream transmission member 74 at the time of the transmission release mechanism 75 blocking the rotation is small, the developing unit 9 can be reliably shifted from the separated state to the contact state by providing the auxiliary pressing spring 96. In addition, even when the auxiliary pressing spring 96 is provided, the contact force between the developing roller 6 and the drum 4 can be prevented from increasing in the state in which the developing unit 9 is in contact with the drum 4, by setting so that the urging force Q by the auxiliary pressing spring 96 does not act on the developing unit 9. By this, the stress imparted to the toner on the developing roller 6 can be reduced.

In the structure of this embodiment described above the process cartridge P includes the developing unit 9 and the drum unit 8, but the form of the cartridge is not limited to this example. For example, the developing unit 9 and the drum unit 8 may be constituted as separate cartridges. In this case, the developing unit 9 is sometimes called a developing cartridge. Even in such a case, it is preferable that the control member 76 is rotatably supported by a cartridge cover (support member) which rotatably supports the developing unit 9.

Here, the drive transmission member (transmission member) transmits drive force (rotational force) not only to the upstream transmission member 74 and the downstream transmission member 75 but also to the developing roller gear 69, the input inner ring 75*a* of the transmission release mechanism 75, the transmission spring 75*c*, and the output member 75*b*. Therefore, the upstream transmission member 74, the downstream transmission member 75, the developing roller gear 69, the input inner ring 75*a*, the transmission spring 75*c*, and the output member 75*b* can be called the first, second, . . . sixth transmission member. In particular, when referring to the input inner ring (input member) 75*a* and the output member 75*c* of the transmission release mechanism 75, these may be referred to as first and second transmission members, respectively. In addition, the transmission spring 75*c* for connecting the input inner ring (input member) 75*a* and the output member 75*c* may be called an intermediate transmission member.

In addition, a plurality of drive transmission members connected so as to rotate integrally can be made into one transmission member. For example, the upstream transmission member 74 and the input inner ring 75*a* may be combined into one transmission member, or the downstream transmission member 75 and the output member 75*b* may be combined into a single transmission member.

In the explanation so far, when developing the electrostatic latent image on the drum 4 the "contact development method" is used in which development is performed in a state that the drum 4 and the developing roller 6 are in contact with each other, but the development method is not limited to such an example. A "non-contact development method" that develops an electrostatic latent image on the drum 4 with a minute gap between the drum 4 and the developing roller 6 may be employed.

Whether it is a non-contact development system or a contact development system, the structure can be used in which the developing roller 6 is brought closer to the drum 4 during development and the developing roller 6 is separated from the drum 4 during non-development (parts (a) to (c) of FIG. 7). With this structure, the toner on the surface of the developing roller 6 can be prevented from transferring onto the drum 4 during non-development (non-image formation).

In addition to it, for the contact development method, the developing roller 6 does not contact the drum 4 during non-development, and therefore, it can be avoided that the developing roller 6 and the drum 4 are kept contacting each other for a long time. That is, it is possible to avoid the deformation of the developing roller 6 during non-development.

In addition, regardless of the method, the rotation of the developing roller 6 stops when not developing the image, and therefore, at this time, a load (such as a load caused by friction generated between the developing roller 6 and the developer) is not applied to the developer (toner) the existing on the periphery of the developing roller 6. Therefore, the life of the developer contained in the cartridge can be kept long.

[Differences from the Conventional Example]

Here, differences between the conventional structure and this embodiment will be described below.

In JP2001-337511, a driving hub 31*a*-1 that receives driving from the image forming apparatus main assembly (reference numerals described in JP-A-2001-337511, the same applies in this paragraph), and a spring clutch that performs drive switching are provided. The second casing 4*a* as the developing unit rotates to interrelate the operation of moving the developing roller 7*a* away from the photosensitive drum 1*a* and the movement of the spring clutch control means for blocking the drive of the spring clutch. The spring clutch control means includes a hinge portion 30*a* that is rotatably mounted around the rotation pin 32*a*, a control plate 34*a* fixed to the hinge portion 30*a*, and a connecting plate 29*a*. One end of the connecting plate 29*a* is rotatably connected around the control pin 33*a* below the rotating pin 32*a* of the hinge portion 30*a*. In addition, the other end of the connecting plate 29*a* is connected to the fixing pin 35*a* on the side surface of the first casing 10*a*. However, a crank mechanism including a handle (connecting plate 29*a*) which connects a rotating shaft (fixing pin 35*a*) and a shaft (control pin 33*a*) having the center shifted from the rotating shaft (fixing pin 35*a*) has a large number of links. Therefore, due to the variation in angle when the developing unit is rotated, variations are likely to occur in the timing at which the crank mechanism acts on the spring clutch. In particular, the control plate 34*a* which directly acts on the spring clutch is coupled to the first casing 10*a* by way of the hinge portion 30*a* and the coupling plate 29*a*. Therefore, the control plate 34*a* performs a complicated operation relative to the first casing 10*a* in response Y to the rotation of the hinge portion 30*a* about the rotation pin 32*a* or the rotation of connecting plate 29*a* about control pin 33*a* and fixed pin 35*a*. It is difficult to accurately control the position and operation of the control plate 34*a*.

In addition, when the number of links which constitute the crank mechanism increases, it is necessary to secure a moving space for each link, and it is difficult to downsize the crank mechanism and the cartridge provided with it.

On the contrary, in this embodiment, a control member 76 for controlling rotation transmission and blocking by the transmission release mechanism 75 is supported by the supporting portion 24*c* of the driving side cartridge cover 24 so as to be rotatable about one axis (rotational center Y). The motion (movement) performed by the control member 76 and the contact surface 76*b* (FIG. 10) relative to the driving side cover 24 is only rotation about the supporting portion 24*c*. Therefore, with respect to the driving side cover 24 and the developing unit 9, the accuracy of the positions and the operations of the control member 76 and the contact surface 76*b* can be easily maintained.

In addition, the driving side cartridge cover 24 rotatably supports the developing unit 9 which supports the transmission release mechanism 75, similarly to the control member 76. The control member 76 and the developing unit 9 are rotatably supported by the same member, so that the positional accuracy of the control member 76 and the transmission release mechanism 75 is increased.

Furthermore, the rotational movement of the control member 76 is controlled by the shape of the action portion 32*c* provided on the development cover member 32 of the developing unit 9, and therefore, the positional relationship between the control member 76 and the transmission release mechanism 75 can be stably maintained relative to the rotation angle of the developing unit 9. More specifically, in the first position of the control member 76, the second operated portion 76*d* of the control member 76 contacts the second operating portion 32*c*2, and therefore, the rotational movement of the control member 76 in the direction of the arrow L1 is restricted. Therefore, the contact surface 76*b* can stably maintain the gap f relative to the rotation locus A.

In addition, in the second position of the control member 76, the control member 76 applies a rotational moment in the H direction by the force in the direction of the arrow P1 from the transmission release mechanism 75. However, even in this state, the first actuated portion 76*c* of the control member 76 abuts to the first actuating portion 32*c*1, so that the rotation of the control member 76 is suppressed. That is, the control member 76 can stably maintain the second position.

As described above, since the positional relationship between the control member 76 and the transmission release mechanism 75 can be stably maintained with respect to the rotation angle of the developing unit 9, transmission and blocking of driving can be switched reliably. By this, control variations in the rotation time of the developing roller 6 can be reduced.

Furthermore, the structure of these transmission release mechanisms 75 is arranged on the same straight line as the rotational center X on which the developing unit 6 is rotatably supported relative to the drum unit 8. Here, at the rotational center X, the relative position error between the drum unit 8 and the developing unit 9 is the least. Therefore, by positioning the transmission releasing mechanism 75 for switching the drive transmission to the developing roller 6 at the rotational center X, the switching timing of the transmission releasing mechanism 75 relative to the angle at which the developing unit 9 is rotated can be controlled with the highest accuracy. By this, the rotation time period of the developing roller 9 can be controlled with high accuracy, and deterioration of the developing roller 9 and the developer can be suppressed. In addition, even if the developing unit 9 (developing frame) rotates, the position of the transmission release mechanism 75 does not change, and therefore, when the developing unit 9 rotates, the control member 76 can easily control the transmission release mechanism 75.

In addition, the rotational movement amount of the control member 76 is controlled by the shape of the action portion 32*c*, and the action portion 32*c* has an at-over-separation control surface 32*c*3 which has an arc shape with the rotational center X of the developing unit 9 as the center. By this, when the developing unit 9 is rotated more than a predetermined position due to the influence of physical transportation and so on, the control member 76 can be set so as not to approach the transmission release mechanism 75 exceeding the predetermined closeness, and the damage and so on can be prevented.

In addition, the control member 76 receives a force (in the direction of the arrow P1) in the direction in which the control member 76 moves from the second position to the first position, by contacting with the control ring 75*d* of the transmission release mechanism 75. The control member 76 and the first action portion 32*c*1 come into contact with each other, and the developing unit 9 receives a force in the arrow P2 direction and rotates in the arrow H direction. Furthermore, the rotational direction (arrow J direction) of the first drive transmission member 74 is a direction in which the developing unit 9 produces a rotation moment in the arrow H direction. For this reason, the control member 76 can reliably switch from the second position to the first position, and can contact and separate the developing unit 9, and as a result, can reliably switch drive transmission and blocking.

In this embodiment, although the case where the development cover member 32 has the action portion 32*c* has been described, the present invention is not limited to such an example, and other portions of the developing unit may be the action portion.

[Summary of Structure]

Finally, the structure of the above-described embodiment can be summarized as follows.

As shown in FIG. 1 and FIG. 3, the cartridge P of this embodiment can be mounted to and dismounted from the apparatus main assembly (electrophotographic image forming apparatus main assembly) of the electrophotographic image forming apparatus 1 (FIG. 1). As shown in FIG. 4, the cartridge P has a developing roller 6 constituted to develop the latent image formed on the photosensitive member.

As shown in FIG. 5, this developing roller 6 is rotatably supported by the bearing member 45. Here, as described above, the developing frame 29, the development bearing 45, the development cover member 32, and the like are collectively referred to as the developing frame in a broad sense.

Such a developing frame (developing frame 29, development cover member 32, development bearing 45) is supported so as to be movable (rotatable) by a frame of a drum unit (photosensitive unit). The drum unit frame is a support member (supporting frame) which movably supports the developing frame, and includes a driving side cartridge cover 24, a non-driving side cartridge cover 25, and the cleaning container 26.

One of the drum unit frame (supporting member) and the developing frame may be referred to as a first frame and the other as the second frame.

The developing frame is capable of taking the separation position (part (a) in FIG. 7) for separating the developing roller 6 from the photosensitive member 4 and the proximity position (part (b) in FIG. 7) for bring the developing roller 6 close to the photosensitive member 4. The image forming apparatus of this embodiment employs the contact development method, and therefore, the developing roller 6 comes close to contact with the photosensitive member. That is, in this embodiment, the proximity position is the contact position. On the other hand, when the non-contact development method is employed, a predetermined gap is provided between the developing roller 6 and the photosensitive member 4 when the developing frame is in the close position. The proximity position is the position of the developing frame which enables the developing roller 6 to develop the latent image on the photosensitive member 4 can be called the developing position (the first position of the developing frame, the first developing frame position). In addition, the position of the developing roller when the developing frame is in the proximity position (contact position, development position) is also called the proximity position (contact position, development position) or the first position (first developing roller position) etc.

On the other hand, the separation position is a retracted position which is retracted from the development position, and the developing roller 6 does not develop the latent image on the photosensitive member 4. The position of the developing roller when the developing frame is in the separated position is also referred to as the separated position (retracted position, non-developing position), or the second position of the developing roller (second developing roller position), and so on, sometimes.

Figure 8:
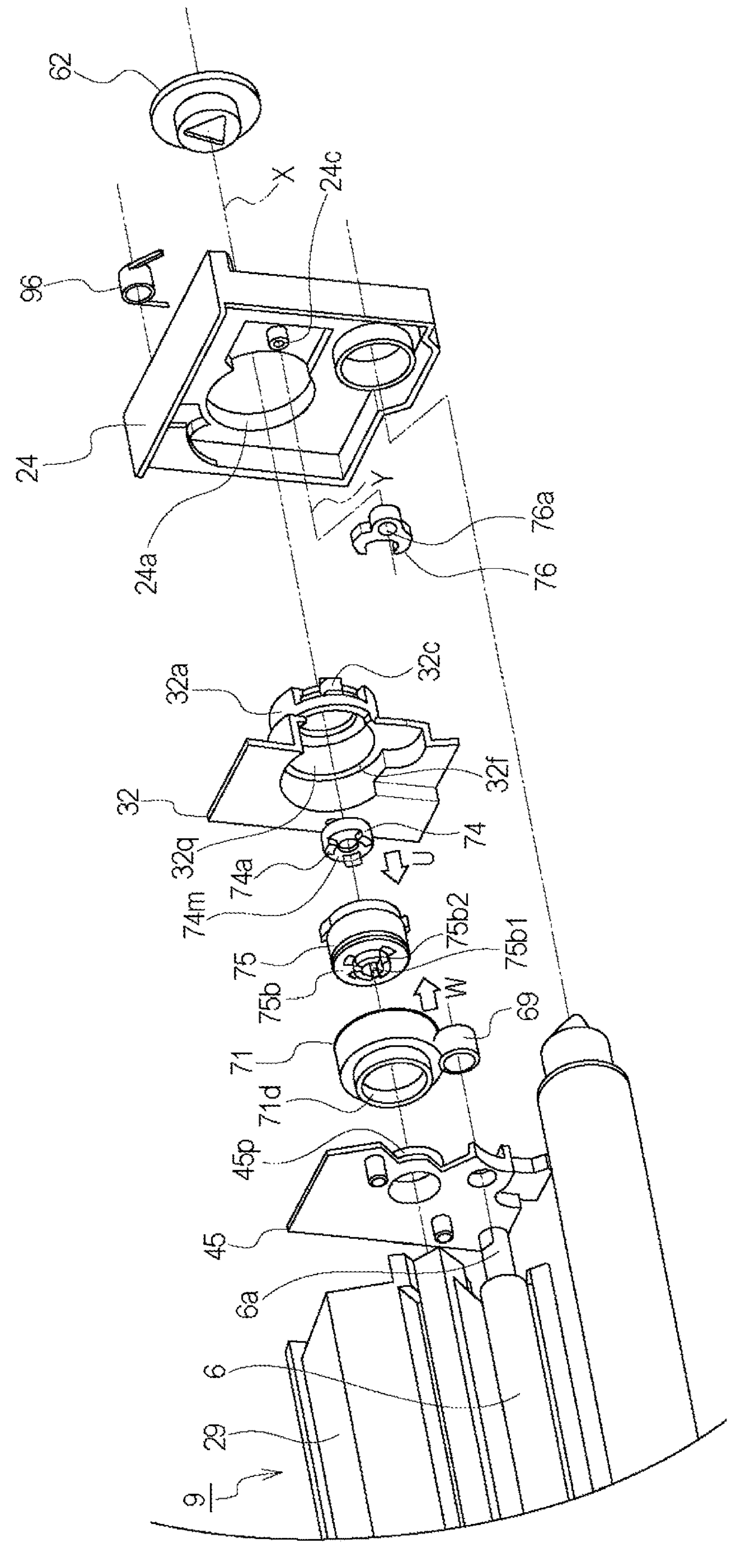
FIG. 8 is a perspective view of the process cartridge according to Embodiment 1.

As shown in FIG. 8, a clutch (transmission release mechanism 75) constituted to be able to switch between a state in which a rotational force is transmitted toward the developing roller 6 and a state in which the transmission is blocked is provided on the developing frame. In this embodiment, the transmission release mechanism 75 is a spring clutch, and is constituted to switch between transmission and blocking of driving force by tightening and loosening of the transmission spring 75*c* (parts (a) to (c) of FIG. 9).

A control member 76 for controlling clutch drive transmission and blocking is provided on the support member (driving side cartridge cover 24) (FIG. 10). The control member 76 is a lever (rotating member) that can rotate about one rotational axis (that is, the supporting portion 24*c*) fixed to the driving side cartridge cover 24.

Here, in this embodiment, the supporting portion 24*c* where the rotational axis of the control member 76 is located is a shaft portion formed integrally with the driving side cartridge cover 24. However, the structure is not limited to such an example. When the control member 76 around the rotational axis which is on the support member (driving side cartridge cover 24), the shaft portion which is a separate member from the driving side cartridge cover 24 is supported by the driving side cartridge cover 24, as the case may be.

For example, the shaft portion is formed integrally with the control member 76, or the shaft portion is fixed to the control member 76, and such a shaft portion is supported by a hole formed in the driving side cartridge cover 24, as the case may be. In this case, the hole provided in the driving side cartridge cover 24 can be regarded as a supporting portion for rotatably supporting the control member 76. In any event, if a supporting portion such as a shaft portion or a hole is fixed to the driving side cartridge cover 24, the control member 76 also rotates about the rotational axis Y (FIG. 10) fixed to the driving side cartridge cover 24.

The control member 76 has a locking portion (abutment surface 76*b*) which can be engaged with the locked portion 75*d*4 provided in the control ring 75*d* of the transmission release mechanism 75. This contact surface 76*b* can take the non-locking position to avoid the engagement (contact) with the locked portion 75*d*4 by retracting from the rotation locus A of the locked portion 75*d*4 (part (a) of FIG. 10).). At this time, the positions of the control member 76 and the contact surface 76*b* provided on the control member 76 are referred to as the first position (first control position, retracted position, non-locking position). When the contact surface 76*b* is located at this first position, the locked portion 75*d*4 can rotate about the axis X by the rotational force received by the transmission release mechanism 75. Therefore, the rotation of the transmission spring 75*c* (FIGS. 9A to 9C) which rotates integrally with the locked portion 75*d*4 is not hindered, and the transmission spring 75*c* transmits the rotational force within the transmission release mechanism 75. The first position is the position (allowance position, drive position, transmission position, non-locking position) for allowing the contact surface 76*b* to transmit the driving force by the transmission release mechanism 75.

On the other hand, the control member 76 and its contact surface 76*b* enter the rotation locus A of the locked portion 75*d*4 and engage (contact) with the locked portion 75*d*4, thereby taking a position to stop the rotation of the locked portion 75*d*4 (part (c) of FIG. 10 or part (d) of FIG. 10). At this time, the positions of the control member 76 and the contact surface 76*b* are referred to as a second position (second control position, locking position, entry position, engagement position). When the contact surface 76*b* is located at this second position, the rotation of the control ring (rotating member) 75*d* (parts (a) to (c) in FIG. 9) provided with the locked portion 75*d*4 also stops. Furthermore, the rotation of the end portion (one end side 75*c*2) of the transmission spring 75*c* fixed to the control ring 75*d* is also stopped. In this state, even if the driving force (rotational force) continues to be inputted from the upstream transmission member 74 to the transmission release mechanism 75, only the input inner ring 75*a* (input member, input hub, first transmission member) rotates. The output member (second transmission member) does not rotate.

That is, the transmission release mechanism 75 does not output the rotational force to the downstream drive transmission member (downstream transmission member) 71. The rotation of the downstream drive transmission member 71 and further the downstream developing roller 6 stops. The second position of the control member 76 is a position in which the contact surface 76*b* blocks the transmission of the driving force by the transmission release mechanism 75 and stops the rotations of the downstream side drive transmission member 71 and the developing roller 6 (blocking position, stop position).

When the contact surface 76*b* is located at the second position, one end side 75*c*2 of the transmission spring 75*c* is locked by the contact surface 75*b* by way of the control ring 75*d*. This stops the transmission spring 75*c* from rotating, and the transmission spring 75*c* is loosened from the input inner ring 75*a*. By doing so, the transmission spring 75*c* does not transmit the driving force from the input inner ring 75*a* to the output member 75*b* (output hub).

In addition, the developing frame (development cover member 32) is provided with an action portion 32*c* (FIGS. 8 and 10) for acting on the control member. The action portion 32*c* is a fixed portion fixed to the developing frame.

The action portion 32*c* acts on the control member 76 as the developing frame moves (swings and rotates) relative to the support member (the driving side cartridge cover 24, the non-driving side cartridge cover 25, and the cleaning container 26) (FIG. 7 and FIG. 10). When the action portion 32*c* acts on the control member 76, the locking portion (contact surface 76*b*) provided on the control member 76 is rotated between the first position (part (a) in FIG. 10) and the second position (between part (c) of FIG. 10). By this, the drive transmission through the clutch (transmission release mechanism 75) is switched (turned on and off).

The locking part (abutment surface 76*b*) is rotatable with the support (control member support 24*c*) provided on the support member (drive side cover 24) as the center (rotational axis), between the first position (part (a) of FIG. 10) and the second position (part (c) of FIG. 10). When the development frame moves relative to the support member, the action portion 32*c* fixed to the developing frame (development cover member 32) comes into contact with the control member 76, by which the contact surface 76*b* rotates between the first position and the second position (FIGS. 7, 9A to C). More specifically, as the developing frame moves to the close position, the second action portion 32*c*2 of the action portion 32*c* is brought into contact to the second action portion 76*d* of the control member 76 to apply a force, so that the contact surface 76*b* is moved to the first action portion 32*c* (part (a) in FIG. 10, part (a) in FIG. 7)). At this time, the transmission of the driving force of the transmission release mechanism 75 is allowed. On the other hand, as the developing frame moves to the separation position, the first action portion 32*c*1 of the action portion 32*c* is brought into contact to the first actuated portion 76*c* of the control member 76 to apply a force, so that the contact surface 76*b* is moved to the second action portion 32*c* (part (c) in FIG. 10, part (c) in FIG. 7). At this time, transmission of the driving force of the transmission release mechanism 75 is blocked.

The action portion 32*c* is disposed in a space between the first acting portion 76*c* and the second acting portion 76*d*, and is constituted to be able to contact to and separate from the control member 76.

According to this embodiment, the movement (movement) performed by the control member 76 and the locking portion (contact surface 76*b*) relative to the support member (drive side cover 24) is only rotation about the supporting portion 24*c*, and therefore, it is easy to maintain the positional accuracy of the control member 76 and the contact surface 76*b* relative to the support member. In addition, an action portion 32*c* acting on the control member 76 is fixed to the developing frame (development cover member 32), and therefore, when the development frame moves relative to the support member, the action portion 32*c* can be made to act on the control member 76, directly interrelation with the movement of the developing frame. It is easy to control the operation timing of the control member 76 and the contact surface 76*b*, and it is easy to move the control member 76 and the contact surface 76*b* with high accuracy, corresponding to the relative position of the developing frame and the support member.

Here, when the control member 76 is in the second position (part (c) of FIG. 10), the locking portion (contact surface 76*b*) of the control member 76 receives the force indicated by the arrow P1 from the locked portion 75*d*4 of the transmission release mechanism 75, in the state in which the rotational force is inputted to the transmission release mechanism 75. The force indicated by the arrow P1 acts in a direction to urge the contact surface 76*b* toward the first position (transmission position). Therefore, when the developing frame moves toward the proximity position (refer to part (a) in FIG. 7), in the state that the first acting portion 32*c*1 of the acting portion 32*c* is separated from the first acted portion 76*c* of the control member 76, the disengagement between the contact surface 76*b* and the locked portion 75*d*4 is assisted by the force P1.

In addition, when the rotational force is inputted to the transmission release mechanism 75 in the state that the control member 76 is in the second position (part (c) of FIG. 10), the first action portion 32*c*1 of the action portion 32*c* receives the force indicated by the arrow P2 from the first acted portion 76*c* of the control member 76. The force P2 acts in a direction to urge the developing unit 9 (developing frame) toward the close position. Therefore, as shown in part (c) of FIG. 7, when the main assembly separating member 80 is separated from the developing frame (the force receiving portion 45*a* of the bearing member 45), the force indicated by the arrow P2 assists the movement of the developing unit 9 (development frame) toward the proximity position (part (a) in FIG. 7).

In addition, the cartridge P is provided with the auxiliary pressing spring 96 for urging the developing frame toward the proximity position with the predetermined urging force when the developing unit 9 (developing frame) is located at the separation position (part (c) in FIG. 7). When the main assembly separation member 80 is separated from the developing frame (bearing member 45), movement of the developing unit 9 (development frame) toward the proximity position, and the disengagement between the contact surface 76*b* and the locked portion 75*d*4 are assisted by the urging force of the auxiliary pressing spring 96. Here, the structure is such that the auxiliary pressing spring 96 does not apply an urging force to the developing unit 9 when the developing unit 9 (developing frame) reaches the close position (part (a) in FIG. 7).

That is, there are cases in which in order for the developing unit 9 to start moving from the separated position to the close position, an extra force is required to release the engagement between the contact surface 76*b* and the locked portion 75*d*4. By using not only the force of the pressing spring 95 (FIG. 4) but also the force of the auxiliary pressing spring 96, the disengagement between the contact surface 76*b* and the locked portion 75*d*4 is assisted. On the other hand, in a state where the contact surface 76*b* and the locked portion 75*d*4 are released and the developing unit 9 has reached the proximity position, the developing unit 9 can be held in the close position by the force of the pressing spring 95 alone. Therefore, it is made sure that the urging force applied to developing unit 9 does not become excessively large, and therefore, the auxiliary pressing spring 96 does not urge the developing unit 9.

In addition, in this embodiment, the transmission release mechanism 75, the upstream transmission member 74, and the downstream transmission member 71 are also arranged coaxially (on the rotational axis X). The structure for input and output of driving force relative to the transmission release mechanism 75 can be simplified (FIG. 8).

Here, the upstream transmission member 74 is provided with a coupling portion (drive input portion 74*b*) to which the drive force is inputted from the outside of the cartridge (that is, the development drive output member 62 of the image forming apparatus main assembly). On the other hand, the downstream transmission member 71 has a gear portion 71*g* (FIG. 1) for outputting the rotational force transmitted from the transmission release mechanism 75 toward the developing roller 6. That is, the downstream transmission member 71 has a gear portion 71*g* which meshes with the developing roller gear 69. The drive input portion 74*b* is also provided on the rotational axis X, and therefore, even if the developing frame rotates, the position of the drive input portion 74*b* does not change. The movement of the developing unit 9 can be prevented from affecting the coupling (coupling) between the drive input portion 74*b* and the development drive output member 62.

Here, the gear portion 71g is an inclined tooth (a helical tooth), and when the downstream transmission member 71 rotates, a force (load W) is applied to the downstream transmission member 71 in the axial direction. The transmission release mechanism 75 is also urged in the axial direction toward the upstream transmission member 74 by this force, and the transmission release mechanism 75 is positioned in the axial direction. Here, the transmission release mechanism 75 includes an input member (input inner ring 75*a*), an output member 75*b*, and a coil spring (transmission spring 75*c*) wound around both of them. The force (load W) applied to the transmission release mechanism 75 by the gear portion 71g acts to press the output member 75*b* against the input inner ring 75*a*. For this reason, the state that the output member 75*b* and the input inner ring 75*a* are in reliable contact with each other is maintained. By this, it is possible to prevent a situation in which the output member 75*b* and the input inner ring 75*a* are separated, and a portion of the transmission spring 75*c* is sandwiched therebetween. In particular, in this embodiment the input member 75*a* is also pressed against the output member 75*b* by the application of the force U from the development drive output member 62, and therefore, the state that the output member 75*b* and the input inner ring 75*a* are in reliable contact with each other is maintained.

As described in the foregoing, the structure is such that the transmission release mechanism 75, the upstream drive transmission member 74, and the downstream transmission member 71 are arranged coaxially, and these members rotate in the direction of arrow J shown in FIG. 1. When the transmission release mechanism 75, the upstream drive transmission member 74, and the downstream transmission member 71 are transmitting the rotational force, the rotational force generated in the arrow J direction produces a moment, in the arrow H direction, applied to the developing unit 9 (developing frame). This moment in the direction of arrow H acts to move the developing unit 9 (developing frame) toward the close position (part (a) in FIG. 7). The rotational force transmitted by the transmission release mechanism 75 or the like acts to bring the developing roller 6 closer to the photosensitive member 4, and therefore, it is possible to assist the maintaining of the proximity of the developing roller 6 to the photosensitive member 4 or to stabilize the proximity of the developing roller 6 to the photosensitive member.

Here, in this embodiment, the supporting member that movably supports the developing frame is a photosensitive member supporting frame which rotatably supports the photosensitive member 4 (that is, the driving side cartridge cover 24, the non-driving side cartridge cover 25, and the cleaning container 26). And, the distance between the developing roller 6 and the drum (photosensitive member, photosensitive drum) 4 is changed by the movement of the developing frame relative to the support member (FIG. 7). However, the present invention is not limited to such a structure, and a structure in which the support member does not support the drum 4 is also conceivable, for example.

That is, there may be a case where the cartridge has the developing roller 6 and the transmission blocking mechanism 75 but does not have the drum 4. Such a cartridge may be called a developing cartridge instead of a process cartridge. In addition, when the developing cartridge structure is employed, it is conceivable that the drum 4 is constituted to be mountable to and dismountable from the apparatus main assembly 2 as a cartridge different from the developing cartridge. In such a case, the cartridge including the drum 4 may be called a process cartridge or a drum cartridge (photosensitive cartridge). The drum 4 may be installed in the apparatus main assembly 2 without being made into a cartridge fashion.

Here, in this embodiment, as an example of the structure of the transmission release mechanism 75, the transmission spring 75*c* tightens the output member outer diameter portion 75*b*4 provided on the output member 75*b* in the same manner as the input side outer diameter portion 75*a*2. As another form, the output side outer diameter portion 75*b*4 may be formed of a member different from the output member 75*b*. At this time, it will suffice if the output-side outer diameter portion 75*b*4 and the output member 75*b* are be connected so that they rotate integrally with each other.

Figure 12:
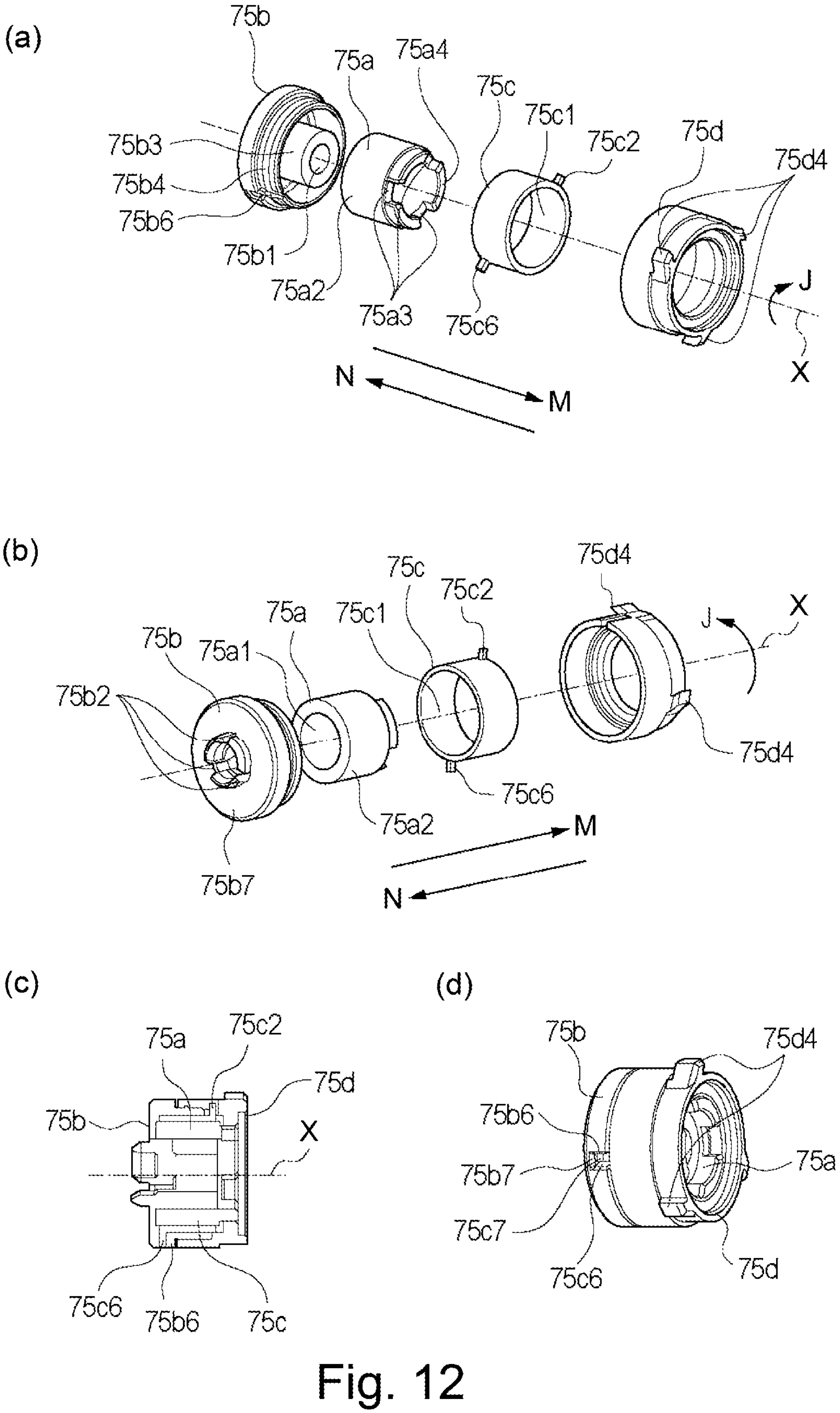
In FIG. 12, part (a) and part (b) are exploded perspective views of a transmission release mechanism of a different form from Embodiment 1, part (c) is a transmission release mechanism of a modified structure from Embodiment 1, and part (d) is an enlarged perspective view of an engaging portion.

Furthermore, another example will be described referring to parts (a) to (d) of FIG. 12. Part (a) in FIG. 12 and part (b) of FIG. 12 show a state in which another form of transmission release mechanism 75 is disassembled, wherein part (a) of FIG. 12 is a perspective view as seen from the drive side, part (b) of FIG. 12 is a perspective view as seen from the non-driving side. In addition, part (c) of FIG. 12 is a cross-sectional view of a transmission release mechanism 75 of another form.

The transmission spring 75*c* includes an inner peripheral portion 75*c*1 which coaxially engages the input inner ring 75*a*, one end side 75*c*2 of the wire engaged with the control ring 75*d*, and a transmission engagement end 75*c*6 on the other end side. The output member 75*b* is provided with a transmission engaged portion 75*b*6 that engages with the transmission engagement end 75*c*6, and the rotation transmitted from the input inner ring 75*a* to the transmission spring 75*c* is transmitted to the output member 75*b* by engagement between the transmission engagement end 75*c*6 and the transmission engaged portion 75*b*6. Here, part (d) of FIG. 12 shows an enlarged perspective view of the engaging portion between the transmission engaging end 75*c*6 and the transmission engaged portion 75*b*6. In the region where the free end 75*c*7 of the transmission engagement end 75*c*6 is located, the transmission engaged portion 75*b*6 is provided with a stepped shape in the axial direction, and the stepped portion 75*b*7 is formed and is not in contact with the free end portion 75*c*7 of the transmission engagement end 75*c*6.

Another form to the structure for transmitting the driving force has been described, and it is the same as in the embodiment as to the disengagement of the transmission of the driving force is blocked. That is, by stopping the rotation of the control ring 75*d*, the transmission spring 75*c* is loosened from the input inner ring 75*a*, so that the transmission spring 75*c* does not transmit the driving force from the input inner ring 75*a* to the output member 75*b*.

The transmission spring 75*c* is formed by winding a wire in a spiral shape, 75*c*2 and the transmission engaging end 75*c*6 are made by bending and cutting the ends. When cutting the wire, burrs can be produced at the free end 75*c*7. On the contrary, by providing the stepped portion 75*b*7 which is not in contact with the free end portion 75*c*7, even when burrs are produced, contact with the stepped portion 75*b*7 can be suppressed. By this, it is possible to prevent the transmission spring 75*c* from providing a resistance to the operation of loosening the input inner ring 75*a* when the rotation of the control ring 75*d* is stopped.

Embodiment 2

Next, another embodiment will be described as Embodiment 2. In Embodiment 2, the transmission release mechanism which has been the spring clutch in Embodiment 1 is different. Therefore, the description of the same portions as those in Embodiment 1 is omitted.

[Developing Unit Structure]

Figure 13:
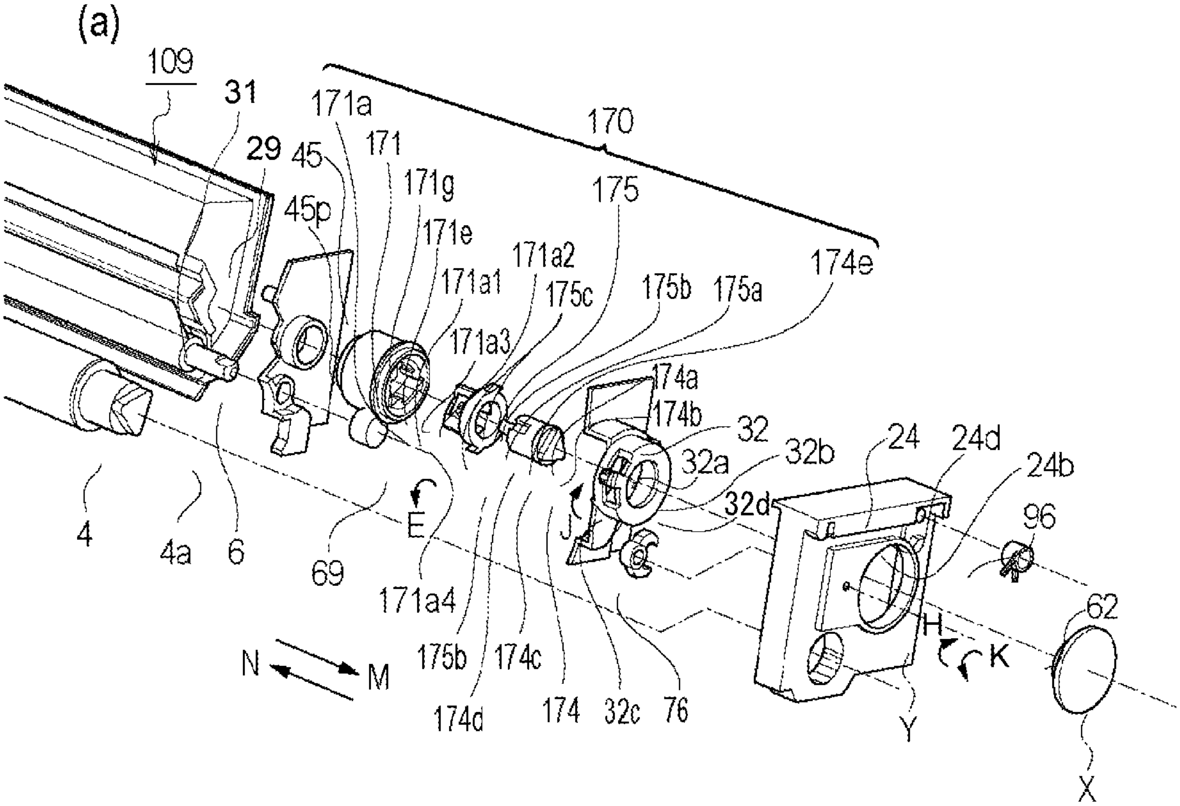
FIG. 13 is a perspective view of a process cartridge and the transmission release mechanism according to Embodiment 2.
Figure 13:
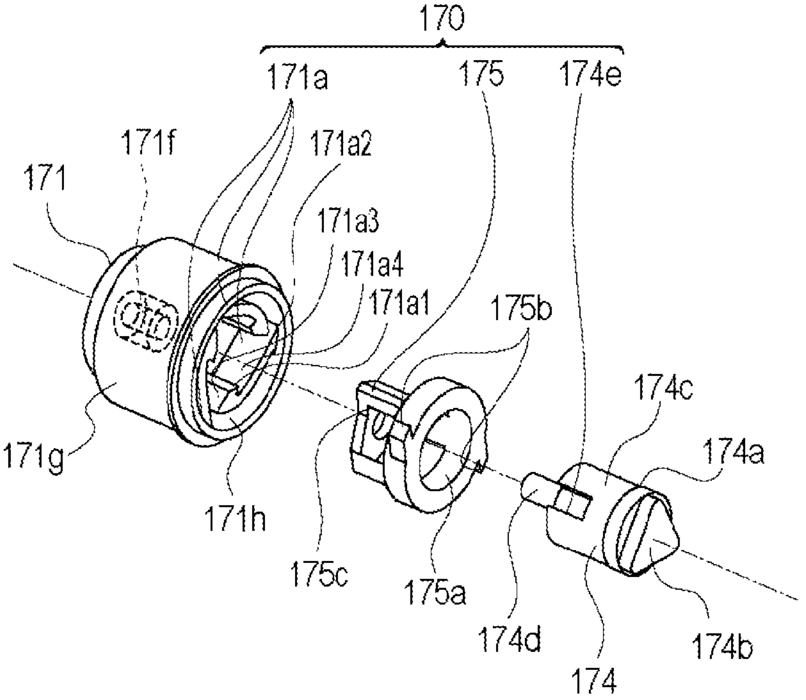
Figure 14:
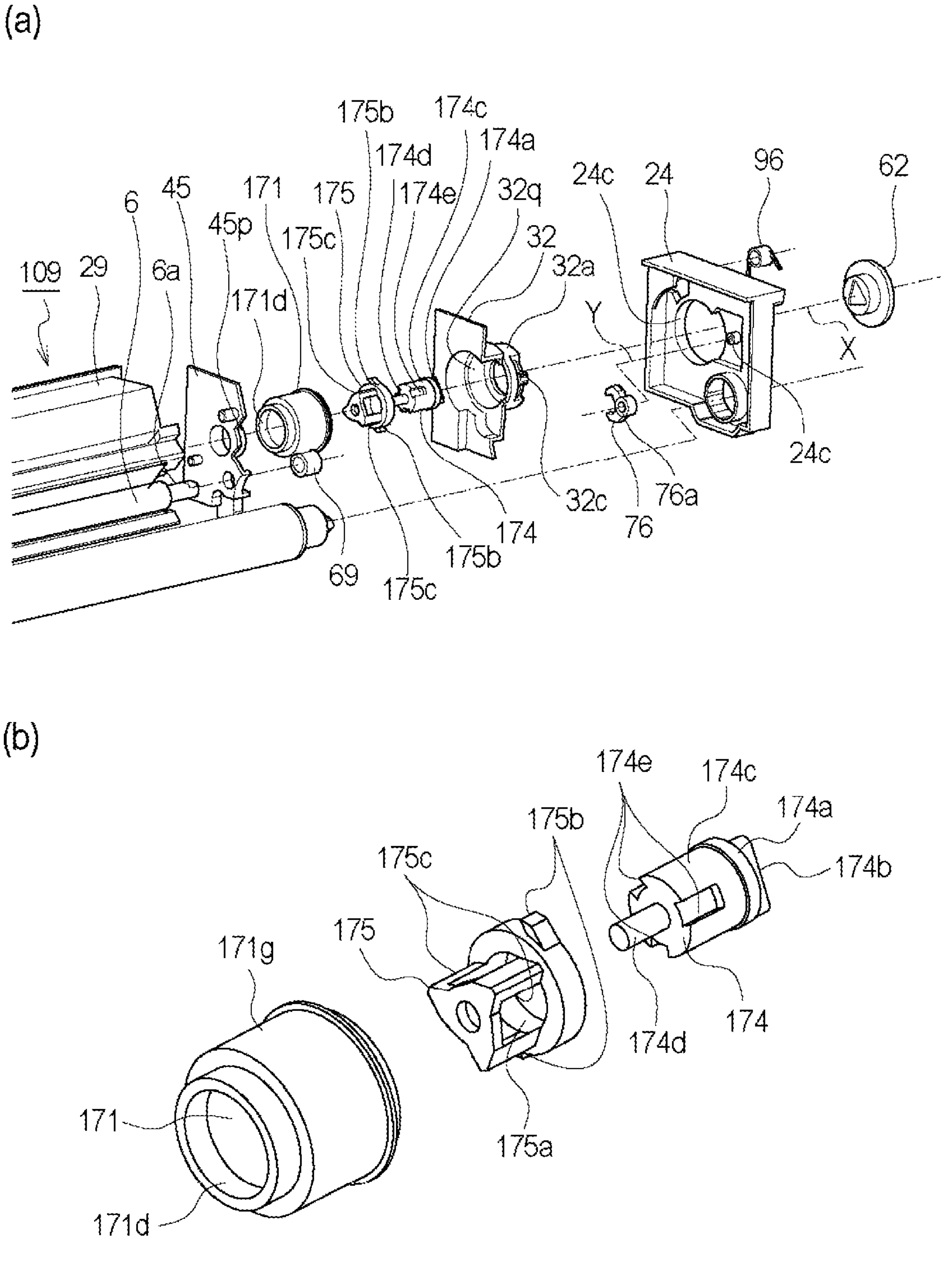
FIG. 14 is a perspective view of the process cartridge and the transmission release mechanism according to Embodiment 2.

Referring to FIG. 13 and FIG. 14 the structure of the developing unit 109 in this embodiment will be described. FIG. 13 is an exploded perspective view of the process cartridge of this embodiment as viewed from the drive side. Part (a) in FIG. 13 shows the entire developing unit 109, and part (b) in FIG. 13 shows the transmission release mechanism (clutch) 170 in an enlarged manner. FIG. 14 is an exploded perspective view of the process cartridge of this embodiment as viewed from the non-driving side. Part (a) of FIG. 14 shows the entire process cartridge, and part (b) of FIG. 14 shows the transmission release mechanism 170 in an enlarged manner.

In this embodiment, a first transmission member 174, a second transmission member 171, and a control ring 175 correspond to the upstream transmission member 74, the downstream transmission member 71, and the control ring 75*a* of Embodiment 1, respectively. However, as shown in FIG. 13, in this embodiment, these structures are partly different from Embodiment 1, and therefore, these differences will be explained in detail.

Although details will be described hereinafter, the transmission release mechanism 170 of this embodiment includes a first transmission member (first drive transmission member, an input side transmission member, a clutch side input portion, an input member) 174, a second transmission member (a second drive transmission member, an output side), a transmission member, a clutch-side output portion, an output member) 171, and a control ring 175. The structure of the developing unit 109 excluding the transmission release mechanism 170 is the same as that of Embodiment 1, and therefore, the description thereof is omitted.

[Developing Unit Drive Structure]

Referring to FIG. 13 and FIG. 14 the drive structure of the developing unit will be described. First, an outline will be described.

As shown in part (a) of FIG. 13, between the bearing member 45 and the driving side cartridge cover member 24, a bearing member 45, a second drive transmission member 171, a control ring 175, a first transmission member 174, and a development cover member 32 are provided in the order named from the bearing member 45 toward the driving side cartridge cover member 24. These members except for the development cover member 32 are rotatable, and the development cover member 32 is swingable. The rotational axes X thereof are provided in substantially the same straight line as the first transmission member 174.

Figure 15:
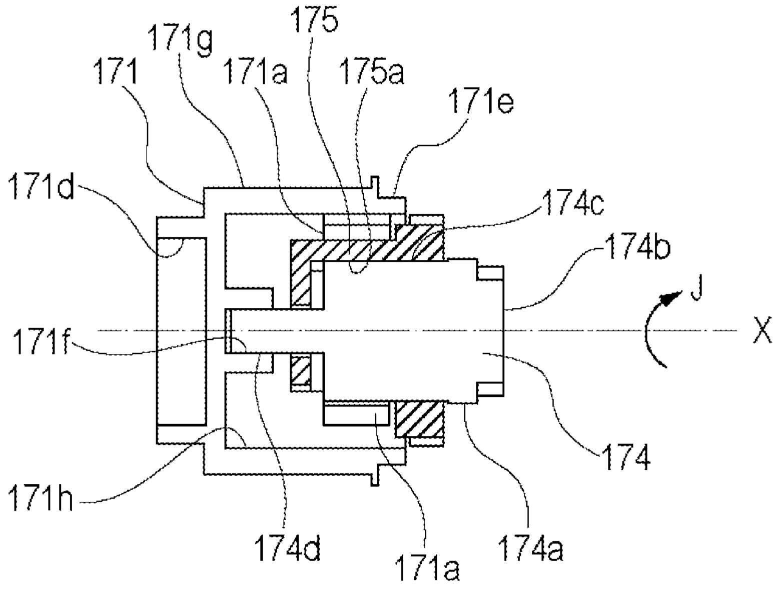
FIG. 15 is a sectional view of the transmission release mechanism according to Embodiment 2.
Figure 16:
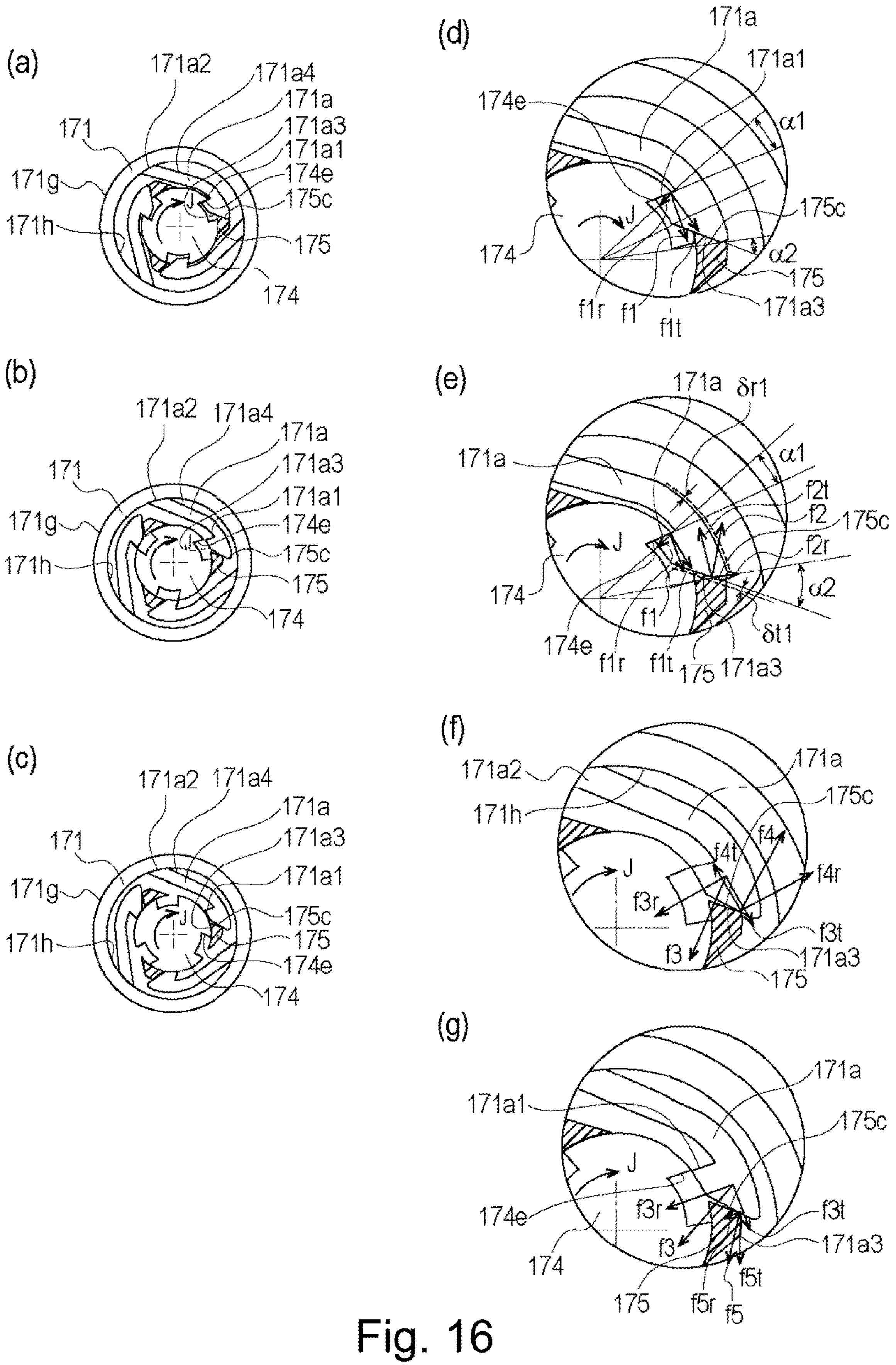
FIG. 16 is a cross-sectional view of a transmission release mechanism according to Embodiment 2.

Referring to FIG. 10, FIG. 13, FIG. 14, FIG. 15, and FIG. 16, the description will be made in detail as the transmission release mechanism 170, a structure in which the control ring 175 switches between transmission of the rotation of the first transmission member 174 to the second transmission member 171 and the blocking thereof. FIG. 15 is a cross-sectional view of the first transmission member 174, the second transmission member 171, and the control ring 175 taken along a plane passing through the rotational axis X. FIG. 16 is a cross-sectional view of the first transmission member 174, the second transmission member 171, and the control ring 175 taken along a plane passing through a position of a drive relay portion 171*a* of the second transmission member 171 and perpendicular to the rotational axis X, as seen from the drive side. The control ring 175 is indicated by hatching. In addition, part (a) of FIG. 16 shows a state in which the rotation of the first transmission member 174 is transmitted to the second transmission member 171. Part (b) of FIG. 16 and part (c) of FIG. 16 show a state in which the rotation of the first transmission member 174 is blocked from being transmitted to the second transmission member 171. Part (b) of FIG. 16 shows the state at the moment of blocking. Part (d) of FIG. 16 shows the state of force when the rotation of the first transmission member 174 is transmitted to the second transmission member 171. Part (e) of FIG. 16 shows the force during the blocking operation which blocks the rotation transmission between the first transmission member 174 and the second transmission member 171. Part (f) of FIG. 16 shows the state of force during the blocking of the rotation of the first transmission member 174 to the second transmission member 171. Part (g) of FIG. 16 shows a state of force when the rotation of the first transmission member 174 is operated from the blocking state to the transmission state to the second transmission member 171.

As described in the foregoing, the transmission release mechanism 170 in this embodiment comprises the first drive transmission member 174, the second transmission member 171 and the control ring 175 are constituted.

As shown in part (b) of FIG. 13 and part (b) of FIG. 14, the first transmission member 174 is substantially cylindrical and includes a drive input portion 174*b*, a control ring supporting portion 174*c*, an outer diameter portion 174*d*, and an engagement surface (engaging portion, drive transmission portion) 174*e*. In addition, the engagement surface 174*e* is provided as a recess shape recessed radially inward from the control ring supporting portion 174*c*.

As shown in part (b) of FIG. 13 and part (b) of FIG. 14, the second transmission member 171 is substantially cylindrical and includes a first transmission portion supporting portion 171*f*, an inner diameter portion 171*h*, and a drive relay portion 171*a*. The drive relay portion 171*a* includes an engaged surface (driving force receiving portion, engaging portion) 171*a*1, a supporting portion 171*a*2, a driven blocking surface 171*a*3 as a contact surface, and an arm portion 171*a*4.

The engaged surface 171*a*1 is a portion which engages with the engaging surface 174*e*. Therefore, one of the engaging surface 174*e* and the engaged surface 171*a*1 may be referred to as a first engaging portion, and the other as a second engaging portion. as shown in FIG. 16, in the drive relay 171*a*, one end is fixed (connected and supported) to the inner diameter portion 171*h* as a supporting portion (fixed end, connecting portion) 171*a*2, and the other end is a free end. A driven blocking surface (a urged portion, an urging force receiving portion, a held portion) 171*a*3 and an engaged surface 171*a*1 are provided in the neighborhood of the free end of the drive relay portion 171*a*. The driven blocking surface 171*a*3 and the engaged surface 171*a*1 face opposite sides in the rotational direction. The engaged surface 171*a*1 faces the upstream side in the rotational direction J, and the non-drive blocking surface 171*a*3 faces the downstream side in the rotational direction J.

The engaged surface 171*a*1 is a portion of a projection shape (projection, projecting portion) provided on the drive relay portion 171*a*, and in the natural state in which no external force is applied to the drive relay portion 171*a*, this projection projects radially inward. In a natural state in which no external force is applied to the drive relay 171*a*, the engaged surface 171*a*1 is located radially inward of the rotation locus when the engagement surface 174*e* described above is rotated about the rotational axis X.

In addition, the drive relay portion 171*a* has a shape extending from the supporting portion 171*a*2 toward the driven blocking surface 171*a*3 toward the downstream side in the rotational direction. In other words, the drive relay portion 171*a* extends downstream in the rotational direction J toward its free end. Here, the rotational direction J is the rotational direction of the second transmission member 171 during image formation. That is, it is the rotational direction of the second transmission member 171 for rotating the developing roller 6 in the direction of arrow E shown in FIG. 4.

As shown in part (d) of FIG. 16, the engaged surface 171*a*1 is a slope, which projects so as to form an angle $\alpha 1$ toward the upstream side in the rotational direction J as it goes inward in the radial direction. The driven blocking surface 171*a*3 is a slope, which projects at an angle $\alpha 2$ toward the downstream in the rotational direction J as it goes radially outward. Here, the relationship between the angle $\alpha 1$ and the angle $\alpha 2$ is angle $\alpha 1 <$ angle $\alpha 2$. The drive relay portion 171*a* is constituted as a cantilever. That is, in the drive relay portion 171*a*, by the arm portion (arm part) 171*a*4 extending from the fixed end (supporting portion 171*a*2) being elastically deformed, the engaged surface 171*a*1 and the driven blocking surface 171*a*3 are movable in the radial direction.

As shown in part (b) of FIG. 13 and part (b) of FIG. 14, the control ring 175 includes an inner diameter portion 175*a*, a locked surface 175*b*, and a drive blocking surface (urging portion, holding portion) 175*c* as a contact surface. The locked surface 175*b* is provided in the same shape as in Embodiment 1. In addition, a plurality of drive blocking portions 175*c* are provided radially from the rotational axis X.

As shown in FIG. 15, the second transmission member 171 is supported by the supporting portion 171*f* such that the outer diameter portion 174*d* of the first transmission member 174 can be rotated on the rotational axis X. And, the first transmission member 174 is supported by the control ring supporting portion 174*c* such that the inner diameter portion 175*a* of the control ring 175 can be rotated on the rotational axis X. In addition, as shown in FIG. 16, the drive blocking surface 175*c* of the control ring 175 is disposed adjacent to the downstream side, in the rotational direction J of the driven blocking surface 171*a*3, of the drive relay portion 171*a*.

Next, the transmission of rotation from the first transmission member 174 to the second transmission member 171 and switching of the blocking will be described in detail. In this embodiment as well, the transmission release mechanism 170 is controlled by the position of the control member 76 as in Embodiment 1. That is, the control member 76 and the locking portion 76*b* of the control member 76 are movable relative to the transmission release mechanism 170 between the first position (first control position, non-locking position, part (a) of FIG. 10) and the second position (second control position, locking position, part (b) of FIG. 10).

When the control member 76 is in the first position, the transmission release mechanism 170 transmits the rotation of the first transmission member 174 to the second transmission member 171. When the control member 76 is in the second position, the transmission release mechanism 170 blocks the rotation of the first transmission member 174 and does not transmit the rotation to the second transmission member 171.

Here, a state in which rotation is transmitted from the first transmission member 174 to the second transmission member 171 is referred to as a drive transmission state, and a state in which the rotation transmission from the first transmission member 174 to the second transmission member 171 is blocked is referred to as a drive blocking state. In addition, the operation to change from the drive transmission state to the drive blocking state is called the drive blocking operation, and the operation from the drive blocking state to the drive transmission state is called drive transmission operation. These states and operations will be described in order.

First, the drive transmission state will be described. In the drive transmission state, the control member 76 is in the first position, and the control member 76 does not contact the control ring 175. This corresponds to the state shown in part (a) of FIG. 10 (the control ring 75*d* of Embodiment 1 corresponds to the control ring 175 of this embodiment).

Part (a) of FIG. 16 shows the state in the drive transmission state. The engaged surface 171*a*1 of the drive relay portion 171*a* is engaged with the engaging surface 174*e* of the first transmission member 174. That is, the engaged surface 171*a*1 is in the rotation locus about the rotational axis X of the engaging surface 174*e*. The position of the engaged surface 171*a*1 in this state is referred to as the first position of the engaged surface (engagement position, first force receiving portion position, first receiving portion position, inner position).

And, in the state in which the first transmission member 174 is rotated, the rotational force is transmitted to the engaged surface **171*a*1 in the rotational direction J by the engaging surface 174*e*. That is, the engaged surface 171*a*1 is a driving force receiving portion for receiving a driving force (rotational force) from the engaging surface 174*e*. In addition, the engagement surface 174*e* is a driving force applying portion (driving force transmitting portion) for applying the driving force. In addition, the engaging surface 174*e* and the engaged surface 171*a*1** are engaging portions where they engage with each other. One of these can also be called a first engagement portion, and the other can be called a second engagement portion.

Referring to part (d) of FIG. 16, the transmission state of force when the engaging surface **174*e* and the engaged surface 171*a*1 are engaged will be described. The engaged surface 171*a*1 of the driving relay portion 171*a* receives a reaction force (driving force, rotational force) f1 from the engaging surface 174*e*. And, the drive relay portion 171*a* rotates in the rotational direction J by a tangential force f1*t* which is a tangential component of the reaction force f1. By this, the second transmission member 171 rotates in the rotational direction J. In addition, as described above, the engaged surface 171*a*1 has a slope shape with an angle α1. Therefore, a retraction force f1*r* inward in the radial direction is included in the reaction force f1. This relay force f1*r* causes the drive relay 171*a* to move inward in the radial direction, and therefore, the engaged state between the engaged surface 171*a*1 and the engaging surface 174*e* is stabilized. As a result, as a result, the drive transmission from the first transmission member 174 is stabilized. Here, as in Embodiment 1, the control ring 175 rotates integrally with the first transmission member 174 and the second transmission member 171, in a state where it is not locked from the control member 76. That is, the drive blocking surface 175*c* of the control ring 175 contacts the driven blocking surface of the second transmission member 171 to receive the driving force, and therefore, the control ring 175 rotates coaxially with the first transmission member 174 and the second transmission member 171 (part (a) of FIG. 16). At this time, the control ring 175 is referred to as being in the first position (first rotational position) relative to the second transmission member 171**.

Next, referring back to parts (c) and (d) of FIG. 10 of Example 1, a drive blocking operation for transitioning from the drive transmission state to the drive blocking state will be described. The control ring **75*d* illustrated in parts (c) and (d) of FIG. 10 corresponds to the control ring 175 of this embodiment. When starting the drive blocking operation, as shown in parts (c) and (d) of FIG. 10, the locking portion 76*b* of the control member 76 is locked to the locked surface 175*b* (corresponding to the surface 75*d*4 in the Figure) of the control ring 175. That is, the control member 76 moves to a second position where the rotation of the control ring 175 can be stopped. Here, the operations of the control member 76 and the control ring 175 at this time are the same as the operations of the control member 76 and the control ring 75*d*** of Embodiment 1, and therefore, description thereof is omitted.

Next, referring to parts (a), (b), and (e) of FIG. 16, the description will be made as to the operation when the rotation of the control ring 175 is restricted and the rotation is stopped.

In the state of part (a) in FIG. 16, the second transmission member 171 is rotated by receiving a rotational force from the first transmission member 174. On the other hand, in part (b) of FIG. 16, the rotation of the control ring 175 is restricted and stopped, and therefore, the drive relay portion **171*a* rotates relative to the control ring 175 in the rotational direction J. By this, the driven blocking surface (urging force receiving portion) 171*a*3 of the drive relay portion 171*a* moves toward the drive blocking surface (urging force applying portion, urging portion, holding portion) 175*c* of the control ring 175 which is at rest. The driven blocking surface 171*a*3 receives a predetermined reaction force (urging force) f2 from the drive blocking surface 175*c*, and performs a drive blocking operation by this reaction force f2. That is, by the engaged surface 171*a*1 moving radially outward, it is dismounted from the engaging surface 174*e*, and the engagement with the engaging surface 174*e* is released. At this time, the position of the engaged surface 171*a*1 is referred to as a second position (non-engagement position, outer position, second receiving portion position) of the engaged surface. In addition, at this time, the position of the control ring relative to the second transmission member 171 is referred to as a second position (second rotation position, second rotation member position) of the control ring 175**.

In the following, referring to part (e) of FIG. 16, the description will be made as to the state of the force of the drive relay portion **171*a*** at this time.

As in the drive transmission state, the engaged surface **171*a*1 receives a reaction force (driving force) f1 from the engaging surface 174*e*, and produces a tangential force f1*t* and the retracting force f1*r*. And, the drive relay portion 171*a* attempts to rotate in the rotational direction J by the tangential force f1*t*. However, in a state in which the control ring 175 is locked from the control member 76, the rotation of the control ring 175 is at rest, and therefore, the second transmission member 171 rotates relative to the control ring 175. As a result, the driven blocking surface 171*a*3 contacts the drive blocking surface 175*c*, and the drive relay portion 171*a* receives the reaction force f2 from the drive blocking surface 175*c* at the driven blocking surface 171*a*3**.

As described in the foregoing, the driven blocking surface **171*a*3 has a slope shape with the angle α2, and therefore, a pulling force f2*r* is produced in the radially outward direction. That is, the driven blocking surface 171*a*3 receives a reaction force (urging force) f2 including a component (extraction force f2*r*) directed radially outward from the drive blocking surface 175*c*. And, angle α1<angle α2, and therefore, the component force f2*r* outward in the radial direction is greater than the pulling force f1*r*** inward in the radial direction.

Therefore, in the drive relay portion **171*a*, slip occurs downstream in the rotational direction J along the driven blocking surface 171*a*3, between the driven blocking surface 171*a*3 and the drive blocking surface 175*c*. By this slip, the driven blocking surface 171*a*3 rotates relative to the control ring 175 in the rotational direction J by Δt1. As a result, the drive relay portion 171*a* is elastically deformed by Δr1 outward in the radial direction. By continuing this sliding movement, the engaged surface 171*a*1 is retracted from the rotation locus about the rotational axis X of the engagement surface 174*e*, and as shown in part (b) of FIG. 16, the engagement is released. That is, when the control member 76 is in the second position, by the control member 76 stopping the control ring 175, the drive relay portion 171*a* move to the second position radially outside, so that the engaged state between the engaged surface 171*a*1 and the engaging surface 174***e* is released.

As a result, the transmission release mechanism 170 is switched to the state in which the first transmission member 174 is blocked from rotating, and the second transmission member 171 is not transmitted to the drive blocking state.

Next, the drive blocking state will be described. As described in the foregoing, in the drive blocking state, the engaged surface 171*a*1 is retracted from the rotation locus about the rotational axis X of the engaging surface 174*e*, and the engagement between the engaged surface 171*a*1 and the engaging surface 174*e* is maintained released. referring to part (f) of FIG. 16, the description will be made as to the state of the force of the drive relay portion 171*a* at this time. In the drive blocking state, the engaged surface 171*a*1 is moved to a radially outer second position (second rotational position) by contact with the drive blocking surface 175*c* and is kept in that state. Therefore, in the drive blocking state, as shown in part (f) of Figure, a restoring force (elastic force, elastic restoring force) f3 is produced tending to restore the original position from the state of elastic deformation by the drive relay portion 171*a* moving outward in the radial direction. The drive relay portion 171*a* has the supporting portion 171*a*2 fixed to the inner diameter portion 171*h*, and therefore, the driven blocking surface 171*a*3 tends to move inward in the radial direction by the radial component f3*r* of the restoring force (elastic force) f3. However, the rotation of the control ring 175 is restricted and stopped, and therefore, the drive relay portion 171*a* receives the reaction force f4 from the drive blocking surface 175*c* by the driven blocking surface 171*a*3, so that its position is restricted.

Finally, the drive transmission operation which transitions from the drive blocking state to the drive transmission state will be described. At the start of drive transmission operation, the control member 76 moves to a first position which allows rotation of the control ring 175 as shown in part (a) of FIG. 10. Here, the operation of the control member 76 at this time is the same as that of Embodiment 1, and therefore, the description thereof is omitted. Next, about the operation when the restriction of the rotation of the control ring 175 is released will be described. The driving relay portion 171*a* produces the restoring force f3 as described above. By this restoring force f3, the engaged surface 171*a*1 is moved into the rotation locus about the rotational axis X of the engaging surface 174*e* of the first transmission member 174, by which the drive transmission state is established. In the following, this will be described in detail. as shown in part (g) of FIG. 16, the driven blocking surface 171*a*3 tends to move inward in the radial direction by the radial component f3*r* of the restoring force f3. Therefore, the driven blocking surface 171*a*3 applies a load f5 to the drive blocking surface 175*c*. Here, the control ring 175 is not restricted in the rotation in the rotational direction J, and therefore, it is rotated in the rotational direction J by the tangential component force f5*t* of the load f5 relative to the drive relay portion 171*a*. The control ring 175 rotates in the rotational direction J relative to the drive relay portion 171*a*, and therefore, the engagement surface 171*a*1 is further restored inward in the radial direction. When the engaged surface 171*a*1 moves in the radial direction into the rotation locus about the rotational axis X of the engaging surface 174*e*, by the movement caused by the restoring force f3, the engaged surface 171*a*1 engages with the engaging surface 174*e* to establish the drive transmission state.

As explained above, by switching between a state allowing the rotation of the control ring 175 and a state where the rotation is restricted and stopped, it is possible to switch between the case where the rotation of the first transmission member 174 is transmitted to the second transmission member 171 and the case where the rotation is blocked.

In this embodiment, the engaged surface (driving force receiving portion, engaging portion) 171*a*1 moves forward and backward in the radial direction, thereby switching between the engagement with the engaging surface (drive transmitting portion, engaging portion) 174*e* and the disengagement therewith. In addition, the engaged surface 171*a*1 retracts radially outward from the engaging surface 174*e*, so that the engagement is broken and the driving force transmission is blocked. By the control ring 175 moving (rotating) relative to the second transmission member 171, the engaged surface 171*a*1 moves as described above.

Here, the movement of the engaged surface 171*a*1 in the radial direction means that at least a radial component is included in the vector of the moving direction of the engaged surface 171*a*1, and the vector may contain components other than the radial direction. That is, when the engaged surface 171*a*1 moves in the radial direction, the engaged surface 171*a*1 may move in another direction (, for example, the rotational direction) as well at the same time. That is, if the distance from the rotational axis (rotational center) changes as the engaged surface 171*a*1 moves, it can be regarded as the radial movement.

As described in the foregoing, the position in which the engaged surface 171*a*1 is engaged with the engaging surface 174*e* and can receive a driving force (rotational force) as in part (a) of FIG. 16 is referred to as a first position (first driving force receiving portion position, first receiving portion position, inner position, engaging position, transmission position) of the engaged surface 171*a*1. In addition, at this time, the relative position of the control ring 175 relative to the engaged surface 171*a*1 (the relative position of the control ring 175 relative to the second transmission member 171) is a first position of the control ring 175 (first control ring position, first rotation member position, 1 rotation position, non-urging position, transmission position). When the control ring 175 is in the first position, the engaged surface 171*a*1 is positioned at the first position, in which the engaged surface 171*a*1 is engaged with the engaging surface 174*e*. At this time, the control ring 175 does not particularly act on the engaged surface 171*a*1. At this time, the engaged surface 171*a*1 is supported at the first position by the arm portion 171*a*4.

On the other hand, as shown in parts (b) and (c) of FIG. 16, the position in which the engaged surface 171*a*1 is disengaged from engaging surface 174*e* and does not receive driving force (rotational force) (or position where reception of driving force is restricted) is referred to as a second position (second driving force receiving portion position, second receiving portion position, non-engaging position, outer position, non-transmitting position) of the engaged surface 171*a*1. In addition, in these cases, the relative position of the control ring 175 relative to the engaged surface 171*a*1 (the relative position of the control ring 175 with respect to the second transmission member 171) is referred to as a second position of the control ring 175 (second control ring position, second rotation member position, second rotation position, urging position, non-transmission position). When the control ring 175 is in the second position, the engaged surface 171*a*1 is positioned in the second position, and the engaged surface 171*a*1 is disengaged (retracted) from the engaging surface 174*e*. That is, the control ring 175 applies an urging force to the engaged surface 171*a*1, thereby moving the engaged surface 171*a*1 radially outward against the elastic force of the arm portion 171*a*4. That is, by the arm portion 171*a*4 being elastically deformed, the engaged surface 171*a*1 moves radially outward.

The engaged surface 171*a*1 moves away from the rotational axis X by moving from the first position (part (a) in FIG. 16) to the second position (parts (b) and (c) in FIG. 16). That is, the second position of the engaged surface 171*a*1 is a position more remote from the rotational axis X than the first position of the engaged surface 171*a*1.

[Structure and Operation of this Embodiment]

In this embodiment, another form of the transmission release mechanism has been described. The structure of the control member 76 for controlling the rotational transmission and blocking by the transmission release mechanism 170 is the same as that in Embodiment 1, and the same effect can be provided. That is, since the positional relationship between the control member 76 and the transmission release mechanism 75 can be stably maintained with respect to the rotation angle of the developing unit 9, the transmission and blocking of the driving force can be switched reliably. By this, control variations in the rotation time of the developing roller 6 can be reduced.

In addition, in JP-A-2001-337511 and Example 1, a spring clutch is used. The spring clutch produces a load even when the drive transmission is not transmitted. For example, in the transmission release mechanism 75 which uses the spring clutch disclosed in Embodiment 1, when the rotation transmission is blocked, a sliding torque is generated in the first transmission member 74 by the input inner ring 75*a* sliding on the transmission spring 75*c* rub.

On the contrary, when the rotation is blocked by the transmission release mechanism 170 described in this embodiment, the drive relay portion 171*a* is retracted and moved outward in the radial direction, and the engaged state between the engaged surface 171*a*1 and the engaging surface 174*e* is released. Therefore, it is possible to reduce the slip torque of the first transmission member 174 when the drive is blocked.

On the other hand, in Embodiment 1, the transmission and blocking relative to the drive with the input inner ring 75*a* is switched by switching between the state in which the transmission spring 75*c* is tightened in the radial direction perpendicular to the rotational axis and the state in which it is loosened. The amount of deformation of the transmission spring 75*c* due to the tightening and loosening of the transmission spring 75*c* is small as compared with the amount of the forward and backward movement of the engaged surface (driving force receiving portion) in the radial direction. The clutch of Embodiment 1 has the advantage of high responsiveness.

In addition, the drive relay portion 171*a* and the engaged surface 171*a*1 are moved in the radial direction to switch between driving transmission and blocking. That is, the switching is performed by moving the engaged surface 171*a*1 so as to change the distance between the rotational axis X and the engaged surface 171*a*1. By this, the drive blocking mechanism can be downsized with respect to the rotational axis direction. That is, there is no need to move the engaged surface 171*a*1 and so on in the axial direction when switching between transmission and blocking of driving. Even if the engaged surface 171*a*1 moves not only in the radial direction but also in the axial direction, the movement distance in the axial direction can be reduced. Therefore, there is no need to increase the width, measured in the axial direction, of the drive blocking mechanism.

[Further Form (Modification)]

In this embodiment, in the transmission release mechanism 170, the first transmission member 174 has the coupling portion 174*a* for receiving the driving force from the outside of the cartridge. In addition, the second transmission member 171 had a gear portion 171*g* for meshing with the developing roller gear 69. However, the present invention is not limited to such a structure.

Figure 17:
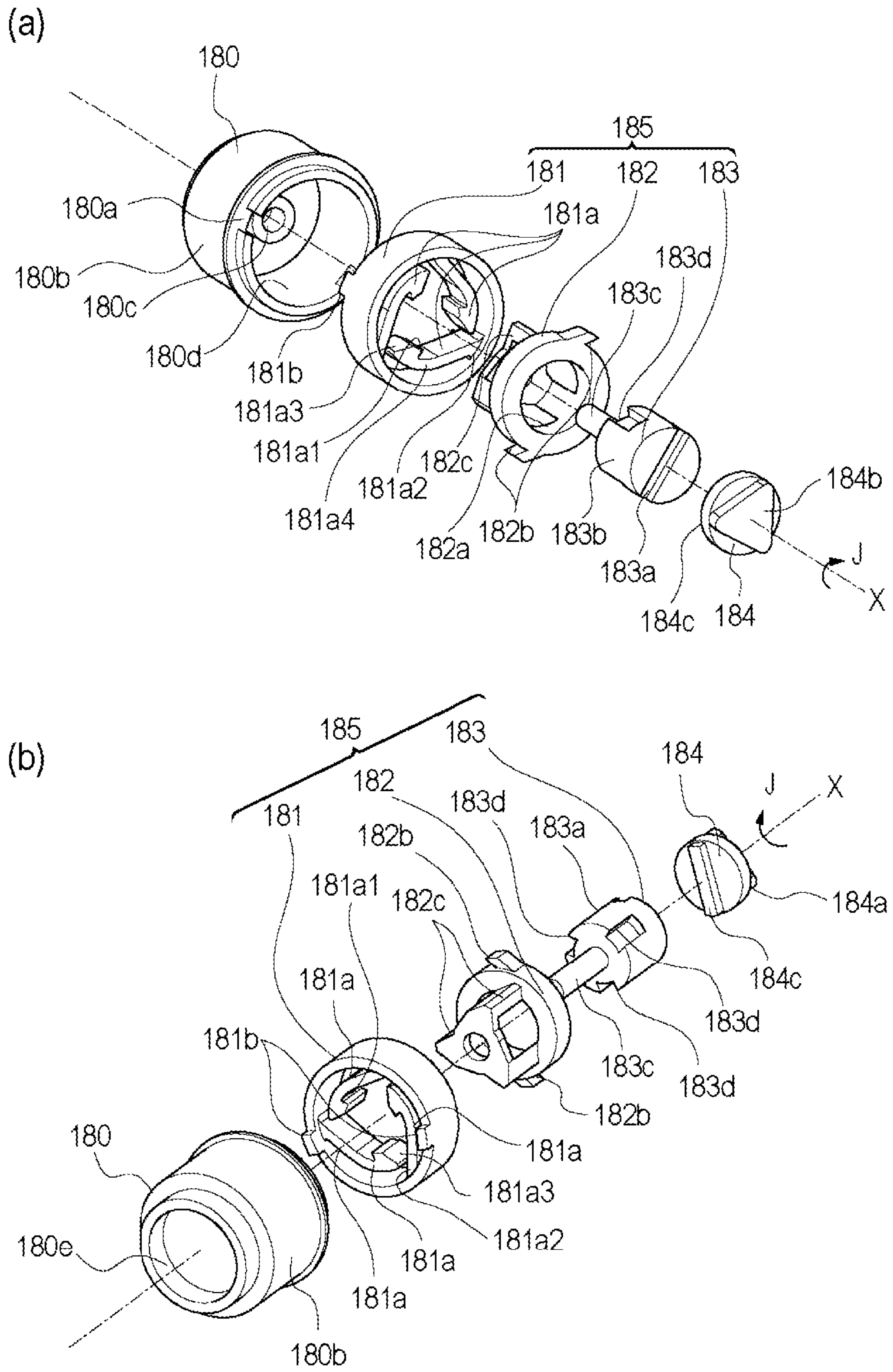
FIG. 17 is an exploded perspective view illustrating another structure of the transmission release mechanism according to Embodiment 2.

FIG. 17 shows a transmission release mechanism 185 as a modification of this embodiment. The transmission release mechanism 185 includes an upstream transmission member (coupling member) 184, a first transmission member 183, a control ring 182, a second transmission member 181, and a downstream transmission member (transmission gear) 180. That is, the first transmission member 174 is divided into two members, an upstream transmission member 184 and a first transmission member 183. In addition, the second transmission member 174 is divided into two members, namely a downstream transmission member 180 and a second transmission member 180. In this case, the second transmission member 181 has its projection 181*b* engaged with the groove (recess portion) 180*a* of the downstream transmission member 180, and the second transmission member 181 and the downstream transmission member 180 are rotatable integrally. Here, the second transmission member 181 may be provided with a groove (recess portion), and the downstream transmission member 180 may be provided with a projection.

In addition, the first transmission member 183 is provided with its groove 183*a* engaged with the projection 184*c* of the upstream transmission member 184 so that the first transmission member 183 and the upstream transmission member 184 are rotatable integrally. Here, the first transmission member 183 may be provided with a projection, and the downstream transmission member 184 may be provided with a groove (recess portion).

The upstream transmission member 184 and the first transmission member 183 are connected to each other so as to rotate integrally, and therefore, in the structure as in this modification, the upstream transmission member 184 may be regarded as a portion of the first transmission member 183. In this case, the upstream transmission member 184 and the first transmission member 183 cooperate to constitute an input member (input side transmission member, clutch input portion) of the transmission release mechanism (clutch) 185.

Similarly, the downstream transmission member 180 and the second transmission member 181 are connected to each other so as to rotate integrally, and therefore, the downstream transmission member 180 may be regarded as a part of the second transmission member 181. In this case, the downstream transmission member 180 and the second transmission member 181 constitute an output member (clutch side output portion, output side transmission member) of the transmission release mechanism 185.

In addition, in this embodiment, the engaged surface 171*a*1 of the drive relay portion 171*a* having the projection shape is engaged with the engaging surface 174*e* of the first drive transmission member 174 having the recess shape. That is, one is a projection and the other is a recess portion. However, the structure of engagement therebetween is not limited to this example. For example, as shown in part (b) of FIG. 18, the engaged surface 1711*a*1 of the drive relay portion 1711*a* may be a recess, and the engagement surface 1741*e* of the first drive transmission member 1741 may be a projection, or as shown in part (a) of FIG. 18, both may have projection shape. That is, what is necessary is just the structure in which they can engage with each other in the rotational direction.

Figure 18:
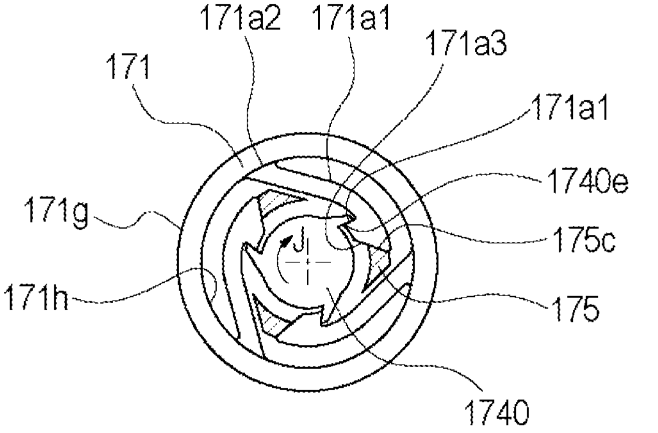
FIG. 18 is a cross-sectional view illustrating another structure of the transmission release mechanism according to Embodiment 2.
Figure 18:
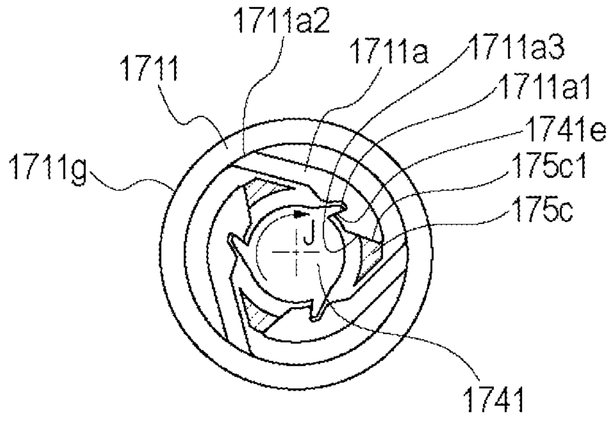
Figure 18:
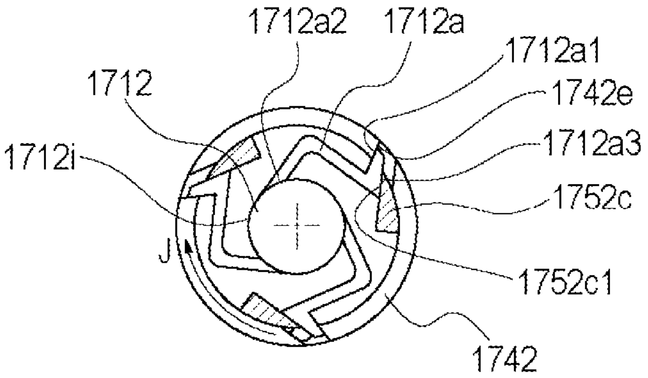

Here, each portion 1711*g*, 1711*a*2, 1711*a* of the second drive transmission member 1711 shown in part (b) of FIG. 18 has a structure corresponding to the portions 171*g*, 171*a*2, 171*a* of the second drive transmission member 1711, respectively, and therefore, the detailed description is omitted.

In this embodiment, the engaged surface 171*a*1 of the drive relay portion 171*a* is constituted to engage radially inward with the engaging surface 174*e* of the first transmission member 174, but the present invention is not limited to such an example. For example, as shown in part (c) of FIG. 18, the engaged surface (driving force receiving portion) 1712*a*1 of the drive relay portion 1712*a* may engage radially outward with the engagement surface 1742*e* of the first transmission member 1742. In this case, a second transmission member 1712 is provided with a cylindrical outer diameter portion 1712*i*, and a supporting portion 1712*a*2 of the drive relay portion 1712*a* is fixed to the outer peripheral portion (cylindrical outer diameter portion) 1712*i*.

The engaged surface (driving force receiving portion) 1712*a*1 engages with the first transmission member by moving forward to the first position on the radially outer side, and disengages from the first transmission member 1742 by retracting to the second position on the radially inner side. That is, in the present modification, unlike the structure described so far, the first position (engagement position) is a position more remote from the axis than the second position (non-engagement position).

In this embodiment, in the drawing, the number of drive relay portions 171*a* and engaged surfaces (drive force receiving parts) is three, but, the present invention is not limited to this number. The number of drive relays 171*a* and engaged surfaces may be single (one) instead of multiple. Or, multiple number other than 3 may be used (that is 2 or 4 or more). It can be selected according to the space.

In this embodiment, in the drawing, the number of engaging surfaces 174*e* of the first transmission member 174 is three, which is the same as the number of drive relay portions 171*a*, but, the present invention is not limited to this number. For example, when the number of the engagement surfaces 174*e* of the first transmission member 174 is three, the number of the engagement surfaces 174*e* of the first transmission member 174 is preferably an integer multiple such as 3, 6, 9, and so on, and can be appropriately selected depending on the space.

In this embodiment, the drive relay portion 171*a* has a cantilever structure in which one end 171*a*2 is fixed and the arm portion 171*a*4 is elastically deformable, but it is not limited to such an example.

Figure 19:
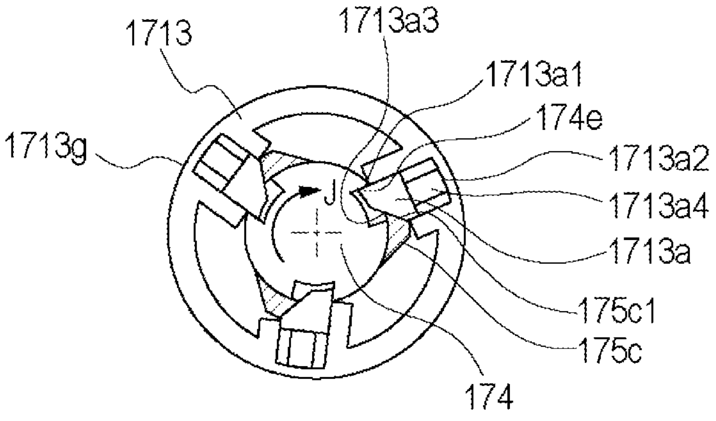
FIG. 19 is a sectional view illustrating another structure of the transmission release mechanism according to Embodiment 2.
Figure 19:
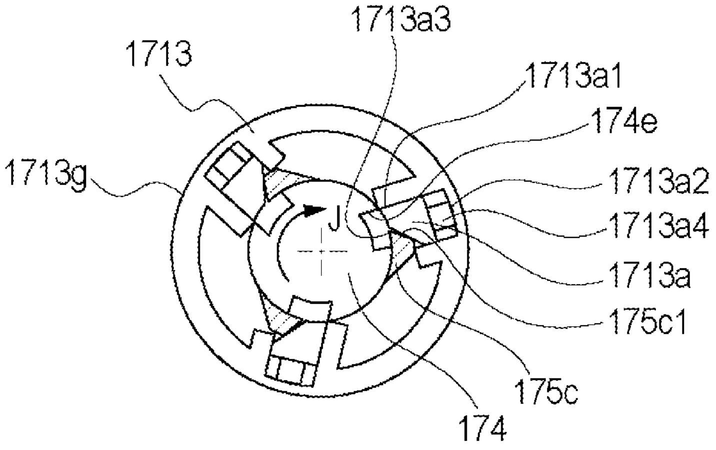

For example, as shown in FIG. 19, the second transmission member 1713 may have a slide member (driving force receiving member, drive relay portion) 1713*a* which moves in the radial direction, and a guide portion for guiding the slide movement.

The slide member 1713*a* has the engaged surface 1713*a*1, and the slide member 1713*a* is urged and supported by an elastically deformable coil spring (supporting portion, elastic portion) 1713*a*4. The coil spring 1713*a*4 supports the slide member 1713*a* such that the engaged surface 1713*a*1 is at the first position inside in the radial direction, but, it can contract in the radial direction. In this case, by the control ring 175 rotating relative to the second drive transmission member 1713, the coil spring 1713*a*1 expands and contracts in the radial direction, so that the engaged surface 1713*a*1 can move in the radial direction. And, the relationship between the engaged surface 1713*a*1 and the engagement surface 174*e* of the first drive transmission member 174 is switchable between the drive transmission state in which they can be engaged with each other (part (a) in FIG. 19) and drive blocking state (part (b) of FIG. 19). That is, the engaged surface 1713*a*1 can move to the second position (part (b) in FIG. 19) retracted toward the outside in the radial direction.

Figure 20:
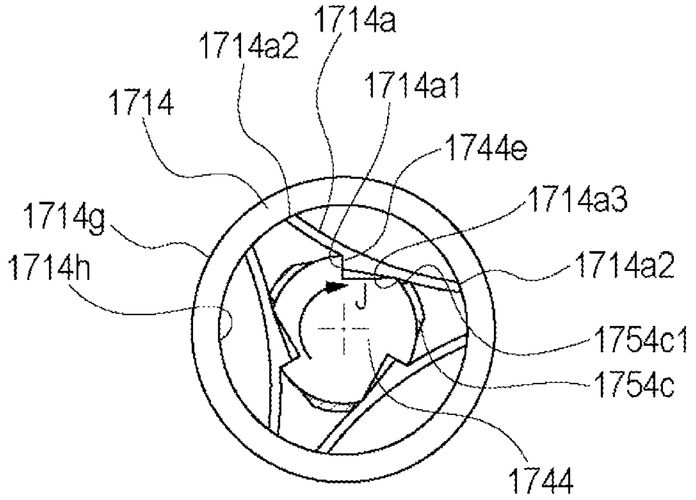
FIG. 20 is a cross-sectional view illustrating another structure of the transmission release mechanism according to Embodiment 2.
Figure 20:
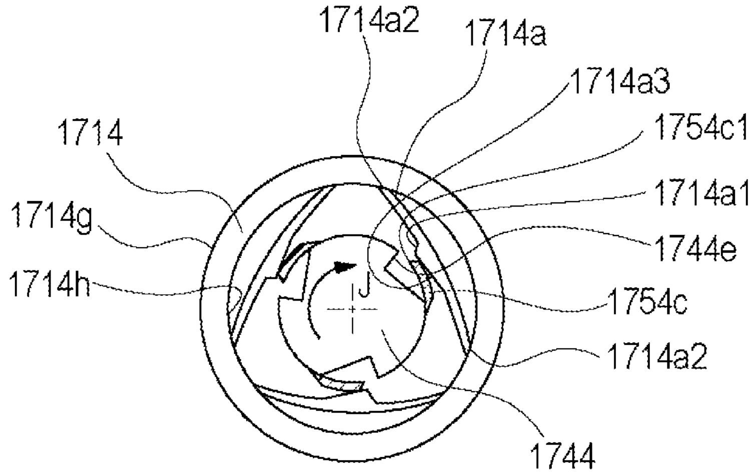

In addition, the drive relay portion 1714*a* as shown in FIG. 20 may have an arcuate shape which is convex inward, with both ends fixed as supporting portions (fixed portions) 1714*a*2. In this case, the relative rotation of the control ring causes the drive relay portion 1714*a* to deform so as to project outward in the radial direction, so that the engaged surface 1714*a*1 can move in the radial direction. And, the engagement surface 1744*e* between the engaged surface 1714*a*1 and the first transmission member 1744 changes between the drive transmission state in which they can be engaged with each other (part (a) in FIG. 20), and the drive blocking state in which the engagement is broken (part (b) of FIG. 20). As described above, any structure may be employed as long as the engaged surface 171*a*1 of the drive relay portion 171*a* moves in the radial direction by the relative rotation of the control ring 175.

In addition, the drive relay portion 171*a* may be an elastic metal to maintain elastic deformation, or may be the one in which an elastic metal is insert-molded in the arm portion 171*a*4. Resin material may be used as long as the proper elasticity can be provided and maintained.

In addition, the control member 76, which is a means for restricting the rotation of the control ring 175, has been described as being the same form as in Embodiment 1, as an example, but is not limited to this example. For example, the control member 76 may be constituted to be controllable by a solenoid, or may be constituted as a link mechanism as disclosed in JP-A-2001-337511. In addition, the control member 76 may be provided not in the developing cartridge 109 but in the image forming apparatus 1.

Embodiment 3

Embodiment 2 is a structure which is particularly effective when the portions constituting the drive blocking mechanism and related portions are small in deformation, play between the portions (slack, gap), and the like. On the other hand, when the above-mentioned deformations are large in each portion, there is a possibility that problems described hereinafter may arise.

First, referring to FIG. 21, the above-mentioned problems with large deformation and play will be described. Each of the two states will be described when the control ring 175 is largely deformed and when the second transmission member 171 has a large amount of play (slack) in the rotational direction.

First, referring to FIG. 21 the problem arising when the deformation occurs in the control ring 175 will be described. Part (a) of FIG. 21 shows the state of the force of the second transmission member 171 and the control ring 175 in the drive blocking state. In addition, part (b) of FIG. 21 shows a modification of the control ring 175. In the drive blocking state, the drive blocking surface 175*c* of the control ring 175 receives a load f5 due to the restoring force f3 from the elastic deformation of the drive relay portion 171*a* (part (f) of FIG. 16). At this time, if the rigidity of the control ring 175 is insufficient, the control ring 175 is deformed in the rotational direction J by the tangential force f5*t* of the load f5. referring to part (b) of FIG. 21, this will be described. In part (b) of FIG. 21, the shape of the control ring 175 before deformation is indicated by a solid line, the deformed shape is indicated by a two-dot chain line. The control ring 175 in the drive blocking state is restricted at the locked surface 175*b*, and therefore, the rotation in the rotational direction J is restricted. At this time, a tangential force f5*t* is generated on the drive blocking surface 175*c*, and therefore, the control ring 175 is twisted in the rotational direction J with the locked surface 175*b* as a fulcrum. Due to this torsional deformation, the drive blocking surface 175*c* of the control ring 175 rotates relative to the drive relay portion 171*a* in the rotational direction J. By this, the drive relay portion 171*a* moves inward in the radial direction by the amount of deformation of the control ring 175. As a result, a portion of the engaged surface 171*a*1 moves on the rotation locus of the engaging surface 174*e* and engages. That is, the drive transmission operation as described in Embodiment 2 occurs. However, the control ring 175 is restricted from rotating and stopped, and therefore, the drive blocking operation starts and the drive blocking state is reestablished. Thereafter, however, for the same reason, the drive transmission operation and the drive blocking operation are repeated. In such a situation, the transmission of rotational force may be unstable.

Next, referring to part (a) of FIG. 21 the description will be made as to the problems arising when the play in the rotational direction J is large in the second transmission member 171 having the drive relay portion 171*a* and the engaged surface 171*a*1. An example of occurrence of play is backlash relative to the developing roller gear 69 (part (a) of FIG. 13) which meshes with the second transmission member 171.

As explained in Embodiment 2, in the drive blocking operation, a reaction force (urging force) f4 is generated in the drive relay portion 171*a* (part (f) in FIG. 16). By the tangential component force f4*t* of the reaction force f4, the reverse rotational force T4 which tends to rotate the drive relay portion 171*a* in the direction opposite to the rotational direction J is produced. At this time, when the second transmission member 171 has a large play, the drive relay portion 171*a* rotates in the direction opposite to the rotational direction J by reverse rotational force T4 (hereinafter referred to as reverse rotation). And, by the reverse rotation of the second transmission member 171, the control ring 175 rotates in the rotational direction J relative to the drive relay portion 171*a*. What occurs thereafter is the same as that when the control ring 175 is deformed, and the description thereof will be omitted.

Figure 21:
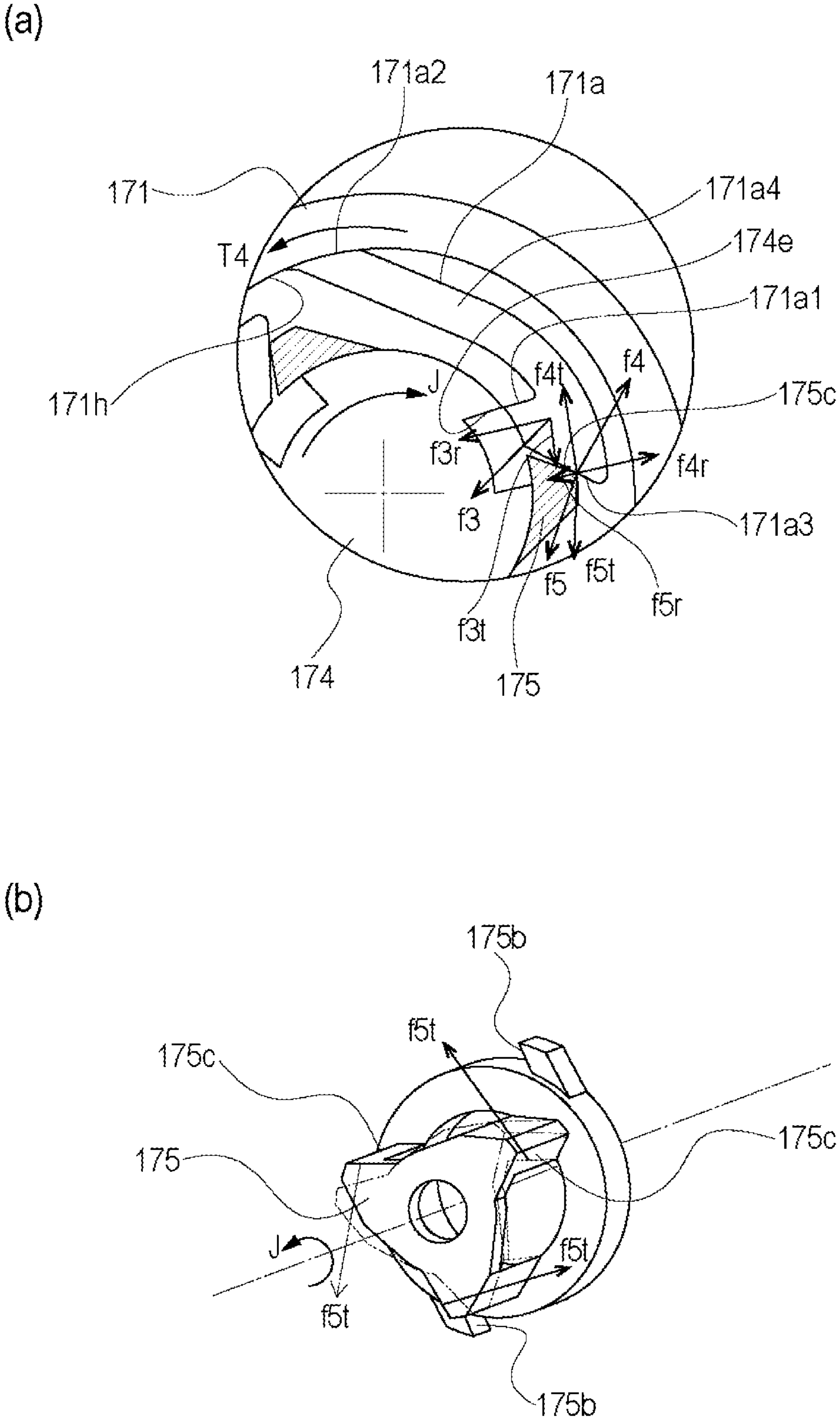
FIG. 21 is a cross-sectional view of a transmission release mechanism and a perspective view of a control ring according to Embodiments 2 and 3.

Here, even if play (backlash) between the second transmission member 171 and the developing roller gear 69 (part (a) (not shown) in FIG. 21) is small, the reverse rotation may occur in the second transmission member 171. If the rotational load (torque) of the gear train on the downstream side of the drive transmission path connected to the second transmission member 171 is small, the second transmission member 171 rotates in the reverse direction together with the downstream gear train by the reverse rotational force T4. By this, the control ring 175 rotates relative to the drive relay portion 171*a* in the rotational direction J, and a similar phenomenon-occurs.

Embodiment 3 provides a means for solving such a problem, and is a structure in which Embodiment 2 is developed further. In the following, the description will be made in detail, but the description of the same portions as in Embodiment 2 is omitted.

[Development Unit Driving Structure]

Since the structure of the drive connection mechanism is the same as that of Embodiment 2, its description is omitted.

In this embodiment, a part of the transmission release mechanism 270 and the control member 176 are different from those in Embodiment 1 and Embodiment 2. In addition, the transmission release mechanism 270 in this embodiment includes a first transmission member 274, a control ring 275, and a second transmission member 271.

Figure 22:
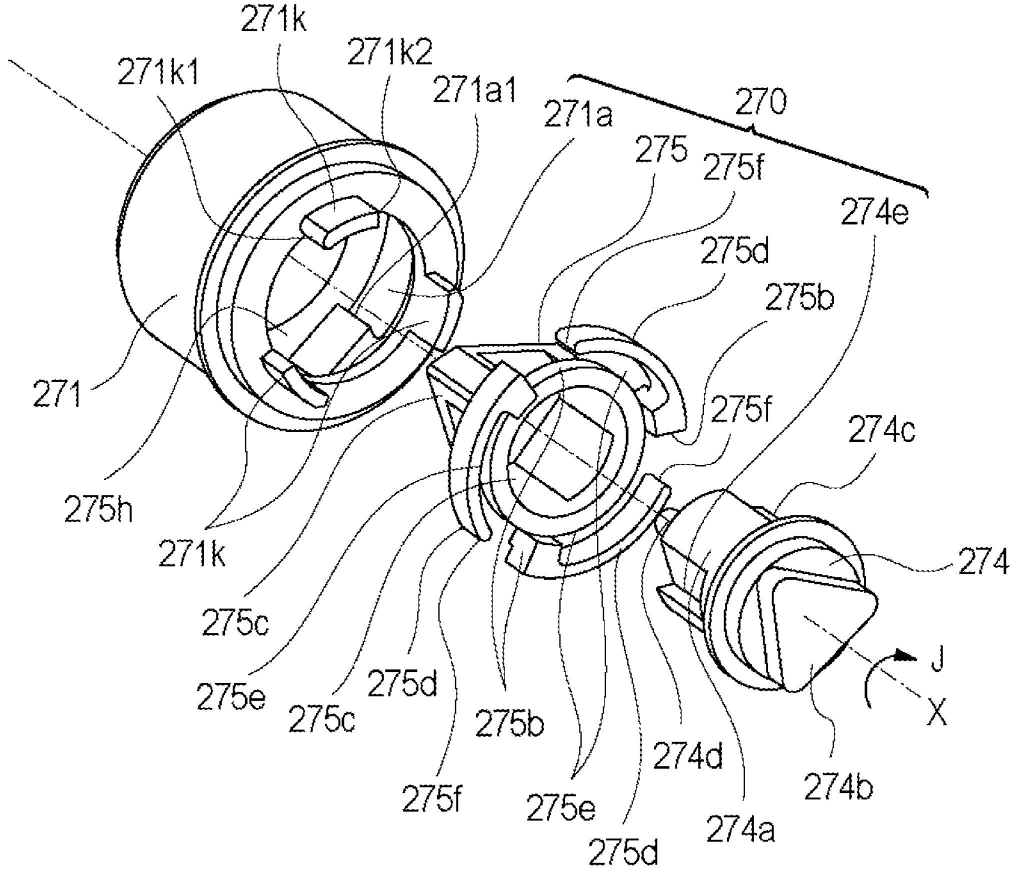
FIG. 22 is an exploded perspective view of the transmission release mechanism according to Embodiment 3.

Next, refer to FIG. 22 and FIGS. 22 and 23, the description will be made regarding the operation of blocking the transmission of the rotation of the first transmission member 274 to the second transmission member 271 and the operation of restricting the relative rotation of the control ring 275 with respect to the second transmission member 271 in the rotational direction J. FIG. 22 is an exploded perspective view of the transmission release mechanism according to this embodiment, as viewed from the drive side.

Figure 23:
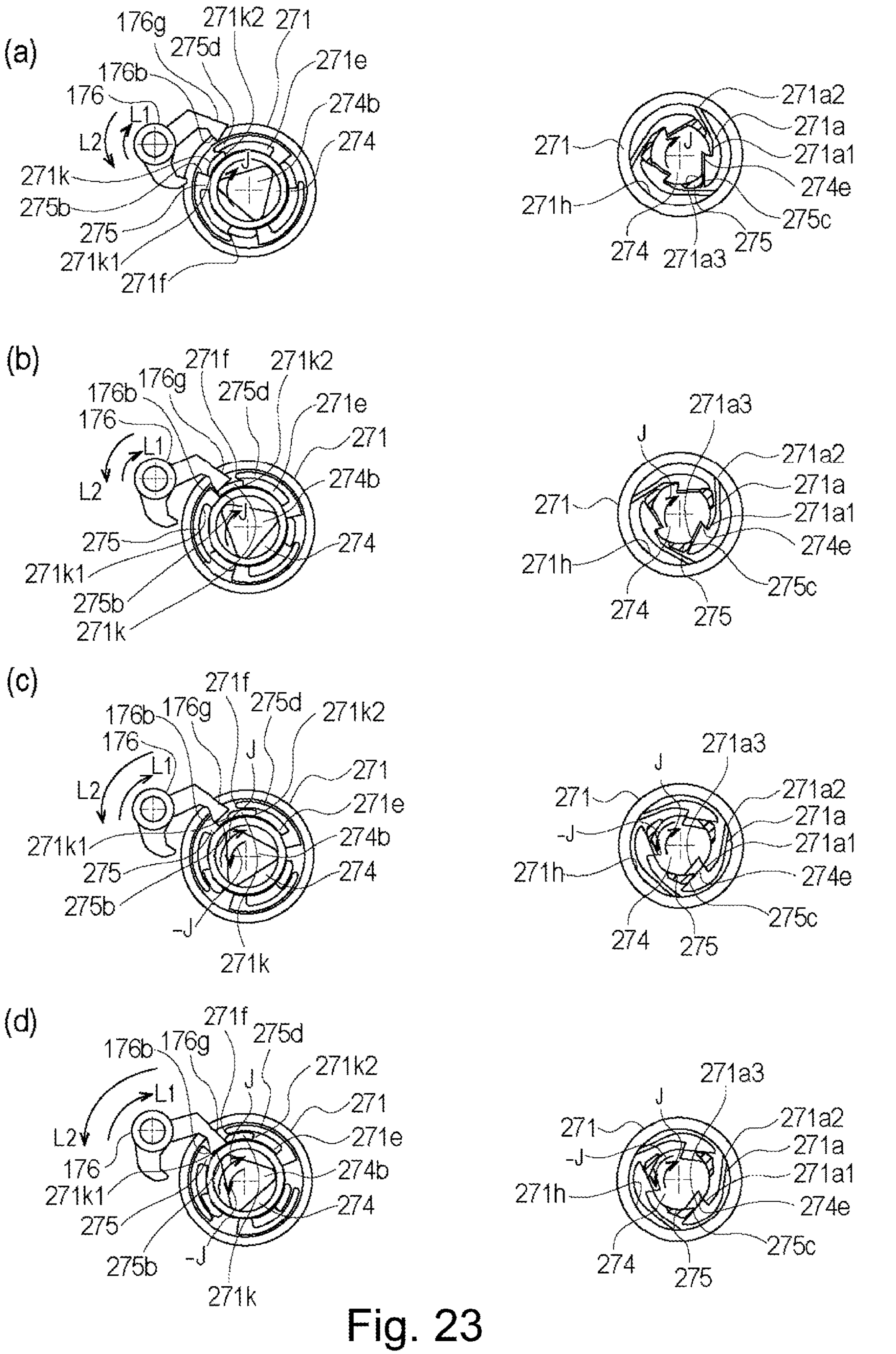
FIG. 23 is a sectional view of the transmission release mechanism and a side view as seen from the outside in the longitudinal direction according to Embodiment 3.

Parts (a) to (d) of FIG. 23 show the first transmission member 274, the second transmission member 271, the control ring 275, and the control member 176. Parts (a) to (d) in FIG. 23 are views of the drive side of the cartridge and sectional views taken along a plane passing through the position of the drive relay portion 271*a* of the second transmission member 271 and perpendicular to the rotational axis X. This is a cross-section as seen from the drive side.

As shown in FIGS. 22 and 23, the transmission release mechanism 270 includes the first transmission member 274, the second transmission member 271, and the control ring 275.

The first transmission member 274 includes a drive input portion 274*b*, a control ring supporting portion 274*c*, an outer diameter portion 274*d*, and an engagement surface 274*e*.

As shown in FIG. 22 and FIG. 23, the second transmission member 271 includes a first transmission portion supporting portion (mounted illustration), an inner diameter portion 271*h*, a drive relay portion 271*a*, and a regulation rib 271*k*. The drive relay portion 271*a* includes an engaged surface 271*a*1, a supporting portion 271*a*2, a driven blocking portion 271*a*3, and an arm portion 271*a*4. Here, since the structure of the drive relay portion 271*a* is the same as that of Embodiment 2, the description thereof is omitted. The regulating rib 271*k* has a locked surface 271*k*1 on the upstream side in the rotational direction J and has a facing surface 271*k*2 facing the restricted portion 271*k*1.

As shown in Figure the control ring 275 includes an inner diameter portion 275*a*, a locked surface 275*b*, a drive blocking portion 275*c*, and a guide portion (cover portion, cover portion, protection portion) 275*d*. The guide portion 275*d* is a rib extending toward the upstream side in the rotational direction J on substantially the same radius of the locked surface 275*b*, and is provided with a locking surface 275*b* on the downstream side in the rotational direction J. In addition, the guide portion 275*b* is provided with a certain space 275*e* on the radially inner side. In addition, a free end portion 275*f* which is a free end of the guide portion 275*b* can be elastically deformed in the radial direction.

In addition, for the control member 176 which controls the rotation of the control ring 275, a restricting portion 176*g* is provided at a portion facing the locking portion 176*b*, as shown in FIG. 23. The structure of the other control member 176 is the same as in Embodiments 1 and 2, and therefore, the description is omitted for these element.

The support structure of the first transmission member 274, the second transmission member 271 and the control ring 275 is the same as in Embodiment 2, and therefore, the description is omitted. The restriction rib 271*k* of the second transmission member 271, the locked surface 275*b* and the guide portion 275*d* of the control ring 275, and the locking portion 176*b* and the restriction portion 176*g* of the control member 176 are arranged on substantially the same cross-section. as shown in part (a) of FIG. 23, the regulating rib 271*k* is disposed in the inner side in the radial direction of the guide portion 275*d*. In addition, the restricted portion 271*k*1 is disposed adjacent to the locked surface 275*b* on the downstream side in the rotational direction J. And, the facing surface 271*k*2 is covered with a guide portion 275*d* on the radially outer side. Here, the arrangement of the engagement surface 274*e* of the first transmission member 274, the drive blocking surface 275*c* of the control ring 275, and the drive relay portion 271*a* of the second transmission member 271 is the same as in Embodiment 2, and therefore, the description is omitted.

Next, refer to FIG. 23 switching between rotation transmission and blocking from the first transmission member 274 to the second transmission member 271, in this embodiment will be described in detail. In this embodiment, the drive transmission state, drive blocking operation, drive blocking state, relative rotation restricting operation, relative rotation restriction state, and drive transmission operation are performed. The relative rotation restricting operation is an operation for the control ring 275 to restrict relative rotation in the rotational direction J with respect to the drive relay portion 271*a* by the play or the deformation during the drive blocking state. In addition, the relative rotation restriction state is a state in which the control ring 275 is restricted from relative rotation in the rotational direction J with respect to the drive relay portion 271*a* during the drive blocking state. Here, other operations and states are the same as those in Embodiment 2. In addition, part (a) of FIG. 23 shows a drive transmission state. Part (b) of FIG. 23 shows the state at the moment when the drive blocking operation starts. Part (c) of FIG. 23 shows the state at the moment when the drive blocking operation is completed and the drive blocking state is reached, and the relative rotation restricting operation starts. Part (d) of FIG. 23 shows the relative rotation restriction state when the relative rotation restricting operation is completed.

The drive transmission state and drive blocking operation are the same as in Embodiment 2, and therefore, the description thereof is omitted.

Next, referring to part (c) of FIG. 23, the description will be made as to the relative rotation restricting operation. After the drive is blocked, the relative rotation restricting operation is performed by two operations, namely a reverse rotating operation of the control ring 275 and a reverse rotation restricting operation of the second transmission member 271. The reverse rotating operation of the control ring 275 is an operation of rotating the control ring 275 in the direction opposite to the rotational direction J and moving the drive relay portion 271*a* further outward in the radial direction. The reverse rotation restricting operation of the second transmission member 271 is an operation for preventing the reverse rotation which occurs due to the play of the second transmission member 271 described above. In the following, this will be described in detail.

Figure 24:
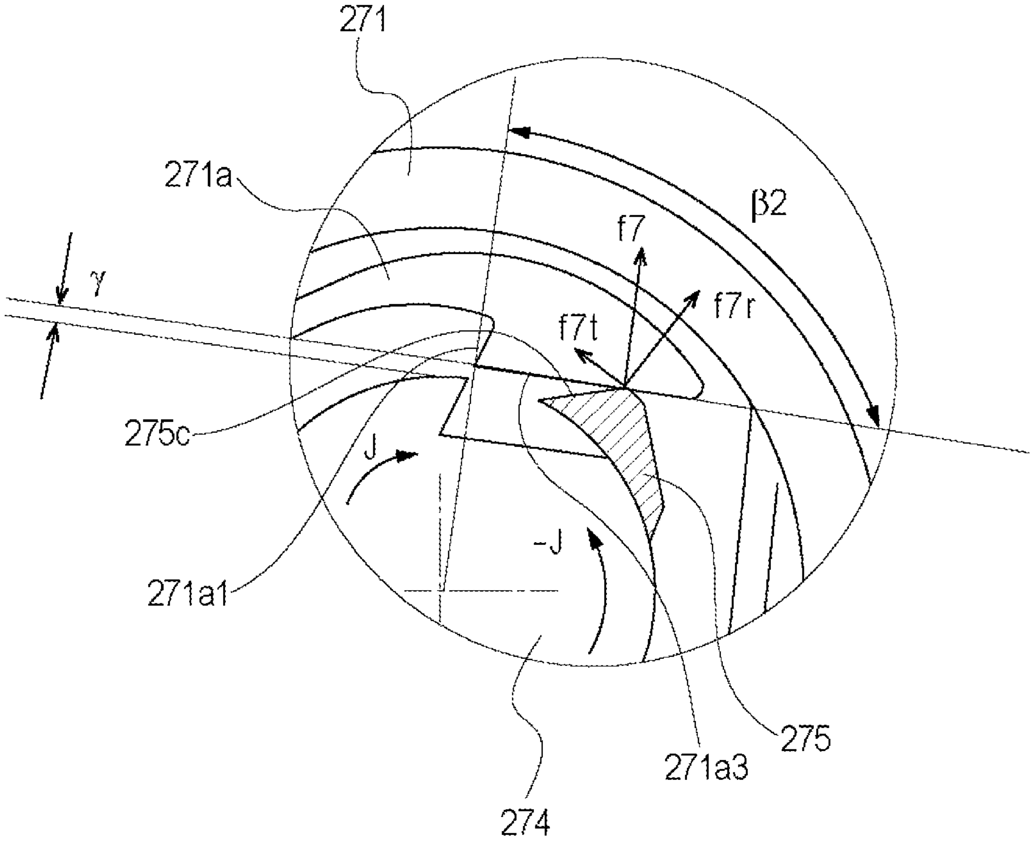
FIG. 24 is a schematic illustration showing the state of a control ring reverse rotating operation of the transmission release mechanism according to Embodiment 3.

First, the reverse rotating operation of the control ring 275 will be described. The control member 176 is further rotated in the L1 direction from the drive blocking state shown in part (c) of FIG. 23. By this, the locking portion 176*b* of the control member 176 applies a force to the locked surface (locked portion) 275*b* of the control ring 275. This force causes the control ring 275 to rotate relative to the second transmission member 271 in the reverse rotational direction –J (reverse rotation). referring to FIG. 24, the description will be made as to the state of the force of the drive relay portion 271*a* at this time. FIG. 24 is a cross-sectional view as seen from the drive side, taken along a plane passing through the position of the drive relay portion 271*a* of the second transmission member 271 and perpendicular to the rotational axis X in the longitudinal direction. In addition, FIG. 24 shows the state of the force when the control ring 275 is relatively rotated in the reverse rotational direction –J relative to the second transmission member 271 as described above. As described above, when the control ring 275 is rotated relative to the second transmission member 271 in the reverse rotational direction –J, the drive blocking surface 275*c* applies a force to the driven blocking surface 271*a*3. That is, the driven blocking surface (urging force receiving portion) 271*a*3 receives a reaction force (urging force) f7 from the driving blocking surface 257*c*. Here, the driven blocking surface 271*a*3 has a slope shape having an angle 132 as in Embodiment 2. Therefore, the reaction force f7 includes a component force f7*r* outward in the radial direction. The component force f7*r* causes the drive relay portion 271*a* to slip downstream in the rotational direction J along the driven blocking surface 271*a*3. By this, the drive relay portion 271*a* is further deformed and moved outward in the radial direction. As a result, a gap y is formed between the drive relay portion 271*a* and the first transmission member 274. By this, as described at the beginning of Embodiment 3, even when the drive relay portion 271*a* moves inward in the radial direction due to deformation or the like, the influence thereof can be eliminated or reduced.

Next, the reverse rotation restricting operation for suppressing the reverse rotating operation of the second transmission member 271 will be described. As shown in part (d) of FIG. 23, when the rotation of the control member 176 proceeds, the restricting portion (reverse rotation restricting portion) 176*g* of the control member 176, to the position for contacting the restricted portion 271*k*1 of the second transmission member 271. By this, the second transmission member 271 is restricted (blocked or suppressed) from rotating in the reverse rotational direction –J. By this, even if the second transmission member 271 is constituted to rotate in the reverse rotational direction –J due to play or the like, as described at the beginning of Embodiment 3, the reverse rotation of the second transmission member 271 is not produced. That is, the inward movement of the drive relay portion 271*a* no longer occurs.

As described above, the control member 176 performs the reverse rotating operation of the control ring 275 and the reverse rotation restriction (reverse rotation prevention, reverse rotation suppression) operation of the second transmission member 271. By this, the relative rotation between the control ring 275 and the second transmission member 271 is restricted (blocked or suppressed), and it is possible to suppress an unstable state in which the drive transmission state and the drive blocking state are repeated.

Since the transmission operation from the state in which the rotation from the first transmission member 274 to the second transmission member 271 is blocked is the same as that of Embodiment 2, the description thereof is omitted.

Here, unlike Embodiment 2, the control ring 275 of this embodiment includes a guide portion 275*d*, and the description will be made in this respect. The guide portion 275*d* covers a portion of the regulation rib 271*k* so that the locking portion 176*b* of the control member does not stop the rotation of the regulation rib 271*k* of the second transmission member 271.

Figure 25:
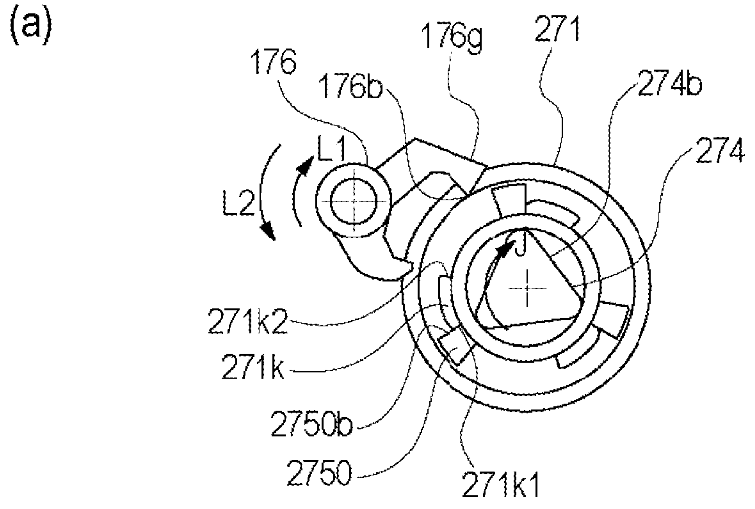
FIG. 25 is a schematic illustration showing the positional relationship between the control ring and the second drive transmission member of the control member according to Embodiment 3.
Figure 25:
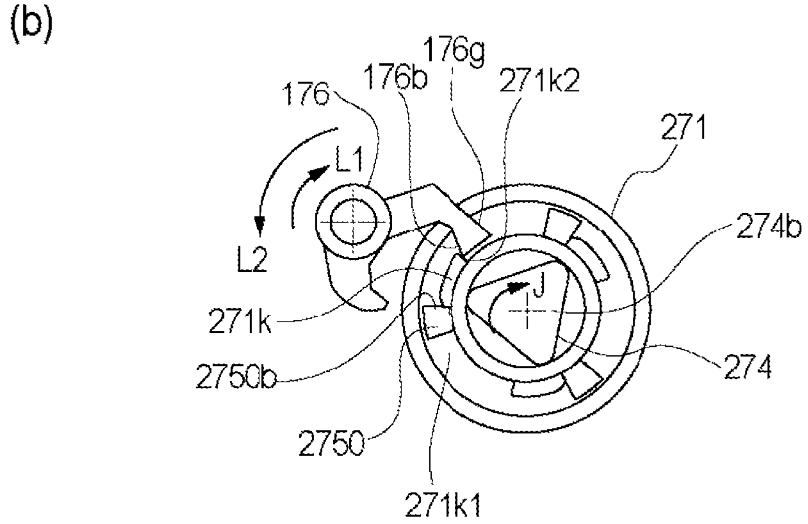
Figure 25:
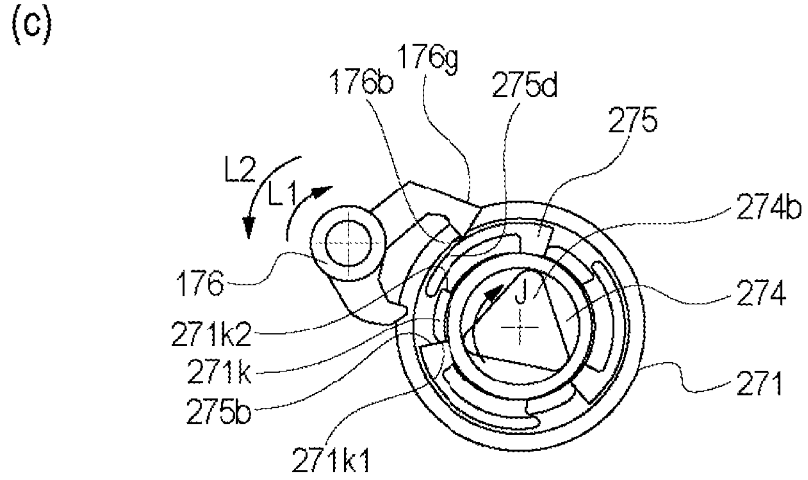

First, for explanation, FIG. 25 shows a control ring 2750 which does not have the guide portion 275*d* as a comparative example of the control ring 275 which has the guide portion

275*d*. FIG. 25 is a view of the first transmission member 274, the second transmission member 271, the control ring 2750, and the control member 176 as viewed from the drive side. Part (a) of FIG. 25 shows the drive transmission state. In addition, part (b) of FIG. 25 shows a state in which the restricting portion 176*g* of the control member 176 is engaged with the opposing surface 271*k*2 of the restricting rib 271*k*. In order to start the drive blocking operation from the drive transmission state as shown in part (a) of FIG. 25, as described above, the control member 176 is rotated in the L1 direction, and the rotation of the control ring 2750 is locked, and then the portion 176*b* is brought into contact to the locked surface 2750*b* and stopped. However, as shown in part (b) of FIG. 25, depending on the timing of starting the rotation of the control member 176 in the L1 direction, the locking portion 176*b* may engage with the facing surface 271*k*2. At this time, the second transmission member 271 and the control ring 2750 do not stop rotating and continue to rotate in the rotational direction J, and therefore, they interfere with the stopped control member 176. The above is the description of the problem arising when the guide portion is not provided.

Next, referring to part (c) of FIG. 25 the description will be made as to when the guide ring 275*d* is provided in the control ring 275. Part (c) of FIG. 25 shows a state in which the locking portion 176*b* of the control member 176 is in contact with the guide portion 275*d* of the control ring 275. It is assumed that the control member 176 rotates in the L1 direction at the timing when the locking portion 176*b* engages the opposing surface 271*k*2 from the drive transmission state (part (a) in FIG. 23) (same timing as part (b) in FIG. 25). Suppose that. In this case, the opposing surface 271*k*2 overlaps the guide portion 275*d* in the rotational direction, and therefore, as shown in part (c) of FIG. 25 the locking portion 176*b* comes into contact with the guide portion 275*d*. By this, the control member 176 is restricted from rotating in the L1 direction, and therefore, the engagement between the locking portion 176*b* and the facing surface 271*k*2 can be prevented. And, the control ring 275 continues to rotate in direction of rotation J, and therefore, as shown in part (b) of FIG. 23, the locking portion 176*b* comes into contact with the locked surface 275*b* sooner or later. That is, even if the control member 176 starts to rotate in the L1 direction at any timing, the locking portion 176*b* can be reliably brought into contact with the locked surface 275*d*. By this, rotation of control ring 275 is restricted and stops, and therefore, the drive blocking operation starts.

That is, the guide portion 275*d* covers a part of the second transmission member 271, and therefore, the control member 176 does not stop the rotation of the second transmission member 271. The guide portion 275*d* can also be regarded as a protecting portion that protects the second transmission member 271 from the control member 176.

Here, as described in Embodiment 1, the control member 176 is rotated in the L1 direction by moving the developing unit to the separation position (the control member 76 shown in FIG. 7). Even in the state in which the locking portion 176*b* is in contact with the guide portion 275*d*, the separating operation of the developing cartridge proceeds, and the control member 176 tends to further rotate in the L1 direction. Therefore, the frictional force between the locking portion 176*b* and the guide portion 275*d* increases. As described above, the free end portion 275*f* of the guide portion 275*d* is bent in the radial direction, and therefore, the frictional force increase can be reduced. For example, the guide portion 275*d* may be made of a resin material that can be elastically deformed.

As described above, by providing the guide portion 275*d* in the control ring 275, the locking portion 176*b* can be assuredly brought into contact with the locked surface 275*b*, and the rotation of the control ring 275 can be restricted and stopped.

As described above, this embodiment is for solving the problems which may are I is in Embodiment 2, and is a further development of Embodiment 2. The form of Embodiment 2 or the form of Embodiment 3 may be selected according to the structure of the process cartridge to be used.

Embodiment 4

Next, another embodiment will be described as Embodiment 4. In Embodiment 1, an example in which a spring clutch is used as the transmission release mechanism 75 has been described. In Embodiment 4, the structure of a drive connecting portion using a transmission release mechanism 475 of another form will be described. Here, the description of the same portions as in Embodiment 1 or Embodiments 2 and 3 is omitted.

[Structure of Drive Connecting Portion]

Figure 26:
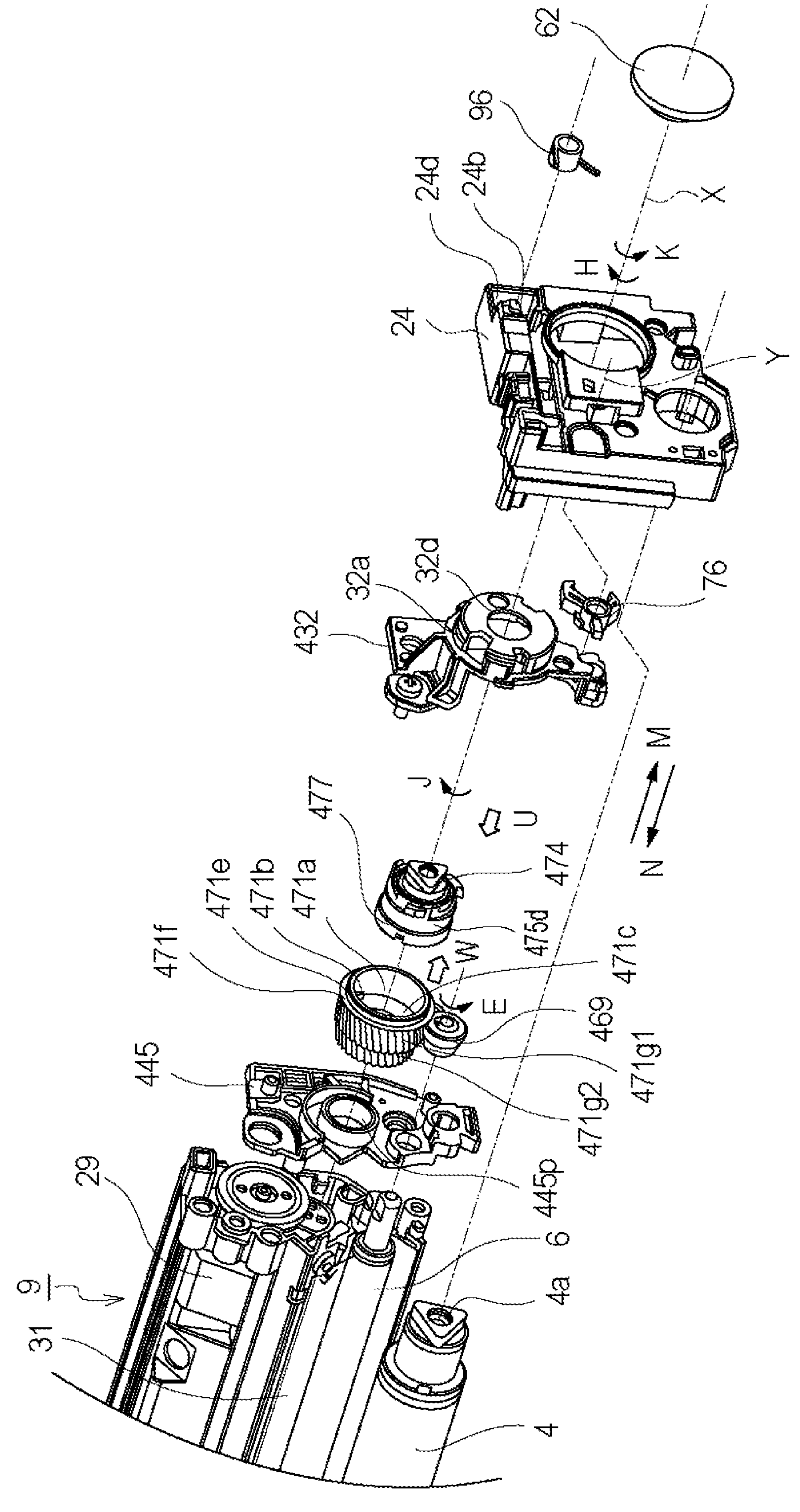
FIG. 26 is a perspective view of the process cartridge and the transmission release mechanism according to Embodiment 4.
Figure 27:
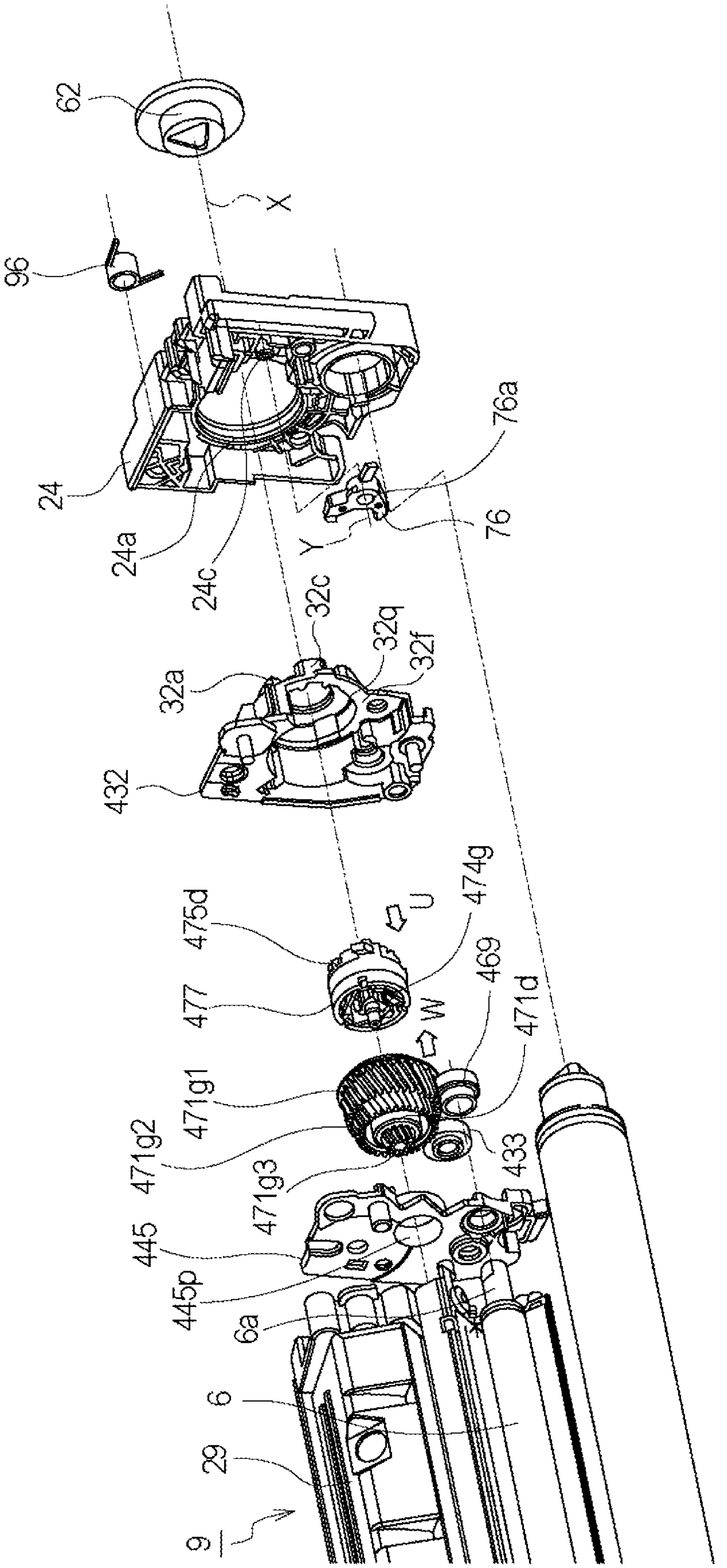
FIG. 27 is a perspective view of a process cartridge and a transmission release mechanism according to Embodiment 4.
Figure 28:
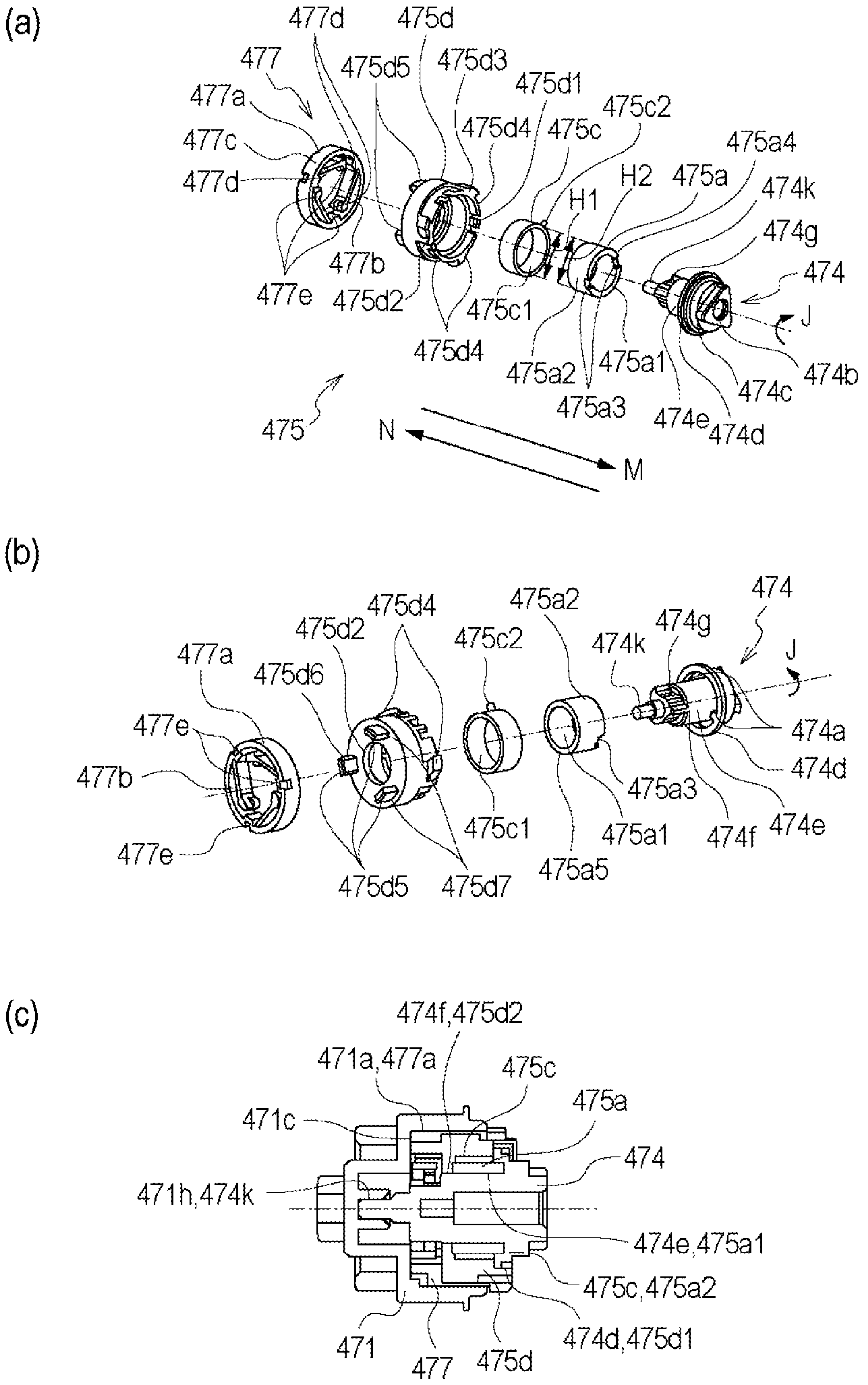
In FIG. 28, part (a) and part (b) are exploded perspective views of the transmission release mechanism according to Embodiment 4, and part (c) is a sectional view of the transmission release mechanism according to Embodiment 4.

Referring to FIG. 26, FIG. 27 and FIG. 28, a general structure of the drive connecting portion in Embodiment 4 will be described.

Between the bearing member 445 and the development cover member 32, there are provided a transmission downstream transmission member (transmission gear) 471, a second transmission member 477, a control ring 475*d* as a rotation member, an input inner ring 475*a*, a load spring 475*c*, a first transmission member (first drive transmission member, coupling member) 474. These members are provided coaxially with the rotational axis X (on the same straight line). That is, the axes of rotation of these members are substantially the same.

The transmission release mechanism 475 in this embodiment includes a second transmission member 477, a control ring 475*d*, an input inner ring 475*a*, a load spring (elastic member) 475*c*, and a first transmission member 474. The structure of the developing unit 409, except for the downstream transmission member 471 and the transmission release mechanism 475, is the same as in Embodiment 1, and therefore, the description thereof is omitted.

Figure 29:
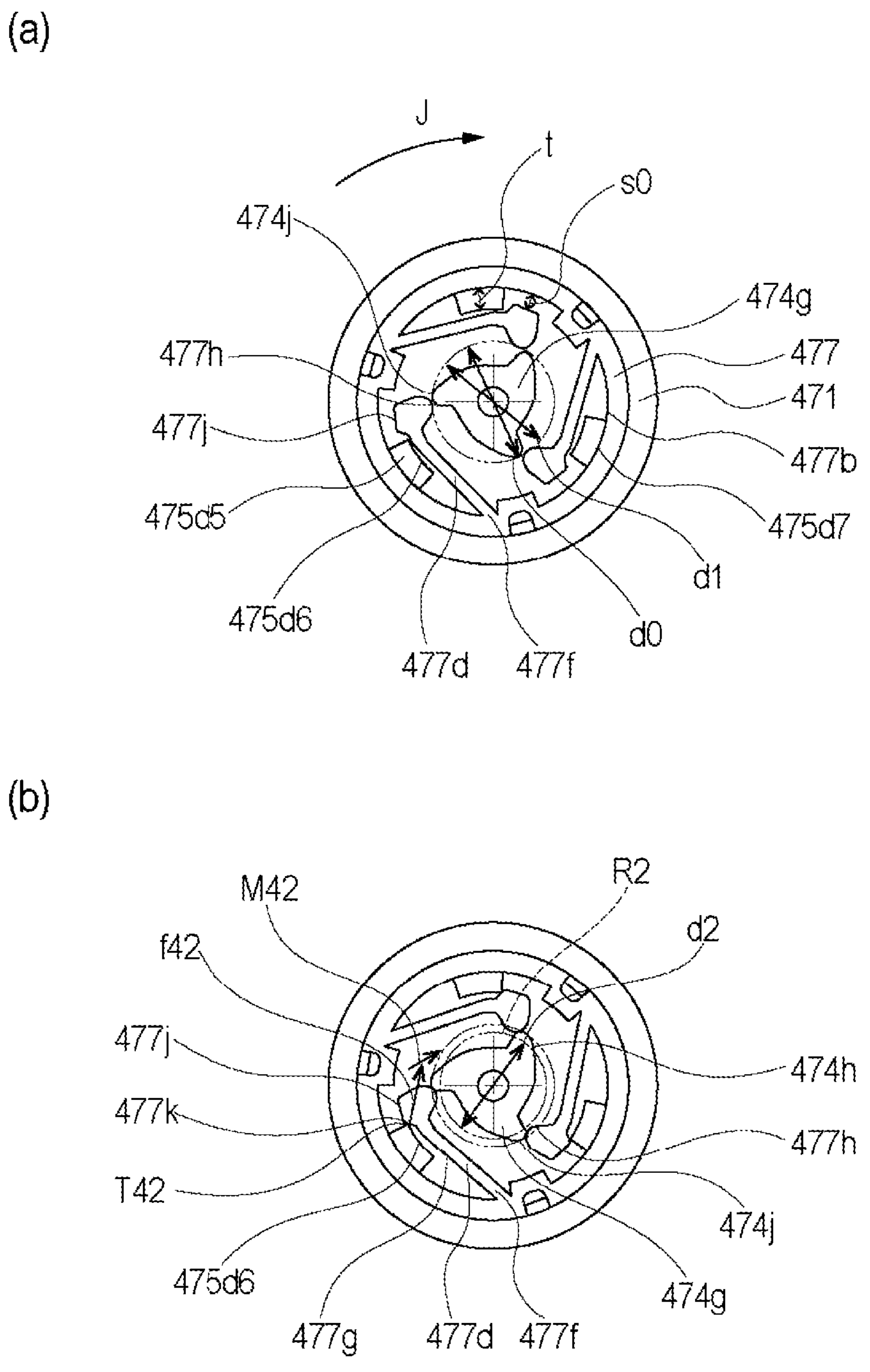
FIG. 29 is a cross-sectional view of the transmission release mechanism according to Embodiment 4.
Figure 30:
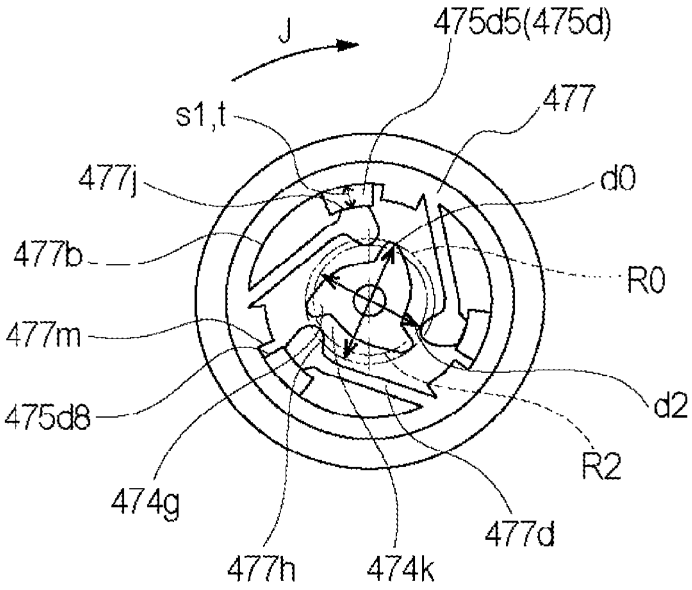
FIG. 30 is a cross-sectional view of the transmission release mechanism according to Embodiment 4.
Figure 30:
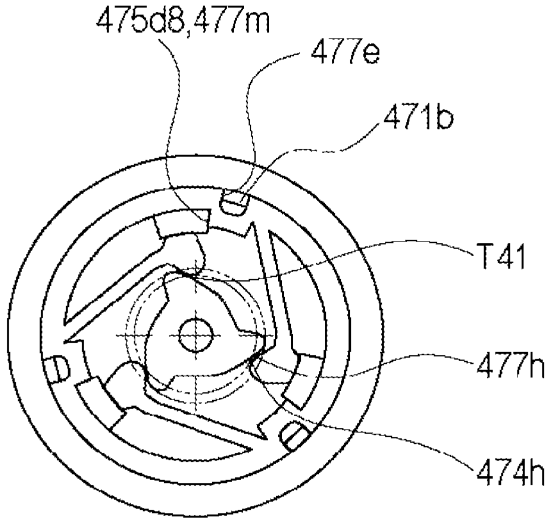

Refer to FIG. 28, FIG. 29 and FIG. 30, each member will be described in detail in the following. This will be described in detail referring to parts (a) to (c) of FIG. 28. Part (a) in FIG. 28, part (b) in FIG. 28, and part (a) in FIG. 28 are exploded perspective views of the transmission release mechanism 475 as viewed from the drive side, and part (b) of FIG. 28 is an exploded perspective view as seen from the non-driving side. In addition, part (c) of FIG. 28 is a cross-sectional view taken along a plane passing through the rotational axis X of the transmission release mechanism 475. In addition, FIG. 29 and FIG. 30 are cross-sections of the drive connecting portion, in which the downstream transmission member 471, the second transmission member 477, the control ring 475*d*, and the first transmission member 474 are shown. Part (a) in FIG. 29 shows the drive blocking state, and part (b) in FIG. 30 shows the drive transmission state. In addition, part (b) of FIG. 29 shows a state in the drive transmission operation and the drive blocking operation, and part (a) of FIG. 30 shows another state in the drive transmission operation and the drive blocking operation. Here, some of the shapes of the parts described below are substantially the same, and are arranged at a plurality of locations at equal intervals radially around the rotational axis X, but in the Figure, only one symbol is shown as a representative.

The first transmission member 474 is a development coupling member, and at one end in the axial direction, a drive input portion (coupling portion) 474*b* is provided to which a drive force is inputted from the outside of the cartridge (image forming apparatus main assembly). On the other end side in the axial direction of the first transmission member 474, a supported end portion 474*k* including a cylindrical shape is provided. The first transmission member 474 is also an input member (clutch side input portion, input side transmission member) for receiving a driving force inputted to the transmission release mechanism (clutch) 475.

In addition, the first transmission member 474 includes a rotation engagement portion 474*a*, one end side supported portion 474*c*, one end side control ring supporting portion (hereinafter referred to as supporting portion) 474*d*, an inner ring supporting portion 474*e*, and another end side control ring supporting portion (hereinafter referred to as supporting portion).) 474*f* and a drive transmission engaging portion 474*g*. Here, the inner ring supporting portion 474*e* and the supporting portion 474*f* are located on the same coaxial axis and have the same diameter.

The drive transmission engaging portion 474*g* is provided with a drive transmission surface 474*h*, an outer peripheral portion 474*j*, and a retracting portion 474*k*. The drive transmission engagement portion 474*g* engages with the second transmission member 477 and has the function of transmitting driving force, and therefore, details of the drive transmission engaging portion 474*g* will be described together with the second transmission member 477.

Next, the input inner ring 475*a* has an inner ring inner diameter portion 475*a*1, an inner ring outer diameter portion 475*a*2, a rotation engaged portion 475*a*3, an input side end surface 475*a*4, and an output side end surface 475*a*5.

The load spring 475*c* is spirally wound in the direction of the arrow J, as viewed from the first transmission member 474 side and in N orientation in the axial direction, so as to form the inner periphery 475*c*1, and a wire engaging end 475*c*2 is provided on one end side of the wire. The load spring 475*c* in this embodiment is wound in the opposite direction to that of the transmission spring 75*c* in Embodiment 1.

The control ring 475*d* is provided with one end side supporting portion 475*d*1 and the other end side supporting portion 475*d*2 on the inner diameter side, and the load spring end locking portion 475*d*3 and a plurality of locked portions 475*d*4 projecting radially on the outer diameter portion. In addition, the control ring 475*d* includes a drive connection control portion (hereinafter, control part) 475*d*5 having a partial annular rib shape at the end, and it includes a drive connection surface 475*d*6 which is a surface on the inner diameter side and a second transmission member support surface 475*d*7 which is a surface on the outer diameter side. (specifically, the thickness t is set to 1.5 mm in this embodiment). The control portion 475*d*5 is arranged at a plurality of locations at equal intervals in the circumferential direction around the rotational axis X. In this embodiment, there are three locations (120° intervals, approximately equal intervals).

The relationship between the portions constituting the transmission release mechanism 475 will be described in detail. First, the relationship between the first transmission member 474 and the input inner ring 475*a* will be described. as shown in part (c) of FIG. 28, the input inner ring 475*a* is supported on the inner ring inner diameter portion 475*a*1 so as to be coaxially rotatable about the rotational axis X by the inner ring supporting portion 474*e* of the first transmission member 474. In addition, the rotation engagement portion 474*a* and the rotation engaged portion 475*a*3 shown in part (b) of FIG. 28 are engaged with each other, by which the rotation of the first transmission member 474 can be transmitted to the input inner ring 475*a*, and the first transmission member 474 and the input inner ring 475*a* rotate integrally. Therefore, the input inner ring 475*a* can also be regarded as a portion of the first transmission member 474.

Next, the load spring 475*c* will be described. As shown in part (a) of Figure the inner diameter H1 of the inner peripheral portion 475*c*1 of the load spring 475*c* in the natural state is selected to be smaller than the outer diameter H2 of the inner ring outer diameter portion 475*a*2 of the input inner ring 475*a*, and is arranged coaxially with the rotational axis X in the press-fitted state. The load spring 475*c* in this embodiment is wound in the opposite direction to that of the transmission spring 75*c* in Embodiment 1. Therefore, when the input inner ring 475*a* rotates in the direction of arrow J, the wire of the load spring 475 acts in the loosing direction. In other words, the load spring 475*c* and the input inner ring 475*a* function as a so-called torque limiter. That is, up to a predetermined torque, the input inner ring 475*a* rotates integrally with the load spring 475*c*, and if a torque exceeding the specified level is produced, the input inner ring 475*a* can rotate relative to the load spring 475.

Subsequently, the control ring 475*d* will be described. As shown in part (a) of FIG. 28 to part (c) of FIG. 28, the control ring 475*d* is coaxial with the first transmission member 474 and the load spring 475*c* on the rotational axis X, and is disposed radially outward from the load spring 475*c*. More specifically, one end control ring supported portion (hereinafter referred to as supported portion) 475*d*1 and the other end control ring supported portion (hereinafter referred to as supported portion) 475*d*2 is rotatably supported by the supporting portion 474*d* and the supporting portion 474*f* of the first transmission member 474. In addition, the load spring end locking portion 475*d*3 of the control ring 475*d* is engaged with the wire engaging end 475*c*2 of the load spring 475*c*.

That is, the first transmission member 474 is connected to the control ring 475*d* by the input inner ring 475*a* and the load spring 475. In this embodiment, as an example of the embodiment, the first transmission member 474, the input inner ring 475*a*, the load spring 475*c*, and the control ring 475*d* are unitized into a unit, for easy assembly.

Next, referring to part (a) of FIG. 29, the second transmission member 477 will be described. The second transmission member 477 is a transmission member to which the driving force is transmitted from the first transmission member 474. In addition, the second transmission member 477 is an output member (output-side transmission member, clutch-side output portion) for outputting the driving force from the drive transmission release mechanism (clutch) 475 to the outside.

The second transmission member 477 includes a cylindrical portion 477*c* having an outer diameter portion 477*a* and an inner diameter portion 477*b*, a drive relay portion 477*d*, and a drive transmission engagement portion 477*e*. The drive relay portion 477*d* includes a supporting portion 477*f*, an arm portion 477*g*, an engaged surface 477*h* as a driving force receiving surface, a driven connection surface 477*j*, and an introduction surface 477*k*.

Here, the supporting portion 477*f* is a connecting portion which is connected to the inner diameter portion 477*b*, as one end side of the drive relay portion 477*d*. That is, the drive relay portion 477*d* includes an arm portion 477*g* extending from the fixed end (supporting portion 477*f*) to the downstream side in the rotational direction J, and the engaged surface 477*h* is disposed on the radially inner side on the free end side, and a driven coupling surface 477*j* is disposed on the radially outer side on the free end side. In addition, the introduction surface 477*k* is a slope connecting the driven connection surface 477*j* of the drive relay portion 477*d* and the arm portion 477*g*, on the radially outer side. As described above, the drive relay portion 477*d* is a cantilever beam having the supporting portion 477*f* as a fulcrum.

The drive relay portion 477*d* is substantially the same shape and is disposed at a plurality of locations. In this embodiment, and as an example, the drive relay portion 477*d* is disposed at three locations (120° intervals, approximately equal intervals) at equal intervals in the circumferential direction of the second transmission member 477. The engaged surface 477*h* is partially arc-shaped. D1 is the diameter when the inscribed circle R1 is virtually drawn with respect to the three engaged surfaces 477*h* in the natural state in which the driving relay portion 477*d* does not receive a force from other portions.

Here, details of the drive transmission engagement portion 474*g* in the first transmission member 474 will be described. As shown in part (a) of FIG. 29, the drive transmission engaging portion 474*g* is provided with the drive transmission surface 474*h*, the outer peripheral portion 474*j*, and the retracting portion 474*k*.

Next, the outer peripheral portion 474*j* is a portion of the circumscribed circle R0 of the triangular prism, and its diameter is d0. It is preferable that the relationship between the diameter d0 and the diameter d1 described above is d0≤d1. That is, the inscribed circle R1 formed by the three engaged surfaces 477*h* of the second transmission member 477 is larger than the circumscribed circle R0 formed by the three drive transmission surfaces 474*h* of the first transmission member 474. In addition, in a natural state in which the driving relay portion 477*d* shown in part (a) of FIG. 29 does not receive a force from other components, a gap s0 is provided between the inner diameter portion 477*b* and the driven connecting surface 477*j*. When d0≤d1, the relationship between the gap s0 and the thickness t of the control portion 475*d*5 in the control ring 475*d* is s0<t.

After describing the detailed structure of the downstream transmission member 471, the relationship between the second transmission member 477 and the transmission release mechanism 475 will be described.

As shown in FIGS. 26 and 27, the downstream transmission member (transmission gear) 471 is substantially cylindrical. The downstream transmission member 471 has a cylindrical portion 471*e* at the outer peripheral portion of the cylinder on one end side, and is engaged with the inner diameter portion 32*q* of the development cover member 432. In addition, the outer peripheral portion of the cylinder on the other end side has a supported portion 471*d* and is engaged with the first bearing portion 445*p* (cylindrical inner peripheral surface) of the bearing member 445. That is, the downstream transmission member 471 is rotatably supported at both ends by a bearing member 445 and a development cover member 432. In Embodiment 1, the bearing portion 71*d* and the first bearing portion 45*p* of the bearing member 45 are engaged with each other on the circumferential outer surface, but in this embodiment, the inner circumference and the outer circumference are reversed. Either structure can be implemented.

Furthermore, the downstream transmission member 471 is provided with an end surface flange 471*f*, a gear portion 471*g*1, a gear portion 471*g*2, and a gear portion 471*g*3, and the downstream transmission member 471 can be engaged with a plurality of gears to transmit driving to a plurality of components.

More specifically, as shown in FIG. 27, the gear portion 471*g*1 of the downstream transmission member 471 meshes with the developing roller gear 469 to rotate the developing roller 6. In addition, the gear portion 471*g*2 transmits the driving force to the toner supply roller gear 433 provided at the end of the toner supply roller 33 shown in FIG. 2. The toner supply roller 33 supplies the toner to the developing roller 6 and takes off the toner remaining on the developing roller 17 without being developed from the developing roller 6. In addition, the gear portion 471*g*3 transmits driving to a toner stirring member for stirring the toner accommodated in the developing frame. Here, the gear portions 471*g*1, 471*g*2, 471*g*3 include helical gears, in the twist angle of the gear is set so that it receives the thrust load W in the direction of arrow M by the meshing engagement of the gears. By this thrust load W, the end surface flange 471*f* contacts the abutting surface 32*f* of the development cover member 32, and the downstream transmission member 471 is positioned in the axial direction.

As shown in part (c) of FIG. 28 the downstream transmission member 471 has inside the cylinder, the other end side cylindrical supporting portion 471*h* for supporting the first transmission member 474, and an outer diameter supporting portion 471*a* for supporting the outer diameter portion 477*a* of the second transmission member 477. In addition, the downstream transmission member 471 has a longitudinal regulation end surface 471*c* to restrict the position of the second transmission member 477 in the axial direction. The second transmission member 477 is disposed between the longitudinal regulating end surface 471*c* of the downstream transmission member 471 and the control ring 475*d* in the axial direction.

As described above, opposite ends of the downstream transmission member 471 are rotatably supported by the bearing member 445 and the development cover member 432. On the contrary, for the first transmission member 474 one end side supported portion 474*c* is supported by the development cover member 432 at one end side, and the other end side supported portion 474*k* is supported by the other end side cylindrical supporting portion 471*h* of the downstream transmission member 471 at the other end side. That is, the first transmission member 474 is rotatably supported by the development cover member 432 and the downstream transmission member 471 at opposite ends thereof.

In addition, the downstream transmission member 471 has engaged ribs 471*b* extending radially from the outer diameter supporting portion 471*a* provided inside the cylinder shown in FIG. 26, and as shown in part (b) of FIG. 30, it engages with the drive transmission engagement portion 477*e* of the second transmission member 477. The engaged rib 471*b* can transmit a driving force to the downstream transmission member 471 when the second transmission member 477 rotates. That is, the engagement rib 471*b* is a driving force receiving portion for receiving a driving force. Here, as described above the downstream transmission member 471 is connected to the second transmission member 477 so as to rotate integrally with the second transmission member 477, and therefore, the downstream transmission member 471 can also be regarded as a portion of the second transmission member 477.

Next, the parts arranged in the cylindrical portion 477*c* of the second transmission member 477 shown in part (a) of FIG. 29 will be described. A drive transmission engagement portion 474*g* of the first transmission member 474 is provided on the inner diameter side of the drive relay portion 477*d* in the second transmission member 477. The annular rib-shaped control portion 475*d*5 of the control ring 475*d* is provided between the inner diameter portion 477*b* of the second transmission member 477 and the drive relay portion 477*d*. The second transmission member support surface 475*d*7 provided in the control portion 475*d*5 is fitted and supported so as to be rotatable with respect to the inner diameter portion 477*b* of the second transmission member 477.

The control ring 475*d* can move relative to the second transmission member 477 around the rotational axis X, and the relative position of the control ring 475*d* and the second transmission member 477 is switched depending on the drive blocking state and the drive transmission state.

In the following, referring to FIGS. 29-31, the relationship between the transmission release mechanism 475 and the second transmission member 477 will be described in detail. Furthermore, the positional relationship between the control ring 475*d* and the second transmission member 477 will be described for each state and operation, such as a drive blocking state, a drive transmission operation, a drive transmission state, and a drive blocking operation.

[Drive Blocking State 1]

Part (a) of FIG. 29 shows a state in which the drive is blocked. In the drive blocking state, the drive connection surface 475*d*6 of the control ring 475*d* is in a state of being retracted from the driven connection surface 477*j*, and therefore, the drive connection surface 475*d*6 is not in contact with the drive relay portion 477*d*. In the state in which the drive connecting surface 475*d*6 is retracted from the drive relay portion 477*d*, the drive relay portion 477*d* is not receiving a force from the control ring 475*d*. Therefore, an inscribed circle R1 formed by three engaged surfaces 477*h* in the drive relay portion 477*d* has a diameter d1.

On the other hand, the relationship between the outer peripheral portion 474*j* of the drive transmission engaging portion 474*g* and the diameter d0 is d0≤d1. Therefore, the engaged surface (driving force receiving portion, second engaging portion, engaged portion) 477*h* of the second transmission member 477 is not engaged with the drive transmission surface (drive transmission portion, first engagement portion) 474*h* of the first transmission member 474. the position of the engaged surface 477*h* at this time is referred to as a second position (second driving force receiving portion position, second receiving portion position, non-engaging position) of the engaged surface 477*h*. In addition, the position of control ring 475*d* at this time is referred to as a second position (second rotating member position, second rotating position, blocking position, non-transmitting position, non-holding position) of the control ring 475*d*.

At this time, the second transmission member 477 is not engaged with the first transmission member 474 and does not receive a driving force from the first transmission member 474. The transmission release mechanism (clutch) 475 blocks the transmission of the rotational force of the first transmission member 474 to the second transmission member 477 and is in a drive blocking state in which the rotation is not transmitted to the downstream transmission member 471 or the developing roller 6.

[Drive Transmission Operation]

Subsequently, a drive transmission operation of transition from the drive blocking state to the drive transmission state will be described.

Part (b) of FIG. 29 shows a state of the drive blocking operation of the transition from the drive transmission state to the drive blocking state.

At the start of drive transmission operation, the control member 76 moves to a first position (non-locking position) which allows rotation of the control ring 475*d* as shown in part (a) of FIG. 10. Here, a control ring 75*d* shown in part (a) of FIG. 10 corresponds to the control ring 475*d* of this embodiment. When the control member 76 is in the first position, the control member 76 is not in contact with the control ring 475*d*, so that the control ring 475*d* is allowed to rotate.

In this state, when the first transmission member 474 receives driving force to rotate in the direction of arrow J, as shown in part (a) of FIG. 28, the control ring 475*d* also rotates. This is because, as described above, an input inner ring 475*a* and a load spring 475*c* connect the first transmission member 474 to the control ring 475*d*, and these transmit the driving force from the first transmission member 474 to the control ring 475*d*.

The input inner ring 475*a* and the load spring 475*c* act as a torque limiter. If the torque for rotating the control ring 475*d* is below a predetermined magnitude, the torque limiter rotates the control ring 475*d* integrally with the first drive transmission member 474.

For this reason, when the drive transmission operation starts, the control ring 475*d* which rotates integrally with the first transmission member 474 starts to rotate relative to the second transmission member 477 which is at rest. In the drive blocking state 1 shown in part (a) of FIG. 29, the drive connection surface 475*d*6 of the control ring 475*d* rotates from a state where it is not in contact with the drive relay portion 477*d*, and the drive connection surface 475*d*6 starts to contact the introduction surface 477*k* of the second transmission member 477. The introduction surface 477*k* is a slope connecting the driven connecting surface 477*j* of the drive relay portion 477*d* and the arm portion 477*g*, and the drive connection surface 475*d*6 advances in the rotational direction J while being in contact with the introduction surface 477*k*. The control portion 475*d*5 produces a force f42 against the introduction surface 477*k* at the contact position T42 with the introduction surface 477*k*.

Here, the drive relay portion 477*d* of the second transmission member 477 is a cantilever beam including the supporting portion 477*f* as a fulcrum. The introduction surface 477*k*, which is the free end side of the drive relay portion 477*d*, receives the force f42 from the drive connection surface 475*d*6 at the contact position T42, by which a bending moment M42 is generated in the drive relay portion 477*d*. By this, in the drive relay portion 477*d*, bending inward in the radial direction with the supporting portion 477*f* as a fulcrum occurs, and the drive relay portion 477*d* moves radially inward due to elastic deformation.

Furthermore, when the control ring 475*d* rotates relative to the second transmission member 477, the controller 475*d*5 contacts the driven connecting surface 477*j* of the second transmission member 477, as shown in part (a) of FIG. 30. In the drive blocking state 1 shown in part (a) of FIG. 29, the gap between the inner diameter portion 477*b* and the driven connecting surface 477*j* in the second transmission member 477 is s0, and the relationship with the thickness t of the control portion 475*d*5 in the control ring 475*d* is the gap s0<thickness t. The thickness t of the control portion 475*d*5 is larger than the gap s0, and therefore, when the rotation of the control ring 475*d* proceeds in the drive transmission operation, as shown in part (a) of FIG. 30, the controller 475*d*5 widens the gap s0.

Here, the rotation of the control ring 475$d$ continues until the rotation restricted end surface 475$d$8 provided on the control ring 475$d$ and the rotation restricting end surface 477$m$ provided on the second transmission member 477 are brought into contact with each other. The state in which the rotation restricted end surface 475$d$8 and the rotation restricted end surface 477$m$ are in contact with each other is the drive transmission state shown in part (b) of FIG. 30.

As a result of the control portion 475$d$5 being inserted into the gap s0, the gap between the inner diameter portion 477$b$ of the second transmission member 477 and the driven connecting surface 477$j$ is switched to the gap s1. More specifically, the gap s1 is substantially equal to the thickness t. In addition, the amount of bending which elastically deforms the drive relay portion 477$d$ inward in the radial direction corresponds to the difference between the thickness t and the gap s0.

Here, the diameter when the inscribed circle R2 is virtually drawn with respect to the three engaged surfaces 477$h$ in the second transmission member 477 is defined as d2. The diameter d2 is smaller than the diameter d1 of the inscribed circle R1 in the drive blocking state shown in part (a) of FIG. 29, by the amount of the radially inward elastic deformation of the drive relay portion 477$d$. In addition, the thickness t of the controller 475$d$5 is set so that the diameter d2 resulting from the deformation of the drive relay portion 477$d$ satisfies d2<the diameter d0 at the outer peripheral portion 474$j$ of the drive transmission engagement portion 474$g$.

Here, the controller 475$d$5 by the drive transmission operation changes from the state shown in part (b) of FIG. 29 to the state shown in part (a) of FIG. 29, in the process of rotation in contact with the introduction surface 477$g$ of the second transmission member 477. In this process, the diameter of the inscribed circle decreases, step by step from the diameter d1 of the inscribed circle R1 in the drive blocking state to the diameter d2 of the inscribed circle R2 in the drive transmission state.

By this, the engaged surface 477$h$ of the second transmission member 477 is switched to a state in which it can be engaged with the drive transmission surface 474$h$ of the first transmission member 474, and it becomes a drive transmission state which transmits the rotation of the 1st transmission member 474 to the downstream transmission member 471, as shown in part (b) of FIG. 30.

The position of the engaged surface 477$h$ at this time, is referred to as a first position (first driving force receiving portion position, first receiving portion position, inner position, engagement position, transmission position) of the engaged surface 477$h$. In addition, the position of the control ring 475$d$ at this time is called a first position of the control ring 475$d$ (first control position, first rotating member position, first rotating position, transmission position, holding position). When the control ring 475$d$ is in the first position, the control portion (holding portion) 475$d$5 holds the engaged surface 477$h$ in the first position. That is, the control portion 475$d$5 biases the engaged surface 477$h$ radially inward against the elastic force of the drive relay portion 477$d$.

Here, for the process of shifting to the drive transmission state by the drive transmission operation, the setting and operation of the torque limiter (input inner ring 475$a$, load spring 475$c$) included in the transmission release mechanism 475 will be described.

The input inner ring 475$a$ and the load spring 475$c$ (part (a) in FIG. 28, and so on) are transmission members for transmitting the driving force from the first transmission member 474 to the control ring 475$d$. However, the structure is such that these input inner ring 475$a$ and load spring 475 not only transmit driving force but also function as a torque limiter as described above.

The input inner ring 475$a$ is connected to the first transmission member 474 so as to rotate integrally, and a load spring 475$c$ is wound around the input inner ring 475$a$. The load spring 475$c$ is connected to the control ring 475$d$. And, while the torque for rotating the input inner ring 475$a$ is below a predetermined magnitude, the driving force is transmitted from the input inner ring 475$a$ to the load spring 475$d$. On the other hand, when the torque exceeds a predetermined magnitude, the driving force is not transmitted from the input inner ring 475$a$ to the load spring 475$c$, and the input inner ring 475$a$ idles relative to the load spring 475$c$. Here, the torque at the time when the input inner ring 475$a$ idles relative to the load spring 475$c$ is called idling torque.

By the action of this torque limiter, the control ring 475$d$ is connected to the first transmission member 474 and rotates integrally with the first transmission member 474, until the torque acting on the control ring 475$d$ reaches a predetermined torque (idling torque).

On the other hand, when the torque acting on the control ring 475$d$ is the predetermined value or more, the drive transmission from the input inner ring 475$a$ to the load spring 475 is blocked, so that the drive connection between the control ring 475$d$ and the first transmission member 474 is broken. That is, only the first transmission member 474 can be rotated while the control member stops the rotation of the control ring 475$d$.

In drive transmission operation, the control portion 475$d$5 of the control ring 475$d$ rotates relative to the second transmission member 477 while expanding the gap s0 between the inner diameter portion 477$b$ and the driven connecting surface 477$j$. That is, in drive transmission operation, the driven connecting surface 477$j$ contacts the driving connecting surface 475$d$6, and a load resistance is produced when the drive relay portion 477$d$ is elastically deformed radially inward. It is necessary to set the idling torque of the torque limiter so that the rotation of the control ring 475$d$ does not stop due to this load resistance. In this embodiment, the elastic deformation amount inward in the radial direction in the drive relay portion 477$d$ is 0.8 mm, and the idling torque of the torque limiter included in the transmission release mechanism 475 is 2.94 N·cm.

Next, in the state that has shifted to the drive transmission state shown in part (b) of FIG. 30, the control ring 475$d$ reaches a position where the rotation restricted end surface 475$d$8 and the rotation restricted end surface 477$m$ are in contact with each other. In this state, the control ring 475$d$ receives, from the second transmission member 477, the load torque of the downstream transmission member 471 connected to the second transmission member 477. The idling torque of the torque limiter included in the transmission release mechanism 475 is set to be equal to or less than the load torque of the downstream transmission member 471. That is, by the rotation restricted end surface 475$d$8 and the rotation regulating end surface 477$m$ of the second transmission member 477 contacting each other, the torque limiter temporarily cancels the drive connection between the control ring 475$d$ and the first drive transmission member when the control ring 475$d$ receives the load torque from the second transmission member 477.

As a result, the control ring 475$d$ stops rotating relative to the second transmission member 477, and only the first transmission member 474 rotates relative to the second transmission member 477. That is, the control ring **475*d* is in a state in which the rotation is restricted (stopped) from the second transmission member 477. as shown in part (b) of FIG. 30, the position of control ring 475*d* in a state that the rotation restricted end surface 475*d*8 of the control ring 475*d* and the rotation restricting end surface 477*m* of the second transmission member 477 are in contact with each other is called the first position (first rotation position). This is the position of the control ring 475*d*** in the drive transmission state.

Here, the drive transmission operation will be described with respect to the rotational direction phase of the engaged surface **477*h* of the second transmission member 477 in a state during the drive transmission operation. More specifically, the drive transmission operation in said two phase combinations will be described. In the first phase combination, the rotational direction phase of the engaged surface 477*h* as shown in part (a) of FIG. 30 is located in the retracting portion 474*k* of the drive transmission engaging portion 474*g* of the first transmission member 474. Next, in the second phase combination, the rotational direction phase of the engaged surface 477*h* as shown in part (b) of FIG. 29 is located on the outer peripheral portion 474*j* and the drive transmission surface 474*h* of the drive transmission engagement portion 474*g***.

In drive transmission operation, when the control ring **475*d* rotates relative to the second transmission member 477, the control portion 475*d*5 of the control ring 475*d* elastically deforms the drive relay portion 477*d* of the second transmission member 477** inward in the radial direction.

In the case of the first phase combination (part (a) in FIG. 30), the engaged surface **477*h* is located at the retracting portion 474*k*, and therefore, the engaged surface 477*h* is movable to the first position (engagement position) on the radially inner side before coming into contact with the drive transmission engagement portion 474*g*. Therefore, by transmitting the driving force to the control ring 475*d* by the torque limiter of the transmission release mechanism 475, the control ring 475*d*** can also reach the first position (first rotation position).

When the control ring **475*d* is in the first position, and the relative rotation of the control ring 475*d* relative to the second transmission member 477 stops, the inscribed circle R2 with respect to the three engaged surfaces 477*h* has a diameter d2. That is, the engaged surface 477*h* is held in the first position by the control ring 475*d*. In this state, the connection with the torque limiter is temporarily disconnected, and the control ring 475*d* stops relative to the second transmission member 477**.

When the first transmission member 474 rotates from this state relative to the second transmission member 477 and the control ring **475*d*, the engaged surface 477*h* as shown in part (b) of FIG. 30 reaches the drive transmission state in contact with the drive transmission surface 474*h*. By the driving force received by the engaged surface 477*h* from the drive transmission surface 474*h*, the second transmission member 477 starts rotating. In addition, when this state is established the torque limiter reconnects control ring 475*d* and first transmission member 474 with each other, and therefore, the first transmission member 474, the second transmission member 477, and the control ring 475*d*** are rotated integrally.

The second phase combination as shown in part (b) of FIG. 29 will be described.

When the engaged surface **477*h* is moved inward in the radial direction by the control portion 475*d*5, it comes into contact with the outer peripheral portion 474*j* of the drive transmission engaging portion 474*g* and the drive transmission surface 474*h* before the controller 475*d*5 contacts the driven connecting surface 477*j*. That is, the engaged surface 477*h*** is prevented from moving before the movement from the second position (non-engagement position) to the first position (engagement position) is completed.

In the state in which the engaged surface **477*h* is in contact with the drive transmission engaging portion 474*g*, a large resistance is produced when the control ring 475*d* moves the drive relay portion 477*d* of the second transmission member 477** inward in the radial direction.

For this reason, the torque limiter included in the transmission release mechanism 475 stops the control ring **475*d* even when the first transmission member 474 is rotating. That is, outer peripheral portion 474*j* and drive transmission surface 474*h* in the drive transmission engagement portion 474*g* of the first transmission member 474 rotates through the engaged surface 477*h*. By this, the second phase combination (part (b) in FIG. 29) is switched to the first phase combination (part (a) in FIG. 30) where the engaged surface 477*h* is positioned at the retracting portion 474*k*. through the process described above, the engaged surface 477*h* reaches a drive transmission state in contact with the drive transmission surface 474*h***.

[Drive Transmission State]

The drive transmission state is shown in part (b) of FIG. 30. By the drive transmission operation, the control ring **475*d* has reached a position where the rotation restricted end surface 475*d*8 provided on the control ring 475*d* and the rotation restricted end surface 477*m* provided on the second transmission member 477 contact each other. The relationship between control ring 475*d* and second transmission member 477 and drive transmission surface 474*h* of first transmission member 474** in this state, will be explained in more detail.

The control portion **475*d*5 is arranged on an extension line in the radial direction from the rotational center X toward the engaged surface 477*h* which is provided on the free end side of the drive relay portion 477*d* which is a cantilever, and it is in contact with the driven connecting surface 477*j*. In addition, the drive relay portion 477*d* is elastically deformed radially inward by the thickness t of the control portion 475*d*5. As a result, the diameter d2 of the inscribed circle R2 with respect to the three engaged surfaces 477*h* is smaller than the diameter d0 at the outer peripheral portion 474*j* of the drive transmission engaging portion 474*g***.

The three engaged surfaces **477*h* are located radially inward from the diameter d0 at the outer peripheral portion 474*j*. That is, the engaged surface 477*h* is located at the first position (engagement position), and therefore, when the first transmission member 474 rotates, the engaged surface 477*h* can come into contact with the drive transmission surface 474*h***.

Referring to part (a) of FIG. 31, about the state of power at this time will be explained.

The contact position in the drive transmission state between the drive transmission surface **474*h* and the engaged surface 477*h* of the second transmission member 477 is depicted by reference T41. The engaged surface 477*h* receives the reaction force f41 from the drive transmission surface 474*h* at the contact position T41. The drive transmission surface 474*h* has an inclined surface with an angle α41 which is an angle toward the upstream side of the rotational direction J as the radius increases with reference to the line connecting the rotational center X and the contact position T41**. On the other hand, since the engaged surface 477*h* has an arc shape, the reaction force f41 at the contact portion between the drive transmission surface 474*h* and the engaged surface 477*h* is produced as a normal force of the drive transmission surface 474*h*. For the reaction force f41, the force in each portion against the radial component f41*r* and tangential component f41*t* will be explained.

First, the drive transmission surface 474*h* has an inclined surface with an angle α41, and therefore, the radial component f41*r* of the reaction force f41 is a force in a direction of moving the engaged surface 477*h* of the drive relay portion 477*d* outward in the radial direction. On the contrary, the driven connecting surface 477*j* of the drive relay portion 477*d* is placed on a radial extension line from the rotational center X toward the engaged surface 477*h*. Furthermore, a second transmission member support surface 475*d*7, which is a surface on the outer diameter side of the control portion 475*d*5 arranged to face the drive coupling surface 475*d*6 by way of the thickness t, is in contact with the inner diameter portion 477*b* of the second transmission member 477. furthermore, the outer diameter portion 477*a* of the second transmission member 477 is supported by the outer diameter supporting portion 471*a* of the downstream transmission member 471. As described above, against the radial component f41*r* which moves the engaged surface 477*h* of the drive relay portion 477*d* radially outward, the drive relay portion 477*d* is in a state where movement in the radial direction is restricted by the drive connecting surface 475*d*6, the second transmission member 477, and the downstream transmission member 471. Therefore, the deformation of the drive relay portion 477*d* can be suppressed against the radial direction component f41*r*, and therefore, the engagement between the drive transmission surface 474*h* and the engaged surface 477*h* is stabilized. That is, the control ring 475*d* is located at the first rotational position, and when the drive connecting surface 475*d*6 and the driven connecting surface 477*j* are in contact with each other, the drive transmission can be stably performed.

Next the tangential direction component f41*t* will be described. The reaction force f41 generates a tangential force f41*t*, which is a tangential component, and the tangential force f41*t* pulls the drive relay portion 477*d* in the rotational direction J to cause the second transmission member 477 and the downstream transmission member 471 to rotate in the rotational direction J.

The driving relay portion 477*d* has a shape extending from the supporting portion 477*f* downstream wise in the rotational direction J toward the free end side where the engaged surface 477*h* and the driven connecting surface 477*j* are provided. It is preferable that the direction extending from the supporting portion 477*f* to the downstream side in the rotational direction J is substantially parallel to the tangential force f41*t* in contact between the engaged surface 477*h* and the drive transmission surface 474*h*. The drive relay portion 477*d*, which is a cantilever beam, has a higher tensile rigidity in the stretching direction than a rigidity in the bending direction which is the radial direction, and the deformation of the drive relay portion 477*d* can be further reduced with respect to the transmission torque from the first transmission member 474. That is, the rotation of the first transmission member 474 can be stably transmitted to the second transmission member 477.

[Drive Blocking Operation]

Next, a drive blocking operation for shifting from the drive transmission state to the drive blocking state will be described. Upon starting the drive blocking operation, as shown in parts (c) and (d) of FIG. 10, when the developing unit 9 rotates and reaches the separated position, the control member 76 also rotates and moves to the second position. Here, since the operation of the control member 76 at this time is the same as that of Embodiment 1, the description thereof is omitted.

The control ring 475*d* rotates integrally with the first transmission member 474 by the action of the torque limiter of the transmission release mechanism 475 in the drive transmission state. On the contrary, when the control member 76 is located at the second position (locking position), the contact surface 76*b* of the control member 76 is inside the rotation locus A shown in part (c) of FIG. 10. In this case, the contact surface 76*b* of the control member 76 locks the locked portion 475*d*4 of the control ring 475*d* and tends to restrict the rotation of the control ring 475*d*.

In the state where the control member 76 restricts the rotation of the control ring 475*d*, the load spring 475*c* engaged with the control ring 475*d* is also in a state of the rotation thereof being restricted. In this state, when the first transmission member 474 rotates, while the input inner ring 475*a* that rotates integrally with the first transmission member 474 produces idling torque with the load spring 475*c*, it can continue to rotate relative to the load spring 475*c* and the control ring 475*d*. That is, a large load is applied to the control ring 475*d* from the control member 76, and therefore, the torque limiter (the input inner ring 475*a* and the load spring 475*c*) disconnects the first transmission member 474 and the control ring 475*d*. Therefore, the first transmission member 474 can continue to rotate even when the control ring 475*d* is stopped.

In this manner, when the control member 76 is in the second position, the rotation of the control ring 475*d* and the load spring 475*c* can be restricted and stopped by the control member 76, even if the first transmission member 474 is rotating.

In the following, the relationship between the first transmission member 474, the second transmission member 477, and the control pipe 475*d* in the drive blocking operation will be described.

When the first transmission member 474 is rotated while the rotation of the control ring 475*d* is stopped by the drive blocking operation, similarly, the second transmission member 477 that has been rotated integrally with the first transmission member 474 in the drive transmission state also advances relative to the control ring 475*d*. Here, the relative rotation of the second transmission member 477 with respect to the control ring 475*d* proceeds until the engagement state between the drive transmission surface 474*h* and the engaged surface 477*h* is released. This will be described in detail.

In drive blocking operation, for the control ring 475*d*, the rotation restricted end surface 475*d*8 and the rotation restricted end surface 477*m* are separated from each other from the first rotation position shown in part (b) of FIG. 30 where the rotation-restricted end surface 475*d*8 and the rotation-restricted end surface 477*m* are in contact with each other as shown in part (a) of FIG. 30. This is because the second transmission member 477 is rotated by the first transmission member in a state where the control ring 475*d* is locked by the control member 76 and is at rest. Here, the drive connection between the first transmission member 474 and the control ring 475*d* is disestablished by the torque limiter, and even if the rotation of the control ring 475*d* is stopped, the first transmission member 474 can rotate relative to the control ring 475*d*.

As described above, the relative rotation of the second transmission member 477 *d* proceeds relative to the control ring 475, and the control portion 475*d*5 of the control ring

475*d* moves relatively upstream in the rotational direction J of the second transmission member 477. That is, the control ring 475*d* relatively moves from the first position (first rotation position) toward the second position (second rotation position).

In the state where the control portion 475*d*5 is in contact with the driven connecting surface 477*j* of the driving relay portion 477*d* as shown in part (a) of FIG. 30, the gap s1 of the second transmission member 477 is maintained. Therefore, the inscribed circle formed by the three engaged surfaces 477*h* is substantially equal to the circle having the diameter R2 in the drive transmission state. That is, the engaged surface 477*h* is urged by the control portion 475*d*5 of the control ring 475*d* and is held at the first position on the radially inner side. As a result, the engagement between the engaged surface 477*h* of the second transmission member 477 and the drive transmission surface 474*h* of the first transmission member 474 is maintained, and the rotation of the first transmission member 474 can be transmitted to the second transmission member 477.

Next, when the rotation of the second transmission member 477 relative to the control ring 475*d* proceeds, the control portion 475*d*5 reaches the introduction surface 477*k* of the drive relay portion 477*d*, as in the state shown in part (b) of FIG. 29. When the control portion 475*d*5 moves in contact with the introduction surface 477*k* of the drive relay portion 477*d*, the gap gradually changes from the gap s1 in the drive transmission state to the gap s0 in the drive blocking state. That is, it restore to the natural state radially outward from the state where the drive relay portion 477*d* of the second transmission member 477 is deformed radially inward. By this, the inscribed circles of the three engaged surfaces 477*h* gradually increase from the inscribed circle R2 in the drive transmission state toward the inscribed circle R1 in the drive blocking state.

Therefore, the difference between the inscribed circles of the three engaged surfaces 477*h* and the diameter d0 at the outer peripheral portion 474*j* of the drive transmission engaging portion 474*g* is reduced. That is, the amount of engagement between the engaged surface 477*h* of the second transmission member 477 and the drive transmission surface 474*h* of the first transmission member 474 decreases. as a result, the rotation of the first transmission member 474 cannot be transmitted to the second transmission member 477, so that the relative rotation of the second transmission member 477 relative to the control ring 475*d* stops.

That is, the first transmission member 474 switches to the drive blocking state at the instance when the rotation becomes unable to transmit the force to the second transmission member 477. Thus, the movement of the engaged surface 477*h* to the second position (non-engaging position) on the radially outer side is completed.

[Drive Blocking State 2]

In the drive blocking state 1 shown in part (a) of FIG. 29 described above, as one state in the drive blocking state, the drive connecting surface 475*d*6 of the control ring 475*d* is in a non-contact state with the drive relay portion 477*d*. That is, in the drive blocking state 1, the engaged surface (drive force receiving portion) 477*h* of the drive relay portion 477*d* is retracted to the second position (non-engagement position) on the radially outer side.

Figure 31:
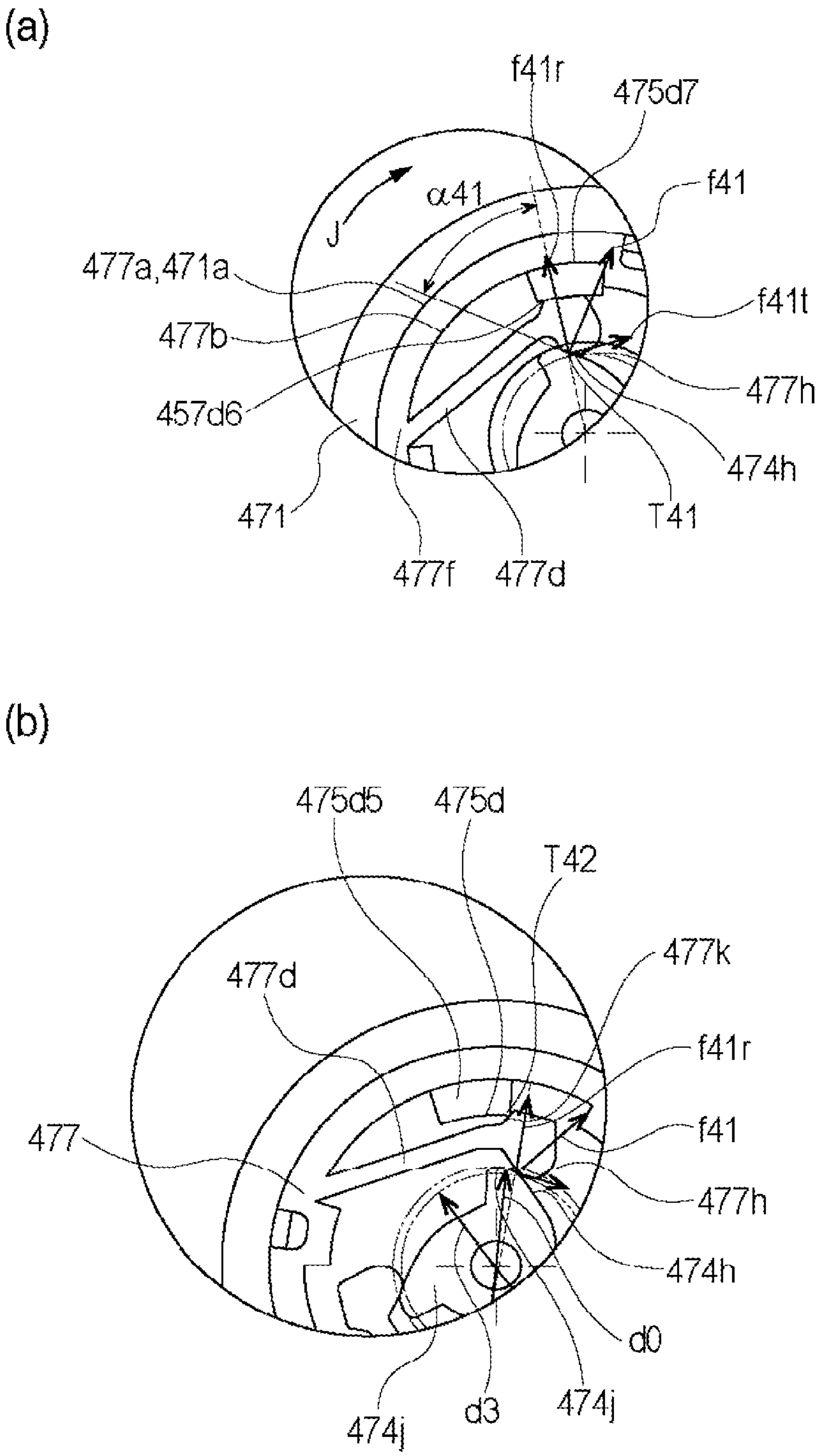
FIG. 31 is a sectional view of the transmission release mechanism according to Embodiment 4.

On the contrary, as another state in the drive blocking state, a drive blocking state in which the control portion 475*d*5 as shown in part (b) of FIG. 31 is in contact with the introduction surface 477*k* will be supplementarily described.

When the control portion 475*d*5 contacts the introduction surface 477*k*, the drive relay portion 477*d* cannot be restored to the natural state due to the contact between the control portion 475*d*5 and the introduction surface 477*k*. Here, when the diameter of the inscribed circle of the three engaged surfaces 477*h* is d3 when the control portion 475*d*5 contacts the introduction surface 477*k*, the diameter d3 is smaller than the diameter d1 in which the drive relay portion 477*d* is in a natural state. In addition, the relationship between the outer peripheral portion 474*j* of the drive transmission engaging portion 474*g* and the diameter d0 is d0≤d1, and therefore, the relationship is such that the drive transmission surface 474*h* of the drive transmission engagement portion 474*g* and the engaged surface 477*h* of the second transmission member 477 can be engaged. That is, it can be considered that the engaged surface 477 is still placed at the first position (engagement position) on the radially inner side.

As shown in part (b) of FIG. 31, the radial component f41*r* of the reaction force f41 is a force in a direction of moving the engaged surface 477*h* of the drive relay portion 477*d* outward in the radial direction. Against the radial direction component f41*r* received by the engaged surface 477*h*, the control portion 475*d*5 tens to restrict the deformation of the drive relay portion 477*d* at the contact position T42 with the introduction surface 477*k*.

On the contrary, the introduction surface 477*k* of the drive relay portion 477*d* is placed on the upstream side, in the rotational direction J, of the radial extension line from the rotational center X toward the engaged surface 477*h*. Therefore, for the radial component f41*r*, a bending moment Mk which deforms the drive relay portion 477*d* outward in the radial direction is produced with the contact position T42 as a fulcrum, and the engaged surface 477*h* can be allowed to move outward in the radial direction. That is, the drive relay portion 477*d* can be deformed outward in the radial direction so that the inscribed circles of the three engaged surfaces 477*h* are increased. As a result, when the inscribed circle expands to the same diameter d0 at the outer peripheral portion 474*j* of the drive transmission engaging portion 474*g*, the rotation of the first transmission member 474 can be blocked from the second transmission member 477 and the downstream transmission member 471.

As described above, in addition to the drive blocking state 1 shown in part (a) of FIG. 29, the drive blocking state can also be established when the control portion 475*d*5 is in contact with the introduction surface 477*k*, as shown in part (b) of FIG. 31. The drive blocking state shown in part (b) of FIG. 31 is the drive blocking state 2.

In drive blocking state 2, the engaged surface 477*h* of the second transmission member 477 is not retracted to the second position (outer position, non-engagement position), and it is still in the first position (inner position, engagement position). However, when the first transmission member 474 rotates, each time the engaging portion 474*g* of the first transmission member 474 intermittently contacts the engaged surface 477*h* of the second transmission member 477, the engaged surface 477*h* moves from the first position (engaged position) to the second position (non-engaged position). Therefore, the engaged surface 477*h* does not receive a driving force from the engaging portion 474*g*.

The drive blocking state 1 and the drive blocking state 2 can be made depending on the timing at which the control member 76 locks the control ring 475*d*. About this, the description will be made, referring to part (c) of FIG. 10. Here, the reference characters of the control ring in part (c) of FIG. 10 is 75*d*, but in the description of this embodiment, is replaced with 475*d*. The control member 76 is rotated by the drive blocking operation, and when the locking portion at the free end of the control member 76 enters the inside of the rotation locus A of the control ring 475*d*, the control member 76 can contact and be locked with the control ring 475*d*. That is, the rotational phase of the locked portion 475*d*4 of the control ring 475*d* is not constant relative to the timing when the control member 76 enters the inside of the rotation locus A of the control ring 475*d*, and for this reason, variations occur in the timing at which the control member 76 locks the control ring 475*d*.

The control ring 475*d* stops rotating at the timing when the control member 76 and the control ring 475*d* come into contact with each other. And, when the control ring 475*d* stops rotating, the relative rotation between the second transmission member 477 and the control ring 475*d* is started. As a result, the control portion 475*d*5 of the control ring 475*d* retracts from the driven connection surface 477*j* of the drive relay portion 477*d*. On the other hand, in the drive blocking operation, the control member 76 continues to rotate in the rotational direction L1 for a certain period of time. Therefore, when the control member 76 comes into contact with the control ring 475*d* on the inner side of the rotation locus A and upstream of the rotational direction L1, it rotates in the rotational direction L1, even after the control member 76 contacts the control ring 475*d*, the control ring 475*d* is turned in the rotational direction L1. That is, by the rotation of the control member 76, the control ring 475*d* is moved upstream in the rotational direction J (rotated in the direction opposite to the rotational direction J). Therefore, the relative rotation with the second transmission member 477 becomes larger. By this, the drive blocking state 1 is as shown in part (a) of Figure.

Next, when the control member 76 comes into contact with the control ring 475*d* inside the rotation locus A, at the timing when the rotation in the rotational direction L1 has progressed, the degree to which the control member 76 rotates the control ring 475*d* in the rotational direction L1 after contacting the control ring 475*d* is reduced. Therefore, the degree to which the control ring 475*d* is moved to the upstream side in the rotational direction J by the rotation of the control member 76 is small, and as a result, the relative rotation between the control ring 475*d* and the second transmission member 477 is small. By this, the drive blocking state 2 as shown in part (b) of FIG. 31 is established.

As described above, the drive blocking state can be a state such as a drive blocking state 1 and a drive blocking state 2. The position of the control ring 475*d* in the drive blocking state is the second rotational position, and the second rotational position is a position where the control portion 475*d*5 has retracted from the driven connection surface 477*j* of the drive relay portion 477*d*. That is, it includes the state from the state where the control portion 475*d*5 is in contact with the introduction surface 477*k* to the state where it is not in contact with the drive relay portion 477*d*.

Here, even when the elastic restoring force of the drive relay portion 477*d* is weak (or no elastic restoring force), and the rotation of the control ring 475*d* is stopped, the drive relay portion 477*d* cannot retract the engaged surface 477*h* to the second position (non-engagement position). Even in this case, as explained in the drive blocking state 2, by the engaged surface 477*h* receiving a force f41 (part (b) of FIG. 32) from the engaging portion 474*g*, it can be retracted to the second position (non-engagement position). That is, in this embodiment in a natural state of not receiving an external force, the engaged surface 477*h* is not necessarily in the second position (non-engagement position).

Here, in the drive blocking state, the control member 76 restricts the rotation of the control ring 475*d*, and the load spring 475*c* engaged with the control ring 475*d* is also in a state of being restricted in the rotation thereof. That is, the torque limiter (load spring 475*c*) which has connected the first transmission member 474 and the control ring 475*d* with each other releases the connection. The first transmission member 474 rotates idly relative to the control ring 475*d*.

In this state, when the first transmission member 474 rotates, the input inner ring 475*a* that rotates integrally with the first transmission member 474 is in a state in which idling torque is produced between the input inner ring 475*a* and the load spring 475*c*.

[Summary of Structure of this Embodiment]

In this embodiment, another form of the transmission release mechanism has been described. The structure of the control member 76 for controlling the rotation transmission and blocking by the transmission release mechanism 475 is the same as in Embodiment 1, and as compared with the prior art, another type of transmission release mechanism can achieve the same effect. That is, by maintaining a stable positional relationship between the control member 76 and the transmission release mechanism 475 relative to the rotation angle of the developing unit 9, it is possible to reliably switch the drive transmission and the blocking. By this, the control variations in the rotation time of the developing roller 6 can be reduced.

In the following, differences from the embodiments described so far will be described.

When the control member 76 is in the first position away from the control ring 475*d*, the control ring 475*d* can rotate (without being stopped by the control member 76), and the transmission release mechanism 475 can transmits the first transmission member 474 to the downstream transmission member 471. As for the structure for transmitting the driving force, in Embodiment 1, the transmission spring 75*c* is tightened on the inner diameter side with respect to the rotation of the first transmission member 74, so that the driving force can be transmitted. On the other hand, in this embodiment, as in Embodiment 2 and Embodiment 3, by moving the drive relay portion 477*d* radially inward, the driving force transmission is enabled. In Embodiments 2 and 3, in the drive transmission state, for the engagement portion between the engaged surface 171*a*1 of the drive relay portion 171*a* and the engagement surface 174*e* of the first transmission member 174, the shape of the engagement surface 174*e* is selected so that a pulling force f1*r* inward in the radial direction is produced.

In this embodiment, for the engagement portion between the drive transmission surface 474*h* and the engaged surface 477*h* of the drive relay portion 477*d*, the shape of the drive transmission surface 474*h* is selected so that the force f41*r* in the direction of moving outward in the radial direction is produced. On the contrary, the driven coupling surface 477*j* of the drive relay portion 477*d* receives the radial component f41*r* in contact with the driving coupling surface 475*d*6 of the controlling portion 475*d*5 on the radial extension line from the rotational center X toward the engaged surface 477*h*. As described above, by constituting so as to suppress deformation of the drive relay portion 477*d* against radial component f41*r*, the engagement between the drive transmission surface 474*h* and the engaged surface 477*h* is stabilized. By this, similarly to Embodiments 1 to 3, the rotation of the first transmission member 474 can stably reach the downstream transmission member 471.

In addition, the position of the engaged surface 477*h* of the drive relay portion 477*d* in the drive transmission state is determined by inserting the thickness t of the control portion 475*d*5 into the gap between the inner diameter portion 477*b* and the driven connecting surface 477*j* in the second transmission member 477. For this reason, even when the drive relay portion 477*d* has changed its natural shape due to creep deformation, for example, the position of the engaged surface 477*h* of the drive relay portion 477*d* in the drive transmission state is stabilized. Even when repeating the transmitting and blocking operations, the position of the engaged surface 477*h* of the drive relay portion 477*d* in the drive transmission state is similarly stabilized.

Next, if the control member 76 is in the second position in which it can contact the control ring 475*d*, the control ring 475*d* is locked by the control member 76 to stop the rotation, by which the transmission release mechanism 475 blocks the rotation of the first transmission member 474 and does not transmit the rotation to the downstream transmission member 471.

In Embodiment 1, the rotation of the transmission spring 75*c* together with the control ring 75*d* is locked by the control member 76. By this, the inner diameter of the transmission spring 75*c* is restricted so that it could not be twisted in the direction of decreasing to block the transmission of the rotation to the input inner ring 75*a* rotating integrally with the first transmission member 74. In the spring clutch which is the transmission release mechanism 75 described in Embodiment 1, when the rotation is blocked by the transmission release mechanism 75, by the input inner ring 75*a* and the transmission spring 75*c* sliding relative to each other, a sliding torque is produced in the first transmission member 74.

On the contrary, in Embodiment 2 and Embodiment 3, when the rotation is blocked by the transmission release mechanism 170, the drive relay portion 171*a* is moved radially outward by the control ring 175 to release the engaged state between the engaged surface 171*a*1 and the engaging surface 174*e*. Therefore, the torque of the first transmission member 174 in the drive blocking state is reduced.

In addition, in Embodiments 2 and 3, the shape of the engagement surface 174*e* is selected so that a pulling force f1*r* radially inward is generated, in the engaging portion between the engaged surface 171*a*1 of the drive relay portion 171*a* and the engaging surface 174*e* of the first transmission member 174, in the drive transmission state. Therefore, in order to maintain a reliable drive blocking state, it is necessary to move the engaged surface 171*a*1 of the drive relay portion 171*a* radially outward relative to the engaging surface 174*e* to reliably maintain the non-contact state, and the structure for accomplishing this has been described in Embodiment 3.

On the other hand, in this embodiment, the diameter d1 of the inscribed circle R1 with respect to the three engaged surfaces 477*h* in the natural state where the driving relay portion 477*d* does not receive a force from other portions and the diameter d0 in the outer peripheral portion 474*j* of the driving transmission portion engaging portion 474*g* satisfy d0≤d1. Ideally, d0<d1 is preferable, but when the three engaged surfaces 477*h* in the natural state are separated from the outer peripheral portion 474*j* of the drive transmitting portion engaging portion 474*g*, the contact between the engaged surface 477*h* and the outer peripheral portion 474*j* in the drive blocking state can be suppressed. As a result, when the engaged surface 477*h* and the outer peripheral portion 474*j* are in contact with each other, the minute load fluctuation produced in the first transmission member 474 can be suppressed. However, in this embodiment, it has been described that even if d0≤d1, the drive blocking state can be stably achieved. That is, in this embodiment, in the drive blocking state, the control ring 475*d* is restricted from rotating and stops, and the drive connecting surface 475*d*6 of the control ring 475*d* is retracted from the driven connecting surface 477*j*. In addition, the shape of the drive transmission surface 474*h* is set so that the force f41*r* in the direction of moving outward in the radial direction is produced, in the engagement portion between the drive transmission surface 474*h* and the engaged surface 477*h* of the drive relay portion 477*d*. In the drive blocking state, the deformation of drive relay 477*d* outward in the radial direction by radial component f41*r* is allowed, and therefore, the drive relay portion 477*d* can be deformed outward in the radial direction so that the inscribed circle of the three engaged surfaces 477*h* is increased. Even if the drive transmission surface 474*h* of the first transmission member 474 and the engaged surface 477*h* of the drive relay portion 477*d* are in contact with each other, engagement therebetween can be avoided. Therefore, the rotation of the first transmission member 474 can be blocked from being transmitted to the second transmission member 477 and the downstream transmission member 471. That is, it is not necessary to cause the engaged surface 477*h* of the drive relay portion 477*d* to be out of contact from the drive transmission surface 474*h*, and the amount of retracting the engaged surface 477*h* can be reduced.

As a result, as compared with Embodiment 2 and Embodiment 3, downsizing is possible in the radial direction perpendicular to the rotational axis.

Embodiment 5

Next, a further embodiment will be described as Embodiment 5. In Embodiment 4, an example using a structure with a torque limiter inside the transmission release mechanism 575 has been explained, but, Embodiment 5 has a structure of a drive connecting portion using a transmission release mechanism 575 of another form. Here, the description of the same portions as those in the first and Embodiment 4s is omitted.

Here, in foregoing Embodiments 1 to 4, the transmission release mechanism (clutch) blocks the transmission of driving force inside the cartridge. On the contrary, in this embodiment, it is characterized in that the transmission of driving force is blocked in the boundary area (connection area) between the cartridge and the image forming apparatus.

[Structure of Drive Connecting Part]

Referring to FIGS. 32-37 a schematic structure of the drive connecting portion in Embodiment 5 will be described.

Figure 32:
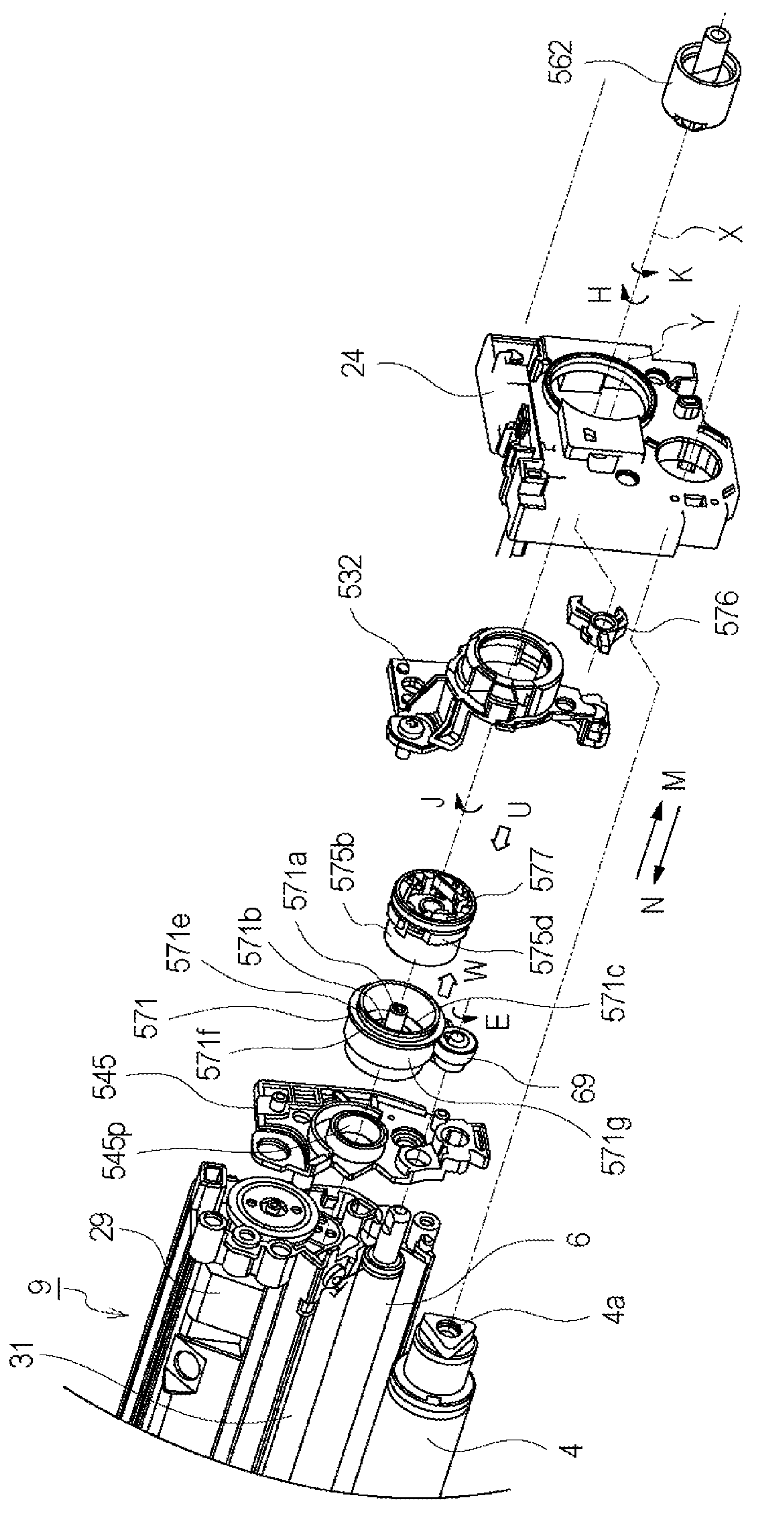
FIG. 32 is a perspective view of the process cartridge and the transmission release mechanism according to Embodiment 5.

FIG. 32 is a perspective view of the cartridge p and the transmission release mechanism 575 in this embodiment as viewed from the drive side.

Figure 33:
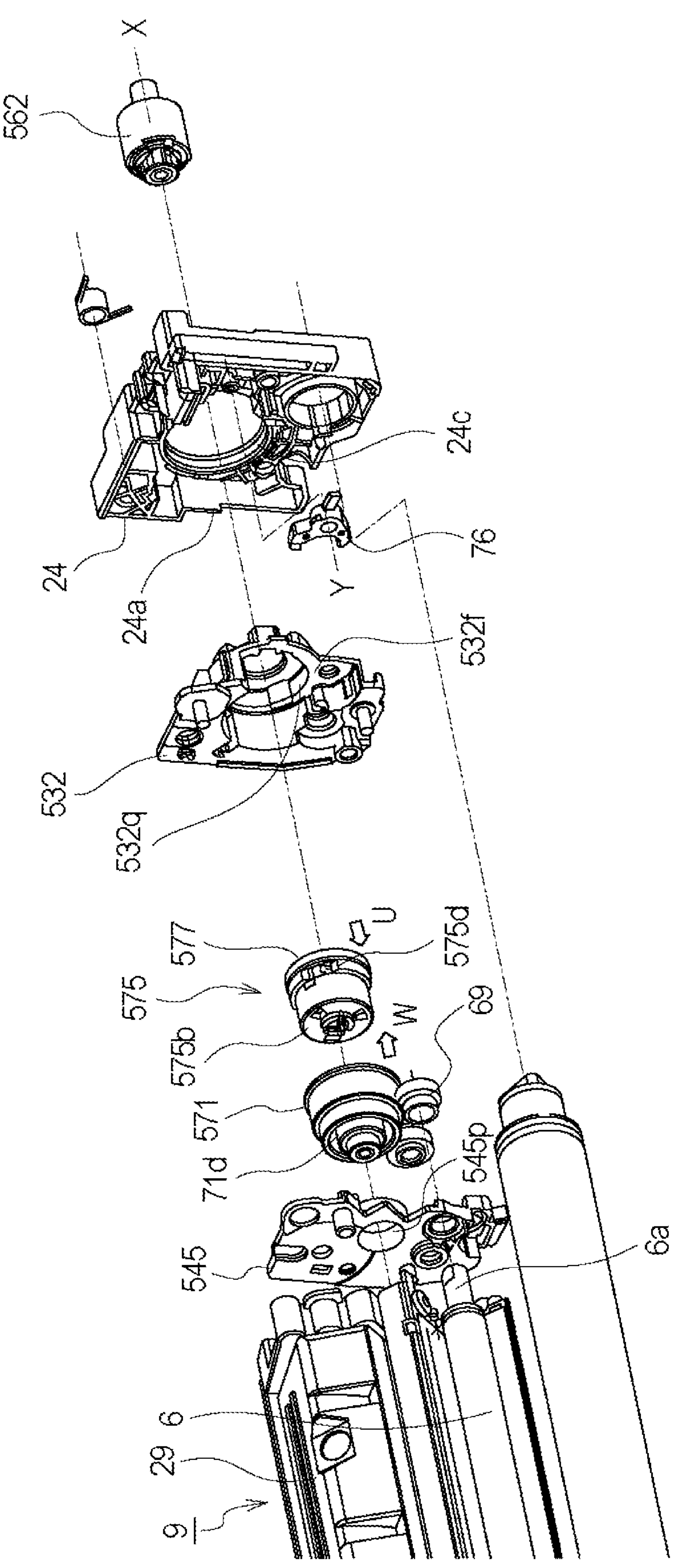
FIG. 33 is a perspective view of the process cartridge and the transmission release mechanism according to Embodiment 5.

FIG. 33 is a perspective view of the cartridge p and the transmission release mechanism 575 in this embodiment as viewed from the non-driving side.

Figure 34:
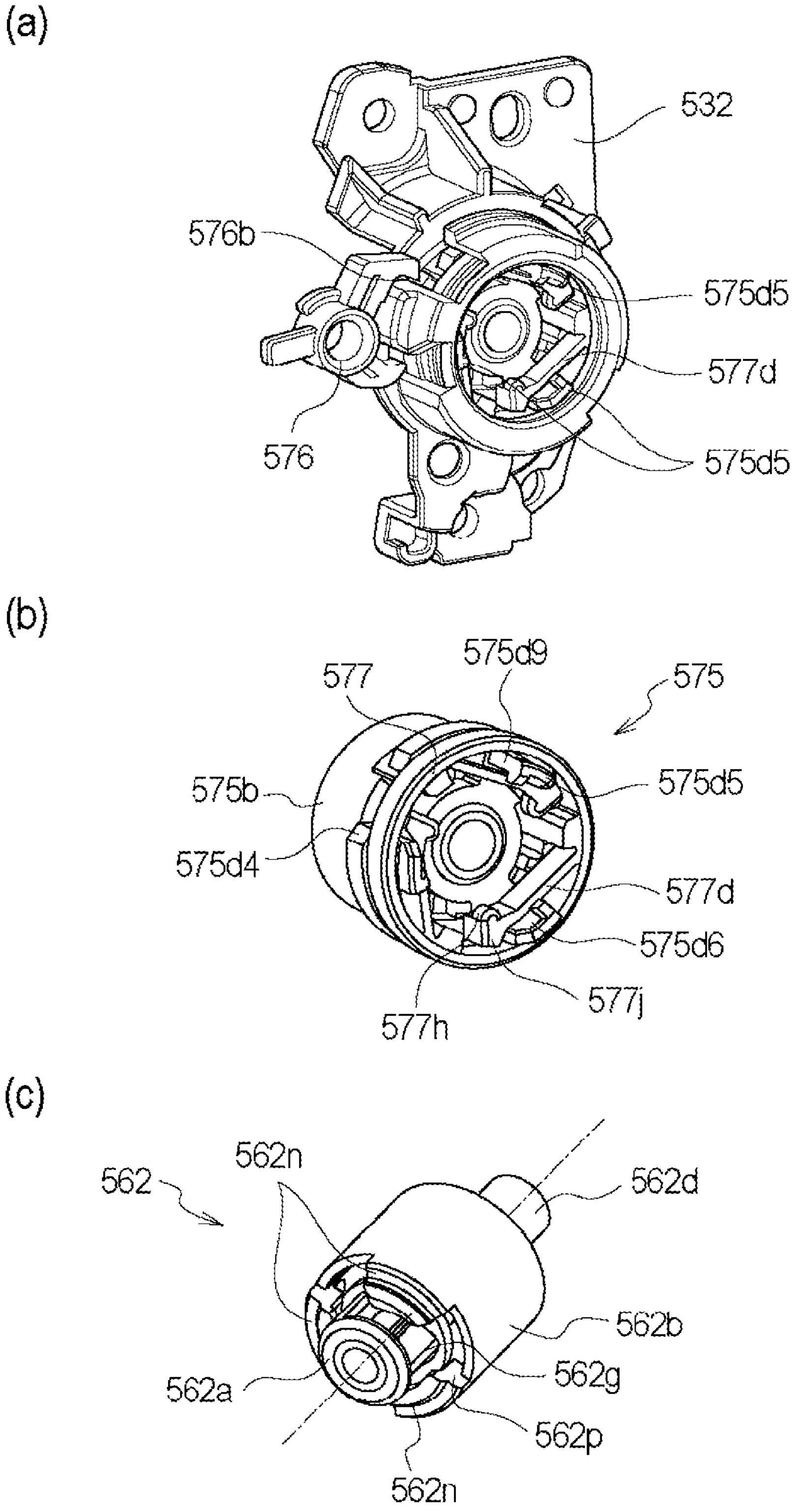
FIG. 34 is a perspective view of a control member, a transmission release mechanism, and a main assembly driving shaft according to Embodiment 5.

FIG. 34 is a perspective view illustrating the transmission release mechanism 575, the development cover member 532, the control member 576, and the main assembly driving shaft 562 in this embodiment.

Figure 35:
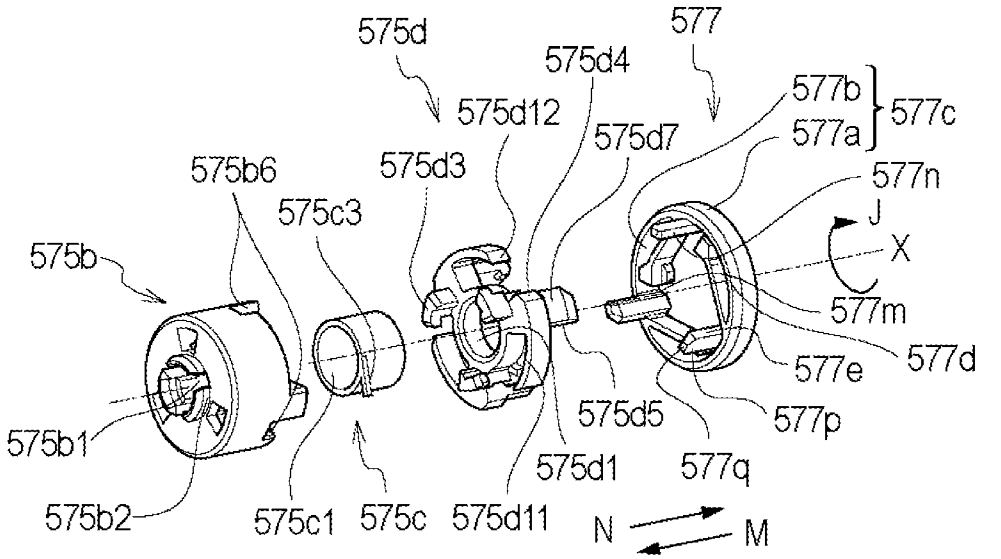
FIG. 35 is an exploded perspective view of the transmission release mechanism according to Embodiment 5.
Figure 35:
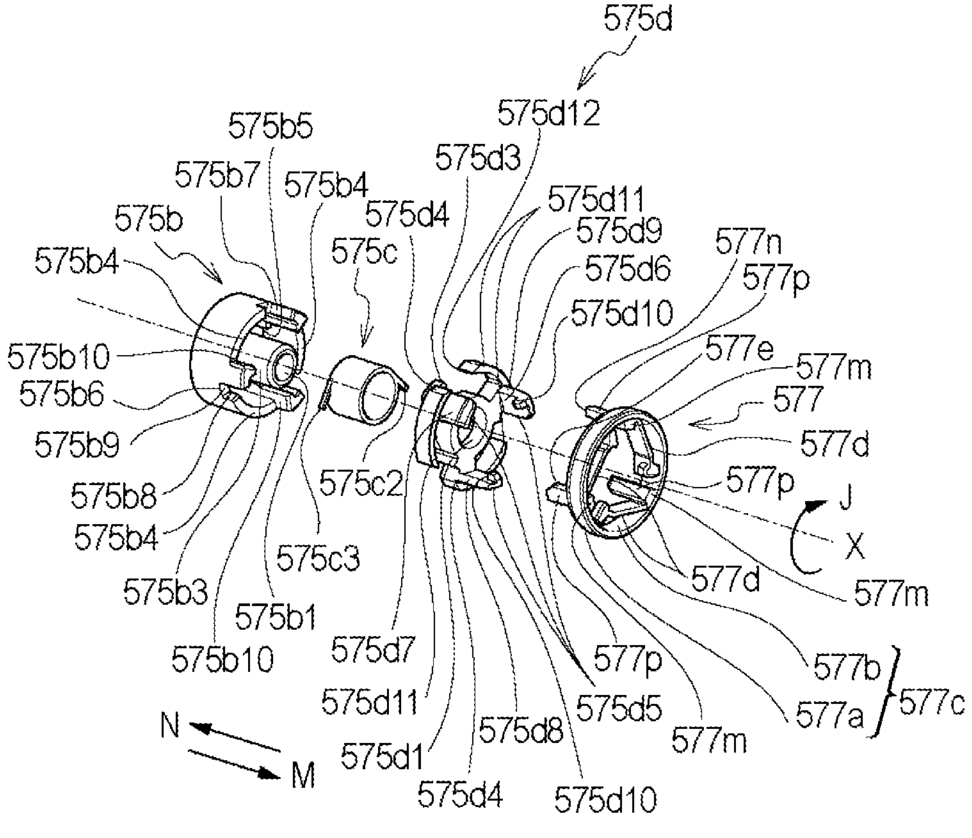

FIG. 35 shows a state in which the transmission release mechanism 575 is disassembled, wherein part (a) of FIG. 35 is an exploded perspective view as seen from the driving side, and part (b) of FIG. 35 is an exploded perspective view as seen from the non-driving side.

Figure 36:
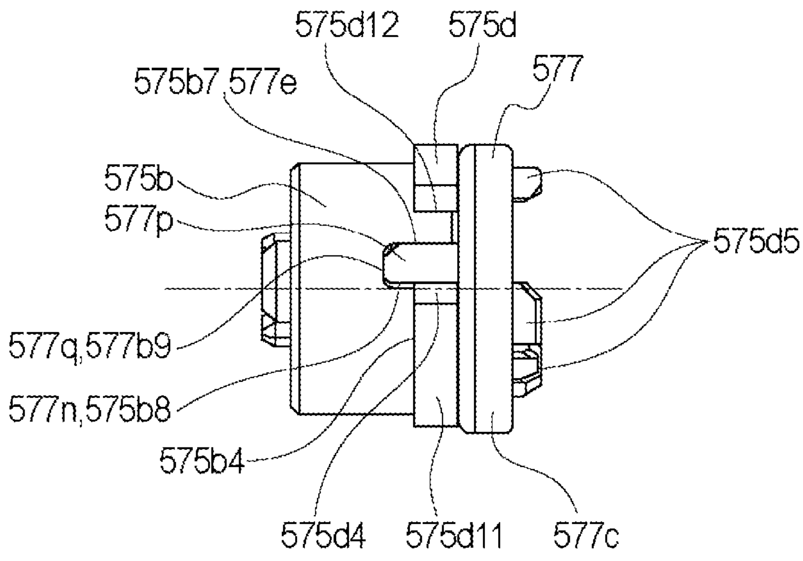
FIG. 36 is an illustration showing a transmission release mechanism according to Embodiment 5.
Figure 36:
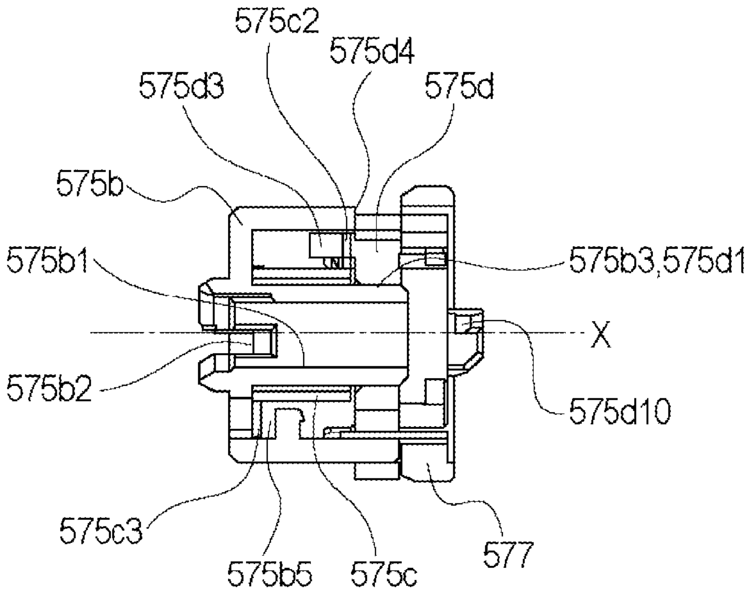

Part (a) of FIG. 36 is a side view of the transmission release mechanism 575, and part (b) of FIG. 36 is a cross-sectional view of the transmission release mechanism 575 taken along a plane passing through the rotational axis X.

Figure 37:
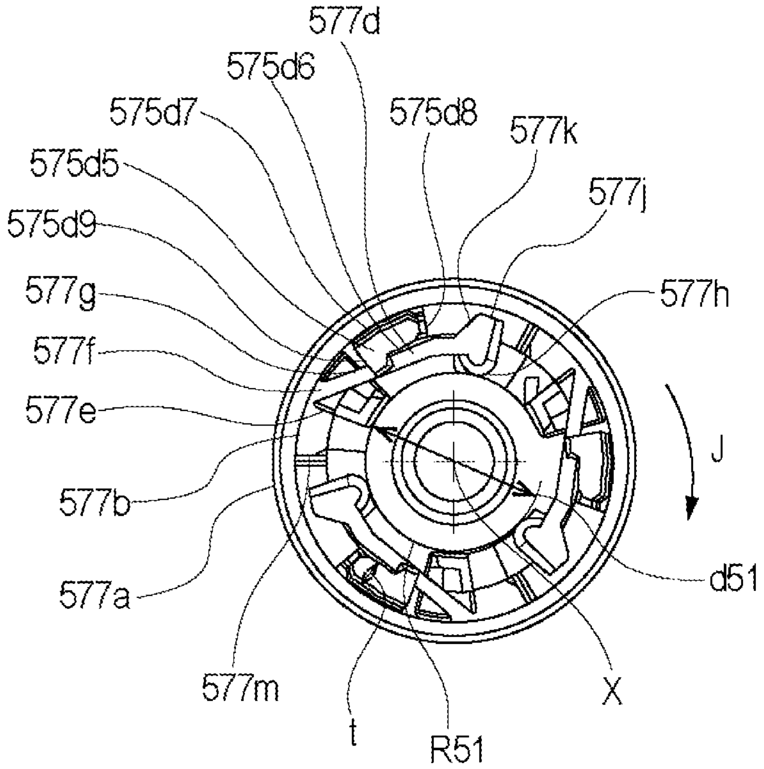
FIG. 37 is a front view from the drive side of the transmission release mechanism according to Embodiment 5.

FIG. 37 is a front view of the transmission release mechanism 575 as viewed from the drive side.

Between the bearing member 45 and the development cover member 532, there are provided a downstream transmission member (transmission gear) 571, an output member 575*b*, a return spring 575*c*, a control ring 575*d* as a rotation member, and a coupling member 577 as a first transmission member. The rotation axes X of these members are the same as the rotational center of the developing unit as in the above-described embodiment.

In the following, the transmission release mechanism 575 will be described. The transmission release mechanism 575 in this embodiment comprises a coupling member 577 as a first transmission member, a control ring 575*d*, an output member 575*b*, and a return spring (elastic member, urging member) 575*c*. in the developing unit 509, the structures except for the development cover member 532, the second drive transmission member 571, and the transmission release mechanism 575 are the same as those of Embodiment 4, and therefore, the description thereof is omitted.

Here, some of the portions described below have the same shape arranged at equal intervals in multiple locations, but in the Figure, only one reference sign is shown as a representative.

The coupling member 577 has a structure corresponding to the second transmission member 477 described in Embodiment 4, and has a shape similar to that of the second transmission member 477. That is, the coupling member 577 includes a cylindrical portion 577*c* having an outer diameter portion 577*a* and an inner diameter portion 577*b*, a drive relay portion 577*d*, an output member engagement portion 577*p*, and a rotation restricting end surface 577*m*. The output member engaging portion 577*p* is a partial annular rib extending from the cylindrical portion 577*c* in the direction of arrow N, and includes a drive transmission engaging portion 577*e*, a reverse restricted portion 577*n*, and an axially restricted portion 577*q*. That is, the output member engagement portion 577*p* is provided with a drive transmission engagement portion 577*e* on the circumferential end surface on the downstream side in the rotational direction J, a reverse restricted portion 577*n* on the circumferential end surface on the upstream side in the rotational direction J, and an axially restricted portion 577*q* on the end surface side. Here, the rotation regulating end surface 577*m* is a part of the same surface as the reverse restricted portion 577*n* and is provided on the cylindrical portion 577*c* side.

As shown in part (b) of FIGS. 37 and 34, the drive relay portion 577*d* has a fixed end (supporting portion 577*f*), an arm portion 577*g*, a first engaged surface 577*h* as a first driving force receiving surface, a driven connecting surface 577*j*, and an introduction surface 577*k*.

A space is formed in the coupling member 577 radially inward of the first engaged surface 577*h* (part (b) of FIG. 34). That is, the periphery of the axis of the coupling member 577 is open, and a driving shaft 562 of the image forming apparatus main assembly, which will be described hereinafter, can enter the inside of the coupling member 577.

Here, the shape of the drive relay portion 577*d* described below is similar to that of Embodiment 4. The supporting portion 577*f* is a connecting portion that is connected to the inner diameter portion 577*b* as one end side of the drive relay portion 577*d*, and is a fixed end of the drive relay portion 577*d*. The drive relay portion 577*d* has an arm portion 577*g* extending downstream in the rotational direction J from the fixed end (supporting portion 577*f*). The first engaged surface (first driving force receiving portion, engaging portion) 577*h* is provided radially inward near the free end, and the driven connecting surface 577*j* is provided radially outward near the free end. In addition, the introduction surface 577*k* is a slope connecting the driven connection surface 577*j* of the drive relay portion 577*d* and the arm portion 577*g* on the outer side in the radial direction. As described above, the drive relay portion 577*d* is a cantilever beam having the supporting portion 577*f* as a fulcrum. The drive relay portion 577*d* is a supporting portion (elastic member) that movably supports the first engaged surface 577*h*.

The drive relay portion 577*d* and the output member engaging portion 577*p* have substantially the same shape and are arranged at multiple locations, and in this embodiment, as an example, the coupling members 577 are arranged at three locations at equal intervals in the circumferential direction (120° intervals, approximately equal intervals).

The first engaged surface 577*h* has a partially arc shape. In the natural state in which the drive relay portion 577*d* does not receive a force from other portions, the diameter when the inscribed circle R51 is virtually drawn with respect to the arc shape of the three first engaged surfaces 577*h* d51.

As shown in part (a) of FIG. 35 and part (b) of FIG. 35, the control ring 575*d* includes one end side control ring supported portion 575*d*1, a return spring end locking portion 575*d*3, a locked portion 575*d*4 projecting radially in the outer diameter portion, and a guide portion 575*d*11, on the inner diameter side.

In addition, as shown in part (a) of FIG. 35 and part (b) of FIG. 35, the control ring 575*d* is provided with a partial annular rib-like drive connection control portion (hereinafter referred to as control portion) 575*d*5 projecting in the direction of arrow M at the end. As shown in FIG. 35, the control portion 575*d*5 has a drive coupling surface 575*d*6 which is a surface on the inner diameter side, and a coupling member support surface 575*d*7 which is a surface on the outer diameter side. Furthermore, it has a rotation restricted end surface 575*d*8 at the circumferential end surface on the downstream side in the rotational direction J, and a second engaged face 575*d*9 as a second driving force receiving face on the circumferential end surface at the upstream side in the rotational direction J. As described above, the drive connecting surface 575*d*6, the coupling member support surface 575*d*7, the rotation restricted end surface 575*d*8, and the second engaged surface 575*d*9 form a partial annular rib shape. In addition, at the end of the control portion 575*d*5, there is provided a retaining shape portion 575*d*10 extending inward in the radial direction.

Here, as shown in FIG. 37, the thickness of the control portion 575*d*5, that is, the distance from the drive connecting surface 575*d*6 to the coupling member support surface 575*d*7 is defined as the thickness t (specifically, the thickness t is set to 1.5 mm). The control portion 575*d*5 is arranged at a plurality of locations at equal intervals in the circumferential direction around the rotational axis X. In this embodiment, it is arranged at three positions (120° intervals, approximately equal intervals).

Figure 38:
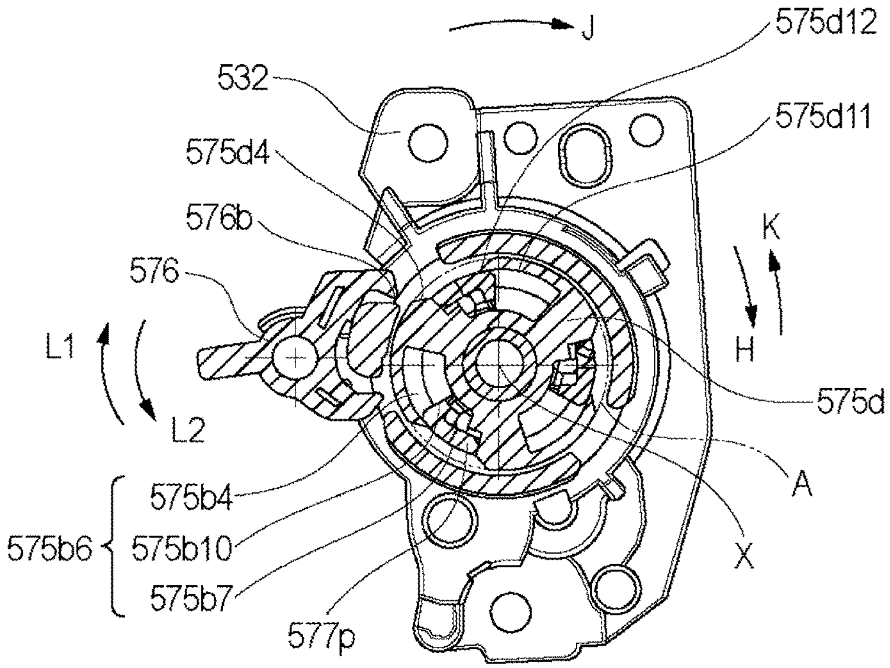
FIG. 38 is a cross-sectional view illustrating the positional relationship between the control member and the transmission release mechanism according to Embodiment 5.
Figure 38:
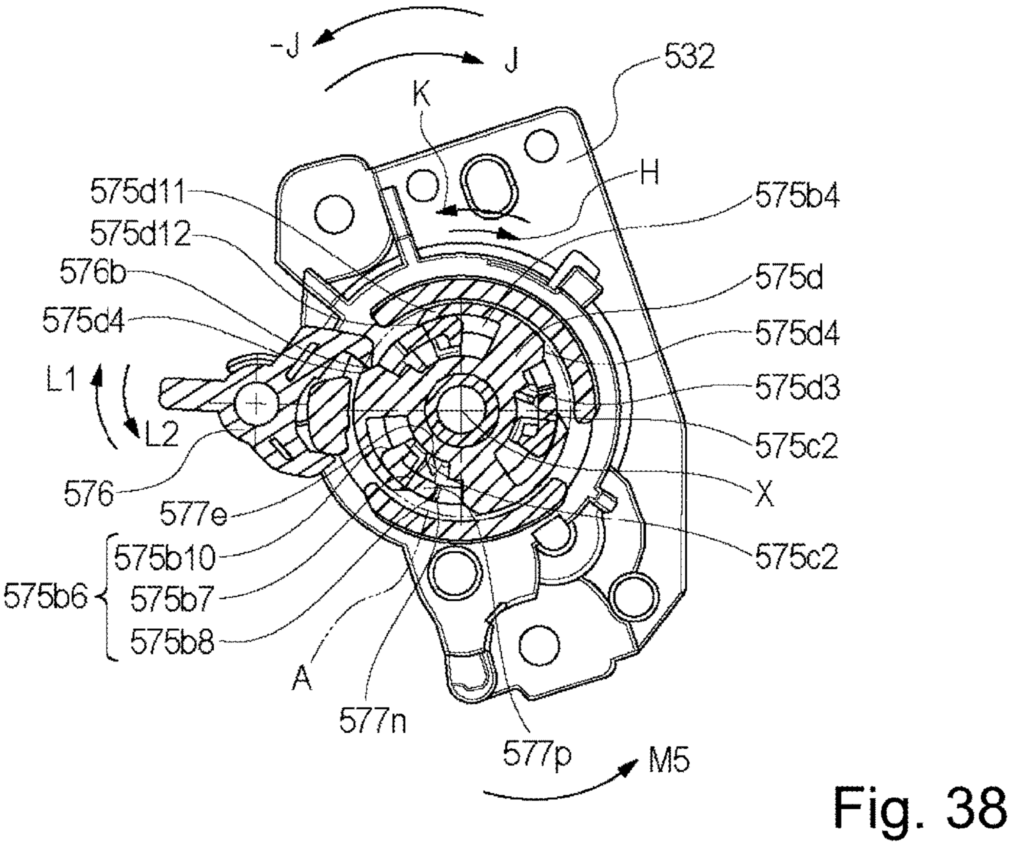

Part (a) of FIG. 38 and part (b) of Figure are sectional views as seen from the drive side, taken along a plane which passes through the positions of the locked portion 575*d*4 and the guide portion **575*d*11 and is perpendicular to the rotational axis X. Part (a) in FIG. 38 shows a state in which the control member 576 is placed at the first position which allows the control ring 575*d* to rotate, and, the control ring 575*d*** is in the first rotational position which is the position in the drive transmission state.

Part (b) of FIG. 38 shows a state in which the control member 576 is in the second position, and the control member 576 locks the locked portion **575*d*4 of the control ring 575*d*, and the control ring 575*d*** is in the second rotational position, which is the position in the drive blocking state.

The guide portion **575*d*11 is a rib which extends circumferentially from the locked portion 575*d*4 toward the upstream side in the rotational direction J on substantially the same radius of the locked portion 575*d*4, and the free end on the free end side of the guide portion 575*d*11 functions as a guide portion free end portion 575*d*12**.

The locked portion **575*d*4 and the guide portion 575*d*11** are arranged at three locations (120° intervals, approximately equal intervals) at equal intervals in the circumferential direction around the rotational axis X.

Then, the relationship between the components constituting the transmission release mechanism 575 will be described in detail while explaining the structure of the output member **575*b* and the return spring 575*c***.

The output member **575*b* will be described. As shown in part (a) of FIG. 35 and part (b) of Figure the output member 575*b* includes an engagement hole 575*b*1, an engagement groove 575*b*2, a control ring engagement shaft 575*b*3, a control ring axial direction restriction surface (hereinafter simply referred to as restriction surface) 575*b*4, a return spring end other end side locking portion 575*b*5, a coupling engagement portion 575*b*6**.

A coupling engagement portion **575*b*6 shown in part (b) of FIG. 35 has the drive transmission engaged surface 575*b*7, the reverse restriction surface 575*b*8, the axial direction restriction surface 575*b*9, and the rotational direction front end surface 575*b*10. Specifically, the shape of the coupling engagement portion 575*b*6 will be described. A ring rib shape extends in the direction of the arrow M in the axial direction so as to connect to the regulating surface 575*b*4 in a certain phase. This annular rib shape is provided with a rotational direction front end surface 575*b*10 on the downstream side in the rotational direction J, and is provided with a drive transmission engaged surface 575*b*7 on the upstream side in the rotational direction J. Furthermore, the drive transmission engaged surface 575*b*7 extends in the direction of the arrow N in the axial direction from the restriction surface 575*b*4, and a recess is formed between the reverse transmission restriction surface 575*b*8 disposed upstream of the drive transmission engaged surface 575*b*7 in the rotational direction J. The axial direction regulating surface 575*b*9 is the bottom surface of the recess, and is disposed between the drive transmission engaged surface 575*b*7 and the reverse regulating surface 575*b*8. And, the inversion restricting surface 575*b*8 is connected to the restricting surface 575*b*4** in the next phase, and is arranged at three locations with substantially the same shape and at equal intervals in the circumferential direction.

The coupling engaging portion **575*b*6 is engaged with the output member engaging portion 577*p* of the coupling member 577. Part (b) of FIG. 36 shows an engagement portion between the coupling engagement portion 575*b*6 and the output member engagement portion 577*p*. The drive transmission engaged surface 575*b*7 is a driving force receiving portion for engaging with the driving transmission engaging portion 577*e* of the coupling member 577 to receive the driving force of the coupling member 577. In addition, the reverse regulating surface 575*b*8 engages with the reverse restricted portion 577*n* of the coupling member 577 to restrict the coupling member 577 from rotating in the rotational direction –J. as shown in part (a) of FIG. 36, in the axial direction, the axial direction regulating surface 575*b*9 faces the axial direction restricted portion 577*q* of the coupling member 577 to restrict the axial position of the coupling member 577**.

As described above, the output member **575*b* and the coupling member 577 are engaged in the rotational direction, and can rotate integrally with each other. The output member 575*b* can also be regarded as a part of the coupling member 577**.

In addition, when the output member **575*b* and the coupling member 577 rotate integrally, the output member engaging portion 577*p* and the coupling engaging portion 575*b*6 are rotated with the rotational direction front end surface 575*b*10 (part (b) of FIG. 35, FIG. 38**) at the leading side.

Next, the relationship between the control ring **575*d*, the output member 575*b*, and the coupling member 577** will be described.

As shown in part (b) of FIG. 36, the control ring **575*d* is rotatably supported at one end side by a control ring engaging shaft 575*b*3 of the output member 575*b* in the one end side control ring supported portion 575*d*1. In addition, the control portion 575*d*5 projecting toward the arrow M direction at the end of the control ring 575*d* is, as shown in FIG. 37, a coupling member support surface 575*d*7, which is a surface on the outer diameter side, is rotatably engaged with an inner diameter portion 577*b* of the coupling member 577. Here, also in this embodiment, the drive relay portion 577*d* and the control portion 575*d*5 are provided at three locations, respectively, but, each is arranged so as to be relative to each other. In addition, as will be described hereinafter, also in this embodiment, the control ring 575*d* can be moved relative to the coupling member 577 about the rotational axis X, and the relative position between the control ring 575*d* and the coupling member 577 is changed depending on the switching between the drive blocking state and the drive transmission state. That is, also in this embodiment, the control ring 575*d*** can move between the first position (first rotation position) in the drive transmission state and the second position (second rotation position) in the drive blocking state.

As shown in part (a) of FIG. 36 and part (b) of FIG. 36, the locked portion **575*d*4 and the guide portion 575*d*11 in the control ring 575*d* are disposed between the regulating surface 575*b*4 of the output member 575*b* and the cylindrical portion 577*c* of the coupling member 577 in the axial direction. The output member engaging portion 577*p* of the coupling member 577 and a coupling engaging portion 575*b*6 of the output member 575*b* are arranged on the radially inner side of the guide portion 575*d*11. In addition, the rotational direction front end surface 575*b*10 of the coupling engagement portion 575*b*6 of the output member 575*b* is in a state where the control ring 575*d* is covered with the guide portion 575*d*11 at either the first rotational position or the second rotational position. That is, the rotational direction front end surface 575*b*10 is disposed downstream of the guide portion front end portion 575*d*12** in the rotational direction J.

Referring to part (a) in FIG. 35, part (b) in FIG. 35, part (b) in FIG. 36, and part (b) in FIG. 38 the return spring (elastic member) 575*c* will be described. As shown in FIG. 35, the return spring 575*c* is a torsion coil spring.

As shown in part (b) of Figure the coil portion 575*c*1 is supported by the control ring engagement shaft 575*b*3 of the output member 575*b*. One end arm 575*c*2 of the return spring 575*c* engages with the return spring end locking portion 575*d*3 of the control ring 575*d*, and the other end arm 575*c*3 engages with the return spring end other end locking portion 575*b*5 of the output member 575*b*. For this reason, as shown in FIG. 37, the return spring 575*c* acts between the output member 575*b* and the control ring 575*d*, and applies a moment M5 in the direction of the arrow K about the rotational axis X to the control ring 575*d*. the moment M5 in the direction of arrow K by this return spring 575*c* acts on the control ring 575*d*, such that the control portion 575*d*5 of the control ring 575*d* is moved to the retracting side from the driven connecting surface 577*j* of the coupling member 577. As a result, when the external force is not applied to the control ring 575*d*, the control ring 575*d* is in the second position (second rotational position), and therefore, the drive connection control portion 575*d*5 is in the state of being retracted from the driven connection surface 577*j*.

In this embodiment, as an example of the embodiment, the transmission release mechanism 575 is unitized to improve assemblability. Therefore, as shown in part (b) of FIG. 36, at the other end side locking portion 575*b*5 of the return spring end of the output member 575*b*, the other end side arm portion 575*c*3 of the return spring 575*c* is locked in the axial direction. And, the control ring 575*d* is locked in the axial direction by the one end side arm portion 575*c*2 of the return spring 575*c*, and the drive relay portion 577*d* of the coupling member 577 is locked in the axial direction by the retaining shape portion 575*d*10 of the control ring 575*d*.

Next, the relationship between the transmission release mechanism 575, the downstream transmission member 571, and the development cover member 532 will be described.

The downstream transmission member (transmission gear) 571 is the same as in Embodiment 4 except for the structure inside the cylinder shown in FIG. 32, and opposite ends thereof are rotatably supported by the bearing member 545 and the development cover member 532. In addition, the structure inside the cylinder is the same as that of Embodiment 1, and an engagement shaft (shaft portion) 571 is provided on the rotational axis X, and the engagement rib 571*b* extending radially from an engagement shaft 571*a*, and a longitudinal contact end surface 571*c* which contacts 575 are provided.

In the transmission release mechanism 575, the engaged hole portion 575*b*1 of the output member 575*b* is engaged with the engagement shaft 571*a*, and is supported coaxially with respect to the downstream transmission member 571 at the rotational axis X.

In the transmission release mechanism 575, an outer diameter portion 577*a* of the coupling member 577 is rotatably supported by an inner diameter portion 532*q* of the development cover member 532. That is, opposite ends of the transmission release mechanism 575 are supported by the development cover member 532 and the downstream transmission member 571, coaxially with the rotational axis X.

In addition, the engagement rib 571*b* of the downstream transmission member 571 is inserted in the engagement groove 575*b*2 of the transmission release mechanism 575. By this, when the transmission release mechanism 575 rotates, the driving force can be transmitted to the downstream transmission member 571. That is, the engagement rib 571*b* is a driving force receiving portion for receiving the driving force.

As described above, the transmission release mechanism 575 is supported by the rotational axis X in the developing unit 509 and the cartridge P. The transmission release mechanism 575 obtains a driving force from the main assembly driving shaft 562 provided in the apparatus main assembly 2 by way of the coupling member 577 as the first transmission member when mounted in the apparatus main assembly 2.

This coupling member 577 is constituted to be connectable to and disengageable from the main assembly driving shaft 562 of the apparatus main assembly 2.

[Structure of Main Assembly Driving Shaft]

Figure 39:
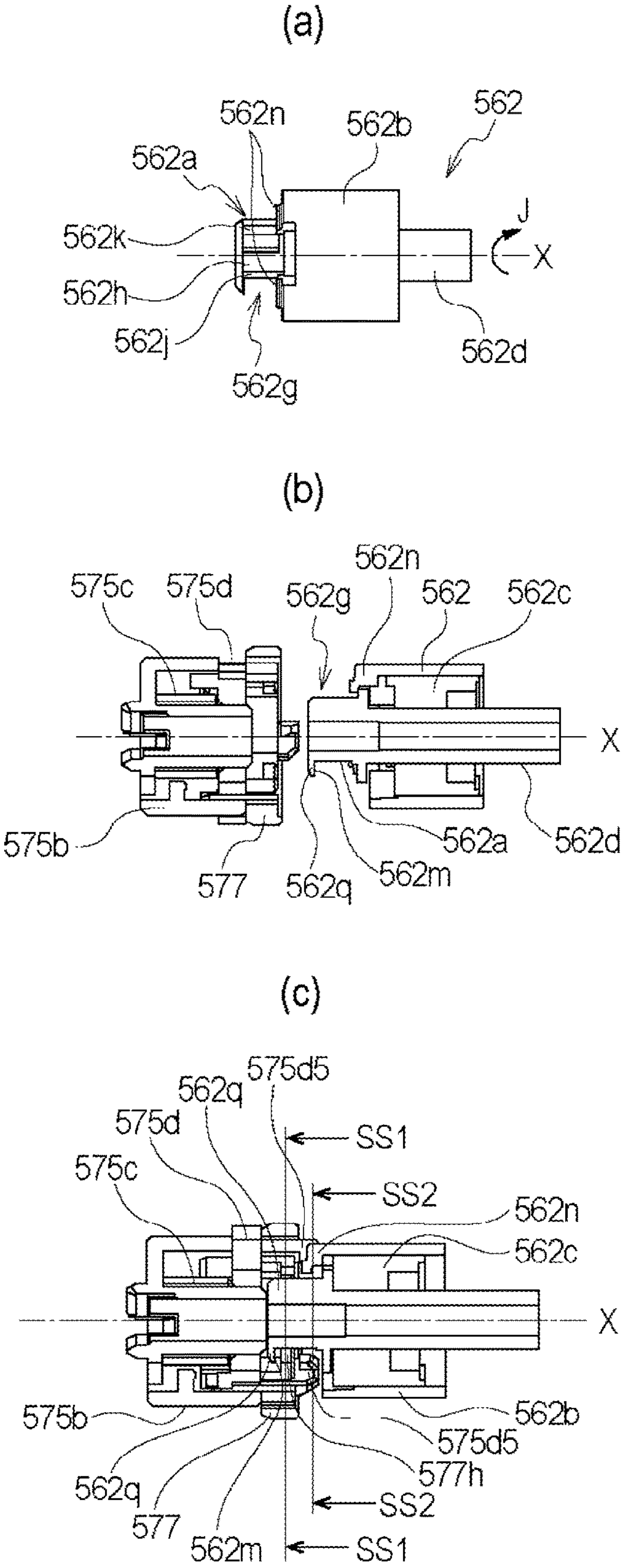
FIG. 39 is an illustration showing the relationship between the transmission release mechanism and the main assembly driving shaft according to Embodiment 5.

The coupling member 577 as the first transmission member is engaged with the main assembly driving shaft 562 shown in FIGS. 33 and 34, part (c), and FIG. 39, and receives the driving force from a drive motor (not shown) provided in the apparatus main assembly 2. Here, referring to FIG. 33, the structure of the main assembly driving shaft 562 will be described.

Part (c) of FIG. 34 is a perspective view of the main assembly driving shaft 562, and part (a) of FIG. 39 is an external view of the main assembly driving shaft 562. Part (b) of FIG. 39 is a cross-sectional view taken along the rotational axis X (rotational axis) in a state of being mounted in the image forming apparatus main assembly and before the transmission release mechanism 575 and the main assembly driving shaft 562 are engaged with each other. Part (c) in FIG. 39 is a cross-sectional view taken along the rotational axis X (rotational axis) in a state of being mounted in the image forming apparatus main assembly and the transmission release mechanism 575 and the main assembly driving shaft 562 are engaged with each other.

As shown in part (b) of FIG. 39, the main assembly driving shaft 562 includes a first output member (first main assembly side coupling) 562*a*, a second output member (second main assembly side coupling) 562*b*, and a torque limiter 562*c*. These are arranged coaxially. In addition, the main assembly driving shaft 562 is disposed substantially coaxially with the rotational axis X of the coupling member 577 functioning as the first transmission member.

The main assembly driving shaft 562 is connected to a drive motor (not shown) and rotates with a driving force. In addition, the first output member 562*a* is constituted integrally with the upstream driving shaft 562*d* to transmit the driving force. Next, the second output member 562*b* is connected to a torque limiter 562*c*, and the torque limiter 562*c* is mounted to the upstream driving shaft 562*d*. That is, the second output member 562*b* is connected to the upstream driving shaft 562*d* by way of a torque limiter 562*c*. Therefore, the second output member 562*b* rotates integrally with the upstream driving shaft 562*d* up to a predetermined torque, and can rotate relative to the upstream driving shaft 562*d* when the torque exceeds a predetermined level.

The detailed shape of the first output member 562*a* which transmits drive to the first transmission member will be described.

Figure 40:
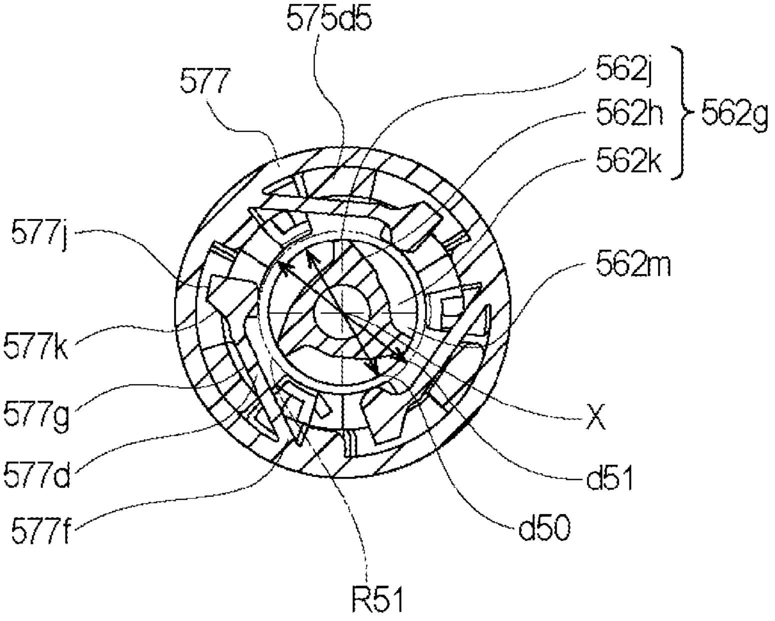
FIG. 40 is a cross-sectional view illustrating the relationship between the transmission release mechanism and the main assembly driving shaft according to Embodiment 5.
Figure 40:
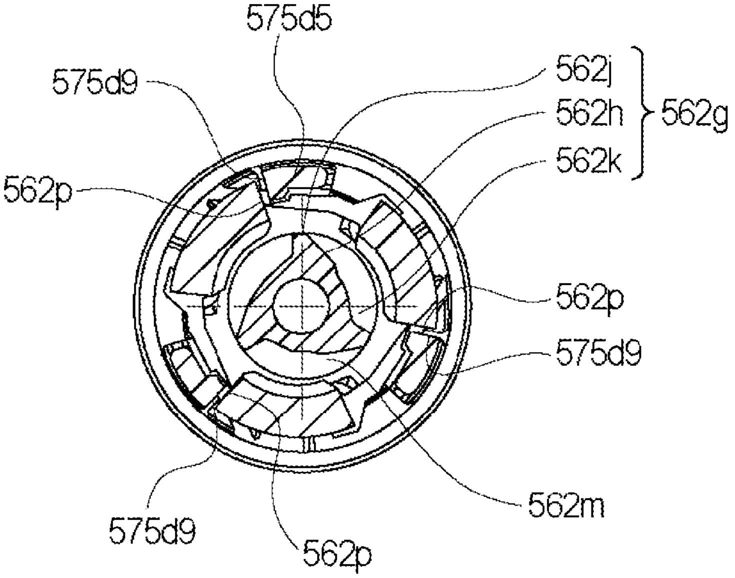

Part (a) of FIG. 40 is a cross-sectional view, taken along a plane perpendicular to the rotational axis X in SS2 shown in part (c) of FIG. 39, of the first output member 562*a*, the second output member 562*b*, the control member 575*d*5 of the control ring 575*d* and the coupling member 577.

Part (b) of FIG. 40 is a cross-sectional view, taken along a plane perpendicular to the rotational axis X in SS1 shown in part (c) of FIG. 39, of the first output member 562*a*, the second output member 562*b*, the control portion 575*d*5 of the control ring 575*d*.

As shown in part (b) of FIG. 39, the first output member 562*a* includes a drive transmission engaging portion 562*g* in the form of a projection which projects toward the cartridge side along the rotational axis.

As shown in part (a) of FIG. 40, the drive transmission engagement portion 562*g* has a drive transmission surface 562*h*, an outer peripheral portion 562*j*, and a retracting portion 562*k*. And, the rotational driving force received from the motor is transmitted to the coupling member 577 as the first transmission member on the cartridge P side by way of the drive transmission surface 562*h* provided in the drive transmission engagement portion 562*g*.

More specifically, the drive transmission engaging portion 562*g* is a projection form polygonal column, and has three drive transmission surfaces 562*h* in accordance with the number of drive relay portions 577*d* provided in the coupling member 577. The drive transmission engagement portion 562*g* has a similar structure to the drive transmission engagement portion 474*g* (part (a) of FIG. 29, and so on) of Embodiment 4.

A drive transmission surface 562*h* is connected to the drive transmission engagement portion 562*g* from the outer peripheral portion 562*j* toward the downstream side in the rotational direction J, and a retracting portion 562*k* is provided on the downstream side in the rotational direction J from the drive transmission surface 562*h*. The outer peripheral portion 562*j* is a portion of the circumscribed circle R50 of the polygonal column, and the diameter thereof is d50.

In addition, the first output member 562*a* has a retaining flange 562*q* at the end on the cartridge P side along the rotational axis. The diameter of the retaining flange 562*q* is d50, which is the same as the diameter of the outer peripheral portion 562*j*. That is, the retaining flange 562*q* is formed by connecting the outer peripheral portions 562*j* of partial arc shapes, in the circumferential direction into a circular shape. By providing the retaining flange 562*q* at the end of the first output member 562*a*, a retaining surface 562*m* that connects the retaining flange 562*q* and the drive transmission engaging portion 562*g* is provided.

Next, detailed shape of the second output member 562*b* which transmits drive to the control ring will be described. As shown in part (a) of FIG. 39 and part (b) of FIG. 39, the second output member 562*b* is coaxial with the first output member 562*a* and is disposed on the outer side in the radial direction than the first output member 562*a*. The second output member 562*b* includes an annular rib-shaped second drive transmission portion 562*n* projecting toward the cartridge P side along the rotational axis. As shown in part (b) of FIG. 40, a second drive transmission surface 562*p* is provided on the downstream side in the rotational direction J of the second drive transmission portion 562*n*. The second drive transmission surface 562*p* transmits the drive to the second engaged surface 575*d*9 as the second drive force receiving surface (second drive force receiving portion) of the cartridge P.

The second drive transmission portion 562*n* is provided at three positions matching the number of the second engaged surfaces 575*d*9 provided a control ring 575*d*. The second output member 562*b* is connected to the torque limiter 562*c* as described above, and rotates in interrelation with the torque limiter 562*c*.

[Mounting of Cartridge P in the Main Assembly]

Next, an engagement state between the main assembly driving shaft 562 and the transmission release mechanism 575 when the cartridge P (PY, pM, pC, pK) is mounted in the apparatus main assembly 2 will be described.

When the front door 3 (FIG. 2) is closed after the cartridge P is mounted on the apparatus main assembly 2, the main assembly driving shaft 562 moves from the part (b) in FIG. 39 to the part (c) in FIG. 37, in interrelation with the closing of the front door 3.

At this time, as explained in conjunction with FIG. 37, in the state before the transmission release mechanism 575 is mounted to the apparatus main assembly 2, by the action of the return spring 575*c*, the control ring 575*d* is in the second rotational position, and the control portion 575*d*5 is retracted from the driven connecting surface 577*j*.

That is, as shown in part (a) of FIG. 40, the drive relay portion 577*d* of the coupling member 577 is in a natural state in which no force is received from other components, and the inscribed circle R51 formed by the three first engaged surfaces 577*h* has a diameter d51.

On the contrary, the diameter d50 at the outer peripheral portion 562*j* of the drive transmission portion engaging portion 562*g* satisfies d50<d51 as follows. More specifically, the diameter d51 is 9.6 mm and the diameter d50 is 8 mm.

As described above, the diameter d51 of the inscribed circle R51 formed by the three first engaged surfaces 577*h* of the coupling member 577 is larger than the diameter d51 of the drive transmission portion engaging portion 562*g* of the main assembly driving shaft 562. By this, as the cartridge P is inserted into the apparatus main assembly 2, the main assembly driving shaft 562 enters the coupling member 577, and the main assembly driving shaft 562 and the coupling member 577 can be engaged with each other.

In the following, referring to FIG. 38 through FIG. 45, the relationship between the transmission release mechanism 575 and the main assembly driving shaft 562 will be described in detail. The description will be made as to the positional relationship between control ring 575*d*, coupling member 577, and main assembly driving shaft 562 for each state and operation in the drive blocking state, the drive transmission operation, the drive transmission state, the drive blocking operation, and so on.

Part (a) in FIG. 38 shows a state in which the control member 576 is placed in the first position which allows the control ring 575*d* to rotate, and the control ring 575*d* is located at the first rotational position which is a position in the drive transmission state. When the control member 576 is in the first position, the contact surface 576*b* of the control member 576 is placed outside the rotation locus A (two-dot chain line) of the locked portion 575*d*4 of the control ring 575*d* and is away from the transmission release mechanism 575.

Next, part (b) of FIG. 38 shows a state in which the control member 576 is in the second position, and the control member 576 locks the locked portion 575*d*4 of the control ring 575*d*, and the control ring 575*d* is in the second rotational position which is the drive blocking state.

When the control member 576 is in the second position, the contact surface 576*b* of the control member 576 is placed inside the rotation locus A (two-dot chain line) of the locked portion 575*d*4 of the control ring 575*d*. Therefore, the contact surface 576*b* of the control member 576 locks the locked portion 575*d*4 of the control ring 575*d* and tends to restrict the rotation of the control ring 575*d*.

Figure 42:
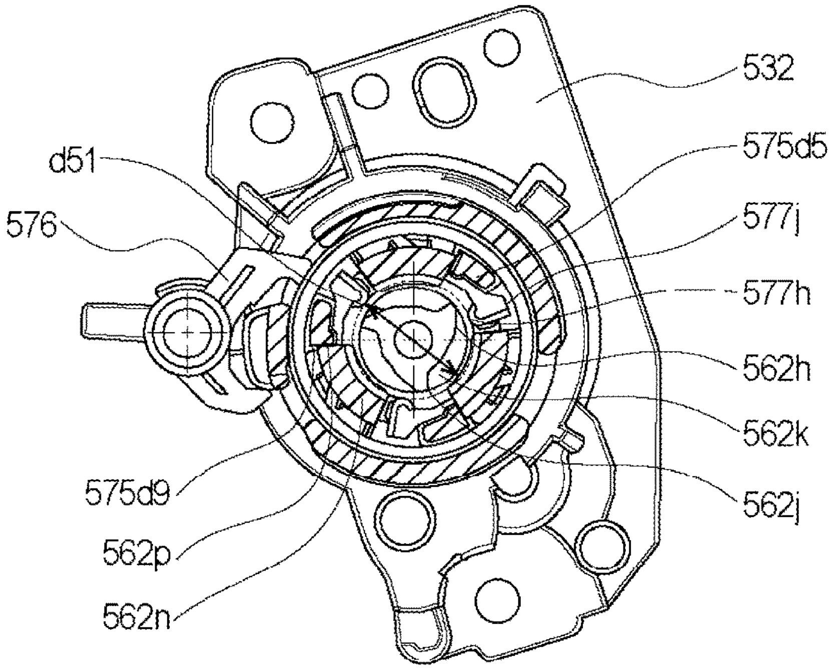
FIG. 42 is a cross-sectional view illustrating the relationship among the control member, the transmission release mechanism, and the main assembly driving shaft according to Embodiment 5.
Figure 42:
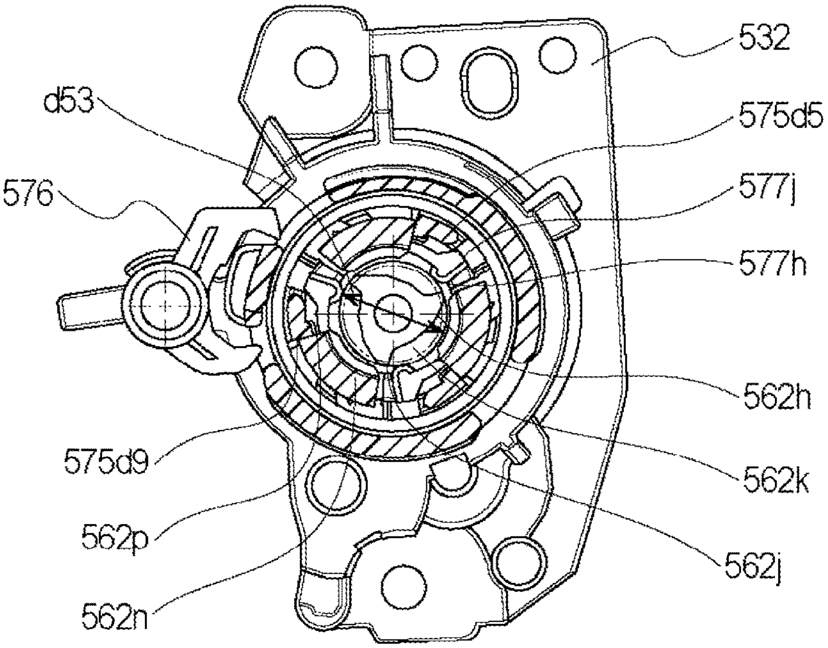
Figure 43:
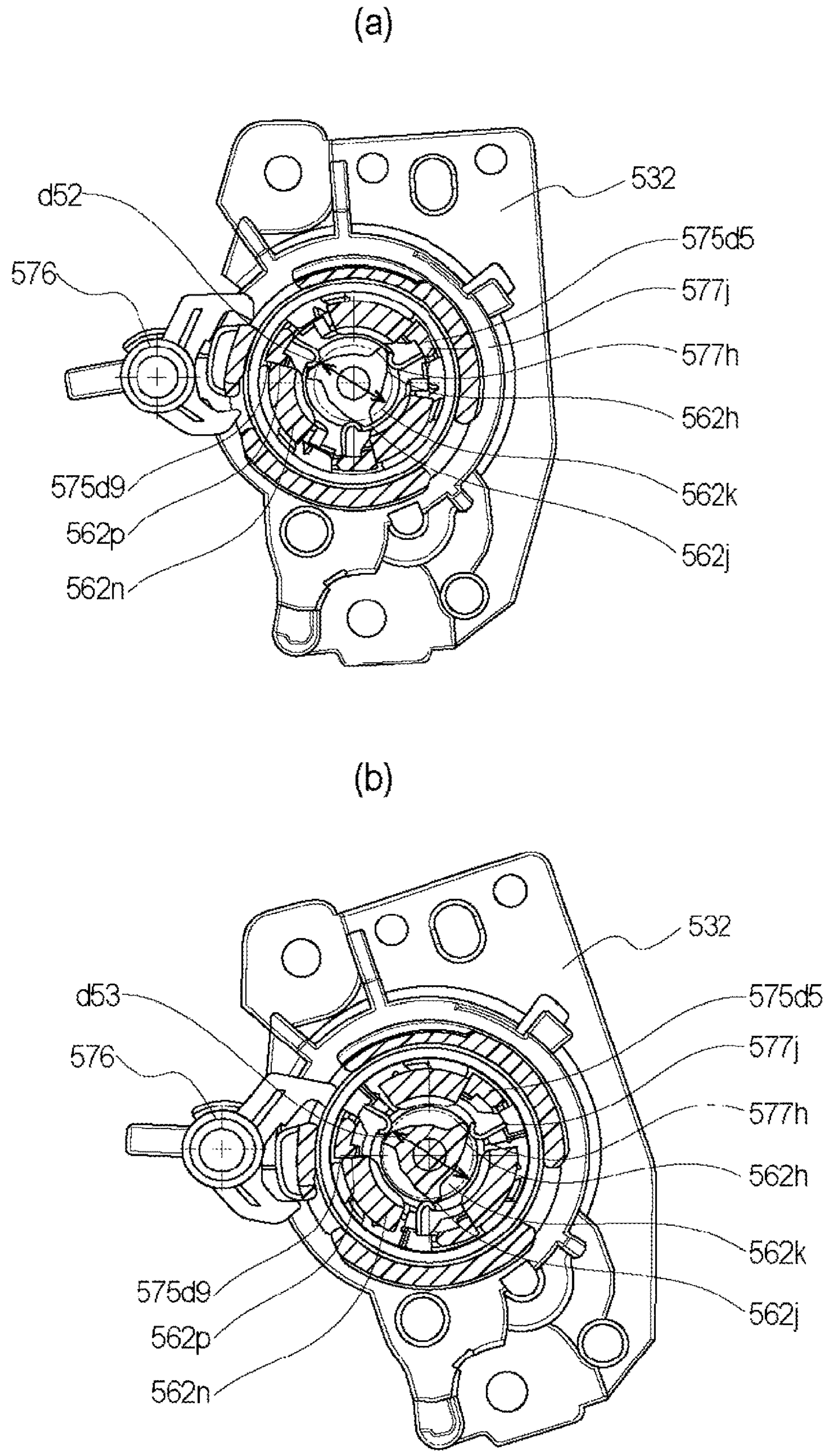
FIG. 43 is a cross-sectional view illustrating the relationship between the control member, the transmission release mechanism, and the main assembly driving shaft according to Embodiment 5.

FIGS. 42 and 43 show the transmission release mechanism 575, the development cover member 532, the control member 576, and the main assembly driving shaft 562, and show the positional relationships of the components in each state.

Part (a) in FIG. 42 shows the drive blocking state, in which the control member 576 is in the second position, and the control ring 575*d* is in the second rotational position. At this time, as shown in part (b) of FIG. 38, the contact surface 576*b* of the control member 576 is in a state of being in contact with the locked portion 575*d*4 of the control ring 575*d*.

Part (b) of FIG. 42 shows one state in the drive transmission operation in which the control member 576 is in the first position, and the control ring 575*d* is in one state when moving from the second rotation position to the first rotation position. At this time, as shown in part (a) of FIG. 38, the contact surface 576*b* of the control member 576 is in this state in which the control ring 575*d* is retracted from the locked portion 575*d*4.

Part (a) of FIG. 43 shows the drive transmission state in which the control member 576 is in the first position, and the control ring 575*d* is in the first rotational position. At this time, as shown in part (a) of FIG. 38, the contact surface 576*b* of the control member 576 is in the control ring 575*d* is retracted from the locked portion 575*d*4.

Part (b) of FIG. 43 shows one state in the drive blocking operation in which the control member 576 is in the second position, and the control ring 575*d* is in one state when moving from the first rotation position to the second rotation position. At this time, as shown in part (b) of FIG. 38, the contact surface 576*b* of the control member 576 is in a state of being in contact with the locked portion 575*d*4 of the control ring 575*d*.

In the following, the detailed state will be described in order.

[Drive Blocking State 1]

Immediately after the cartridge P is mounted on the apparatus main assembly 2, the transmission release mechanism 575 is in a drive blocking state as shown in part (a) of FIG. 40. The description will be made in detail.

Immediately after the cartridge P is mounted on the apparatus main assembly 2 description will be made as to two phases of the main assembly driving shaft 562 and the transmission release mechanism 575.

Figure 41:
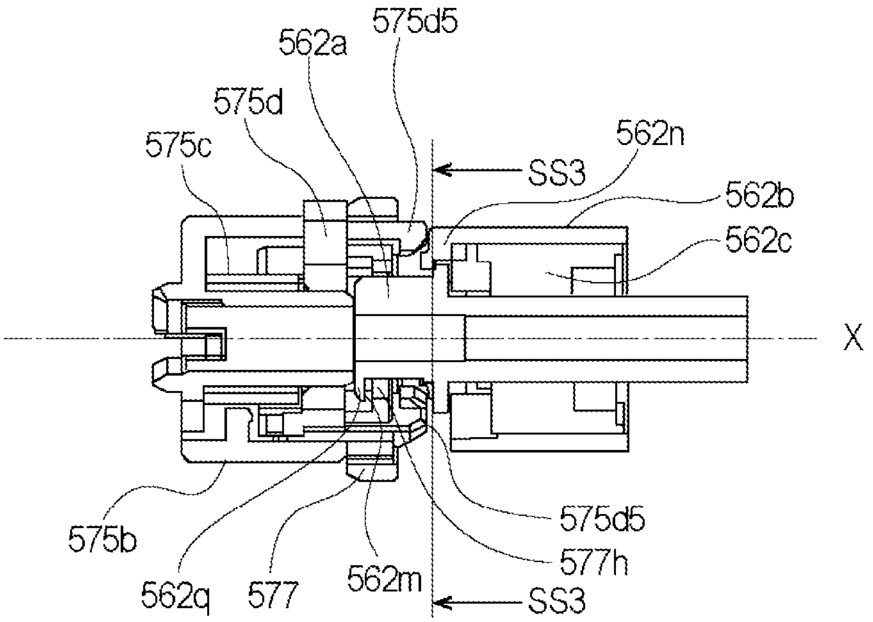
FIG. 41 is a cross-sectional view illustrating the relationship between the transmission release mechanism and the main assembly driving shaft according to Embodiment 5.
Figure 41:
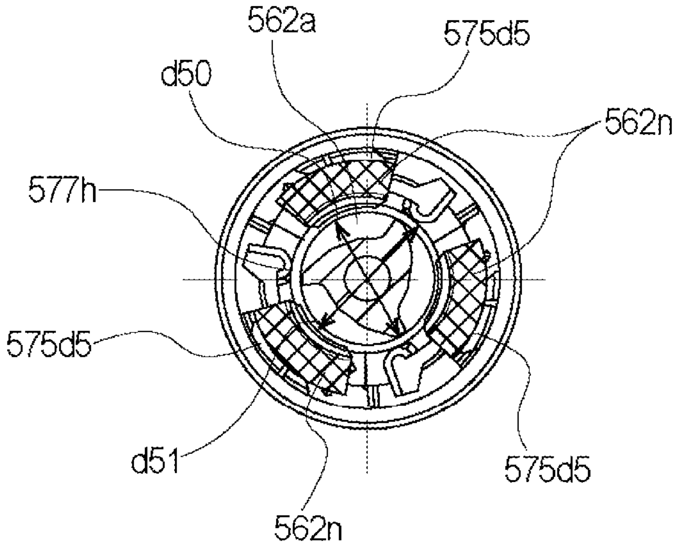

First, as shown in part (b) of FIG. 41, an annular rib-shaped second drive transmission portion 562*n* overlaps the second output member 562*b* of the main assembly driving shaft 562 with the phase of the annular rib-shaped control portion 575*d*5 provided in the control ring 575*d*. And, in the axial direction, the end surfaces of the annular ribs are in contact with each other.

This state is a first at-mount phase. Part (a) of FIG. 41 is a cross-sectional view taken along the rotational axis X (rotational axis) in the first at-mount phase, in a state in which the transmission release mechanism 575 and the main assembly driving shaft 562 are engaged with each other.

Part (b) of FIG. 41 is a cross-sectional view taken along a plane perpendicular to the rotational axis X at SS3 shown in part (a) of FIG. 41 in which the first output member 562*a* and the second drive transmission portion 562*n* of the second output member 562*b* are cut.

In the first at-mount phase, the main assembly driving shaft 562 is not in the final position relative to the transmission release mechanism 575.

Here, the second output member 562*b* can move relative to the first output member 562*a* by a certain distance relative to the axial direction, and the second output member 562*b* is urged toward the cartridge P in the axial direction by an urging spring (not shown).

In addition, as shown in part (a) of FIG. 41, the first output member 562*a* is in this state that the coupling member 577 is inserted, even in the first at-mount phase. In the first at-mount phase, when the motor (not shown) of the apparatus main assembly 2 rotates, the upstream driving shaft 562*d* and the first output member 562*a* rotate. However, in the natural state, the three first engaged surfaces 577*h* of the coupling member 577 are on the radially outer side than the diameter d51 of the drive transmission portion engaging portion 562*g*, and therefore, the rotation of the main assembly driving shaft 562 cannot be transmitted to the coupling member 577 in the blocking state.

On the other hand, the second drive transmission portion 562*n* which receives the drive by way of the torque limiter 562*c* rotates while contacting the end surface of the control portion 575*d*5 of the control ring 575*d*. When the second drive transmission portion 562*n* rotates, the phase of the second drive transmission portion 562*n* reaches between the control portions 575*d*5 provided in three places, and the second drive transmission portion 562*n* moves in the direction of arrow N by an urging spring (not shown). by this, the second drive transmission portion 562*n* as shown in part (c) of FIG. 39 and part (a) of FIG. 40 is placed between the control portions 575*d*5. This state is a second at-mount phase.

Depending on the phase of the main assembly driving shaft 562 and the transmission release mechanism 575, the phase may be the second at-mount phase, immediately after mounting the cartridge P to the main assembly 2.

In the second at-mount phase, when the second drive transmission surface 562*p* and the second engaged surface 575*d*9 are not in contact with each other, the control portion 575*d*5 is retracted from the driven connecting surface 577*j* in this state. The drive blocking state in which the rotation of the main assembly driving shaft 562 cannot be transmitted to the coupling member 577 is maintained.

[Drive Transmission Operation]

Next, the drive transmission operation in the transition from the drive blocking state to the drive transmission state will be described.

Figure 44:
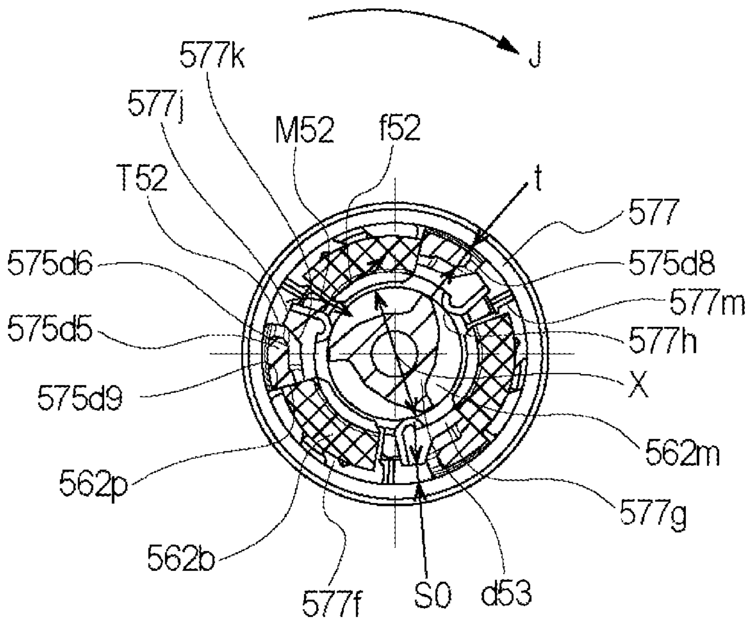
FIG. 44 is a sectional view illustrating the relationship between the transmission release mechanism and the main assembly driving shaft according to Embodiment 5.
Figure 44:
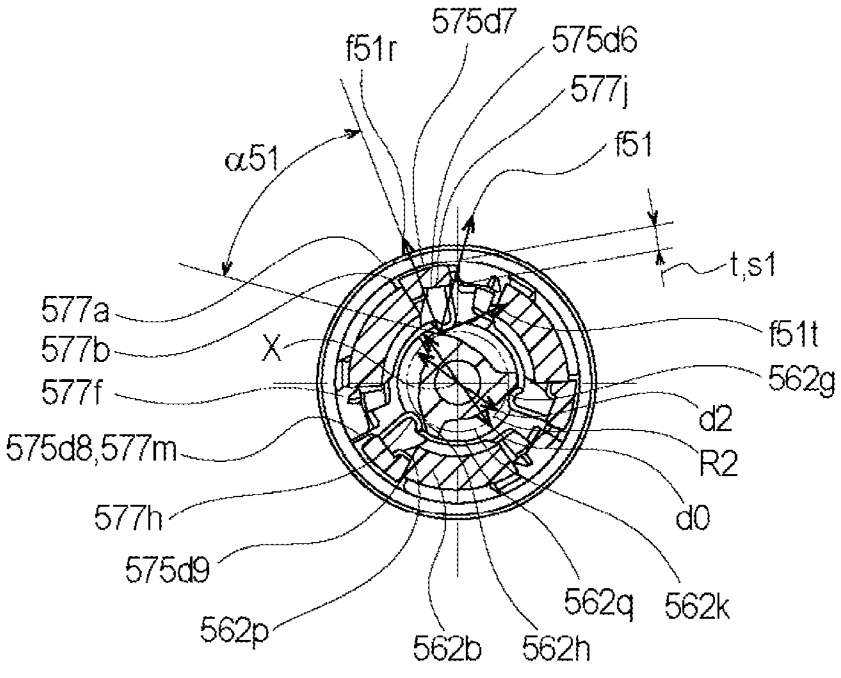

Part (a) of FIG. 44 shows a state of the drive blocking operation in the transition from the drive transmission state to the drive blocking state.

At the start of drive transmission operation, the control member 576 is placed at the first position which allows rotation of the control ring 575*d* as shown in part (a) of FIG. 38. Here, since the operation of the control member 576 at this time is the same as that of Embodiment 1, the description thereof is omitted. When the control member 576 is in the first position, the control member 576 is not in contact with the control ring 575*d*, and therefore, the control ring 575*d* is allowed to rotate.

When the upstream driving shaft 562*d* rotates in the direction of arrow J from the state shown in part (a) of FIG. 40, the second output member 562*b* connected to the upstream driving shaft 562*d* also rotates by way of the torque limiter 562*c*. By the effect of this torque limiter 562*c*, the second output member 562*b* rotates integrally with the first output member 562*a* until the torque required for the rotation of the second output member 562*b* becomes a predetermined magnitude.

For this reason, when drive transmission starts, the second output member 562*b* rotates relative to the stopped control ring 575*d*. The second drive transmission surface 562*p* provided on the second output member 562*b* reaches the position where the second engaged surface (second drive force receiving portion, urging force receiving portion) 575*d*9 provided on the control ring 575*d* contacts.

The control ring 575*d* receives the driving force from the second output member 562*b* in the second engaged surface 575*d*9 to start rotating relative to the coupling member 577. That is, in the state that the developing roller and the coupling member 577 are at rest, the control ring 575*d* first receives the driving force (second driving force, second rotational force, urging force) to start moving.

The rotation of drive connecting surface 575*d*6 of control ring 575*d* proceeds from the drive blocking state 1 shown in part (a) of FIG. 40 which has been in the non-contact state with the drive relay portion 577*d*, as shown in part (a) of FIG. 44, the drive connecting surface 575*d*6 starts to contact the introduction surface 577*k* of the coupling member 577. The introduction surface 577*k* is a slope connecting the driven connecting surface 577*j* and the arm portion 577*g* of the drive relay portion 577*d*, and the drive connection surface 575*d*6 advances in the rotational direction J while contacting the introduction surface 577*k*. The control portion 575*d*5 produces a force f52 on the introduction surface 577*k* at the contact position T52 with the introduction surface 577*k*.

Here, the drive relay portion 577*d* of the coupling member 577 is a cantilever beam including the supporting portion 577*f* as a fulcrum. The introduction surface 577*k*, which is the free end side of the drive relay portion 577*d*, receives the force f52 from the drive connection surface 575*d*6 at the contact position T52, by which a bending moment M52 is produced in the drive relay portion 577*d*. By this, the drive relay portion 577*d* is bent radially inward with the supporting portion 577*f* as a fulcrum, the drive relay portion 577*d* moves inward in the radial direction by elastic deformation.

Furthermore, when the control ring 575*d* rotates relative to the coupling member 577, the rotation of the control ring 575*d* proceeds until the rotation restricted end surface 575*d*8 provided on the control ring 575*d* contacts the rotation restricted end surface 577*m* provided on the coupling member 577. The state in which the rotation restricted end surface 575*d*8 and the rotation restricted end surface 577*m* are in contact with each other is the drive transmission state shown in part (b) of FIG. 44. In the drive transmission state shown in part (b) of FIG. 44, the control portion 575*d*5 contacts the driven connecting surface 577*j* of the coupling member 577.

In the drive blocking state 1 shown in part (a) of FIG. 40, a gap s0 is provided between the inner diameter portion 577*b* and the driven connecting surface 577*j* in the coupling member 577, and the relationship with the thickness t of the control portion 575*d*5 in the control ring 575*d* is the gap s0<thickness t. The thickness t of the control portion 575*d*5 is larger than the gap s0, and therefore, when the rotation of the control ring 575*d* advances in the drive transmission operation, the control portion 575*d*5 pushes the gap s0, as shown in part (b) of FIG. 44.

As a result of the insertion of the control portion 575*d*5 into the gap s0, the gap between the inner diameter portion 577*b* of the coupling member and the driven connection surface 577*j* is switched to gap s1. Specifically, the gap s1 is substantially equal to the thickness t. In addition, the amount of bending which elastically deforms the drive relay portion 577*d* inward in the radial direction corresponds to the difference between the thickness t and the gap s0.

Here, the diameter of the inscribed circle of the three engaged surfaces 577*h* when the control portion 575*d*5 contacts the introduction surface 577*k*, is d53. The diameter d53 is smaller than the diameter d51 of the inscribed circle R51 in the drive blocking state 1 shown in part (a) of FIG. 40, by the amount by which the drive relay 577*d* is elastically deformed radially inward. In addition, the diameter at the time when an inscribed circle R52 is virtually drawn with respect to three engaged surfaces 577*h* in the drive transmission state is d52. The thickness t of the control portion 575*d*5 is selected such that the diameter d52 resulting from the deformation of the drive relay portion 577*d* with respect to the diameter d50 at the outer peripheral portion 562*j* of the drive transmission engagement portion 562*g* of the main assembly driving shaft 562 satisfies d52<d50.

Here, when the control portion 575*d*5 by the drive transmission operation advances the rotation while being in contact with the introduction surface 577*g* of the coupling member 577, the state shown in part (a) of FIG. 44 is changed to the state shown in part (b) of FIG. 44. In this process, the diameter of the inscribed circle gradually decreases from the diameter d51 of the inscribed circle R51 in the drive blocking state to the diameter d52 of the inscribed circle R52 in the drive transmission state. That is, the engaged surface (engaging portion, driving force receiving portion) 577*h* moves from the radially outer second position (non-engaging position) to the radially inner first position (engaging position).

By this, the engaged surface 577*h* of the coupling member 577 is switched to the state in which it can engage with the drive transmission surface 562*h* of the main assembly driving shaft 562, the drive transmission state is established in which the rotation of the main assembly driving shaft 562 is transmitted to the downstream transmission member 571, as shown in part (b) of FIG. 44.

Here, the setting and operation of the torque limiter 562*c* of the main assembly driving shaft 562 will be described with respect to the process of shifting to the drive transmission state by the drive transmission operation. In Embodiment 4, the torque limiter is provided between the first transmission member of the cartridge and the control ring. However, in this embodiment, the torque limiter 562*c* is provided on the main assembly driving shaft 562 of the image forming apparatus main assembly.

By the operation of the torque limiter 562*c*, the second output member 562*b* rotates integrally with the upstream driving shaft 562*d* until the torque acting on the second output member 562*b* reaches a predetermined level. In addition, when the torque acting on the second output member 562*b* is greater than or equal to a predetermined value, the second output member 562*b* remains at rest by the action of the torque limiter 562*c*, but the main assembly driving shaft 562 can rotate.

In the drive transmission operation, the control portion 575*d*5 rotates relative to the coupling member 577 while expanding the gap s0. That is, in the drive transmission operation, the driven connecting surface 577*j* is in contact with the driving connecting surface 575*d*6, and a load resistance is produced when the drive relay portion 577*d* is elastically deformed radially inward. Furthermore, in this embodiment, the transmission release mechanism 575 is provided with a return spring 575*c*, and a moment M5 acts on the control ring 575*d* in the direction of the arrow K. The moment M5 in the direction of arrow K is applied as a load resistance when the second output member 562*b* rotates the control ring 575*d* in the rotational direction J. It is necessary to set the idling torque of the torque limiter 562*c* so that the rotation of the second output member 562*b* is not stopped by the load resistances. In this embodiment, the amount of elastic deformation inward in the radial direction at the drive relay portion 577*d* is set to 1.6 mm, the moment M of the return spring 575*c* is set to 1.5 N, cm, and the idle of the torque limiter 562*c* of the transmission release mechanism 575 is set to 4.9 N·cm.

Next, in the state of transition to the drive transmission state shown in part (b) of FIG. 44, the control ring 575*d* has reached a position where the rotation restricted end surface 575*d*8 and the rotation restricted end surface 577*m* are in contact with each other. In this state, the control ring 575*d* receives the load torque of the downstream transmission member 571 connected to the coupling member 577. That is, the second output member 562*b* which transmits the drive to the control ring 575*d* also receives the load torque of the downstream transmission member 571.

The torque limiter 562*c* sets the idling torque below the load torque of the downstream transmission member 571, and therefore, the downstream transmission member 571 cannot be rotated. That is, the rotation of the second output member 562*b* and the control ring 575*d* is stopped relative to the coupling member 577, and the rotation of the control ring 575*d* is restricted from the coupling member 577.

The position where the rotation restricted end surface 575*d*8 of the control ring 575*d* and the rotation restricting end surface 577*m* of the coupling member 577 come into contact is defined as a first position (first rotation position). The first rotational position is the position of the control ring 575*d* in the drive transmission state.

Figure 45:
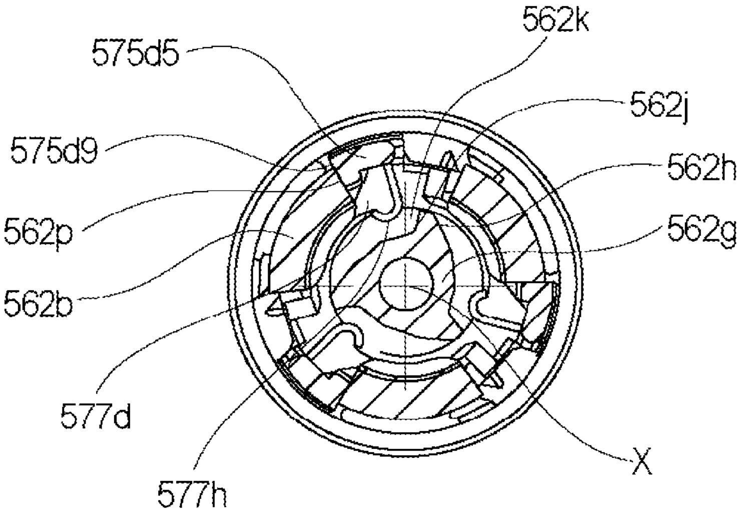
FIG. 45 is a sectional view illustrating the relationship between the transmission release mechanism and the main assembly driving shaft according to Embodiment 5.
Figure 45:
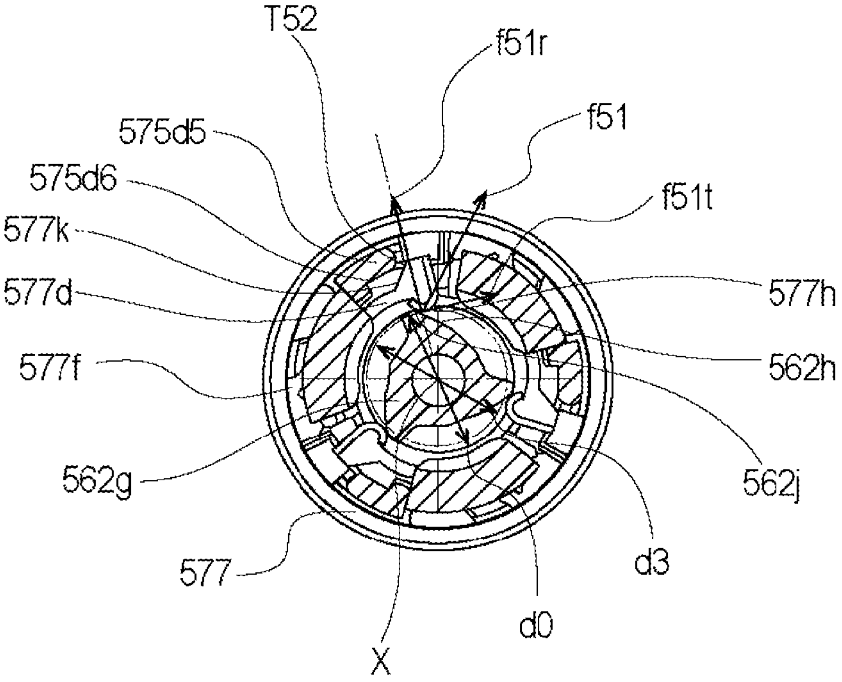

Here, the drive transmission operation will be described with respect to the rotational direction phase of the engaged surface 577*h* of the coupling member 577 in a state during the drive transmission operation. More specifically, the drive transmission operations in two phase combinations will be described. the first phase combination appears when the rotational direction phase of the engaged surface 577*h* as shown in part (a) of FIG. 45 is located at the retracting portion 562*k* of the drive transmission engaging portion 562*g* of the main assembly driving shaft 562. Next, the second phase combination appears when the rotational direction phase on the engaged surface 577*h* as shown in part (a) of FIG. 44 is placed on the outer peripheral portion 562*j* of the drive transmission engaging portion 562*g* and the drive transmission surface 562*h*.

In the drive transmission operation, when the control ring 575*d* rotates relative to the coupling member 577, the control portion 575*d*5 of the control ring 575*d* elastically deforms the drive relay portion 577*d* of the coupling member 577 inward in the radial direction.

As shown in part (a) of FIG. 45, in the case of the first phase combination, the engaged surface 577*h* is positioned at the retracting portion 562*k*, and therefore, the engaged surface 577*h* is movable inward in the radial direction before coming into contact with the drive transmission engaging portion 562*g*. Therefore, upon receiving the drive transmission from the second output member 562*b*, the control ring 575*d* can reach the first rotational position. In part (a) of FIG. 45, the engaged surface (engaging portion, driving force receiving portion) 577*h* is positioned at the first position on the inner side in the radial direction under the urging force from the control ring 575*d*.

When the relative rotation of the control ring 575*d* relative to the coupling member 577 stops in the case that the control ring 575*d* is in the first rotation position, the inscribed circle R52 with respect to the three engaged surfaces 577*h* has a diameter d52. When the main assembly driving shaft 562 rotates relative to the coupling member 577 from this position, the engaged surface 577*h* as shown in part (b) of FIG. 44 reaches the drive transmission state in contact with the drive transmission surface 562*h*.

Next, the case of the second phase combination as shown in part (a) of FIG. 44 will be described. When the engaged surface 577*h* is moved radially inward by the control portion 575*d*5, the control portion 575*d*5 comes into contact with the outer peripheral portion 562*j* of the drive transmission engagement portion 562*g* and the drive transmission surface 562*h*, before coming into contact with the driven connecting surface 577*j*. In the state that the engaged surface 577*h* is in contact with the drive transmission engaging portion 562*g*, a large resistance is produced when the drive relay portion 577*d* of the coupling member 577 is moved inward in the radial direction.

For this reason, the second output member 562*b* cannot rotate the control ring 575*d* and stops. On the other hand, the main assembly driving shaft 562 continues to rotate, and therefore, the outer peripheral portion 562*j* and the drive transmission surface 562*h* of the drive transmission engagement portion 562*g* of the main assembly driving shaft 562 pass by the engaged surface 577*h*, and the rotation proceeds. by this, the engaged surface 577*h* is switched from the second phase combination the first phase combination placed in the retracting portion 562*k*, and the engaged surface 577*h* reaches a drive transmission state in contact with the drive transmission surface 562*h* through the process described above.

[Drive Transmission State]

Part (b) of FIG. 44 illustrates the drive transmission state. By the drive transmission operation, the control ring 575*d* reaches the position where the rotation restricted end surface 575*d*8 provided on the control ring 575*d* and the rotation restricted end surface 577*m* provided on the coupling member 577 is in contact with each other. In this state, the relationship between the control ring 575*d*, the coupling member 577, and the drive transmission surface 562*h* of the main assembly driving shaft 562 will be described in more detail.

The control portion 575*d*5 is arranged on the extended line in the radial direction from the rotational center X toward the engaged surface 577*h* with respect to the engaged surface 577*h* provided on the free end side of the drive relay portion 577*d* which is a cantilever, and the control portion 575*d*5 is in contact with the driven connecting surface 577*j*.

In addition, the drive relay portion 577*d* is elastically deformed radially inward by the thickness t of the control portion 575*d*5. As a result, the diameter d52 of the inscribed circle R52 with respect to the three engaged surfaces 577*h* is smaller than the diameter d50 at the outer peripheral portion 562*j* of the drive transmission engaging portion 562*g*.

The three engaged surfaces 577*h* are located radially inward from the diameter d50 at the outer peripheral portion 562*j*, and therefore, when the first output member 562*a* rotates, the engaged surface 577*h* can come into contact with the drive transmission surface 562*h*.

Referring to part (b) of FIG. 44, the state of power at this time will be described.

The contact position in the drive transmission state between the drive transmission surface 562*h* and the engaged surface 577*h* of the coupling member 577 is T51. The engaged surface 577*h* receives the reaction force f51 from the drive transmission surface 562*h* at the contact position T51. The drive transmission surface 562*h* has an inclined surface with an angle α51, and the angle α51 is an angle toward the upstream side of the rotational direction J as the radius increases with reference to the line connecting the rotational center X and the contact position T51. On the other hand, the engaged surface 577_h_ has an arc shape, and therefore, the reaction force f51 at the contact portion between the drive transmission surface 562_h_ and the engaged surface 577_h_ is produced as a normal force of the drive transmission surface 562_h_. The radial direction component f51_r_ and tangential direction component f51_t_ of the reaction force f51 will be described.

First, since the drive transmission surface 562_h_ has an inclined surface with an angle α51, the radial direction component f51_r_ of the reaction force f51 is a force in a direction to move the engaged surface 577_h_ of the drive relay portion 577_d_ outward in the radial direction. On the contrary, the driven connecting surface 577_j_ of the drive relay portion 577_d_ is located on a radial extension line from the rotational center X toward the engaged surface 577_h_. That is, the radial component f51_r_ is received in contact with the drive coupling surface 575_d_6 of the controller 575_d_5. Furthermore, the coupling member support surface 575_d_7, which is a surface on the outer diameter side of the control portion 575_d_5 arranged to face the drive coupling surface 575_d_6 by way of the thickness t, is in contact with the inner diameter portion 577_b_ of the coupling member 577. Further, the outer diameter portion 577_a_ of the coupling member 577 is supported by the inner diameter 532_q_ of the development cover member 532 shown in FIG. 33.

The radial component f51_r_ of the force f51 acts to move the engaged surface 577_h_ of the drive relay portion 577_d_ outward in the radial direction. At this time, the drive relay portion 577_d_ is in a state that the movement in the radial direction is restricted (blocked) by the drive connecting surface 575_d_6, the coupling member 577, and the development cover member 532. Therefore, against the radial component f51_r_, it is possible to suppress the deformation of the drive relay portion 577_d_, and the engagement between the drive transmission surface 562_h_ and the engaged surface 577_h_ is standardized. That is, the control ring 575_d_ is located at the first rotational position, and when the drive connection surface 575_d_6 and the driven connection surface 577_j_ are in contact with each other, the drive transmission can be stably performed.

Next, the tangential direction component f51_t_ will be described. The reaction force f51 produces a tangential force f51_t_ which is a tangential component, and the drive relay portion 577_d_ is pulled in the rotational direction J by the tangential force f51_t_, so that the coupling member 577 can be rotated in the rotational direction J.

The driving relay portion 577_d_ has a shape extending from the supporting portion 577_f_ downstream wise in the rotational direction J toward the free end side where the engaged surface 577_h_ and the driven connecting surface 577_j_ are provided. It is preferable that the direction extending from the supporting portion 577_f_ to the downstream side in the rotational direction J is substantially parallel to the tangential force f51_t_ in contact between the engaged surface 577_h_ and the drive transmission surface 562_h_. The drive relay portion 577_d_, which is a cantilever beam, has a higher tensile rigidity in the stretching direction than that in the bending direction, which is the radial direction, and therefore, the deformation of the drive relay portion 577_d_ can be reduced as compared with the transmission torque from the main assembly driving shaft 562. That is, the rotation of the main assembly driving shaft 562 can be stably transmitted to the coupling member 577.

[Drive Blocking Operation]

Next, the drive blocking operation for shifting from the drive transmission state to the drive blocking state will be described. Upon starting the drive blocking operation, as shown in part (b) of FIG. 38, when the developing unit 9 rotates and reaches the separated position, the control member 576 is also rotated and moved to the second position. since the operation of the control member 576 at this time is the same as that of Embodiment 1, the description thereof is omitted.

The control ring 575_d_ receives the drive from the second output member 562_b_ and rotates integrally with the main assembly driving shaft 562 and the coupling member 577 in the drive transmission state.

On the contrary, when the control member 576 is in the second position, that is, the contact surface 576_b_ of the control member 576 is located inside the rotation locus A shown in part (b) of FIG. 38, the contact surface 576_b_ of the control member 576 locks the locked portion 575_d_4 of the control ring 575_d_. The control member 576 tends to restrict the rotation of the control ring 575_d_. When the control member 576 restricts the rotation of the control ring 575_d_, the rotation of the second output member 562_b_ which transmits the drive to the control ring 575_d_ is also restricted.

In this state, when the main assembly driving shaft 562 rotates, the main assembly driving shaft 562 can continue to rotate relative to the second output member 562_b_ and the control ring 575_d_, while the torque limiter 562_c_ produces idling torque. In this manner, when the control member 576 is in the second position, the rotation of the control ring 575_d_ can be restricted and stopped by the control member 576 even if the main assembly driving shaft 562 is rotating.

In the following, the relationship between the main assembly driving shaft 562, the coupling member 577, and the control pipe 575_d_ in the drive blocking operation will be described.

When the main assembly driving shaft 562 rotates while the rotation of the control ring 575_d_ is stopped by the drive blocking operation, the coupling member 577 which has been rotating integrally with main assembly driving shaft 562 in the drive transmission state rotates relative to the control ring 575_d_.

Here, the relative rotation of the coupling member 577 relative to the control ring 575_d_ proceeds until the engagement state between the drive transmission surface 562_h_ and the engaged surface 577_h_ is broken. This will be described in detail.

In drive blocking operation, with respect to the control ring 575_d_, the rotationally restricted end surface 575_d_8 and the rotationally restricted end surface 577_m_ move away from the first rotational position shown in part (b) of FIG. 44 where the rotationally restricted end surface 575_d_8 and the rotationally restricted end surface 577_m_ are in contact with each other. This is because the coupling member 577 is rotating in a state where the control ring 575_d_ is locked by the control member 576 and is stopped rotating. As described above, the relative rotation of the coupling member 577 relative to the control ring 575_d_ proceeds, and the control portion 575_d_5 of the control ring 575_d_ relatively moves toward the upstream side in the rotational direction J of the coupling member 577.

In the state where the control portion 575_d_5 is in contact with the driven connecting surface 577_j_ of the drive relay portion 577_d_, the gap s1 of the coupling member 577 is maintained. Therefore, the inscribed circle formed by the three engaged surfaces 577_h_ is substantially the same as the diameter R52 in the drive transmission state. As a result, the engagement between the engaged surface 577_h_ of the coupling member 577 and the drive transmission surface 562_h_ of the main assembly driving shaft 562 is maintained, and therefore, the rotation of the first output member 562*a* can be transmitted to the coupling member 577.

Next, when the rotation of the coupling member 577 with respect to the control ring 575*d* proceeds, the control portion 575*d*5 reaches the introduction surface 577*k* of the drive relay portion 577*d* as shown in part (a) of FIG. 44. When the control portion 575*d*5 moves in contact with the introduction surface 577*k* of the drive relay portion 577*d*, the gap gradually changes from the gap s1 in the drive transmission state to the gap s0 in the drive blocking state. That is, the drive relay portion 577*d* is restored radially outward toward the natural state from the state where the drive relay portion 577*d* of the coupling member 577 is deformed radially inward. By this, the diameter d53 of the inscribed circle of the three engaged surfaces 577*h* at this time when the control portion 575*d*5 contacts the introduction surface 577*k* increases stepwise from the inscribed circle R52 in the drive transmission state toward the inscribed circle R51 in the drive blocking state.

Therefore, the difference between the inscribed circles of the three engaged surfaces 577*h* and the diameter d50 at the outer peripheral portion 562*j* of the drive transmission engaging portion 562*g* is reduced. That is, the amount of engagement between the engaged surface 577*h* of the coupling member 577 and the drive transmission surface 562*h* of the main assembly driving shaft 562 decreases. As a result, the rotation of the first output member 562*a* cannot be transmitted to the coupling member 577, and the relative rotation of the coupling member 577 relative to the control ring 575*d* stops. in other words, the first output member 562*a* switches to the drive blocking state, at the time when the rotation becomes unable to be transmitted to the coupling member 577.

Additionally, in this embodiment, as described in part (a) of FIG. 38 and part (b) of FIG. 38, the control ring 575*d* is provided with a guide portion 575*d*11. Irrespective of whether the control ring 575*d* is in the first rotational position or the second rotational position, the output member engaging portion 577*p* of the coupling member 577 and the coupling engaging portion 575*b*6 of the output member 575*b* are positioned on the radially inner side of the guide portion 575*d*11.

The control ring 575*d* can stop rotating in the state of being locked by the control member 576. On the other hand, in a state where the coupling member 577 and the output member 575*b* are rotated by receiving the drive from the main assembly driving shaft 562, they cannot be locked by the control member 576.

If the control member 576 is locked to the coupling member 577 or the output member 575*b*, the control member 576 receives a large force. For this reason, in this embodiment, the control ring 575*d* is provided with a guide portion 575*d*11, so that the control member 576 cannot be locked with the coupling member 577 and the output member 575*b*. More specifically, the guide portion 575*d*11 is provided so that when the contact surface 576*b* of the control member 576 is located inside the rotation locus A shown in part (b) of Figure the surfaces perpendicular to the rotational direction J of the coupling member 577 and the output member 575*b* are not in contact with the contact surface 576*b*. By this, the control member 576 is restrained from being locked to the coupling member 577 and the output member 575*b*. That is, the guide portion 575*d*11 is a cover portion (cover portion) that covers a portion of them to prevent the control member 576 from stopping the rotations of the coupling member 577, the output member 575*b*, and the like. In other words, the guide portion 575*d*11 is a protection portion which protects the coupling member 577 and the like from the control member 576.

[Drive Blocking State 2]

In the drive blocking state 1 shown in part (a) of FIG. 40 described above, the drive connection surface 575*d*6 of the control ring 575*d* is in a non-contact state with the drive relay portion 577*d*, as a state in the drive blocking state. Here, as another state in the drive blocking state, a drive blocking state in which the control portion 575*d*5 as shown in part (b) of FIG. 45 is in contact with the introduction surface 577*k* will be supplementarily described.

When the control portion 575*d*5 contacts the introduction surface 577*k*, by the contact between the control portion 575*d*5 and the introduction surface 577*k*, the drive relay portion 577*d* cannot be restored to the natural state. Here, diameter d53 of the inscribed circle of the three engaged surfaces 577*h* at the time when the control portion 575*d*5 contacts the introduction surface 577*k* is smaller than the diameter d51 in which the drive relay portion 577*d* is in a natural state. In addition, the relationship between the outer peripheral portion 562*j* of the drive transmission engaging portion 562*g* and the diameter d50 is d50≤d51, and therefore, the relationship is such that the drive transmission surface 562*h* of the drive transmission engagement portion 562*g* and the engaged surface 577*h* of the coupling member 577 can engage with each other. As shown in part (b) of FIG. 45, the radial component f51*r* of the reaction force f51 is a force in a direction of moving the engaged surface 577*h* of the drive relay portion 577*d* to the outside in the radial direction. against the radial direction component f51*r* received by the engaged surface 577*h*, the control portion 575*d*5 tends to restrict the deformation of the drive relay portion 577*d* at the contact position T52 with the introduction surface 577*k*.

On the contrary, the introduction surface 577*k* of the drive relay portion 577*d* is located on the upstream side, in the rotational direction J, of the radial extension line from the rotational center X toward the engaged surface 577*h*. Therefore, as to the radial component f51*r*, a bending moment Mk is produced which deforms the drive relay portion 577*d* radially outward with the contact position T52 as a fulcrum, so that the engaged surface 577*h* can be allowed to move outward in the radial direction. As a result, when the inscribed circle expands to a diameter d50 equivalent to the outer peripheral portion 562*j* of the drive transmission engaging portion 562*g*, the rotation of the first output member 562*a* can be blocked with respect to the coupling member 577 and the downstream transmission member 571.

As described above, in addition to the drive blocking state 1 shown in part (a) of FIG. 40, also in a state where the control portion 575*d*5 as shown in part (b) of FIG. 45 is in contact with the introduction surface 577*k*, the drive blocking state can be established. The drive blocking state shown in part (b) of FIG. 45 is a drive blocking state 2. The reason why the drive blocking state 1 and the drive blocking state 2 can be established is the same as in Embodiment 4.

The drive blocking state 1 and the drive blocking state 2 can be established depending on the timing at which the control member 576 locks the control ring 575*d*. Referring to part (b) of FIG. 38, this will be described. When the control member 576 is rotated by the drive blocking operation and enters the inside of the rotation locus A of the control ring 575*d*, the control member 576 can contact and can be locked with the control ring 575*d*. That is, the rotation phase of the locked portion 575*d*4 of the control ring 575*d* is not constant relative to the timing at which the control member 576 enters the inside of the rotation locus A of the control ring 575*d*, and therefore, variations occur in the timing at which the control member 576 locks the control ring 575*d*.

The control ring 575*d* stops rotating at the timing when the control member 576 contacts the control ring 575*d*. And, when the control ring 575*d* stops rotating, the relative rotation between the coupling member 577 and the control ring 575*d* is started. As a result, the control portion 575*d*5 of the control ring 575*d* retracts from the driven connection surface 577*j* of the drive relay portion 577*d*. On the other hand, in the drive blocking operation, the control member 576 continues to rotate in the rotational direction L1 for a certain period of time. Therefore, when the control member 576 is on the inner side of the rotation locus A and on the upstream side in the rotational direction L1, and it comes into contact with the control ring 575*d*, it rotates in the rotational direction L1, even after the control member 576 comes into contact with the control ring 575*d*, and turns the control ring 575*d* in the rotational direction L1. That is, the control ring 575*d* is moved upstream in the rotational direction J in the rotational direction J by the rotation of the control member 576, and therefore, the relative rotation with the coupling member 577 becomes larger. By this, the drive blocking state 1 is as shown in part (a) of Figure.

Next, when the control member 576 is inside the rotation locus A and contacts the control ring 575*d* at the timing when the rotation in the rotational direction L1 proceeds, the extent to which the control member 576 rotates the control ring 575*d* in the rotational direction L1 after contacting the control ring 575*d* is reduced. Therefore, the degree to which the control ring 575*d* is moved to the upstream side of the rotational direction J by the rotation of the control member 576 is also small, and as a result, the relative rotation between the control ring 575*d* and the coupling member 577 becomes small. By this, the drive blocking state 2 is as shown in part (b) of Figure.

As described above, the drive blocking state can be a state such as a drive blocking state 1 and a drive blocking state 2. The position of the control ring 575*d* in the drive blocking state is the second rotational position, the second rotational position is a position where the control portion 575*d*5 has retracted from the driven connection surface 577*j* of the drive relay portion 577*d*. That is, this includes a range from a state in which the control portion 575*d*5 is in contact with the introduction surface 577*k* to a state in which the control portion 575*d*5 is not in contact with the drive relay portion 577*d*.

[Dismounting of Cartridge P from Main Assembly]

The description will be made as to the relationship between main assembly driving shaft 562 and transmission release mechanism 575 when dismounting the cartridge P (PY, PM, PC, PK) from main assembly 2.

When the front door 3 (FIG. 2) of the apparatus main assembly 2 is opened, the main assembly driving shaft 562 moves in the direction of the rotational axis X and retracts from the cartridge P in interrelation with opening the front door 3. The second output member 562*b* can move relative to the first output member 562*a* by a certain amount relative to the axial direction. When the main assembly driving shaft 562 moves in the direction to retract from the cartridge P of the rotational axis X, the second output member 562*b* moves ahead of the first output member 562*a*.

Therefore, the second drive transmission surface 562*p* of the second output member 562*b* is retracted in the axial direction from the control portion 575*d*5 of the control ring 575*d*, as shown in FIG. 37. On the other hand, the first output member 562*a* remains in a state in which the drive transmission engaging portion 562*g* of the main assembly driving shaft 562 is positioned on the first engaged surface 577*h* of the coupling member 577, in the axial direction.

If the drive transmission state shown in part (b) of FIG. 44 is the case, the drive relay portion 577*d* of the coupling member 577 has moved inward in the radial direction, the three engaged surfaces 577*h* are in a state of being located radially inward from the retaining flange 562*q* of the first output member 562*a*. On the contrary, in the state that the second drive transmission surface 562*p* shown in FIG. 37 is retracted in the axial direction from the control portion 575*d*5, the control ring 575*d* is switched to the second rotational position, by the action of the return spring 575*c* of the transmission release mechanism 575. As a result, the states that the controller 575*d*5 is retracted from the driven connecting surface 577*j* is established, and the driving relay portion 577*d* of the coupling member 577 is restored to the natural state outward in the radial direction from the state in which it is deformed radially inward. By this, the inscribed circle R51 of the three engaged surfaces 577*h* becomes larger than the outer peripheral portion 562*j* of the drive transmission portion engaging portion 562*g* and the diameter d50 of the retaining flange 562*q*, so that the first output member 562*a* can move in the axial direction.

[Summary of Structure and Operation of this Embodiment]

In this embodiment, another form of the transmission release mechanism has been described. The structure of the above-described embodiment can be summarized as follows.

In the transmission release mechanism (clutch) 575 in this embodiment, the drive transmission and blocking are switched at the boundary between the cartridge and the image forming apparatus main assembly. That is, the transmission release mechanism 575 is a cartridge coupling mechanism for coupling with the image forming apparatus main assembly.

The transmission release mechanism 575 has a coupling member 577 which receives a driving force directly from the image forming apparatus main assembly by coupling (coupling) with a driving shaft 562 provided in the image forming apparatus main assembly (FIG. 32). In other words, the coupling member is a member which receives a driving force (rotational force) from the outside of the cartridge.

The coupling member 577 receives a driving force (first driving force, first rotating force) from the drive transmission surface 562*h* of the drive transmission engagement portion (first main assembly side engagement portion) 562*g* provided in the first output member (first main assembly coupling) 562*a* (part (c) in FIG. 34, part (b) in FIG. 43, FIG. 44, and so on)).

The coupling member 577 has a structure corresponding to the second transmission member 477 (FIGS. 26, 27, and 29) in Embodiment 4. On the other hand, the first output member 562*a* has a structure corresponding to the first transmission member 474 (FIGS. 26, 27, and 29) in Embodiment 4. That is, the transmission release mechanism 575 of this embodiment can also be considered as a structure provided by transferring a portion of the transmission release mechanism 475 of Embodiment 4 from the cartridge to the image forming apparatus main assembly.

The coupling member 577 has the first engaged surface (first driving force receiving portion, first cartridge side engaging portion) 577*h* for engaging with the drive transmission engaging portion 562*g* to receive the driving force (part (b) of FIG. 34).

The first engaged surface is a portion projecting so as to approach the axis of the coupling member 577. That is, the first engaged surface is provided on a projection (projection) projecting so as to approach the axis.

The first engaged surface 577*h* is supported by a drive relay portion (support part) 577*d* (FIG. 45), and the drive relay portion 577*d* is a cantilever and has an arm portion (elastic portion) that can be elastically deformed. By the elastic deformation of the arm portion of the drive relay portion 577*d*, the first engaged portion 577*h* can move back and forth in the radial direction as in Embodiments 2-4.

By this radial advance and retraction of the first engaged surface 577*h*, the transmission canceling mechanism 575 is switched between a state in which the driving force is inputted and a state in which the driving force is not inputted.

The first engaged surface 577*h* shown in part (a) of FIG. 43 is in the first position (first receiving portion position, inner position, engaging position) approaching the axis of the coupling member 577. In the state of this position, the first engaged surface 577*h* can be engaged with the drive transmission engaging portion 562*g* of the first output member to receive the driving force. This is the state where the clutch is engaged.

On the other hand, the first engaged surface 577*h* shown in part (b) of FIG. 43 is in the second position (second receiving portion position, outer position, non-engagement position) which is away from the axis. In the state of this position, the first engaged surface 577*h* releases the engagement, by retracting (that is, separating) away from the drive transmission engaging portion 562*g* of the first output member. That is, at this time, the first engaged surface 577*h* is in a state of not receiving the driving force. This is the state in which the clutch is disengaged.

In addition, this embodiment is similar to Examples 2-4, the control mechanism (control ring 575*d* and control member 576) for controlling the position of the first engaged surface 577*h* is provided.

The control ring 575*d* is a rotating member which rotates about the same axis as the coupling member 577, and it can rotate relative to the coupling member 577. The control ring 575*d* has a second engaged surface (second driving force receiving portion, second cartridge side engagement) for receiving a driving force from the second output member (second main assembly coupling 562*b*) of the driving shaft 562 (part (b) in FIG. 34). The structure is such that the second engaged surface 575*d*9 receives a driving force (second driving force, urging force), from the second drive transmission surface 562*p* of the second drive transmission portion (second main assembly engagement portion) 562*n* of the second output member 562*b* (part (c) in FIG. 34, FIG. 45, and so on).

The control ring 575*d* first starts rotating in a state where the coupling member 577 is stopped (the developing roller 6 is not driven), by which the coupling member 577 can be connected to the first output member 562*a* by the operation described below.

As shown in parts (a) and (b) of FIG. 40, immediately after mounting the cartridge P to the apparatus main assembly 2, the first engaged surface 577*h* is retracted from the first output member 562*a* and is in a second position (second receiving portion position) in which the force cannot be received. In addition, at this time, the control ring 575*d* is also in the second position (second rotation position, second rotation member position) relative to the coupling member 577. In this state, the first output member 562*a* and the second output member 562*b* start to rotate. Then, the second drive transmission surface (second main assembly side engaging portion) 562*p* of the second output member 562*b* contacts the second engaged surface 575*d*9 of the control ring 575*d*, and the driving force (second driving force, urging force) is transmitted. by this, the control ring 575*d* rotates in the rotational direction J with respect to the coupling member 577, and the state becomes as shown in part (b) of FIG. 44 and part (a) of FIG. 45. This is a state in which the control ring 575*d* is in the first position (first rotation position, first rotation member position). In this state, the control portion 575*d*5 (drive connection surface 575*d*6) provided in the control ring 575*d* applies the radially inward urging force to the driven connection surface 577*j*. By this force, the first engaged surface 577*h* approaches the axis and is held at the first position (first receiving portion position), so that the engagement with the drive transmission engagement portion 562*g* of the first output member is enabled. by this, the first engaged surface 577*h* receives a driving force from the drive transmission engaging portion 562*g*, and the coupling member 577 also starts rotating, and the driving force is transmitted toward the developing roller 6. When this happens, the coupling member 577, the control ring 575*d*, the first output member 562*a*, and the second output member 562*b* are all rotating.

The drive connecting surface 575*d*6 of the control portion 575*d*5 is an urging portion (holding portion) for urging the first engaged surface 577*h* toward the first position and holding it in the first position. The control portion 575*d*5 urges the first engaged surface 577*h* to the first position using the driving force (second driving force, urging force) received from the second drive transmission surface 562*p*. The second engaged surface 575*d*9 of the control portion 575*d*5 receives an urging force for receiving an urging force for urging the first engaged surface 577*h* toward the first position from the second drive transmission surface 562*p*.

As shown in part (a) of FIG. 45, the controller 575*d*5 is located more remote from the axis than the first engaged surface 577*h*. In other words, the turning radius of the control portion 575*d*5 is larger than the turning radius of the first engaged surface 577*h*.

In addition, the control portion 575*d*5 provided with the second engaged surface 575*d*9 and the drive connecting surface 575*d*6 projects toward the outside of the cartridge. In other words, the control portion 575*d*5 is a projection (projection) which projects away from the non-driving side of the cartridge in the axial direction.

The free end of the control portion 575*d*5 is disposed closer to the outside of the cartridge than the drive relay portion 577*h* and the first engaged surface 577*h*, in the axial direction (part (b) of FIG. 34). That is, at least a portion of the control portion 575*d*5 (the second engaged surface 575*d*9 and the drive coupling surface 575*d*6) is disposed closer to the drive side of the cartridge than the drive relay portion 577*h* and the first engaged surface 577*h*, in the axial direction.

In other words, at least a portion of the control portion 575*d*5 (second engaged surface 575*d*9 or drive coupling surface 575*d*6) is more remote from the non-drive side of the cartridge than the drive relay portion 577*h* or the first engaged surface 577*h*, in the axial direction.

When the driving force from the first output member 562*a* and the second output member 562*b* is not inputted to the cartridge B, the control ring 575*d* is normally in the second rotational position relative to the coupling member 577 (parts (a) and (b) of FIG. 40). This is because there is a return spring 575*c* (FIG. 35) as an urging member (elastic member, urging portion, elastic portion) for urging the control ring 575*d* to the second rotational position. The return spring 575*c* is connected to the output member 575*b* and the control ring 575*d*. this return spring 575*c* is provided, and therefore, when the driving force is not transmitted to the cartridge B, the control ring 575*d* is in the second position, and the engaged surface 577*h* is also in the second position. Therefore, when mounting the cartridge, it is possible to suppress the engaged surface 577*h* from interfering with the first output member 562*a*. That is, the first output member 562*a* can smoothly enter the coupling member 577.

When the driving shaft 562 rotates, the control ring 575*d* receives a driving force larger than the elastic force (urging force) by the return spring 575*c* from the second output member 562*b*, and therefore, it moves from the second rotational position (FIG. 40) to the first rotational position (part (b) of FIG. 44, FIG. 45). By this, the coupling member 577 can also be connected to the first output member 562*a*.

Also in this embodiment, the structure of the control member 576 for controlling the rotation transmission and blocking by the transmission release mechanism 575 (FIG. 42, and so on) is the same as the control member 76 of Embodiment 1 (FIGS. 7 and 10). The control member 576 of this embodiment can obtain the same effects as those of Embodiment 1 over the prior art. That is, the positional relationship between the control member 576 and the transmission release mechanism 575 can be stably maintained relative to the rotation angle of the developing unit 9, by which it is possible to reliably switch drive transmission and blocking. By this, control variations in the rotation time of the developing roller 6 can be reduced.

In response to the development frame moving from the development position (part (a) in FIG. 38) to the non-development position (part (b) in FIG. 38), the control member 576 stops the rotation of the control ring 575*d*. At this time, the control member 576 also stops the rotation of the second output member 562*b* engaged with the control ring 575*d*. The second output member 562*b* is connected to the first output member 562*a* by way of a torque limiter 562*c* (part (c) of FIG. 39), but at this time, the torque limiter 562*c* releases the connection. Therefore, even if the rotation of the second output member 562*b* stops, the first output member 562*a* can continue to rotate.

Even after the rotation of the control ring 575*d* is stopped, the coupling member 577 is rotated by the first output member 562*a*. By the rotation of the coupling member 577, the control ring 575*d* rotates relative to the second rotation position (FIGS. 40 and 41) from the first rotation position (part (b) of FIG. 44, FIG. 45).

By this, the control portion 575*d*5 of the control ring 575*d* moves away (withdraws) from the coupling member 577, and therefore, the first engaged surface 577*h* is allowed to move away from the axis (FIG. 40). Normally, when the control ring 575*d* moves to the second position, the first engaged portion 577*h* can also be retracted to the second position, by eliminating the elastic deformation of the drive relay portion 577*d* (second receiving portion position: FIG. 40). as a result, the first engaged portion 577*h* does not receive the driving force from the first output member 562*a*. not only the control ring 575*d* but also the coupling member 577 stops, and the rotational driving of the developing roller 6 (FIG. 26) is also stopped. This is called the drive blocking state 1.

Here, if the elastic restoring force of the drive relay 577*d* is weak (or no elastic restoring force), or when the relative rotation between the control ring 575*d* and the coupling member 577 is small, the first engaged portion 577*h* may not be retracted to the second position.

However, even in such a case, when the first engaged portion 577*h* contacts the drive transmission surface 562*h* of the rotating first output member 562*a*, the force f51 acting radially outward is applied to the first engaged portion 577*h* (part (a) of FIG. 45). As a result, the first engaged portion 577*h* retracts to the second position every time it contacts the drive transmission surface 562*h*. The first engaged portion 577*h* cannot receive the driving force, or the receiving of the driving force is extremely limited. For this reason, the rotation of the coupling member 577 is stopped (or the rotation of the coupling member 577 is substantially limited and can be regarded as stopped). This is called the drive blocking state 2. As described above, in this embodiment, the drive blocking state 2 can be taken, and therefore, the first engaged portion 577*h* is not necessarily retracted to the second position (non-engagement position) in the state in which no external force is applied to the drive relay portion 577*d*.

In summary, it will suffice if the control ring 575*d* moves the first engaged portion 577*h* to the second position or allows the first engaged portion 577*h* to move to the second position, by moving to the second rotational position, (part (b) of FIGS. 40 and 45).

As described above, the control member 576 controls the switching between the driving force input state and the input stop state for the transmission release mechanism 575. When the development frame moves to the non-development position, the control member 576 acts on the transmission release mechanism 575 (control ring 575*d*) so that the input of the driving force is stopped.

That is, when the locking portion at the free end of the control member 576 is the second position (locking position) where it can come into contact with the control ring 575*d*, the control ring 575*d* is locked by the control member 576, and the rotation is stopped. By this, the transmission release mechanism 575 stops the rotation of the main assembly driving shaft 562 from being inputted to the cartridge and stops the rotation of the downstream transmission member 571.

In this embodiment, as in Embodiment 4, the shape of the drive transmission surface 562*h* is set such that a force f51*r* in the direction of moving outward in the radial direction is produced in the engagement region between the drive transmission surface 562*h* and the engaged surface 577*h* of the drive relay portion 577*d*. On the contrary, the driven connection surface 577*j* of the drive relay portion 577*d* receives the radial component f51*r* in contact with the drive connection surface 575*d*6 of the control portion 575*d*5 on the radial extension line from the rotational center X toward the engaged surface 577*h*. As described above, the structure is such as to suppress the deformation of the drive relay portion 577*d* with respect to the radial direction component f51*r*, by which the engagement between the drive transmission surface 562*h* and the engaged surface 577*h* is stabilized. By this, similarly to Examples 1 to 3, the rotation of the main assembly driving shaft 562 can be stably transmitted to the downstream transmission member 571.

In addition, the position of the engaged surface 577*h* of the drive relay portion 577*d* in the drive transmission state is determined by inserting the thickness t of the control portion 575*d*5 into the gap between the inner diameter portion 577*b* and the driven connecting surface 577*j* in the coupling member 577. For this reason, for example, even when the drive relay portion 577*d* has changed its natural shape due to creep deformation, and so on, the position of the engaged surface 577*h* of the drive relay portion 577*d* in the drive transmission state is stable. Even when repeatedly transmitting and blocking the position of the engaged surface 577*h* of the drive relay portion 577*d* in the drive transmission state is also stabilized.

The diameter d51 of the inscribed circle R51 with respect to the three engaged surfaces 577*h* in the natural state where the drive relay 577*d* is not receiving force from other portions satisfies d50≤d51, for the diameter d50 at the outer peripheral portion 562*j* of the drive transmission portion engaging portion 562*g*. Ideally d50<d51, and it is preferable that the contact between the engaged surface 577*h* and the outer peripheral portion 562*j* in the drive blocking state can be suppressed more when the three engaged surfaces 577*h* in the natural state are separated from the outer peripheral portion 562*j* of the drive transmitting portion engaging portion 562*g*. As a result, when the engaged surface 577*h* and the outer peripheral portion 562*j* are in contact with each other, the minute load fluctuation generated in the main assembly driving shaft 562 can be suppressed. However, in this example, even if d50≤d51, the drive can be blocked stably, as described in the foregoing. That is, in this example, in the drive blocking state, the control ring 575*d* stops its rotation by being restricted, and the drive connection surface 575*d*6 of the control ring 575*d* is retracted from the driven connection surface 577*j*. In addition, the shape of the drive transmission surface 562*h* is set such that in the engagement portion between the drive transmission surface 562*h* and the engaged surface 577*h* of the drive relay portion 577*d*, force f51*r* in the direction to move outward in the radial direction is produced. In the drive blocking state, against the radial component f51*r*, the drive relay portion 577*d* is allowed to deform outward in the radial direction, and the drive relay portion 577*d* can be deformed outward in the radial direction so as to increase the size of the inscribed circle of the three engaged surfaces 577*h*.

Even when the drive transmission surface 562*h* of the main assembly driving shaft 562 and the engaged surface 577*h* of the drive relay portion 577*d* are in contact with each other, transmission of rotation of the main assembly driving shaft 562 to the coupling member 577 and the downstream transmission member 571 can be blocked. That is, there is no need to make the engaged surface 577*h* of the drive relay portion 577*d* non-contact from the drive transmission surface 562*h*, the amount of retracting the engaged surface 577*h* can be reduced. as a result, as compared with Embodiment 2 and Embodiment 3, downsizing is possible in the radial direction perpendicular to the rotational axis.

In addition, in this embodiment as is different from Embodiment 4, a torque limiter 562*c* is provided on the main assembly driving shaft 562 side. Also with such a structure, similarly to Embodiment 4, the transmission release mechanism 575 switches between the driving transmission state and the driving blocking state, for the transmission of rotation from the main assembly driving shaft 562 to the downstream transmission member 571, as has been described. By providing the functional portions such as the torque limiter 562*c* on the main assembly side, the cost of the cartridge P can be reduced.

In addition, in this embodiment, when mounting the cartridge, the coupling member 577 is in the state of is not being connected with the first output member 562*a*. In addition, when dismounting the cartridge, the connection between the coupling member 577 and the first output member 562*a* is released. Therefore, the user can easily mount and dismount the cartridge. On the other hand, when the driving shaft 562 rotates, the coupling member 577 and the first output member 562*a* can be reliably connected with each other.

<Summary of Each Embodiment>

As explained in Embodiments 1 to 5, the modifications thereof, and reference examples, as a mechanism to control the rotation of the developing roller (rotatable member for carrying the developer on its surface), various structures are possible to employ.

For example, as shown in FIG. 9 and so on, as an example of transmission/blocking mechanism (clutch), it is possible to employ a spring clutch 75 which switches between transmission and blocking of driving by loosening or tightening a spring (elastic member) 75*c*. In addition, as another example of transmission/blocking mechanism, the structures shown in parts (a) to (c), FIG. 19, FIG. 23, FIG. 29 to FIG. 31, FIG. 42, FIG. 43 are usable. These have structures for switching between transmission and blocking of driving by moving the engaged surface (engaging portion, driving force receiving portion) 171*a*1 and the like in the radial direction.

In addition, as an example of transmission blocking mechanism, it is possible to employ the mechanism (75, 170, 270, 375, 475) for switching between driving transmission and blocking inside the cartridge (parts (a) to (c) of FIGS. 9 and 16, FIGS. 19 and 23, FIG. 29 to FIG. 31 and so on). That is, the clutch is provided with the first transmission member and the second transmission member, and transmits and blocks driving force between them.

On the other hand, as another example of the transmission blocking mechanism, it is also possible to employ a mechanism (575) which switches between transmission and blocking of the drive in the boundary area (connection area) between the cartridge and the image forming apparatus main assembly (FIGS. 32, 33, 34, and so on). In such a transmission blocking mechanism 575, the coupling member 577 on the cartridge side is switched between the state in which the driving force is inputted from the driving shaft 562 on the image forming apparatus main assembly side and the state in which the driving force is not inputted, by which the switching is effected between driving force transmission and blocking. The transmission blocking mechanism 575 has the coupling member 577 for connecting to the driving shaft of the image forming apparatus main assembly.

In addition, there may be a plurality of structures for the control ring provided in the transmission blocking mechanism. In the structure shown in FIG. 9, the control ring 75*b* is connected to the spring 75*c* for connecting the input member (input inner ring, first transmission member) 75*a* and the output member (second transmission member) 75*b* of the transmission blocking mechanism. The control ring 75*b* receives the rotational force from the input inner ring 75*a* by way of the spring 75*c* to rotate.

On the other hand, in the structure shown in FIG. 16, the structure is such that the drive blocking surface 175*c* of the control ring 175 receives a driving force from the second transmission member (output member) 171 of the transmission blocking mechanism to rotate together with the second transmission member 171 (part (a) of FIG. 16).

Or, as shown in FIG. 28, the control ring 475*d* is connected to the first transmission member 474 by way of the torque limiter (spring 475*c*), and the control ring 475*d* is rotated by the driving force of the first transmission member 475.

Or, as shown in FIG. 39 and FIG. 43, the control ring 575*d* can also be rotated by the second drive output member 562*b* provided in the image forming apparatus main assembly. That is, the control ring 575 is driven using a driving force directly received from the outside of the cartridge not the driving force transmitted from the inside of the cartridge.

In addition, as shown in part (c) of FIG. 16, when the drive is blocked, the control ring 175 is moved to the second rotational position to establish the state in which the engaged surface 171*a*1 is urged to the second position on the outer side in the radial direction by the drive blocking surface (urging portion, holding portion) 175*c* of the control ring 175.

In addition, the control rings (475*d*, 575*d*) shown in part (a) of FIG. 30 and FIG. 45 can also be used. With such a structure, at the time of the drive transmission, the control ring (475*d*, 575*d*) moves to the first position, and the engaged surfaces (driving force receiving portions) 477*h* and 577*h* are urged and held at the first position on the radially inner side, using the urging portions (holding portions 475*d*5 and 575*d*5) of the control ring.

The control ring (475*d*, 575*d*) moves to the second position when the drive is blocked, thereby moving the engaged surface (477*h*, 577*h*) to the second position radially outside. Or, the control ring (475*d*, 575*d*) allows the engaged surfaces (477*h*, 577*h*) to move to the second position.

For example, as shown in part (a) of FIG. 30 and part (a) of FIG. 40, when the drive is blocked, it can be retracted to the second position radially outside by the elastic force of the supporting portion (drive relay portion 477*d*, 577*d*) which supports the engaged surface (477*h*, 577*h*). This is the behavior called the drive blocking state 1 described above.

Or, as shown in part (b) of FIG. 31 and part (b) of FIG. 45, using the force (f41, f51) received when the engaged surface comes into contact with the drive transmission portion, the engaged surface (477*h*, 577*h*) is moved to the second position outside in the radial direction so that the drive transmission can be blocked. This is the behavior called the drive blocking state 2 described above.

In addition, the engaged surface 171*a*1 and so on are movably supported by a drive relay portion (supporting portion, elastic portion) 171*a* and the like which can be elastically deformed. Here, in part (a) of FIG. 16 and so on, although the cantilever is disclosed as a form of the supporting portion (drive relay part) for movably supporting the engaged surface, as shown in FIG. 18, FIG. 19, and FIG. 20, and other structures are possible to use.

In addition, the engaged surface (driving force receiving portion) is not limited to the structure in which the engagement is released by moving outward in the radial direction. In FIG. 18, the structure which releases the engagement by the engaged surface moving radially inward is shown.

As described above, in Embodiments 1-5, various structures have been disclosed for controlling the transmission of the driving force toward the developing roller (the rotating member carrying the developer on the surface). Some of the structures of the different embodiments may be combined with each other.

The Effect of the Invention

According to the present invention, an image forming apparatus capable of stably switching the driving to a developing roller is provided.

REFERENCE NUMERALS AND CHARACTERS

| | |
|---|---|
| 1: | Image forming apparatus. |
| 2: | main assembly of the apparatus. |
| 4: | Electrophotographic photosensitive drum. |
| 5: | Charging roller. |
| 7: | Cleaning blade. |
| 8: | Drum unit. |
| 9: | Developing unit. |
| 24: | Drive side cartridge cover. |
| 25: | Non-driving side cartridge cover. |
| 26: | Cleaning container. |
| 27: | Waste developer storage. |
| 29: | Development frame. |
| 31: | Development blade. |
| 32: | Development cover member. |
| 32c: | Acting portion. |
| 32c1: | First acting portion. |

The invention claimed is:

1. A cartridge detachably mountable to a main assembly of an electrophotographic image forming apparatus, the cartridge comprising:

a developing roller;

a coupling member for transmitting a driving force for rotating the developing roller toward the developing roller by rotating about an axis, the coupling member being provided with (i) a driving force receiving portion configured to receive the driving force from outside of the cartridge and (ii) an open space provided between the driving force receiving portion and the axis and being open to outside of the cartridge, the driving force receiving portion being configured to be movable between (i) a first receiving portion position and (ii) a second receiving portion position that is more remote from the axis than the first receiving portion position is from the axis; and a rotatable member rotatable about the axis relative to the coupling member between (i) a first rotational position for placing the driving force receiving portion in the first receiving portion position and (ii) a second rotational position for moving the driving force receiving portion to the second receiving portion position or for permitting movement of the driving force receiving portion to the second receiving portion position, wherein, in a state that the developing roller and the coupling member do not rotate, the rotatable member is capable of rotating from the second rotational position to the first rotational position.

2. A cartridge detachably mountable to a main assembly of an electrophotographic image forming apparatus, the cartridge comprising:

a developing roller;

a coupling member for transmitting a driving force for rotating the developing roller toward the developing roller by rotating about an axis, the coupling member being provided with (i) a driving force receiving portion configured to receive the driving force from outside of the cartridge and (ii) an open space provided between the driving force receiving portion and the axis and being open to outside of the cartridge, the driving force receiving portion projecting toward the axis and being configured to be movable between (i) a first receiving portion position and (ii) a second receiving portion position that is more remote from the axis than the first receiving portion position is from the axis; and a rotatable member rotatable about the axis relative to the coupling member between (i) a first rotational position for placing the driving force receiving portion in the first receiving portion position and (ii) a second rotational position for moving the driving force receiving portion to the second receiving portion position or for permitting movement of the driving force receiving portion to the second receiving portion position.

3. A cartridge detachably mountable to a main assembly of an electrophotographic image forming apparatus, the cartridge comprising:

a developing roller;

a coupling member for transmitting a driving force for rotating the developing roller toward the developing roller by rotating about an axis, the coupling member being provided with (i) a driving force receiving portion configured to receive the driving force from outside of the cartridge and (ii) an open space provided between the driving force receiving portion and the axis and being open to outside of the cartridge, the driving force receiving portion being configured to be movable between (i) a first receiving portion position and (ii) a second receiving portion position placed at a position that is more remote from the axis than the first receiving portion position is from the axis;

a rotatable member rotatable about the axis relative to the coupling member between (i) a first rotational position for placing the driving force receiving portion in the first receiving portion position and (ii) a second rotational position for moving the driving force receiving portion to the second receiving portion position or for permitting movement of the driving force receiving portion to the second receiving portion position; and an urging member for urging the rotatable member from the first rotational position toward the second rotational position.

4. A cartridge detachably mountable to a main assembly of an electrophotographic image forming apparatus, the cartridge comprising:

a developing roller;

a coupling member for transmitting a first driving force for rotating the developing roller toward the developing roller by rotating about an axis, the coupling member being provided with (i) a first driving force receiving portion for receiving the first driving force from outside of the cartridge and (ii) an open space provided between the first driving force receiving portion and the axis and being open to outside of the cartridge, the first driving force receiving portion being configured to be movable between (i) a first receiving portion position and (ii) a second receiving portion position that is more remote from the axis than the first receiving portion position is from the axis; and a rotatable member provided with a second driving force receiving portion for receiving a second driving force from outside of the cartridge, the rotatable member being rotatable about the axis, by the second driving force, relative to the coupling member between (i) a first rotational position for placing the first driving force receiving portion in the first receiving portion position and (ii) a second rotational position for moving the first driving force receiving portion to the second receiving portion position or for permitting movement of the first driving force receiving portion to the second receiving portion position.

5. A cartridge detachably mountable to a main assembly of an electrophotographic image forming apparatus, the cartridge comprising:

a photosensitive member;

a developing roller movable toward and away from the photosensitive member;

a coupling member for transmitting a driving force for rotating the developing roller from outside of the cartridge toward the developing roller by rotating about an axis, the coupling member being provided with (i) a driving force receiving portion configured to receive the driving force from outside of the cartridge and (ii) an open space provided between the driving force receiving portion and the axis and being open to outside of the cartridge the driving force, the driving force receiving portion being configured to be movable between (i) a first receiving portion position and (ii) a second receiving portion position that is more remote from the axis than the first receiving portion position is from the axis;

a rotatable member rotatable about the axis relative to the coupling member between (i) a first rotational position for placing the driving force receiving portion in the first receiving portion position and (ii) a second rotational position for moving the driving force receiving portion to the second receiving portion position or for permitting movement of the driving force receiving portion to the second receiving portion position; and a control member for controlling rotation of the rotatable member, wherein the control member moves to a first control position for stopping rotation of the rotatable member in accordance with the developing roller moving close to the photosensitive member, and the control member moves to a second control position for permitting the rotation of the rotatable member in accordance with the developing roller being spaced from the photosensitive member.

6. A cartridge according to claim 3, wherein the first driving force receiving portion projects toward the axis.

7. A cartridge according to claim 1, further comprising an urging member for urging the rotatable member toward the second receiving portion position.

8. A cartridge according to claim 3, wherein the urging member is an elastic member.

9. A cartridge according to claim 1, wherein the driving force receiving portion is a first driving force receiving portion and the driving force is a first driving force, and wherein the rotatable member includes a second driving force receiving portion for receiving a second driving force from outside of the cartridge for rotating the rotatable member.

10. A cartridge according to claim 4, wherein the second driving force receiving portion projects toward outside of the cartridge.

11. A cartridge according to claim 4, wherein the second driving force receiving portion projects in a direction in which the axis extends.

12. A cartridge according to claim 9, wherein the coupling member projects more outward of the cartridge than the first driving force receiving portion in a direction in which the axis extends.

13. A cartridge according to claim 1, further comprising a control member for controlling rotation of the rotatable member, the control member being movable between (a) a first control position for permitting rotation of the rotatable member and (b) a second control position for stopping the rotation of the rotatable member.

14. A cartridge according to claim 5, wherein, when the rotatable member does not rotate in a predetermined rotational direction, the control member is configured to move the rotatable member in a direction opposite to the predetermined rotational direction.

15. A cartridge according to claim 5, wherein the control member includes a locking portion for locking a locked portion provided on the rotatable member, and wherein the locking portion is movable between an unlocked position for retracting from a rotation locus of the locked portion to permit rotation of the rotatable member and (b) a locked position for locking the locked portion to stop the rotation of the rotatable member.

16. A cartridge according to claim 13, wherein the cartridge includes a photosensitive member, and wherein the control member moves (a) to the second control position in accordance with the developing roller moving away from the photosensitive member and (b) to the first control position in accordance with the developing roller moving close to the photosensitive member.

17. A cartridge according to claim 1, wherein the cartridge includes a photosensitive member.

18. A cartridge according to claim 1, wherein the rotatable member includes a holding portion for holding the driving force receiving portion in the first receiving portion position when the rotatable member is in the first rotational position.

19. A cartridge according to claim 18, wherein a rotational radius of the holding portion is greater than a rotational radius of the driving force receiving portion.

20. A cartridge according to claim 1, further comprising a downstream transmission member for transmitting the driving force from the coupling member toward the developing roller, the downstream transmission member having a substantially cylindrical shape, wherein a part of the coupling member is positioned inside of the cylindrical shape.

21. A cartridge according to claim 20, wherein the downstream transmission member is provided with a gear portion for outputting the driving force toward the developing roller.

22. A cartridge according to claim 1, further comprising:

a developing frame rotatably supporting the developing roller;

a supporting member for movably supporting the developing frame; and an urging member configured to be switchable between a state in which the urging member urges the developing frame in accordance with movement of the developing frame and a state in which urging member does not urge the developing frame.

23. A cartridge according to claim 22, further comprising a photosensitive member, wherein the supporting member rotatably supports the photosensitive member, and the developing frame is movable between a developing position in which the developing roller is close to the photosensitive member and a non-developing position in which the developing roller is spaced from the photosensitive member, and wherein the urging member (a) urges the developing frame toward the developing position when the developing frame is in the non-developing position, and (b) does not urge the developing frame when the developing frame is in the developing position.

24. A cartridge according to claim 1, wherein the coupling member includes an elastic portion for supporting the driving force receiving portion.

25. A cartridge according to claim 1, wherein the coupling member includes a cantilever for supporting the driving force receiving portion.

26. A cartridge according to claim 25, wherein the coupling member is configured to rotate in a predetermined rotational direction when transmitting the driving force, and the cantilever extends toward a free end thereof toward a downstream side in the rotational direction.

27. A cartridge according to claim 1, wherein the cartridge is detachably mountable to the main assembly that is provided with a first main assembly side coupling and a second main assembly side coupling, the first main assembly side coupling and the second main assembly side coupling being coaxially positioned, the driving force receiving portion being configured to receive the driving force from the first main assembly side coupling, and the rotatable member being configured to be rotated by the second main assembly side coupling.

28. A cartridge detachably mountable to a main assembly of an electrophotographic image forming apparatus, the cartridge comprising:

a developing roller;

a coupling member for transmitting a driving force for rotating the developing roller toward the developing roller by rotating about an axis, the coupling member being provided with (i) a driving force receiving portion configured to receive the driving force from outside of the cartridge and (ii) an open space provided between the driving force receiving portion and the axis and being open to outside of the cartridge, the driving force receiving portion being configured to be movable between (i) a first receiving portion position and (ii) a second receiving portion position that is more remote from the axis than the first receiving portion position is from the axis; and a holding portion for holding the driving force receiving portion, the holding portion being movable relative to the coupling member between (i) a holding position for holding the driving force receiving portion in the first receiving portion position and (ii) a non-holding position for moving the driving force receiving portion to the second receiving portion position or for permitting movement of the driving force receiving portion to the second receiving portion position.

29. A cartridge according to claim 28, wherein the holding portion is configured to be rotatable about the axis.

30. A cartridge according to claim 28, wherein the holding portion projects outward of the cartridge.

31. A cartridge according to claim 28, wherein the holding portion projects more outward of the cartridge than the driving force receiving portion.

32. A cartridge detachably mountable to a main assembly of an electrophotographic image forming apparatus, the cartridge comprising:

a developing roller;

a driving force receiving portion for receiving a driving force from outside of the cartridge for rotating the developing roller, the driving force receiving portion being configured to be rotatable about an axis between (i) a first receiving portion position and (ii) a second receiving portion position that is more remote from the axis than the first receiving portion position is from the axis; and an urging force receiving portion for receiving from outside of the cartridge an urging force for moving the driving force receiving portion from the second receiving portion position toward the first receiving portion position, wherein the cartridge is provided with an open space between the driving force receiving portion and the axis and the open space is open to outside of the cartridge.

33. A cartridge according to claim 32, wherein the urging force receiving portion is configured to rotate about the axis.

34. A cartridge according to claim 32, wherein the urging force receiving portion projects outward of the cartridge.

35. A cartridge according to claim 32, wherein the urging force receiving portion projects more outward of the cartridge than the driving force receiving portion in a direction in which the axis extends.

* * * * *